(12) United States Patent
Yatake et al.

(10) Patent No.: US 8,759,417 B2
(45) Date of Patent: Jun. 24, 2014

(54) WATER-BASED INK, WATER-BASED INK SET, AND PROCESS FOR PRODUCING DISPERSION

(75) Inventors: Masahiro Yatake, Nagano (JP); Hidehiko Komatsu, Nagano (JP); Hitoshi Ohta, Nagano (JP); Kazuhiko Hara, Nagano (JP); Hiroko Hayashi, Nagano (JP); Jun Ito, Nagano (JP); Nagatoshi Kasahara, Nagano (JP); Keiichi Noto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1302 days.

(21) Appl. No.: 10/492,884

(22) PCT Filed: Oct. 17, 2002

(86) PCT No.: PCT/JP02/10786
§ 371 (c)(1),
(2), (4) Date: Oct. 15, 2004

(87) PCT Pub. No.: WO03/033602
PCT Pub. Date: Apr. 24, 2003

(65) Prior Publication Data
US 2005/0124726 A1    Jun. 9, 2005

(30) Foreign Application Priority Data

| Oct. 18, 2001 | (JP) | 2001-320779 |
| Feb. 26, 2002 | (JP) | 2002-50460 |
| Feb. 28, 2002 | (JP) | 2002-55034 |
| Mar. 5, 2002 | (JP) | 2002-59573 |
| Mar. 5, 2002 | (JP) | 2002-59576 |
| Jul. 1, 2002 | (JP) | 2002-192758 |
| Jul. 1, 2002 | (JP) | 2002-192759 |
| Jul. 1, 2002 | (JP) | 2002-192760 |
| Aug. 8, 2002 | (JP) | 2002-231537 |
| Aug. 8, 2002 | (JP) | 2002-231539 |
| Aug. 8, 2002 | (JP) | 2002-231540 |
| Aug. 8, 2002 | (JP) | 2002-231541 |
| Sep. 6, 2002 | (JP) | 2002-261820 |
| Sep. 6, 2002 | (JP) | 2002-261821 |
| Sep. 6, 2002 | (JP) | 2002-261822 |
| Sep. 6, 2002 | (JP) | 2002-261823 |
| Sep. 6, 2002 | (JP) | 2002-261826 |
| Sep. 6, 2002 | (JP) | 2002-261827 |
| Sep. 20, 2002 | (JP) | 2002-275206 |

(51) Int. Cl.
| B60C 1/00 | (2006.01) |
| C08F 220/04 | (2006.01) |
| C08G 73/10 | (2006.01) |
| C08J 3/00 | (2006.01) |
| C08K 3/20 | (2006.01) |
| C08K 5/05 | (2006.01) |
| C08K 5/06 | (2006.01) |
| C08K 5/24 | (2006.01) |
| C08K 9/00 | (2006.01) |
| C08F 297/02 | (2006.01) |
| C08L 25/00 | (2006.01) |
| C09D 5/00 | (2006.01) |
| C09D 5/02 | (2006.01) |
| C09D 11/00 | (2014.01) |
| C09D 11/10 | (2014.01) |
| C09J 7/02 | (2006.01) |

(52) U.S. Cl.
USPC ........... 523/160; 523/161; 523/200; 523/205; 524/261; 524/265; 524/366; 524/376; 524/377; 524/378; 524/379; 524/386; 524/389; 524/577

(58) Field of Classification Search
USPC .................. 523/160, 161, 200, 205; 524/577
See application file for complete search history.

(56) References Cited

U.S. PATENT DOCUMENTS

| 4,732,613 | A | * | 3/1988 | Shioya et al. | 106/31.32 |
| 5,637,138 | A | * | 6/1997 | Yamazaki | 106/31.32 |
| 5,648,405 | A | * | 7/1997 | Ma et al. | 523/160 |
| 5,824,142 | A | | 10/1998 | Yamazaki | |
| 6,074,467 | A | | 6/2000 | Tabayashi et al. | |
| 6,500,248 | B1 | * | 12/2002 | Hayashi | 106/31.86 |
| 6,511,534 | B1 | | 1/2003 | Mishina et al. | |
| 6,596,068 | B1 | | 7/2003 | Ito et al. | |
| 6,602,333 | B2 | | 8/2003 | Miyabayashi | |
| 6,676,735 | B2 | | 1/2004 | Oki et al. | |
| 6,852,777 | B1 | | 2/2005 | Nakano et al. | |
| 6,916,862 | B2 | * | 7/2005 | Ota et al. | 523/200 |
| 2003/0106462 | A1 | * | 6/2003 | Yatake et al. | 106/31.59 |
| 2003/0203988 | A1 | * | 10/2003 | Erdtmann et al. | 523/160 |

FOREIGN PATENT DOCUMENTS

| CN | 02825419.8 | 10/2002 |
| EP | 861880 A1 | 9/1998 |
| EP | 1 046 687 | 10/2000 |
| EP | 1059337 A1 * | 12/2000 |
| EP | 1114851 A | 7/2001 |

(Continued)

OTHER PUBLICATIONS

Machine Translation of JP 2001-302950 A (2001).*

(Continued)

*Primary Examiner* — Patrick Niland

(57) ABSTRACT

An aqueous ink ensuring less blurring and high color formation on plain paper, satisfactory color formation and fixing property on special paper and excellent ejection stability is realized by using a microcapsule of a colorant encapsulated with a polymer and rendered dispersible in water and specifying the amount of the aromatic ring in the polymer to be from 20 to 70 wt % of the polymer.

20 Claims, No Drawings

(56) References Cited

FOREIGN PATENT DOCUMENTS

| | | |
|---|---|---|
| JP | 1-182383 A | 7/1989 |
| JP | 05-320276 | 12/1993 |
| JP | 07-138518 | 5/1995 |
| JP | 08-183920 A | 7/1996 |
| JP | 8-183920 A | 7/1996 |
| JP | 9-31378 A | 2/1997 |
| JP | 9-151342 | 6/1997 |
| JP | 10-316909 | 12/1998 |
| JP | 11-080633 A | 3/1999 |
| JP | 11-80633 A | 3/1999 |
| JP | 11-166144 | 6/1999 |
| JP | 11-302586 A | 11/1999 |
| JP | 2000-7961 A | 1/2000 |
| JP | 2000-256570 | 9/2000 |
| JP | 2000-303008 | 10/2000 |
| JP | 2000-345086 A | 12/2000 |
| JP | 2001-2964 A | 1/2001 |
| JP | 2001-055531 A | 2/2001 |
| JP | 2001-72905 | 3/2001 |
| JP | 2001-152060 | 6/2001 |
| JP | 2001-164156 | 6/2001 |
| JP | 2001-187851 | 7/2001 |
| JP | 2001-302950 A | 10/2001 |
| JP | 2001-329199 | 11/2001 |
| JP | 2002-003765 A | 1/2002 |
| JP | 2002-69346 A | 3/2002 |
| JP | 2002-121446 A | 4/2002 |
| JP | 2002-121460 A | 4/2002 |
| JP | 2002-167529 A | 6/2002 |
| JP | 2002-211122 A | 7/2002 |
| JP | 2002-285055 A | 10/2002 |
| JP | 2003-138176 | 5/2003 |
| WO | WO 00/22056 A1 * | 4/2000 |
| WO | 00/39226 | 7/2000 |
| WO | 01/44384 | 6/2001 |
| WO | WO 01/96483 A1 * | 12/2001 |

OTHER PUBLICATIONS

Machine Translation of JP 2002-069346 A (2002).*
Machine English Translation of JP 2000-345086, Hiroshi et al., Dec. 12, 2000.*
Machine English Translation of JP 11-302586, Tsutomu, Feb. 11, 1999.*
English Abstract of JP 2003-138176 dated May 14, 2003.
English Abstract of JP 2001-329199 dated Nov. 27, 2001.
English Abstract of JP 2001-187851 dated Jul. 10, 2001.
English Abstract of JP 2001-72905 dated Mar. 21, 2001.
English Abstract of JP 2000-256570 dated Sep. 19, 2000.
English Abstract of JP 11-166144 dated Jun. 22, 1999.
English Abstract of JP 9-151342 dated Jun. 10, 1997.
English Abstract of Japanese 11-080633 A Published Nov. 2001.
English Abstract of Japanese 2001-187851 Published Jul. 2001.
Patent abstracts of Japan and JPO computer English translation of JP 07-138518 dated May 30, 1995.
Patent abstracts of Japan and JPO computer English translation of JP 2001-164156 dated Jun. 19, 2001.

* cited by examiner

WATER-BASED INK, WATER-BASED INK SET, AND PROCESS FOR PRODUCING DISPERSION

TECHNICAL FIELD

The present invention relates to an aqueous ink ensuring high printing quality on plain paper, recycled or coated paper and gloss media and at the same time, having excellent storage stability.

The present invention also relates to an aqueous ink set ensuring excellent color reproducibility and printing quality on a printing medium particularly such as plain paper or gloss media usually used for aqueous inkjet printing.

In addition, the present invention relates to a method for producing a dispersion, comprising two steps, that is, a step of producing a dispersing element of a colorant encapsulated with a polymer and rendered dispersible in water, and a step of dispersing the dispersing element in an aqueous medium, wherein the amount of the aromatic ring in the polymer is from 20 to 70 wt % of the polymer. Furthermore, the present invention relates to a dispersion produced by this method and an aqueous ink using the dispersion.

BACKGROUND ART

The properties recently required of the aqueous ink for aqueous inkjet printers are that the printed image has good fastness such as water resistance and light fastness, troubles such as irregular flow of aqueous ink or spreading of ink to enlarge the attached small ink droplet (hereinafter this is referred to as "blurring") do not occur irrespective of the species of printing medium, and the printed image exhibits high density/color reproducibility irrespective of the species of printing medium.

Among these requirements, for ensuring the fastness of the printed image, studies are being made to use a pigment having excellent fastness in place of a dye. The pigment has no solubility in water unlike dye and therefore, needs to be dispersed in a fine particle state in water, but it is very difficult to stably maintain this dispersed state. To solve this problem, various techniques for stably dispersing a pigment in water have been proposed, such as a method of using a dispersible surfactant described in JP-A-1-301760 (the term "JP-A" as used herein means an "unexamined published Japanese patent application") and a method of using a dispersing polymer having a hydrophobic moiety and a hydrophilic moiety described in JP-B-5-64724 (the term "JP-B" as used herein means an "examined Japanese patent publication"). Also, with regard to the aqueous ink for aqueous inkjet printers, a technique of encapsulating the colorant surface with a polymer has been proposed, such as a method of using a microcapsule enclosing a dye aqueous ink described in JP-A-62-95366, a method of using a microcapsulated dye obtained by dissolving or dispersing a dye in a water-insoluble solvent and emulsifying the resulting solution or dispersion in water with a dispersible surfactant described in JP-A-1-170672, a method of preparing a microcapsule containing an inclusion product obtained by dissolving or dispersing a sublimable disperse dye in at least one of water, a water-soluble solvent and a polyester and using the microcapsule in a recording solution described in JP-A-5-39447, an ink composition comprising a colored emulsification-polymerized particle and an aqueous material described in JP-A-6-313141, and a method of using a phase inversion emulsification reaction or acid precipitation described in JP-A-10-140065.

As for the realization of a printed image having good color reproducibility, JP-A-5-155006 and JP-A-10-52925 describe a method of forming an image by combining a yellow aqueous ink, a magenta aqueous ink, a cyan aqueous ink and a black aqueous ink each obtained by dispersing a specific pigment with a water-soluble resin, and JP-A-2001-354886 describes a method of forming an image by combining a yellow aqueous ink, a magenta aqueous ink, a cyan aqueous ink, a black aqueous ink, a green aqueous ink and a red aqueous ink each obtained by dispersing a pigment with a water-soluble resin.

However, dispersing elements obtained by conventional techniques are unstable and when a surfactant or a substance having a hydrophilic moiety and a hydrophobic moiety, such as glycol ether, is present, absorption or desorption readily takes place and the aqueous ink disadvantageously suffers from poor storage stability. In the preparation of a normal aqueous ink, a surfactant or a substance having a hydrophilic moiety and a hydrophobic moiety, such as glycol ether, is necessary so as to reduce the blurring on paper. If such a substance is not used, the aqueous ink insufficiently permeates into paper and this causes a problem that the species of paper is limited for performing uniform printing or the printed image readily decreases in the quality.

Furthermore, when an additive for use in the present invention (that is, an acetylene glycol, an acetylene alcohol, a silicon-base surfactant, a di(tri)ethylene glycol monobutyl ether, a (di)propylene glycol monobutyl ether, a 1,2-alkylene glycol or a mixture thereof) is used in conventional dispersing elements, the long-term storage stability cannot be obtained and due to poor re-solubility of the aqueous ink, the aqueous ink is readily dried to cause a problem of clogging, for example, at the nozzle of an aqueous inkjet head or at the pen tip of a writing tool.

Also, the pigment dispersed by using such a dispersant has a problem in that the residual dispersant remains in the aqueous ink system and the dispersant does not satisfactorily contribute to the dispersion but desorbs from the pigment to increase the viscosity. If the viscosity increases, the amount added of the coloring material such as pigment is limited and a sufficiently high image quality cannot be obtained particularly on plain paper.

The present invention has been made to solve these problems and an object of the present invention is to provide an aqueous ink containing a dispersing element capable of giving an aqueous ink ensured with less blurring and high color formation on plain paper, satisfactory color formation and fixing on special paper, and in the aqueous inkjet recording, excellent ejection stability.

DISCLOSURE OF THE INVENTION

The aqueous ink of the present invention is an aqueous ink comprising a dispersing element of a colorant encapsulated with a polymer (hereinafter sometimes referred to as a "dispersing polymer") and rendered dispersible in water, wherein the amount of the aromatic ring in the polymer is from 20 to 70 wt % (hereinafter sometimes simply shown as "%") of the polymer.

BEST MODE FOR CARRYING OUT THE INVENTION

The present invention has been accomplished as a result of extensive investigations which have been made by taking account of properties required of the aqueous ink, such that the dispersing element in the aqueous ink has excellent stability, an aqueous ink ensured with less blurring and high color formation on plain paper and satisfactory color formation and fixing on special paper can be prepared and in aqueous inkjet recording, the aqueous ink exhibits excellent ejection stability from an aqueous inkjet head.

Preferred Embodiment (a) of the Present Invention

The aqueous ink of the present invention comprises a dispersing element of a colorant encapsulated with a polymer and rendered dispersible in water, wherein the amount of the aromatic ring in the polymer is from 20 to 70% of the polymer. When the amount of the aromatic ring is 20% or more of the polymer, the polymer can properly adsorb to a colorant having a hydrophobic surface. The adsorbed polymer is stabilized also by adding an additive which is suitably used in the present invention. If the amount of the aromatic ring exceeds 70%, dispersion becomes difficult and conversely, stability cannot be obtained. The amount of the aromatic ring is preferably from 25 to 50%.

The aqueous ink of the present invention is described below.

The dispersing element as a characteristic feature of the aqueous ink of the present invention is first described. As described above, the dispersing element contained in the aqueous ink of the present invention is encapsulated with a polymer and rendered dispersible in water.

In the present invention, the colorant means a substance having a so-called colored molecule and includes a pigment and a dye. As the colorant above, an organic or inorganic pigment can be suitably used.

Pigment

Examples of the inorganic or organic colorant which can be used as the pigment include the followings.

Examples of the inorganic black pigment include carbon blacks (C.I. pigment Black 7) such as furnace black, lamp black, acetylene black and channel black.

Examples of the organic pigment which can be used include a phthalocyanine pigment, a quinacridone pigment, a condensed azo pigment, an isoindolinone pigment, a quinophthalone pigment, an anthraquinone pigment, a benzimidazolone pigment and a perylene pigment.

Specific examples of the organic pigment for yellow aqueous ink include C.I. Pigment yellow 1 (Hansa Yellow G), 2, 3 (Hansa Yellow 10G), 4, 5 (Hansa Yellow 5G), 6, 7, 10, 11, 12 (Disazo Yellow AAA), 13, 14, 16, 17, 24 (Flavanthrone Yellow), 55 (Disazo Yellow AAPT), 61, 61:1, 65, 73, 74 (Fast Yellow 5GX), 75, 81, 83 (Disazo Yellow HR), 93 (Condensed Azo Yellow 3G), 94 (Condensed Azo Yellow 6G), 95 (Condensed Azo Yellow GR), 97 (Fast Yellow FGL), 98, 99 (anthraquinone), 100, 108 (Anthrapyrimidine Yellow), 109 (Isoindolinone Yellow 2GLT), 110 (Isoindolinone Yellow 3RLT), 113, 117, 120 (Benzimidazolone Yellow H2G), 123 (Anthraquinone Yellow), 124, 128 (Condensed Azo Yellow 8G), 129, 133, 138 (Quinophthalone Yellow), 139 (Isoindolinone Yellow), 147, 151 (Benzimidazolone Yellow H4G), 153 (Nickel Nitroso Yellow), 154 (Benzimidazolone Yellow H3G), 155, 156 (Benzimidazolone Yellow HLR), 167, 168, 172, 173 (Isoindolinone Yellow 6GL) and 180 (Benzimidazolone Yellow).

Specific examples of the organic pigment for magenta aqueous ink include C.I. Pigment Red 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red B), 40, 41, 42, 88 (Thioindigo Bordeaux), 112 (Naphthol Red FGR), 114 (Brilliant Carmine BS), 122 (dimethylquinacridone), 123 (Perylene Vermilion), 144, 146, 149 (Perylene Scarlet), 150, 166, 168 (Anthanthrone Orange), 170 (Naphthol Red F3RK), 171 (Benzimidazolone Maroon HFM), 175 (Benzimidazolone Red HFT), 176 (Benzimidazolone Carmine HF3C), 177, 178 (Perylene Red), 179 (Perylene Maroon), 185 (Benzimidazolone Carmine HF4C), 187, 188, 189 (Perylene Red), 190 (Perylene Red), 194 (Perynone Red), 202 (Quinacridone Magenta), 209 (Dichloroquinacridone Red), 214 (Condensed Azo Red), 216, 219, 220 (Condensed Azo), 224 (Perylene Red), 242 (Condensed Azo Scarlet) and 245 (Naphthol Red), and C.I. Pigment Violet 19 (quinacridone), 23 (Dioxazine Violet), 31, 32, 33, 36, 38, 43 and 50.

Specific examples of the pigment for cyan aqueous ink include C.I. Pigment Blue 15, 15:1, 15:2, 15:3, 15:4, 15:6 (all are Phthalocyanine Blue), 16 (non-metallic Phthalo-cyanine Blue), 17:1, 18 (Alkali Blue Toner), 19, 21, 22, 25, 56, 60 (Indanthrene Blue), 64 (Dichloroindanthrone Blue), 65 (Violanthrone) and 66 (Indigo).

Specific examples of the organic pigment which can be used for black aqueous ink include black organic pigments such as Aniline Black (C.I. Pigment Black 1).

Specific examples of the organic pigment used for color aqueous inks other than yellow, cyan and magenta aqueous inks include C.I. Pigment Orange 1, 2, 5, 7, 13, 14, 15, 16 (Vulcan Orange), 24, 31 (Condensed Azo Orange 4R), 34, 36 (Benzimidazolone Orange HL), 38, 40 (Pyranthrone Orange), 42 (Isoindolinone Orange RLT), 43, 51, 60 (benzimidazolone-base insoluble monoazo pigment), 62 (benzimidazolone-base insoluble monoazo pigment) and 63; C.I. Pigment Green 7 (Phthalocyanine Green), 10 (Green Gold), 36 (Chlorobromophthalocyanine Green), 37 and 47 (Violanthrone Green); and C.I. Pigment Brown 1, 2, 3, 5, 23 (Condensed Azo Brown 5R), 25 (Benzimidazolone Brown HFR), 26 (Perylene Bordeaux) and 32 (Benzimidazolone Brown HFL).

In the aqueous ink of the present invention, these pigments can be used individually or as a mixture of two or more thereof.

Before the pigment is encapsulated with a polymer to form a microcapsule (this means a dispersing element), the pigment used is preferably ground to a fine particle in advance. The grinding of the pigment may be performed by wet grinding or dry grinding using grinding media such as zirconia bead, glass bead and inorganic salt. Examples of the grinding apparatus include an attritor, a ball mill and a vibrating mill.

In the case of grinding the pigment into a fine particle, not a small amount of the grinding media (bead) is considered to mingle in the pigment. More specifically, Si is considered to mingle in the pigment in the case of using glass beads as the grinding media, Zr is considered to mingle in the case of using zirconia beads, and Fe, Cr, Ni and the like are considered to mingle in the case of using a grinding apparatus constituted by stainless steel members. Therefore, the pigment after the grinding is preferably subjected to washing, ultrafiltration or the like to remove contaminants generated from the grinding media or grinding apparatus.

Also, the pigment may be ground by a method (salt milling method) of using a water-soluble inorganic salt (e.g., NaCl, $BaCl_2$, KCl, $Na_2SO_4$) for the grinding media. At this time, the mingled grinding media component can be theoretically removed by the washing with ion exchanged water or the like. However, in some cases, a pigment having a large surface area and the above-described inorganic salt are mixed and if the washing after grinding is insufficient, a large amount of an inorganic salt as the dispersion media may remain and therefore, cares should be taken to avoid this.

As for the dispersion method, ultrasonic wave dispersion, bead milling, sand milling, roll milling, jet milling and other known dispersion methods may be used.

In the case where the aqueous ink is used for aqueous inkjet system, the amount of the pigment added is preferably from 0.5 to 30%, more preferably from 1.0 to 12%. If the amount added is less than this range, the printing density cannot be ensured, whereas if the amount added exceeds this range, the viscosity of the aqueous ink increases or a structural viscosity is generated in the viscosity characteristics and this is liable to worsen the ejection stability of the aqueous ink from an aqueous inkjet head.

The particle size of the pigment is preferably 5 μm or less, more preferably 0.3 μm or less, still more preferably from 0.01 to 0.15 μm.

Dispersing Polymer

The dispersing polymer for use in the aqueous ink of the present invention encapsulates the pigment and thereby renders the pigment dispersible in water and at the same time, the amount of the aromatic ring in the dispersing polymer is from 20 to 70% of the dispersing polymer. The hydrophobic group of a substance forming the dispersing polymer is preferably at least one selected from an alkyl group, a cycloalkyl group and an aromatic ring, but an aromatic ring is preferably used in the above-described amount. The alkyl group or the alkyl group in the cycloalkyl group is preferably an alkyl group having a carbon number of 4 or more. In the case of incorporating an aromatic ring into the dispersing polymer, the aromatic ring can be incorporated in the form of an aryl group (specifically, a phenyl group, a naphthyl group, an anthryl group or the like) and/or a derivative thereof, other aromatic ring, or a heterocyclic ring and/or a derivative thereof. Also, the substance forming the dispersing polymer preferably has a hydrophilic functional group. The hydrophilic functional group is preferably at least a carboxyl group, a sulfonic acid group, a hydroxyl group, an amino group, an amido group or a base thereof. Specific examples of the substance which can be used for forming the dispersing polymer include monomers and oligomers containing an acryloyl, methacryloyl, vinyl or allyl group having a double bond.

Also, the polymer encapsulating the pigment preferably contains, as a component, one or more member selected from the group consisting of a polyacrylic acid ester, a styrene-acrylic acid copolymer, a polystyrene, a polyester, a polyamide, a polyimide, a silicon-containing polymer and a sulfur-containing polymer. A substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol, which is used in the present invention, causes an absorption/desorption reaction with a normal dispersant used for dispersion and the desorbed dispersant floats in the aqueous ink to readily generate a phenomenon that the printing is disordered. However, when the colorant is properly dispersed by using the polymer, the absorption/desorption reaction scarcely occurs because the polymer stably encapsulates the colorant, and this is preferred.

The colorant obtained by encapsulating the pigment with the polymer is preferably produced by encapsulating the pigment with a copolymer of a dispersant having at least a polymerizable group and a monomer copolymerizable therewith. Here, the dispersant having a polymerizable group has at least a hydrophobic group, a hydrophilic group and a polymerizable group, and the polymerizable group is an acryloyl group, a methacryloyl group, an allyl group or a vinyl group. The copolymerizable group is similarly an acryloyl group, a methacryloyl group, an allyl group or a vinyl group. In the case of use as an aqueous ink for aqueous inkjet recording, a relatively uniform particle size is preferred in view of clogging or ejection stability and therefore, the colorant obtained by encapsulating the pigment with the polymer is preferably produced by an emulsification polymerization method or a phase inversion emulsification reaction method. Also, when the benzene ring in the polymer falls within the range of the present invention and the dispersion is performed by using a suitable dispersant, a firm polymer results and this is preferred because dispersion stability can be obtained for a long period of time even on addition of a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and 1,2-alkylene glycol, which is preferably used in the present invention.

The colorant obtained by encapsulating the pigment with the polymer is preferably produced by dispersing the pigment with a dispersant having a polymerizable group and subjecting it to an emulsification polymerization in water using a monomer copolymerizable with the dispersant and a polymerization initiator or to a phase inversion emulsification in water to encapsulate the pigment with the polymer.

Examples of the monomer for the dispersing polymer used in the aqueous ink of the present invention, which can be used specifically for incorporating an aromatic ring into the dispersing polymer, include styrene, (α, 2, 3 or 4)-alkylstyrene, (α, 2, 3 or 4)-alkoxystyrene, 3,4-dimethylstyrene, α-phenylstyrene, divinylbenzene, vinyl-naphthalene, styrene macromer, benzyl (meth)acrylate, phenoxyethyl (meth)acrylate, and di(meth)acrylate of ethylene oxide adduct of bisphenol A or F. Other examples of the monomer which can be used include tetrahydrofurfuryl acrylate, butyl methacrylate, dimethylamino(meth)acrylate, dimethylaminoethyl(meth)acrylate, dimethylaminopropyl acrylamide, N,N-dimethylaminoethyl acrylate, acryloyl-morpholine, N,N-dimethylacrylamide, N-isopropylacrylamide, N,N-diethylacrylamide, methyl (meth)acrylate, ethyl (meth)acrylate, propyl(meth)acrylate, ethylhexyl(meth)acrylate, other alkyl(meth)acrylates, methoxy diethylene glycol(meth)acrylate, (meth)acrylate of diethylene glycol or polyethylene glycol of an ethoxy, propoxy or butoxy group, cyclohexyl (meth)acrylate, isobornyl(meth)acrylate, hydroxyalkyl (meth)acrylate, other fluorine-, chlorine- or silicon-containing (meth)acrylates, (meth)acrylamide, maleic acid amide and (meth)acrylic acid. In the case of introducing a crosslinked structure into the dispersing polymer, in addition to the above-described monofunctional monomer, a compound having an acryl group or a methacryl group may be used, such as (mono-, di-, tri-, tetra- or poly-)ethylene glycol di(meth)acrylate, (meth)acrylate of 1,4-butanediol, 1,5-pentanediol, 1,6-hexanediol, 1,8-octanediol, 1,10-decanediol or the like, trimethylolpropane tri(meth)acrylate, glycerin (di- or tri-) (meth)acrylate, neopentyl glycol di(meth)acrylate, pentaerythritol tetra-(meth)acrylate and dipentaerythritol hexa(meth)acrylate.

The dispersing polymer may also be prepared by adding one or more member selected from aromatic ring-containing polymers, that is, a styrene-acrylic acid copolymer, a polystyrene and a polyimide, and other polymers, that is, a polyacrylic acid ester, a polyester, a polyamide, a silicon-containing dispersing polymer and a sulfur-containing dispersing polymer, to contain the selected polymer as the main component.

Examples of the polymerization initiator which can be used include potassium persulfate, ammonium persulfate and general initiators used for radical polymerization, such as hydrogen persulfate, azobisisobutyronitrile, benzoyl peroxide, dibutyl peroxide, peracetic acid, cumene hydroperoxide, tert-butylhydroxyperoxide and para-methane-hydroxyperoxide.

The dispersing polymer for use in the aqueous ink of the present invention can also be prepared by emulsification polymerization. In this case, a chain transfer agent may be used and examples thereof include tert-dodecylmercaptan, n-dodecylmercaptan, n-octylmercaptan, xanthogens such as dimethylxanthogen disulfide and diisobutylxanthogen sulfide, dipentene, indene, 1,4-cyclohexadiene, dihydrofuran and xanthene.

By using a dispersing element containing the above-described pigment and dispersing polymer as constituent elements, an aqueous ink having excellent storage stability and suitable for aqueous inkjet printing can be obtained. Furthermore, when the aqueous ink of the present invention contains a water-soluble organic solvent which is described later, an image reduced in blurring and having good fixing property/color reproducibility can be formed irrespective of the species of printing medium, such as plain paper or gloss media. Furthermore, the dispersing element can also be suitably used for an aqueous ink for writing tools.

The colorant obtained by encapsulating the pigment with the polymer is preferably produced by encapsulating the pigment with a copolymer of a dispersant having at least a polymerizable group and a monomer copolymerizable therewith. Here, the dispersant having a polymerizable group has at least a hydrophobic group, a hydrophilic group and a polymerizable group, and the polymerizable group is an acryloyl group, a methacryloyl group, an allyl group or a vinyl group. The copolymerizable group is similarly an acryloyl group, a methacryloyl group, an allyl group or a vinyl group.

In the case of use as an aqueous ink for aqueous inkjet recording, a relatively uniform particle size is preferred in view of clogging or ejection stability and therefore, the colorant obtained by encapsulating the pigment with the polymer is preferably produced by an emulsification polymerization method or a phase inversion emulsification reaction method. Also, when the benzene ring in the polymer falls within the range of the present invention and the dispersion is performed by using a suitable dispersant, a firm polymer results and this is preferred because dispersion stability can be obtained for a long period of time.

The dispersing element obtained by encapsulating the pigment with the polymer is preferably produced by dispersing the pigment with a dispersant having a polymerizable group and subjecting it to an emulsification polymerization in water using a monomer copolymerizable with the dispersant and a polymerization initiator.

Aqueous Ink

The aqueous ink of the present invention comprises at least a penetrant, a moisture holding agent, water and the above-described dispersing element.

In the aqueous ink for use in the present invention, a penetrant is sometimes added for the purpose of enhancing permeability of the aqueous ink into recording media such as paper. Also, various additives are sometimes added, such as a moisture holding agent so as to ensure the standing stability, the stable ejection from an aqueous ink ejection head and the like, a dissolution aid, a permeation controlling agent (penetrant), a viscosity adjusting agent, a pH adjusting agent, an antioxidant, an antifungal, a corrosion inhibitor, and a chelate for capturing metal ion having an effect on the dispersion.

(Penetrant)

When a penetrant is added, the printed matter is increased in the drying property and even on continuous printing, the previous printing portion is not transferred to the back surface of the next medium, so that high-speed print recording can be realized. Furthermore, in the case of use as the aqueous ink for aqueous inkjet printer, a penetrant which is less bubbled and not easily dried in a nozzle of the aqueous inkjet head is preferred.

The penetrant is preferably one or more member selected from acetylene glycol-base surfactants, acetylene alcohol-base surfactants, silicon-base surfactants, glycol ethers and alkylene glycols. By using such a penetrant, the blurring on plain paper can be reduced and the line width on gloss media can be appropriately adjusted.

Specific product examples of the acetylene glycol- or acetylene alcohol-base surfactant which can be suitably used as the penetrant include Surfynol TG, Surfynol 104, Surfynol 420, Surfynol 440, Surfynol 465, Surfynol 485, Surfynol 61, and Surfynol 82 (all produced by Air Products); Olfine E1010, Olfine E1004, Olfine E1004 and Olfine STG (all produced by Nissin Chemical Industry Co., Ltd.); and Acetylenol E00, Acetylenol E40 and Acetylenol E100 (all produced by Kawaken Fine Chemicals).

Examples of glycol ethers which can be suitably used as the penetrant include diethylene glycol mono($C_4$ to $C_8$ alkyl) ether, triethylene glycol mono($C_4$-$C_8$ alkyl) ether, propylene glycol mono($C_3$-$C_6$ alkyl) ether, and dipropylene glycol mono($C_3$-$C_6$ alkyl) ether. Specific examples include diethylene glycol monobutyl ether, triethylene glycol monobutyl ether, propylene glycol monobutyl ether, and dipropylene glycol monobutyl ether.

Examples of alkylene glycols which can be used as the penetrant include 1,2-($C_4$-$C_{10}$ alkyl)diol, 1,3-($C_4$-$C_{10}$ alkyl)diol, 1,5-($C_4$-$C_{10}$ alkyl)diol and 1,6-($C_4$-$C_{10}$ alkyl)diol. Specific examples include 1,2-pentanediol, 1,2-hexanediol, 1,3-butanediol, 1,5-pentanediol and 1,6-hexanediol.

When such a glycol ether and/or an alkylene glycol is added, the printed matter is increased in the drying property and even on continuous printing, the previous printing portion is not transferred to the back surface of the next medium, so that high-speed printing can be realized particularly in the aqueous inkjet recording. Those glycol ethers and/or alkylene glycols not only have an effect as a penetrant but also have properties as a dissolution aid for other sparingly-soluble additives used in the aqueous ink. For example, in the case of using, among those acetylene glycols, a compound having low solubility in water by itself, the solubility of the acetylene glycol can be elevated and the amount added thereof can be increased by adding and using a glycol ether in combination.

Furthermore, the glycol ethers and/or alkylene glycols have a microbicidal/antibacterial activity and therefore, when contained in an amount of approximately from 3 to 5% in the aqueous ink, this compound can provide an effect of suppressing the generation of microorganisms, fungi and the like.

In the aqueous ink of the present invention, the above-described acetylene glycol-base surfactants, acetylene alcohol-base surfactants, glycol ethers and alkylene glycols can be used individually or in combination as the penetrant. The amount added thereof is preferably from 0.01 to 30 wt %, more preferably from 0.1 to 10 wt %, based on the aqueous ink. If the amount added is less than 0.01%, the effect of enhancing the printing quality decreases, whereas if it exceeds 30 wt %, the periphery of a nozzle of the aqueous ink ejection head is non-uniformly wetted and stable ejection may not be obtained.

One or more member selected from those acetylene glycol-base surfactants, acetylene alcohol-base surfactants and silicon-base surfactants is preferably contained in an amount of 0.1 to 5%. Even if the amount added exceeds 5%, the effect on the printing quality does not increase any more and if added, the viscosity increases, as a result, the aqueous ink becomes difficult to handle or liable to adhere to the head tip and this readily causes disorder of printing, whereas if the amount added is less than 0.1%, the effect of enhancing the printing quality decreases. The amount added is more preferably from 0.15 to 2%.

Furthermore, at least one or more member selected from those acetylene glycol-base surfactants, acetylene alcohol-base surfactants and silicon-base surfactants, and one or more member selected from di(tri)ethylene glycol monobutyl ether, (di)propylene glycol monobutyl ether and 1,2-alkylene glycol are preferably added at the same time. When the acetylene glycol and/or acetylene alcohol-base surfactant is used simultaneously with one or more member selected from di(tri)ethylene glycol monobutyl ether, (di)propylene glycol monobutyl ether and 1,2-alkylene glycol, the printing quality is more enhanced.

In this case, one or more member selected from those acetylene glycol-base surfactants, acetylene alcohol-base surfactants and silicon-base surfactants is preferably added in an amount of 0 to 0.5% and one or more member selected from di(tri)ethylene glycol monobutyl ether, (di)propylene glycol monobutyl ether and 1,2-alkylene glycol is preferably added in an amount of 1% or more. One or more member selected from those acetylene glycol-base surfactants, acetylene alcohol-base surfactants and silicon-base surfactants provides an effect of enhancing the permeability by the addition in a small amount and therefore, the amount added thereof is 0.5% or less. As for one or more member selected from di(tri)ethylene glycol monobutyl ether, (di)propylene glycol monobutyl ether and 1,2-alkylene glycol, when the amount added thereof is 1% or more, the printing quality is more enhanced.

Other than these, as the penetrant for the aqueous ink of the present invention, the above-described alcohols, nonionic surfactants, silicon surfactants, water-soluble organic solvents and other surfactants can be similarly used.

Specific examples of the silicon-base surfactant which can be suitably used as the penetrant include BYK-307, BYK-331, BYK-333, BYK-347 and BYK-348 (all produced by Byk-Chemie).

In the aqueous ink of the present invention, these penetrants can be used individually or in combination of two or more thereof.

In particular, the alkylene glycol monoalkyl ether preferably has 10 or less alkylene glycol repeating units and contains an alkyl ether having a carbon number of 3 to 10. Among these, preferred are di(tri)ethylene glycol monobutyl ether and/or (di)propylene glycol monobutyl ether. The 1,2-alkylene glycol is preferably 1,2-hexanediol and/or 1,2-pentanediol.

The substance comprising one or more member selected from di(tri)ethylene glycol monobutyl ether, (di)propylene glycol monobutyl ether and 1,2-alkylene glycol is preferably added in an amount of 0.5 to 30%, more preferably from 1 to 15%.

In view of printing quality, at least one or more member selected from those acetylene glycol-base surfactants and acetylene alcohol-base surfactants and one or more member selected from di(tri)ethylene glycol monobutyl ether, (di)propylene glycol monobutyl ether and 1,2-alkylene glycol are preferably added at the same time.

In this case, one or more member selected from those acetylene glycol-base surfactants and acetylene alcohol-base surfactants is preferably added in an amount of 0.01 to 1.0% and one or more member selected from di(tri)ethylene glycol monobutyl ether, (di)propylene glycol monobutyl ether and 1,2-alkylene glycol is preferably added in an amount of 1% or more. One or more member selected from those acetylene glycol-base surfactants and acetylene alcohol-base surfactants provides an effect of enhancing the permeability by the addition in a small amount. Therefore, even with an amount added of 1.0% or less, when one or more member selected from di(tri)ethylene glycol monobutyl ether, (di)propylene glycol monobutyl ether and 1,2-alkylene glycol is added in an amount of 1% or more, the printing quality is more enhanced.

The 1,2-alkylene glycol is preferably a 1,2-alkylene glycol having a carbon number of 4 to 10 and the amount added thereof is preferably 10% or less. However, in the case of use for writing tools, the 1,2-alkylene glycol and the amount added thereof are not limited thereto. The amount added is more preferably from 1 to 8%.

The di(tri)ethylene glycol monobutyl ether indicates a diethylene glycol monobutyl ether and/or a triethylene glycol monobutyl ether and for giving permeability of a level necessary for improving the printing quality, this compound is preferably added in an amount of 20% or less, more preferably from 0.5 to 10%.

In the aqueous ink of the present invention, the above-described and other surfactants and hydrophilic high-boiling point low-volatile solvents such as high-boiling point low-volatile polyhydric alcohols and their monoetherified, dietherified or etherified products may be used individually or in combination of two or more thereof as an auxiliary for the penetrant so as to control the permeability of aqueous ink and furthermore, improve the nozzle clogging resistance, the moisture retentivity of aqueous ink or the solubility of penetrant.

The 1,2-alkylene glycol is preferably a 1,2-alkylene glycol having a carbon number of 4 to 10 and the amount added thereof is preferably 10% or less. If the amount added exceeds 10%, the viscosity increases and the handleability as an aqueous solution for use in the aqueous inkjet recording decreases and even if added in such an amount, the effect of improving the printing quality does not increase any more. However, in the case of use for writing tools, the amount of the 1,2-alkylene glycol added is not limited thereto.

Also, the 1,2-alkylene glycol is preferably a 1,2-pentanediol or a 1,2-hexanediol. The 1,2-pentanediol is preferably added in an amount of 3 to 10%. If the amount added is less than 3%, the effect of improving the permeability is low and blurring is often generated. If the carbon number exceeds 10, the viscosity increases and in view of handleability, this is improper for the water-soluble aqueous ink as in the present invention. The 1,2-hexanediol is preferably added in an amount of 0.5 to 10%. If the amount added is less than 0.5%, the effect of improving the permeability is low, and if the carbon number exceeds 10, the water solubility is low and in view of handleability, this is improper for the water-soluble aqueous ink as in the present invention. In the case where the amount of the above-described acetylene glycol and/or acetylene alcohol-base surfactant added is 0.5% or more, the ratio thereof to the 1,2-alkylene glycol is preferably between 1:0 and 1:50 in view of the printing quality. Even if the ratio of the 1,2-alkylene glycol to the acetylene glycol and/or acetylene alcohol-base surfactant exceeds 50 times, the effect of improving the printing quality does not increase any more and if added in such a ratio, the effect is low and this rather causes a problem of increase in the viscosity.

The (di)propylene glycol monobutyl ether is preferably contained in an amount of 10% or less. Even if the amount added exceeds 10%, the effect of improving the printing quality does not increase any more but on the contrary, due to increase in the viscosity and low water solubility, addition of a dissolution aid becomes necessary. The amount added is more preferably from 0.5 to 5%.

The ratio of the acetylene glycol and/or acetylene alcohol-base surfactant to the (di)propylene glycol monobutyl ether is preferably from 1:0 to 1:10. Even if the ratio of the (di) propylene glycol monobutyl ether to the acetylene glycol and/or acetylene alcohol-base surfactant exceeds 10 times, the effect of improving the printing quality does not increase any more and if added in such a ratio, the effect is low and this rather causes a problem of increase in the viscosity.

The di(tri)ethylene glycol monobutyl ether is preferably contained in an amount of 20% or less. If the amount added exceeds 20%, the viscosity increases to impair the handleability and even if added in such an amount, the effect of improving the printing quality does not increase any more. The amount added is more preferably from 1 to 15%. The di(tri)ethylene glycol monobutyl ether indicates a diethylene glycol monobutyl ether (DEGmBE) and/or a triethylene glycol monobutyl ether (TEGmBE) and for giving permeability of a level necessary for improving the printing quality, this compound is preferably added in an amount of 20% or less. Even if the amount added exceeds 20%, the effect of improving the printing quality does not increase any more but on the contrary, this cases a problem of increase in viscosity. The amount added is more preferably from 0.5 to 10%.

It is preferred that the amount of the acetylene glycol and/or acetylene alcohol-base surfactant added is 0.5% or more and the ratio to the di(tri)ethylene glycol monobutyl ether is from 1:0 to 1:50. In view of printing quality, the di(tri)ethylene glycol monobutyl ether is preferably added in an amount up to 50 times the amount of the acetylene glycol and/or acetylene alcohol-base surfactant. The di(tri)ethylene glycol monobutyl ether contributes to the elevation of solubility of the acetylene glycol-base surfactant and to the enhancement of printing quality, however, if the amount added exceeds 50 times, these effects peak out and the aqueous solution becomes difficult to use for aqueous inkjet recording.

(Moisture Holding Agent)

Examples of the glycols having water solubility, which are used for preventing drying at the nozzle face of the aqueous inkjet recording head or at the pen tip, include ethylene glycol, diethylene glycol, triethylene glycol, propylene glycol, dipropylene glycol, tripropylene glycol, polyethylene glycol having a molecular weight of 2,000 or less, 1,3-propylene glycol, isopropylene glycol, isobutylene glycol, thiodiglycol, 1,4-butanediol, 1,3-butanediol, 1,5-pentanediol, 1,6-hexanediol, glycerin, mesoerythritol, pentaerythritol, trimethylolethane, trimethylolpropane, 1,4-cyclohexanediol, 1,4-cyclohexanedimethanol and cyclohexanethiol.

In the present invention, many kinds of sugars may also be used so as to prevent the aqueous ink from drying and clogging at the nozzle front face. Examples thereof include monosaccharides and polysaccharides, such as glucose, mannose, fructose, ribose, xylose, arabinose, lactose, galactose, aldonic acid, glucitose, maltose, cellobiose, sucrose, trehalose and maltotriose, and also include an alginic acid and salts thereof, cyclodextrins and celluloses. The amount of the sugar added is suitably from 0.05 to 30%. The amount added of the monosaccharide or polysaccharide as a general sugar, such as glucose, mannose, fructose, ribose, xylose, arabinose, lactose, galactose, aldonic acid, glucitose, maltose, cellobiose, sucrose, trehalose and maltotriose, is more preferably from 3 to 20%. The alginic acid or a salt thereof, cyclodextrin or cellulose need be added in an amount of not giving an excessively high viscosity when the aqueous ink is produced.

Other examples of additives which have compatibility with water and can be used for enhancing the solubility of glycol ethers or aqueous ink components having low solubility in water contained in the aqueous ink, improving the permeability into a material on which a letter or an image is recorded, such as paper, and preventing clogging in the nozzle or at the pen tip, include alkyl alcohols having a carbon number of 1 to 4, such as ethanol, methanol, butanol, propanol and isopropanol, glycol ethers such as ethylene glycol monomethyl ether, ethylene glycol monoethyl ether, ethylene glycol monobutyl ether, ethylene glycol, monomethyl ether acetate, diethylene glycol monomethyl ether, diethylene glycol monoethyl ether, diethylene glycol mono-n-propyl ether, ethylene glycol mono-iso-propyl ether, diethylene glycol, mono-iso-propyl ether, ethylene glycol mono-n-butyl ether, diethylene glycol mono-n-butyl ether, triethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether and dipropylene glycol mono-n-butyl ether, formamide, acetamide, dimethylsulfoxide, sorbitol, sorbitan, acetin, diacetin, triacetin and sulfolane. A compound may be appropriately selected from these and used.

(Other Additives)

The aqueous ink for aqueous inkjet recording of the present invention sometimes contains various additives such as a moisture holding agent so as to ensure the standing stability, the stable ejection from an aqueous ink ejection head and the like, a dissolution aid, a permeation controlling agent, a viscosity adjusting agent, a pH adjusting agent, an antioxidant, an antifungal, a corrosion inhibitor, and a chelate for capturing metal ion having an effect on the dispersion. These are described below.

A glycol having water solubility is preferably added so as to prevent drying at the nozzle face of an aqueous inkjet recording head or at the pen tip of a writing tool and examples thereof include ethylene glycol, diethylene glycol, triethylene glycol, propylene glycol, dipropylene glycol, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, glycerin, mesoerythritol and pentaerythritol.

Also, in the present invention, many kinds of sugars may be used so as to prevent the aqueous ink from drying and clogging at the nozzle front face. Examples thereof include monosaccharides and polysaccharides, such as glucose, mannose, fructose, ribose, xylose, arabinose, lactose, galactose, aldonic acid, glucitose, maltose, cellobiose, sucrose, trehalose and maltotriose, and also include an alginic acid and salts thereof, cyclodextrins and celluloses. The amount of the sugar added is suitably from 0.05 to 30%. If the amount added is less than 0.05%, the clogging phenomenon inhibitory effect of preventing the aqueous ink from drying and clogging at the head tip is low, whereas if it exceeds 30%, the viscosity of the aqueous ink increases and the printing cannot be properly performed. The amount added of the monosaccharide or polysaccharide as a general sugar, such as glucose, mannose, fructose, ribose, xylose, arabinose, lactose, galactose, aldonic acid, glucitose, maltose, cellobiose, sucrose, trehalose and maltotriose, is more preferably from 3 to 20%. The alginic acid or a salt thereof, cyclodextrin or cellulose needs to be added in an amount of not giving an excessively high viscosity when the aqueous ink is produced.

Other examples of additives which have compatibility with water and can be used for enhancing the solubility of glycol ethers or aqueous ink components having low solubility in water contained in the aqueous ink, improving the permeability into a material on which a letter or an image is recorded, such as paper, and preventing clogging in the nozzle or at the pen tip, include alkyl alcohols having a carbon number of 1 to 4, such as ethanol, methanol, butanol, propanol and isopropanol, glycol ethers such as ethylene glycol monomethyl ether, ethylene glycol monoethyl ether, ethylene glycol monobutyl ether, ethylene glycol, monomethyl ether acetate, diethylene glycol monomethyl ether, diethylene glycol monoethyl ether, diethylene glycol mono-n-propyl ether, ethylene glycol mono-iso-propyl ether, diethylene glycol, mono-iso-propyl ether, ethylene glycol mono-n-butyl ether, diethylene glycol mono-n-butyl ether, triethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether and dipropylene glycol mono-n-butyl ether, formamide, acetamide, dimethylsulfoxide, sorbitol, sorbitan, acetin, diacetin, triacetin and sulfolane. A compound may be appropriately selected from these and used.

In the aqueous ink of the present invention, other surfactant may be further added so as to control the permeability into a medium such as paper and special paper. The surfactant added is preferably a surfactant having good compatibility with the aqueous ink system of the present invention and among surfactants, a surfactant having high and stable permeability is preferred. Examples thereof include an amphoteric surfactant and a nonionic surfactant. Examples of the amphoteric surfactant include lauryl-dimethylaminoacetic acid betaine, 2-alkyl-N-carboxymethyl-N-hydroxyethylimidazolinium betaine, coconut oil fatty acid amide propyldimethylaminoacetic acid betaine, polyoctyl-polyaminoethylglycine, and imidazoline derivatives. Examples of the nonionic surfactant include ether-type surfactants such as polyoxyethylenenonylphenyl ether, polyoxyethyleneoctylphenyl ether, polyoxyethylene-dodecylphenyl ether, polyoxyethylene alkylallyl ether, polyoxyethyleneoleyl ether, polyoxyethylenelauryl ether, polyoxyethylene alkyl ether and polyoxyalkylene alkyl ether (e.g., polyoxypropylene polyoxyethylene alkyl ether), polyoxyethyleneoleic acid, ester-type surfactants such as polyoxyethyleneoleic acid ester, polyoxyethylenedistearic acid ester, sorbitan laurate, sorbitan monostearate, sorbitan monooleate, sorbitan sesquioleate, polyoxyethylene monooleate and polyoxyethylene stearate, and fluorine-base surfactants such as fluoroalkyl ester and perfluoroalkylcarboxylate.

Examples of the pH adjusting agent, dissolution aid and antioxidant include amines such as diethanolamine, triethanolamine, propanolamine and morpholine, modification products thereof, inorganic salts such as potassium hydroxide, sodium hydroxide and lithium hydroxide, ammonium hydroxide, quaternary ammonium hydroxide (e.g., tetramethylammonium), carbonates such as potassium (hydrogen) carbonate, sodium (hydrogen)carbonate and lithium (hydrogen)carbonate, phosphates, ureas such as urea, thiourea and tetramethylurea, allophanates such as allophanate and methyl allophanate, biurets such as biuret, dimethylbiuret and tetramethylbiuret, and L-ascorbic acid and salts thereof. Also, commercially available antioxidants and ultraviolet absorbents may be used. Examples thereof include Tinuvin 328, 900, 1130, 384, 292, 123, 144, 622, 770 and 292, Irgacor 252 and 153, and Irganox 1010, 1076, 1035 and MD1024, all produced by Ciba-Geigy, and lanthanide oxides.

Examples of the viscosity adjusting agent include rosins, alginic acids, polyvinyl alcohol, hydroxypropyl cellulose, carboxymethyl cellulose, hydroxyethyl cellulose, methyl cellulose, polyacrylate, polyvinylpyrrolidone and gum arabi starch.

In view of durability of the head member and stability of the aqueous ink, the pH adjusting agent is preferably added in an amount of giving a pH value of about 7 to 10 to the aqueous ink.

The pigment dispersion of the present invention and the aqueous ink containing it may contain, if desired, other additives, for example, an antifungal, an antiseptic and a rust inhibitor, such as benzoic acid, dichlorophene, hexachlorophene, sorbic acid, p-hydroxybenzoic acid ester, ethylenediaminetetraacetic acid (EDTA), sodium dehydroacetate, 1,2-benzothiazolin-3-one, 3,4-isothiazolin-3-one, oxazolidine-base compounds (e.g., 4,4-dimethyloxazolidine), alkyl isothiazolone, chloroalkyl isothiazolone, benzisothiazolone, bromonitroalcohol, and/or chloroxylenol. Furthermore, additives such as urea, thiourea and/or ethyleneurea may be contained for the purpose of preventing drying in the nozzle.

Physical Properties of Aqueous Ink

Various physical properties of the aqueous ink for use in the present invention can be appropriately controlled, however, according to a preferred embodiment, the viscosity of the aqueous ink is preferably 10 mPa·sec or less, more preferably 5 mPa·sec or less (at 20° C.). With a viscosity in this range, the aqueous ink is stably ejected from the aqueous ink ejection head. The surface tension of the aqueous ink can also be appropriately controlled, but this is preferably from 25 to 50 mN/m (at 20° C.), more preferably from 30 to 40 mN/m (at 20° C.).

Aging Treatment of Aqueous Ink

When the above-described surfactant or water-soluble organic solvent is added to the aqueous ink of the present invention, it sometimes takes time until various physical properties are stabilized after the addition. In such a case, the ink may be subjected to an aging treatment such as heating, if desired.

In the case of performing the aging treatment, the heating temperature is preferably from room temperature (25° C.) to 100° C., more preferably from 40 to 80° C. The aging treatment time is preferably from several minutes to several days, more preferably from several hours to 24 hours. However, these aging treatment conditions vary depending on the kind of pigment or resin used and as long as the intended effect can be obtained, the aging treatment conditions are not particularly limited.

For example, by performing the aging treatment at a heating temperature of 70° C. for a treatment time of approximately from 12 to 24 hours, various physical properties of ink can be stabilized.

Other Preferred Embodiments of the Invention

Based on the constitution described in the embodiment (a), the aqueous ink of the present invention can have various preferred embodiments described below.

Preferred Embodiment (b)

The aqueous ink of the present invention is characterized in that the weight ratio of the pigment and the dispersing polymer therefor is from 10:90 to 90:10. Within this range, the dispersing element and the aqueous ink using the dispersing element can have excellent dispersion stability and when this dispersing element is used in an aqueous ink for aqueous inkjet printers, a printed image excellent in the fixing property/color formation/glossiness can be obtained not only on plain paler but also on special paper such as gloss media (for example, gloss paper).

Also, the weight ratio of the pigment and the dispersing polymer is from 40:60 to 90:10 when a black pigment is used as the pigment, from 50:50 to 90:10 when a yellow pigment is used, and from 30:70 to 70:30 when a blue pigment is used. Within this range for each pigment, the dispersing element and the aqueous ink using the dispersing element can have excellent dispersion stability and at the aqueous inkjet recording, a clear printed image excellent in the color formation/fixing property/glossiness can be obtained not only on plain paler but also on gloss media. Here, within the above-described range, when the amount of the dispersing polymer is small based on the pigment and the dispersing element is used in an aqueous ink for aqueous inkjet recording, the solid content concentration in the aqueous ink can be low even if the dispersing element is added in a relatively large amount in the aqueous ink and therefore, an aqueous ink less undergoing clogging at the nozzle tip due to drying of the aqueous ink and giving excellent color formation particularly on plain paper is easily prepared, however, glossiness and fixing property are sometimes difficult to obtain on gloss media. On the contrary, when the amount of the dispersing polymer is large based on the pigment and the dispersing element is added in a relatively large amount in the aqueous ink so as to enhance the color formation on plain paper, the solid content concentration in the aqueous ink elevates and clogging readily occurs at the nozzle tip due to drying of the aqueous ink, however, glossiness/fixing property can be easily obtained on gloss media. Therefore, on considering the balance between these two situations, the weight ratio is more preferably from 50:50 to 70:30 when a black pigment is used as the pigment, from 60:40 to 80:20 when a yellow pigment is used, from 60:40 to 90:10 when a red pigment is used, and from 40:60 to 70:30 when a blue pigment is used. The reason why the suitable weight ratio of the pigment and the dispersing polymer differs according to the pigment is not particularly known, but it is presumed that the surface state of particle differs among respective pigments and this affects the adsorption state of dispersing polymer or the surface state of dispersing element. However, the present invention is not limited to this reasoning.

Preferred Embodiment (c)

The aqueous ink of the present invention is characterized in that a dispersing element of a colorant encapsulated with a polymer and rendered dispersible in water is contained, the amount of the aromatic ring in the polymer is from 20 to 70 wt % (hereinafter "%" means "wt %") based on the polymer, a polymer fine particle is further added and the absolute value of zeta potential in the state of the microcapsule and the polymer fine particle being mixed is 30 mV or more.

It is preferred that the microcapsule and the polymer fine particle each independently has an absolute zeta potential value of 30 mV or more and the difference between the zeta potential value of microcapsule and the zeta potential value of polymer fine particle is ±10 mV or less. With a zeta potential in this range, the microcapsule and the polymer fine particle each can be stably present in the aqueous ink. The above-described difference in the zeta potential is preferably ±5 mV or less. Also, the porality of ion of the polymer fine particle is preferably the same as that of the microcapsule. Furthermore, the difference in pH at an isoelectric point is preferably ±2 or less.

In addition, when the aqueous ink of the present invention is measured as a dilute solution diluted with an ion exchanged water to have a dispersing element concentration of 0.001 to 0.01 wt %, the absolute zeta potential value of the dispersing element at 20° C. and a pH of 8 to 9 is preferably 40 mV or more, more preferably 45 mV or more, still more preferably 50 mV or more. If the absolute zeta potential value of the dispersing element is 20 mV or less, the aqueous ink decreases in the storage stability.

Preferred Embodiment (d)

The aqueous ink of the present invention is characterized in that the amounts of ions Si, Ca, Mg, Fe, Cr, N and Zr contained in the liquid component of the aqueous ink each is 50 ppm or less and the total amount of polyvalent metal ions contained in the liquid component of the aqueous ink is 200 ppm or less.

In this embodiment (c), the "liquid component" of the aqueous ink means a liquid moiety when the aqueous ink is divided into a solid moiety such as pigment particle and a liquid moiety of dispersing and holding the solid moiety. Accordingly, the "liquid component" includes impurities mingled into the vehicle (liquid moiety of the aqueous ink itself) at the preparation of the aqueous ink. Each amount of polyvalent metal ions such as Si, Ca, Mg, Fe, Cr, Ni and Zr contained in the "liquid component" can be measured, for example, by centrifuging the aqueous ink to separate it into the supernatant component and the precipitated component and measuring the supernatant component according to any known method. The polyvalent metal ion indicates a divalent or greater valence metal ion.

Preferred Embodiment (e)

The aqueous ink of the present invention is characterized in that a dispersing element of a colorant encapsulated with a polymer and rendered dispersible in water is contained, the amount of the aromatic ring in the polymer is from 20 to 70 wt % (hereinafter "%" means "wt %") based on the polymer, and the amount of polyvalent anions contained in the liquid component of the aqueous ink is 1,000 ppm or less.

The aqueous ink of the present invention is characterized by comprising at least the above-described dispersing element. The content of the dispersing element is, in terms of the weight concentration of pigment, preferably from 0.5 to 30 wt %, more preferably from 1.0 to 12 wt %, and most preferably from 2 to 10 wt %. If the pigment content in the aqueous ink is less than 0.5 wt %, an insufficient printing density sometimes results, whereas if it exceeds 30 wt %, the amount of the moisture holding component added to the aqueous ink is limited in view of viscosity of the aqueous ink and the nozzle of the aqueous inkjet head may be readily clogged or the viscosity of the aqueous ink may increase to disturb the stable ejection.

The aqueous ink or dispersion in the production process of the aqueous ink of the present invention may be subjected to a purification treatment, if desired, such as reverse osmosis membrane, ultrafiltration, electrodialysis or water washing by Nutsche. In particular, when a large amount of polyvalent anion is present in the liquid component of the aqueous ink, in order to prevent its adverse effect (for example, reduction in the storage stability, ejection stability or printing quality), the above-described purification treatment is preferably performed.

Specific examples of the polyvalent anion include sulfate ion, phosphate ion, low molecular polycarboxylate ion.

As for the route through which the polyvalent anion is mingled, the polyvalent anion is sometimes originally contained in raw materials such as pigment and dispersing polymer and in particular, when a surface modified pigment (a pigment of which surface is modified by oxidation or the like) is used as the pigment for use in the production of dispersing element, the surface modifier may remain. Also, the polyvalent anion may mingle from the production apparatus during the production of the aqueous ink such as dispersing step.

By performing the above-described purification treatment and thereby suppressing the amount of polyvalent anion in the liquid component to a certain amount or less, the fluctuation of physical values during storage of the aqueous ink (reduction in the storage stability) can be prevented, the ejection property from the aqueous inkjet heat can be maintained and the printed matter can be ensured with printing density by far higher than that obtained with conventional aqueous inks. The amount of the polyvalent anion in the liquid component of the aqueous ink is preferably 1,000 ppm or less, more preferably 800 ppm or less, still more preferably 600 ppm or less.

In recent years, the level of properties required of the aqueous ink for aqueous inkjet printers is elevated and the aqueous ink is demanded to provide a printed matter having a sufficiently high printing density and free of blurring, bleeding or the like while ensuring high storage stability and high ejection stability.

With a conventionally employed dispersing resin having high hydrophilicity, it is difficult to ensure storage stability or ejection stability or obtain a high printing density without causing blurring, bleeding or the like.

More specifically, in the case of a conventional pigment aqueous ink using a dispersing resin having high hydrophilicity, the dispersing resin is dissolved not in a small amount in the aqueous ink solvent mainly comprising water and this gives rise to the impairment of storage stability or ejection stability. Furthermore, since the constituent component of paper as a recording medium is a hydrophilic cellulose, the pigment intrudes into the recording paper without staying on the hydrophilic cellulose surface due to the effect of the dispersing resin adsorbed to the pigment surface or the resin dissolved in the solvent and a high printing density can be hardly ensured.

In the pigment dispersing element of the aqueous ink of the present invention, the amount of the aromatic ring in the dispersing polymer is 20% or more of the polymer, so that the dispersing polymer can be appropriately adsorbed to the pigment having a hydrophobic surface and scarcely desorbs from the pigment in the aqueous ink. Furthermore, the aqueous ink of the present invention using such a dispersing element as the colorant readily stays on the recording paper surface as compared with an aqueous ink using a conventionally employed dispersing resin having high hydrophilicity and therefore, the printed matter can have a very high printing density.

The reason why the high printing density can be obtained is not clearly known but this is presumed because at the moment when the aqueous ink is ejected from the recording head and landed on paper which is a recording medium, the dispersing element as a colorant swiftly coagulates and remains on the paper.

Even in the case of such an excellent aqueous ink, if an ionic material is present in a large amount, physical properties of the aqueous ink fluctuate during the long-term storage or ejection failure occurs on printing after the aqueous ink is left standing in the non-printing state for a long period of time.

In the process of developing the aqueous ink of the present invention, the present inventors have confirmed that when the amount of polyvalent anion in the liquid component of the aqueous ink exceeds a certain value, fluctuation in physical properties of the aqueous ink during storage (reduction in the storage stability), reduction in the ejection property from the aqueous inkjet recording head, reduction in the printing density, or the like is generated.

The aqueous ink of the present invention has the above-described excellent properties but if an electric charge ion such as polyvalent-anion is present in a large amount in the aqueous ink, this seems to affect the aqueous ink to cause those reductions in the properties.

The present inventors have succeeded in preventing such reductions in the properties by specifying the upper limit of the amount of polyvalent anion in the aqueous ink.

That is, the present inventors have found that if the amount of polyvalent anion present in the liquid component of the aqueous ink exceeds 1,000 ppm, ejection failure or the like readily occurs, whereas when the amount of polyvalent anion is 800 ppm or less, both the ejection property and the storage stability can be ensured and when 600 ppm or less, both the ejection property and the storage stability are very excellent. The present invention has been accomplished based on this finding.

Preferred Embodiment (f)

The aqueous ink of the present invention is characterized in that the total amount of monovalent cations contained in the liquid component of the aqueous ink is 5,000 ppm or less.

If the total amount of monovalent cations present in the liquid component of the aqueous ink exceeds 5,000 ppm, ejection failure or the like readily occurs, whereas when the total amount of monovalent cations is 2,500 ppm or less, both the ejection property and the storage stability are good.

The reason why the properties of the aqueous ink decrease due to the monovalent cation is not clearly known but this is considered because the monovalent cation reacts with the dispersing resin encapsulating the pigment surface to generate coagulation or the like.

Sodium hydroxide or ammonia is used for the neutralization of the hydrophilic functional group in the dispersing resin and therefore, a slight amount (on the order of several ppm to several tens ppm) of such monovalent cation is indispensably present in the aqueous ink. For the reduction of the monovalent cation, purification by reverse osmosis membrane, ultrafiltration, electrodialysis or the like is effective, however, according to the study by the present inventors, when the amount of monovalent cation present in the liquid component of the aqueous ink is 2,500 ppm or less, there arises no particular problem.

Also, according to the study by the present inventors, when a hydroxide of an alkali metal is used for the neutralization of the hydrophilic functional group in the dispersing resin, the printing density on plain paper is liable to elevate in the printing evaluation. Therefore, from the standpoint of ensuring the printing density, such an alkali metal is preferably present in a slight amount in the liquid component of the aqueous ink.

The present invention is also characterized in that the monovalent cation is an alkali metal ion and further that the alkali metal ion is any one of sodium ion, lithium ion and potassium ion.

Furthermore, the present invention is characterized in that the monovalent cation is ammonium ion.

In the present invention, the "liquid component" of the aqueous ink means a liquid moiety when the aqueous ink is divided into a solid moiety such as pigment particle and a liquid moiety of dispersing and holding the solid moiety. Accordingly, the "liquid component" includes impurities mingled into the vehicle (liquid moiety of the aqueous ink itself) at the preparation of the pigment dispersion or aqueous ink. The amount of monovalent cation such as alkali metal ion contained in the "liquid component" can be measured, for example, by centrifuging the aqueous ink to separate it into the supernatant component and the precipitated component and measuring the supernatant component according to any known method. The cation indicates an ion having a positive charge (cation).

Specifically, the monovalent cation indicates an alkali metal ion such as lithium ion ($Li^+$), sodium ion ($Na^+$) and potassium ion ($K^+$), or an ammonium ion ($NH_4^+$)

Preferred Embodiment (g)

The aqueous ink of the present invention is characterized in that the total amount of monovalent anions contained in the liquid component of the aqueous ink is 3,000 ppm or less.

If the total amount of monovalent anions present in the liquid component of the aqueous ink exceeds 3,000 ppm, ejection failure or the like readily occurs, whereas when the total amount of monovalent anions is 1,500 ppm or less, both the ejection property and the storage stability are good.

Examples of the monovalent anion present in the aqueous ink include halogen ions, nitrate ions and low molecular carboxylate ions. The monovalent anion seems to mingle into the aqueous ink as a decomposition by-product or the like at the synthesis of an organic pigment or dispersing resin having a salt-containing carbon black or a halogen group as the auxochrome. For the reduction of the monovalent anion, purification by reverse osmosis membrane, ultrafiltration, electrodialysis or the like is effective.

The present invention is also characterized in that the monovalent anion is a halogen ion and further that the halogen ion is any one of chlorine ion ($Cl^-$), bromine ion ($Br^-$) and iodine ion ($I^-$).

In the present invention, the "liquid component" of the aqueous ink means a liquid moiety when the aqueous ink is divided into a solid moiety such as pigment particle and a liquid moiety of dispersing and holding the solid moiety. Accordingly, the "liquid component" includes impurities mingled into the vehicle (liquid moiety of the aqueous ink itself) at the preparation of the pigment dispersion or aqueous ink. The amount of monovalent anion such as halogen ion contained in the "liquid component" can be measured, for example, by centrifuging the aqueous ink to separate it into the supernatant component and the precipitated component and measuring the supernatant component according to any known method. The anion indicates an ion having a negative charge.

Preferred Embodiment (h)

The aqueous ink of the present invention is characterized in that a dispersing element of a pigment encapsulated with a polymer and rendered dispersible in water is contained, the amount of the aromatic ring in the polymer is from 20 to 70 wt % (hereinafter "%" means "wt %") based on the polymer, and the amount of free polymer contained in the liquid component of the aqueous ink is 3% or less.

In a preferred embodiment, the present invention is characterized in that the amount of free polymer contained in the liquid component of the aqueous ink is 2% or less.

In the present invention, the "liquid component" of the aqueous ink means a liquid moiety when the aqueous ink is divided into a solid moiety such as pigment particle and a liquid moiety of dispersing and holding the solid moiety. Accordingly, the "liquid component" includes impurities mingled into the vehicle (liquid moiety of the aqueous ink itself) at the preparation of the pigment dispersion or aqueous ink.

Furthermore, in the present invention, the "free polymer" in the aqueous ink means a polymer not encapsulating the pigment surface (not adsorbed to the pigment surface) in the aqueous ink. The structure and amount of the "free polymer" can be determined, for example, by centrifuging the aqueous ink into the supernatant component and the precipitated component and measuring the supernatant component according to any known method such as TOC (total organic carbon meter) and gravimetric method (a method of measuring the polymer amount after evaporation and drying).

The present inventors presume that when a polymer component incompletely polymerized is mingled as an impurity in the production process of the dispersing polymer of the aqueous ink, since the incomplete polymer component is weak in the adhesive strength to the pigment surface, this polymer is dissolved as a free polymer in the liquid component of the aqueous ink due to the effect of surfactant or hydrophilic organic solvent added as a penetrant in the aqueous ink, as a result, the above-described reduction in the properties of the aqueous ink occurs.

The present inventors have succeeded in eliminating the problems such as fluctuation of physical values during storage of the aqueous ink (reduction in the storage stability), reduction in the ejection property from the aqueous inkjet head and reduction in the printing density of the printed matter, by optimizing the production process or previously performing washing such as ultrafiltration in the production of the dispersing polymer to suppress the amount of the free polymer in the liquid component of the aqueous ink to a certain value or less. The aqueous ink of the present invention has been achieved based on this finding.

Preferred Embodiment (i)

The aqueous ink set of the present invention is characterized by comprising at least a black aqueous ink, a yellow aqueous ink, a magenta aqueous ink and a cyan aqueous ink, wherein each aqueous ink comprises at least a dispersing element, a moisture holding agent, a penetrant and water, the dispersing element comprises a pigment encapsulated with a dispersing polymer and rendered dispersible in water, and the amount of the aromatic ring in the dispersing polymer is from 20 to 70% of the dispersing polymer.

In a preferred embodiment, the aqueous ink set of the present invention is characterized in that the black aqueous ink comprises at least one member selected from C.I. Pigment Black 1 and C.I. Pigment Black 7, the yellow aqueous ink comprises at least one member selected from C.I. Pigment Yellow 74, C.I. Pigment Yellow 110, C.I. Pigment Yellow 128 and C.I. Pigment Yellow 180, the magenta aqueous ink comprises at least one member selected from C.I. Pigment Red 122, C.I. Pigment Red 202, C.I. Pigment Red 209 and C.I. Pigment Violet 19, and the cyan aqueous ink comprises at least one member selected from C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6 and C.I. Pigment Blue 16.

In a preferred embodiment, the aqueous ink set of the present invention is characterized in that the aqueous ink set further comprises a red aqueous ink and/or a blue aqueous ink and/or a green aqueous ink.

In a preferred embodiment, the aqueous ink set of the present invention is characterized in that the red aqueous ink comprises at least one member selected from C.I. Pigment Red 178 and C.I. Pigment Red 190.

In a preferred embodiment, the aqueous ink set of the present invention is characterized in that the blue aqueous ink comprises C.I. Pigment Violet 23.

In a preferred embodiment, the aqueous ink set of the present invention is characterized in that the green aqueous ink comprises at least one member selected from C.I. Pigment Green 7 and C.I. Pigment Green 36.

The aqueous ink set of the present invention forms an image by using a combination of a black aqueous ink, a yellow aqueous ink, a magenta aqueous ink and a cyan aqueous ink each comprising at least one pigment selected from the above-described pigments and at the same time, comprising at least a penetrant, a moisture holding agent and water, whereby a printed image reduced in blurring and favored with good fixing property/color reproducibility can be obtained irrespective of the species of printing medium. Also, for the purpose of obtaining a printed image free of blurring and favored with excellent color reproducibility particularly in the secondary color (red, blue, green), an image can be formed by appropriately further combining a red aqueous ink, a blue aqueous ink and a green aqueous ink with the above-described aqueous ink set. Specific examples of the pigment which can be suitably used for the red aqueous ink, blue aqueous ink and green aqueous ink include C.I. Pigment Red 178 and 190 as the pigment for red aqueous ink, C.I. Pigment Violet 23 as the pigment for blue aqueous ink, and C.I. Pigment Green 7 and 36 as the pigment for green aqueous ink.

The amount of the pigment added is preferably from 0.5 to 30%, more preferably from 1.0 to 12%, based on the entire amount of the aqueous ink. If the amount added is less than 0.5%, printing density cannot be ensured, whereas if it exceeds 30%, the viscosity of the aqueous ink increases or a structural viscosity is generated in the viscosity characteristics and this is liable to worsen the ejection stability of the aqueous ink from an aqueous inkjet head.

The particle size of the pigment is preferably 5 μm or less in view of dispersion stability, more preferably 0.3 μm or less, still more preferably from 0.01 to 0.15 μm.

Preferred Embodiment (j)

The aqueous ink set of the present invention is characterized by comprising aqueous inks each comprising at least a dispersing element, a moisture holding agent, a penetrant and water, the dispersing element comprising a pigment encapsulated with a dispersing polymer and rendered dispersible in water and the amount of the aromatic ring in the dispersing polymer being from 20 to 70% of the dispersing polymer, wherein the aqueous ink comprises a combination of a dark aqueous ink and a light aqueous ink, the dark aqueous ink includes at least a dark black aqueous ink, a dark yellow aqueous ink, a dark magenta aqueous ink and a dark cyan aqueous ink, and the light aqueous ink includes at least a light magenta aqueous ink and a light cyan aqueous ink.

The aqueous ink set of the present invention is also characterized in that the light aqueous ink further includes a light black aqueous ink.

The aqueous ink set of the present invention is also characterized in that the light aqueous ink further includes a light yellow aqueous ink.

The aqueous ink set of the present invention is also characterized in that dark black aqueous ink and the light black aqueous ink each comprises at least one member selected from C.I. Pigment Black 1 and C.I. Pigment Black 7, the dark yellow aqueous ink and the light yellow aqueous ink each comprises at least one member selected from C.I. Pigment Yellow 74, C.I. Pigment Yellow 110, C.I. Pigment Yellow 128 and C.I. Pigment Yellow 180, the dark magenta aqueous ink and the light magenta aqueous ink each comprises at least one member selected from C.I. Pigment Red 122, C.I. Pigment Red 202, C.I. Pigment Red 209 and C.I. Pigment Violet 19, and the dark cyan aqueous ink and the light cyan aqueous ink each comprises at least one member selected from C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6 and C.I. Pigment Blue 16.

The aqueous ink set of the present invention is also characterized in that the penetrant is at least one member selected from acetylene glycol-base surfactants, acetylene alcohol-base surfactants, silicon-base surfactants, alkylene glycol monoalkyl ethers and 1,2-alkylene glycols.

The aqueous ink set of the present invention forms an image by using a combination of a dark black aqueous ink, a dark yellow aqueous ink, a dark magenta aqueous ink, a light magenta aqueous ink, a dark cyan aqueous ink and a light cyan aqueous ink and if desired, further using a light black aqueous ink and a light yellow aqueous ink, each aqueous ink comprising at least one pigment selected from the above-described pigments and at the same time, comprising at least a penetrant, a moisture holding agent and water, whereby a printed image reduced in blurring and favored with good fixing property, color reproducibility and graininess can be obtained irrespective of the species of printing medium such as plain paper or special paper (particularly, gloss media) for aqueous inkjet printers.

The amount of the pigment added is preferably from 0.5 to 30 wt %, more preferably from 0.5 to 5 wt % in the case of a light aqueous ink and from 1 to 12 wt % in the case of a dark aqueous ink, based on the entire amount of the aqueous ink. The concentration ratio between the dark aqueous ink and light aqueous ink having the same color is preferably in the range of dark aqueous ink:light aqueous ink=10:1 to 4:1 by weight in view of graininess. If the pigment concentration is less than 0.5 wt %, the printing density is too thin and desired color reproducibility and graininess cannot be achieved, whereas if the amount added exceeds 30 wt %, the viscosity of the aqueous ink increases or a structural viscosity is generated in the viscosity characteristics and this is liable to worsen the ejection stability of the aqueous ink from an aqueous inkjet head.

The particle size of the pigment is preferably 5 μm or less in view of dispersion stability, more preferably 0.3 μm or less (300 nm or less), still more preferably from 0.01 to 0.15 μm (10 to 150 nm).

Preferred Embodiment (k)

The method for producing a pigment dispersion contained in an aqueous ink of the present invention is characterized by comprising two steps, that is, a production step of producing a dispersing element of a colorant encapsulated with a polymer and rendered dispersible in water and a dispersing step of dispersing the dispersing element in an aqueous medium, wherein the amount of the aromatic ring in the polymer is from 20 to 70 wt % based on the polymer.

The production method of the present invention is also characterized in that the dispersing step is a step of dispersing at least the dispersing element, water and a dispersion accelerator in a mixed solution state.

In the process of producing the pigment-encapsulating resin dispersion according to the present invention, a dispersion accelerator can be used and by adding it at the dispersing step of dispersing the dispersing element in an aqueous medium, the dispersion efficiency can be enhanced.

The dispersing element used in the pigment dispersion of the present invention is a microcapsule obtained by encapsulating a pigment with a polymer to render the pigment dispersible in water, therefore, the dispersing element comprising the microcapsule is not dispersed in an aqueous medium (e.g., ion exchanged water, distilled water) by the dispersion accelerator. The dispersion accelerator has an effect that when added at the dispersion, the dispersing element becomes readily conformable to (readily wettable with) the dispersion medium and at the same time, the contact resistance between dispersed particles in the dispersion medium is increased to thereby elevate the dispersion efficiency. As a result, the shearing conditions of an apparatus at the dispersing step can be loosened (the shearing force given to the dispersion by the apparatus can be made low), the time necessary for the dispersion can be shortened and the contaminants such as polyvalent metal ion in the dispersion can be reduced.

The dispersion accelerator which can be used is not particularly limited as long as such an effect of elevating the dispersion efficiency can be obtained. Suitable examples thereof include acetylene glycols, acetylene alcohols, glycol ethers and alkylene glycols. Other than these, a lower alcohol and a nonionic surfactant can be used. Furthermore, alcohols, water-soluble organic solvents, anionic, cationic or amphoteric surfactants, sugars and the like can be used and as for examples thereof, the compounds described above for the water-soluble organic solvent such as penetrant and moisture holding agent in the embodiment (a) can be used.

The amount of the dispersion accelerator added may be appropriately determined by taking account of the liquid property and the like of the aqueous ink as the final product. One example thereof is described below.

The amount of acetylene glycols or acetylene alcohols added at the dispersing step is preferably from 1/50 to 2 times in terms of the weight based on the pigment. If the amount added is less than 1/50, a sufficiently high dispersion effect cannot be obtained, whereas if added in a large amount (for example, several times or more the weight of the pigment), the surface tension decreases to cause extended wetting of the aqueous ink in the vicinity of the aqueous ink jet head and the stable ejection property can be hardly ensured.

In the case of intending to decrease the amount of the dispersion accelerator mixed in the aqueous solution as much as possible or reduce the permeability of the aqueous ink, an acetylene alcohol having a small molecular weight is preferably used as the dispersion accelerator. For example, when Surfynol 61 described above is used as the dispersion accelerator, the residual amount can be decreased to the minimum by heating the dispersion after the dispersing step.

The amount of the dispersion accelerator added is not particularly limited as long as at least the effect of enhancing the dispersion efficiency can be obtained by the addition and the dispersed state of the dispersing element or the actual use of the dispersion is not adversely affected. The amount added is preferably from 0.05 to 50 wt %, more preferably from 0.1 to 30 wt %, based on the pigment dispersion at the dispersing step. If the amount added is less than 0.05 wt %, the effect as a wetting agent may not be sufficiently obtained, whereas if it exceeds 50 wt %, the pigment particle may be unstably dispersed.

The dispersion accelerator is used at the time of dispersing a dispersing element of a pigment covered with and encapsulated in a polymer, in an aqueous medium. A pigment-encapsulating resin dispersing element obtained in the production step of the dispersing element, or a slurry, wet cake or the like thereof is added together with the dispersion accelerator and, if desired, a neutralizer and the like in an aqueous medium (particularly, ion exchanged water or distilled water) to have a concentration of about 5 to 40 wt %, and a shearing force is applied thereto by using a stirring device or a dispersing device to disperse the dispersing element in the aqueous medium, whereby a dispersion can be obtained.

These "production step of dispersing element" and "dispersing step" may be continuously performed. In particular, when the dispersing element of a pigment covered with and encapsulated in a resin is produced using an aqueous medium, the same aqueous system can be used for the dispersion medium at the production and dispersing steps of the dispersing element and a continuous process can be easily established. However, the residual unreacted material, reaction by-product and the like in the production step are preferably removed before the dispersing step, because the pigment dispersion finally obtained can have more excellent dispersion stability.

In some cases, the residual unreacted material and the like can be more easily separated and removed from the objective dispersing element when the solvent at the production step of dispersing element is a non-aqueous solvent.

In the present invention, the pigment dispersion preferably has a zeta potential such that when the pigment dispersion is measured as a dilute solution diluted with an ion exchanged water to have a pigment concentration of 0.001 to 0.01 wt %, the absolute zeta potential value of the pigment particle at 20° C. and a pH of 8 to 9 is 40 mV or more, more preferably 45 mV or more, still more preferably 50 mV or more. If the absolute zeta potential value of the pigment particle in the pigment dispersion is 20 mV or less, the pigment dispersion decreases in the storage stability, similarly to the case where the amount of the dispersibility-imparting group introduced is insufficient.

The dispersion and aqueous ink containing the dispersion according to the present invention are described below. The aqueous ink according to the present invention is characterized by comprising at least a pigment dispersion produced by the pigment production method of the present invention. The content of the dispersion is, as a weight concentration of pigment, preferably from 0.5 to 30 wt %, more preferably from 1.0 to 12 wt %, and most preferably from 2 to 10 wt %.

If the pigment content of the aqueous ink is less than 0.5 wt %, insufficient printing density may be caused, whereas if it exceeds 30 wt %, the amount of the moisture holding component added in the aqueous ink is limited in view of viscosity of the aqueous ink and the nozzle of the aqueous inkjet head may be readily clogged or the viscosity of the aqueous ink may increase to disturb the stable ejection.

When the above-described surfactant or water-soluble organic solvent is added to the pigment dispersion contained in the aqueous ink of the present invention, it sometimes takes time until various physical properties are stabilized after the addition. In such a case, the pigment dispersion may be subjected to an aging treatment such as heating, if desired.

In the case of performing the aging treatment, the heating temperature is preferably from room temperature (25° C.) to 100° C., more preferably from 40 to 80° C. The aging treatment time is preferably from several minutes to several days, more preferably from several hours to 24 hours. However, these aging treatment conditions vary depending on the kind of pigment or resin used and as long as the intended effect can be obtained, the aging treatment conditions are not particularly limited.

For example, by performing the aging treatment at a heating temperature of 70° C. for a treatment time of approximately from 12 to 24 hours, various physical properties of the pigment dispersion can be stabilized.

Furthermore, after an aqueous ink is prepared by using the pigment dispersion subjected to this aging treatment, the ink may be further subjected to an aging treatment in the same manner as the above-described aging treatment of the aqueous ink.

In the process of developing the pigment dispersion of the present invention, the present inventors have found the following matters, however, the present invention is not limited by the reasoning described below.

As described above, with the progress of high-quality image and high-speed printing of aqueous inkjet printers, the pigment aqueous ink in particular becomes difficult to ensure stable ejection property.

In addition, the aqueous inkjet printer is recently reduced in the nozzle size and increased in the head driving frequency so as to realize high-quality image and high-speed printing, and when printing is performed by using such an aqueous inkjet printer, the aqueous ink dot undergoes deflected flying or when the printer is left standing in a non-printing state for a long period of time and again used for the printing, the nozzle is clogged due to coagulation of pigment or the like and ejection failure is generated. In the process of developing the pigment-encapsulating resin dispersion, the present inventors have succeeded in overcoming the problems such as ejection failure, coagulation of pigment and the like, by suppressing the content of polyvalent metal ion in the dispersion and the aqueous ink to a certain value or less.

The reason why ejection failure, particularly, impairment of storage stability is caused by the contamination of polyvalent metal ion or the like intermixed in the aqueous ink is not clearly known but this is considered because when such a polyvalent metal ion is present in the aqueous ink, the polyvalent metal ion reacts with the resin encapsulating the pigment surface to cause coagulation or the like. The coagulation readily occurs when a divalent or greater valence metal ion is present. In an experiment by the present inventors, even when a monovalent alkali metal such as Na, K or Li is somewhat present (on the order of several tens to several hundreds of ppm), this does not immediately lead to great impairment of the stability or ejection stability of the aqueous ink.

The effect of the polyvalent metal ion can be reduced to some extent by adding a chelating agent such as EDTA (ethylenediaminetetraacetic acid) in the aqueous ink, however, the problem is not fundamentally solved.

As for the factor which causes the intermixing of the above-described polyvalent metal ion in the pigment dispersion or aqueous ink, for example, the polyvalent metal ion may mingle inside the dispersing element pigment from the reaction tank at the synthesis of a pigment molecule or may be taken in inside the pigment by a specific synthesis reaction (for example, Mg or the like in the Grignard reaction) and the polyvalent metal ion thus mingled or taken in inside the pigment is considered to intermix in the solvent components of the aqueous ink at the dispersion. In particular, the polyvalent metal ion which intermixes from the inside of a pigment particle into the dispersion or aqueous ink, such as Mg, can be hardly prevented from intermixing at the dispersion even if the dispersion media or dispersion tank is devised. As a result, the ejection of aqueous ink and the long-term storage stability of aqueous ink are adversely affected.

Furthermore, a polyvalent metal ion from the dispersion media or the like used at the dispersion, more specifically, Si from a glass bead, Zr from a zirconia bead, or Fe, Ni, Cr or the like from an inner wall of a stainless steel-made dispersing tank, is intermixed in the solvent components of the aqueous ink. In the case of an apparatus used for a long period of time, a residual matter at the previous use may intermix as a contaminant.

The present inventors have succeeded in greatly shortening (about 1/10) the dispersion treatment time by adding an appropriate wetting agent at the dispersion of pigment and thereby succeeded in preventing the polyvalent metal ion from intermixing into the aqueous ink at the dispersion. As a result, a pigment aqueous ink for aqueous inkjet printers can be successfully produced, which is ensured with stable printing property in the printing by an aqueous inkjet printer having a head reduced in the nozzle size and driven at a high frequency so as to satisfy the recent requirement for high-quality image and high-speed printing and at the same time, ensured with storage stability free of change in the properties.

Preferred Embodiment (1)

The aqueous ink of the present invention is characterized in that a dispersing element of a pigment encapsulated with a polymer and rendered dispersible in water is contained, the amount of the aromatic ring in the polymer is from 20 to 70 wt % (hereinafter "%" means "wt %"), and the amount of polyvalent cation contained in the dispersing element is 1,000 ppm or less.

The problems such as fluctuation in physical properties of the aqueous ink during storage (reduction in the storage stability) and reduction in the ejection property from the aqueous inkjet recording head can be prevented from occurring by adjusting the amount of polyvalent cation contained in the dispersing element in the process of preparing the aqueous ink of the present invention.

That is, if the amount of polyvalent cation present in the dispersing element of the aqueous ink exceeds 1,000 ppm, ejection failure or the like is readily generated. When the amount of polyvalent cation is 800 ppm or less, both good ejection property and high storage stability can be obtained.

Preferred Embodiment (m)

The aqueous ink of the present invention is characterized in that a dispersing element of a pigment encapsulated with a polymer and rendered dispersible in water is contained, the amount of the aromatic ring in the polymer is from 20 to 70 wt % (hereinafter "%" means "wt %"), and the amount of polyvalent anion contained in the dispersing element is 800 ppm or less.

The problems such as fluctuation in physical properties of the aqueous ink during storage (reduction in the storage stability) and reduction in the ejection property from the aqueous inkjet recording head can be prevented from occurring by adjusting the amount of polyvalent anion contained in the dispersing element in the process of preparing the aqueous ink of the present invention.

That is, if the amount of polyvalent anion present in the dispersing element of the aqueous ink exceeds 800 ppm, ejection failure or the like is readily generated. When the amount of polyvalent cation is 600 ppm or less, both the ejection property and the storage stability can be ensured, and when 400 ppm or less, both good ejection property and high storage stability can be obtained.

Preferred Embodiment (n)

The aqueous ink of the present invention is characterized in that a dispersing element of a pigment encapsulated with a polymer and rendered dispersible in water is contained, the amount of the aromatic ring in the polymer is from 20 to 70 wt % (hereinafter "%" means "wt %"), and the amount of monovalent cation contained in the dispersing element is 3,500 ppm or less.

The problems such as fluctuation in physical properties of the aqueous ink during storage (reduction in the storage stability) and reduction in the ejection property from the aqueous inkjet recording head can be prevented from occurring by adjusting the amount of monovalent cation contained in the dispersing element in the process of preparing the aqueous ink of the present invention.

That is, it has been found that if the amount of monovalent cation present in the dispersing element of the aqueous ink exceeds 3,500 ppm, ejection failure or the like is readily generated. When the amount of monovalent cation is 2,500 ppm or less, both good ejection property and high storage stability can be obtained. The present invention has been accomplished based on this finding.

Preferred Embodiment (p)

The aqueous ink of the present invention is characterized in that a dispersing element of a pigment encapsulated with a polymer and rendered dispersible in water is contained, the amount of the aromatic ring in the polymer is from 20 to 70 wt % (hereinafter "%" means "wt %"), and the amount of monovalent anion contained in the dispersing element is 5,000 ppm or less.

The problems such as fluctuation in physical properties of the aqueous ink during storage (reduction in the storage stability) and reduction in the ejection property from the aqueous inkjet recording head can be prevented from occurring by adjusting the amount of monovalent anion contained in the dispersing element in the process of preparing the aqueous ink of the present invention.

That is, it has been found that if the amount of monovalent anion present in the dispersing element of the aqueous ink exceeds 5,000 ppm, ejection failure or the like is readily generated. When the amount of polyvalent cation is 3,500 ppm or less, both good ejection property and high storage stability can be obtained. The present invention has been accomplished based on this finding.

Incidentally, in these preferred embodiments (l) to (p), a dispersing element contained in the aqueous ink of the present invention and a dispersing element contained in the pigment dispersion in the production method of a pigment dispersion contained in the aqueous ink of the present invention are described.

EXAMPLES

The present invention is described in greater detail below by referring to Examples, however, the present invention is not limited to these Examples.

In the following, Examples A and B correspond to the preferred embodiments (a) and (b), respectively.

Example A

The embodiment (a) of the present invention is specifically described below.

A case where an organic or inorganic pigment is used as the colorant for use in the present invention is described below. In Examples and Comparative Examples, Pigment A1 was a carbon black pigment, Pigment A2 was a phthalocyanine pigment, Pigment A3 was a dimethyl-quinacridone pigment, and Pigment A4 was a diketo-pyrrolopyrrole pigment. However, the present invention is not limited thereto and many organic or inorganic pigments can be used. In < >, the average particle size is shown by the unit of nm (nanometer).

In the present invention, the pigment can also be dispersed by a reactive dispersant and then subjected to an emulsification polymerization in the presence of a catalyst in water.
(Production of Dispersing Elements A1 to A4)

For Dispersing Element A1, Raven C (produced by Columbian Carbon Co., Ltd.), which is carbon black and an inorganic pigment, was used. In a reaction vessel equipped with an ultrasonic wave generator, a stirrer, a dripping device, a water cooled reflux condenser and a temperature controller, 25 parts (hereinafter "parts" means "parts by weight") of Raven C (produced by Columbian Carbon Co., Ltd.) and 5 parts of Adeka Reasoap SE-10N (produced by Asahi Denka Co., Ltd.) which is a polymerizable surfactant were added to 180 parts of ion exchanged water and dispersed by applying an ultrasonic wave for 4 hours.

Thereafter, a methyl ethyl ketone solution containing 5 parts of styrene, 1.6 parts of α-methylstyrene and 0.5 parts of azobisisobutyronitrile was added and the polymerization reaction was performed at 60° C. for 8 hours. The obtained solution was subjected to centrifugal filtration to take out a pigment encapsulated with a polymer and coarse particles were removed by filtering the pigment through a 0.4-μm membrane filter. This pigment solution encapsulated with a polymer was disaggregated and redispersed in a homogenizer.

Subsequently, in a reaction vessel, the methyl ethyl ketone solution of pigment obtained above, 27 parts of ion exchanged water and 0.05 parts of sodium laurylsulfate were added and then 100 parts of ion exchanged water and 0.5 parts of potassium persulfate as a polymerization initiator were charged. The resulting solution was kept at 70° C. in a nitrogen atmosphere. Thereto, a mixed solution containing 25 parts of styrene, 1 part of tetrahydrofurfuryl methacrylate, 15 parts of butyl methacrylate, 5 parts of triethylene glycol methacrylate and 0.02 parts of tert-dodecylmercaptan was added dropwise and reacted. Thereafter, the methyl ethyl ketone and a part of water were distilled off by a rotary evaporator and the residue was neutralized with sodium hydroxide to adjust the pH to 8.5 and then filtered through a 0.3-μm filter to obtain Dispersing Element A1.

A part of this dispersing element was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 40% based on the entire weight of the dispersing polymer.

Dispersing Elements A2 to A4 were obtained in the same manner as above except that Pigment Blue 15:3 (copper phthalocyanine pigment, produced by Clariant) which is an organic pigment was used for Dispersing Element A2, Pigment Red 122 (dimethylquinacridone pigment, produced by Clariant) which is an organic pigment was used for Dispersing Element A3, and Pigment Yellow 180 (diketopyrrolopyrrole, produced by Clariant) which is an organic pigment was used for Dispersing Element A4.

(Production of Dispersing Elements A5 to A8)

For Dispersing Element A5, Monac 880 (produced by Cabot Co.) which is carbon black was used. A reaction vessel equipped with a stirrer, a thermometer, a reflux tube and a dropping funnel was purged with nitrogen and thereinto, 20 parts of styrene, 5 parts of α-methylstyrene, 15 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

Subsequently, 40 parts of the obtained dispersing polymer solution, 30 parts of Monac 880 (produced by Cabot Co.) which is carbon black, 100 parts of an aqueous solution containing 0.1 mol/liter of sodium hydroxide, and 30 parts of methyl ethyl ketone were mixed and stirred by a homogenizer for 30 minutes. Thereto, 300 parts of ion exchanged water was added and the resulting solution was further stirred for one hour. The entire amount of methyl ethyl ketone and a part of water were distilled off by a rotary evaporator and the residue was neutralized with 0.1 mol/liter of sodium hydroxide to adjust the pH to 9 and then filtered through a 0.3-μm membrane filter to obtain Dispersing Element A5 having a solid (dispersing polymer and carbon black) content of 20%.

A part of this dispersing element was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 36% based on the entire weight of the dispersing polymer.

Dispersing Elements A6 to A8 were obtained in the same manner as above except that Pigment Blue 15:3 (copper phthalocyanine pigment, produced by Clariant) was used for Dispersing Element A6, Pigment Red 122 (dimethyl-quinacridone pigment, produced by Clariant) was used for Dispersing Element A7, and Pigment Yellow 180 (diketo-pyrrolopyrrole, produced by Clariant) was used for Dispersing Element A8.

(Preparation Example of Aqueous Ink)

In the following, examples of the aqueous ink composition suitable as the aqueous ink for aqueous inkjet recording according to the present invention are specifically described. The amount of the dispersing element added is shown as the amount (solid content concentration; the total amount of pigment and dispersing polymer surrounding the pigment) in terms of weight. In < >, the particle size of pigment is shown by the unit of nm. In Examples, the water as balance was ion exchanged water where 0.05% of Proxel XL-2 for preventing septic activity of the aqueous ink, 0.02% of benzotriazole for preventing corrosion of an aqueous inkjet head member and 0.04% of EDTA 2Na salt for reducing the effect of metal ion in the aqueous ink system were added.

Example A-1

| Example A-1 | Amount Added (%) |
| --- | --- |
| Dispersing Element A1 <105> | 9.5 |
| TEGmBE | 5.0 |
| Olfine E1010 | 1.0 |
| Glycerin | 9.0 |
| 1,5-Pentanediol | 5.0 |
| Triethanolamine | 0.8 |
| Water | balance |

TEGmBE: triethylene glycol monobutyl ether Olfine E1010 (acetylene glycol-base surfactant, produced by Nissin Chemical Industry Co., Ltd.)

Example A-2

| Example A-2 | Amount Added (%) |
| --- | --- |
| Dispersing Element A2 <85> | 4.5 |
| DEGmBE | 10.0 |
| Dipropylene glycol | 5.0 |
| Surfynol 465 | 1.2 |
| Triethanolamine | 0.9 |
| Water | balance |

DEGmBE: diethylene glycol monobutyl ether Surfynol 465 (acetylene glycol-base surfactant, produced by Air Products (USA))

Example A-3

| Example A-3 | Amount Added (%) |
| --- | --- |
| Dispersing Element A3 <90> | 8.5 |
| 1,2-Hexanediol | 4.0 |
| Olfine STG | 0.5 |
| Diethylene glycol | 7.0 |
| Thiodiglycol | 1.5 |
| 1,6-Hexanediol | 5.0 |
| Triethanolamine | 1.0 |
| Potassium hydroxide | 0.1 |
| Water | balance |

Olfine STG (acetylene glycol-base surfactant, produced by Nissin Chemical Industry Co., Ltd.)

Example A-4

| Example A-4 | Amount Added (%) |
| --- | --- |
| Dispersing Element A4 <80> | 10.0 |
| TEGmBE | 3.0 |
| 1,2-Pentanediol | 5.0 |
| Surfynol 61 | 0.5 |
| Tetraethylene glycol | 9.0 |
| 1,5-Pentanediol | 2.0 |
| Dimethyl-2-imidazolidinone | 2.0 |
| Sodium benzoate | 0.1 |
| Triethanolamine | 0.7 |
| Water | balance |

Surfynol 61 (acetylene alcohol-base surfactant, produced by Air Products (USA))

Example A-5

| Example A-5 | Amount Added (%) |
| --- | --- |
| Dispersing Element A5 | 8.0 |
| DPGmBE | 2.0 |
| DEGmBE | 7.0 |
| Glycerin | 14.0 |
| Triethanolamine | 0.9 |
| Water | balance |

DPGmBE: dipropylene glycol monobutyl ether

Example A-6

| Example A-6 | Amount Added (%) |
| --- | --- |
| Dispersing Element A6 | 10.0 |
| Olfine E1010 | 1.0 |
| TEGmBE | 6.0 |
| Glycerin | 15.0 |
| Thiodiglycol | 2.0 |
| 1,5-Pentanediol | 1.0 |
| Triethanolamine | 0.9 |
| Water | balance |

Example A-7

| Example A-7 | Amount Added (%) |
| --- | --- |
| Dispersing Element A7 | 12.0 |
| Surfynol 61 | 0.5 |
| DEGmBE | 8.0 |
| Glycerin | 15.0 |
| Trimethylolpropane | 1.0 |
| Trimethylolethane | 1.0 |
| Surfynol 465 | 1.0 |
| Triethanolamine | 0.5 |
| KOH | 0.05 |
| Water | balance |

Example A-8

| Example A-8 | Amount Added (%) |
| --- | --- |
| Dispersing Element A8 | 10.5 |
| Olfine STG | 1.0 |
| PGmBE | 2.0 |
| DEGmBE | 10.0 |
| Glycerin | 7.0 |
| Diethylene glycol | 5.0 |
| Tetrapropylene glycol | 5.0 |
| Triethanolamine | 0.9 |
| KON | 0.1 |
| Water | balance |

PGmBE: propylene glycol monobutyl ether

The aqueous ink compositions used in Comparative Examples are shown below.

Comparative Example A-1

| Comparative Example A-1 | Amount Added (%) |
| --- | --- |
| Pigment A1 <105> | 7.0 |
| Glycerin | 10.0 |
| Dispersant | 3.0 |
| Nonionic surfactant | 1.0 |
| Ion exchanged water | balance |

Nonionic surfactant: Noigen EA160 (produced by Dai-ichi Kogyo Seiyaku Co., Ltd.)

The dispersant was prepared by a dispersion treatment using Solsperse 27000 (produced by Avecia Limited) in a bead mill MINIZETOR (manufactured by Ajisawa) for 2 hours.

Comparative Example A-2

| Comparative Example A-2 | Amount Added (%) |
| --- | --- |
| Acid Blue 9 | 6.5 |
| DEGmME | 7.0 |
| Diethylene glycol | 10.0 |
| 2-Pyrrolidone | 5.0 |
| Ion exchanged water | balance |

DEGmME: diethylene glycol monomethyl ether

Comparative Example A-3

| Comparative Example A-3 | Amount Added (%) |
| --- | --- |
| Direct Black 154 | 2.5 |
| Diethylene glycol | 10.0 |
| Nonionic surfactant | 1.0 |
| Ion exchanged water | balance |

Nonionic surfactant: Epan 450 (produced by Dai-ichi Kogyo Seiyaku Co., Ltd.)

In Table 1, the evaluation results of blurring when a letter was printed are shown as the printing evaluation results. In Table 1, A denotes "very good", B denotes "good", C denotes "bad" and D denotes "very bad".

TABLE 1

Evaluation Results of Printing Quality

|  | Example A | | | | | | | | Comparative Example A | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | D | D | D |
| Rapid Copy | A | A | A | A | A | A | A | A | D | D | D |
| EPSON EPP | A | A | A | A | A | A | A | A | C | C | C |
| Xerox P | A | A | A | A | A | A | A | A | C | C | D |
| Xerox 4024 | A | A | A | A | A | A | A | A | D | D | D |
| Xerox 10 | A | A | A | A | A | A | A | A | C | D | D |
| Neenha Bond | A | A | A | A | A | A | A | A | C | D | D |
| Ricopy 6200 | A | A | A | A | A | A | A | A | D | C | D |
| Yamayuri | A | A | A | A | A | A | A | A | D | D | D |
| Xerox R | A | A | A | A | A | A | A | A | D | D | D |

As apparent from the results in Table 1, the printing quality is bad when the aqueous ink of Comparative Example is used, and the printing quality is good when the aqueous ink of the present invention is used.

Incidentally, this printing evaluation was performed by using an aqueous inkjet printer PM-900C manufactured by Seiko Epson Corporation. The papers used in this evaluation were Conqueror, Favorit, Modo Copy, Rapid Copy, EPSON EPP, Xerox 4024, Xerox 10, Neenha Bond, Ricopy 6200, Yamayuri and Xerox R which are plain papers commercially available in Europe, USA and Japan.

As verified above, the present invention can provide an aqueous ink suitable for aqueous inkjet recording, which is reduced in blurring for a material on which a printed image is recorded, such as paper, and ensures high quality and high practicability.

The aqueous inks of Examples A-1 to A-8 each was charged into a sampling vial and after tightly plugging the vial, left standing at 60° C. for one week. The foreign matters generated and physical values (viscosity, surface tension) of the aqueous ink were examined before and after the aqueous ink was left standing.

As a result, all aqueous inks were almost free of generation of foreign matters and change in physical values and exhibited good storage stability.

The same test was performed by changing the dispersing element in the composition of Example A-1 to the pigment of Comparative Example A-1, as a result, the surface tension was less changed but foreign matters were generated to decrease the filterability and due to occurrence of a viscosity-increasing phenomenon, ejection stability could not be obtained.

Furthermore, aqueous inks prepared by using another additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) in place of DEGmBE and E1010 in the composition of Example A-1, and aqueous inks prepared by adding the additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) to the aqueous ink of Comparative Example A-1 (Examples A-9 to A-18 in Table 2) each was similarly left standing at 60° C. for one week and each aqueous ink after standing was examined on foreign matters generated, physical values (viscosity, surface tension) and ejection stability. The results obtained are shown in Table 2. The amount of foreign matters generated shows a value of amount of foreign matters after standing at 60° C./initial amount of foreign matters, the viscosity shows a value of viscosity after standing at 60° C./initial viscosity, and the surface tension shows a value of surface tension after standing at 60° C./initial surface tension. The ejection stability was evaluated by using an aqueous inkjet printer PM-900C manufactured by Seiko Epson Corporation and rated A when printing disorder was not generated at all even in continuous printing of 100 pages on A4-size Xerox P, rated B when printing disorder was generated at less than 10 portions, rated C when printing disorder was generated at 10 to less than 100 portions, and rated D when printing disorder was generated at 100 or more portions.

TABLE 2

Foreign Matters Generated, Physical Values (Viscosity, Surface Tension) and Ejection Stability when Additives were Changed in Compositions of Example A-1 and Comparative Example A-2

|  | Example | | | | | | | | | |
| --- | --- | --- | --- | --- | --- | --- | --- | --- | --- | --- |
| Additive | 9 | 10 | 11 | 12 | 13 | 14 | 15 | 16 | 17 | 18 |
| DEGmBE | 5 |  | 5 |  |  | 6 | 10 |  |  |  |
| TEGmBE |  | 8 |  | 7 |  |  |  | 8 |  |  |
| PGmBE |  |  | 2 |  |  |  |  |  |  |  |
| DPGmBE |  |  |  | 2 |  |  | 3 |  |  |  |
| 1,2-HD |  |  |  |  | 3 |  |  | 2 |  | 2 |
| 1,2-PD |  |  |  |  |  | 5 |  |  |  | 5 |
| Olfine E1010 |  | 1 | 1 |  | 1 |  |  |  | 1 |  |
| Olfine STG | 0.5 |  |  | 0.5 |  |  | 1 | 0.5 |  |  |
| Surfynol 61 |  |  |  |  |  | 0.5 |  | 0.5 |  |  |
| Example A-1 |  |  |  |  |  |  |  |  |  |  |
| Foreign matters generated | 1 | 1 | 1 | 1 | 1 | 1 | 1 | 1 | 1 | 1 |
| Viscosity | 1 | 1 | 1 | 1 | 1 | 1 | 1 | 1 | 1 | 1 |
| Surface tension | 1 | 1 | 1 | 1 | 1 | 1 | 1 | 1 | 1 | 1 |
| Ejection stability | A | A | A | A | A | A | A | A | A | A |

TABLE 2-continued

Foreign Matters Generated, Physical Values (Viscosity, Surface Tension) and Ejection Stability when Additives were Changed in Compositions of Example A-1 and Comparative Example A-2

| Additive | Example | | | | | | | | | |
|---|---|---|---|---|---|---|---|---|---|---|
| | 9 | 10 | 11 | 12 | 13 | 14 | 15 | 16 | 17 | 18 |
| Comparative Example A-1 | | | | | | | | | | |
| Foreign matters generated | 11 | 5 | 13 | 12 | 3 | 22 | 25 | 20 | 1.5 | 2.1 |
| Viscosity | 5 | 4 | 4 | 3.5 | 1.3 | 10 | 24 | 23 | 1.3 | 2.5 |
| Surface tension | 1.0 | 1.1 | 1 | 1.1 | 1 | 1 | 1.1 | 1.1 | 1 | 1 |
| Ejection stability | D | D | D | D | C | D | D | D | C | C |

As seen from the results in Tables 1 and 2, the aqueous ink prepared by using the dispersing element of the present invention exhibits good printing quality, excellent ejection stability and high storage stability and can be an aqueous ink suitable for aqueous inkjet recording. Examples A-2 to A-8 were also tested by similarly changing the additives, as a result, almost the same results were obtained.

Furthermore, the dispersing polymers used in Examples A-1 and A-5 each was polymerized by varying the amount of aromatic ring to determine the relationship between the aromatic ring amount and the storage stability. The results are shown in Table 3. In the evaluation of the storage stability, each aqueous ink of Examples A-1 to A-8 was charged in a sampling vial and after tightly plugging the vial, left standing at 60° C. or 70° C. for one week and the foreign matters generated and physical value (viscosity) of the aqueous ink was examined before and after the aqueous ink was left standing. The amount of foreign matters generated shows a value of amount of foreign matters after standing at 60° C. or 70° C./initial amount of foreign matters, and the viscosity shows a value of viscosity after standing at 60° C. or 70° C./initial viscosity.

TABLE 3

Amount of Benzene Ring in Dispersing Polymer and Storage Stability

| | | Amount of Benzene Ring (%) | | | | | | | | |
|---|---|---|---|---|---|---|---|---|---|---|
| | | 0 | 10 | 20 | 25 | 30 | 40 | 50 | 60 | 70 | 72 |
| Example A-1 | | | | | | | | | | | |
| Foreign matters | 60° C. | 5.0 | 3.0 | 1.1 | 1.0 | 1.0 | 1.0 | 1.0 | 1.0 | 1.2 | 10 |
| | 70° C. | 15 | 12 | 1.3 | 1.0 | 1.0 | 1.0 | 1.0 | 1.5 | 2.5 | 35 |
| Viscosity | 60° C. | 5.5 | 3.0 | 1.0 | 1.0 | 1.0 | 1.0 | 1.0 | 1.0 | 1.0 | 15 |
| | 70° C. | 20 | 13 | 1.0 | 1.0 | 1.0 | 1.0 | 1.0 | 1.1 | 1.1 | 55 |
| Example A-5 | | | | | | | | | | | |
| Foreign matters | 60° C. | 4.0 | 3.5 | 1.2 | 1.0 | 1.0 | 1.0 | 1.0 | 1.0 | 1.2 | 15 |
| | 70° C. | 10 | 8.5 | 1.5 | 1.0 | 1.0 | 1.0 | 1.0 | 1.3 | 2.8 | 20 |
| Viscosity | 60° C. | 4.2 | 2.5 | 1.0 | 1.0 | 1.0 | 1.0 | 1.0 | 1.0 | 1.0 | 10 |
| | 70° C. | 15 | 10 | 1.0 | 1.0 | 1.0 | 1.0 | 1.0 | 1.1 | 1.2 | 28 |

As seen from the results in Table 3, the amount of aromatic ring in the dispersing polymer of the present invention is from 20 to 70%, preferably from 25 to 50%.

From these, it is understood that when the colorant is dispersed by using a general dispersant as in conventional techniques, the additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) is difficult to use and therefore, a sufficiently high printing quality cannot be obtained. However, according to the present invention, a microcapsule is formed by encapsulating the colorant with a polymer to render it dispersible in water and the amount of aromatic ring in the polymer is controlled to 20 to 70 wt % based on the polymer, so that an aqueous ink suitable for aqueous inkjet recording can be obtained, which is ensured with storage stability and ejection stability while keeping a sufficiently high color forming property. Furthermore, a pigment is suitably used as the colorant and this provides an effect of giving a printed matter more excellent in the water resistance than those obtained by using a normal dye (for example, Comparative Examples A-2 and A-3). In addition, the function of the polymer encapsulating the colorant can be freely changed by the polymerizing monomer or other reactive agents and this provides an effect that a variety of functions (e.g., light fastness, gas resistance, colorability, glossiness, fixing property) can be imparted. In the case of using a normal dispersant as in conventional techniques, the adsorptive strength of the dispersant adsorbing to the colorant is fundamentally weak and the dispersant is partially desorbed. Due to the resultant desorbed material or the dispersant not adsorbed, the viscosity increases and therefore, the amount of colorant added is limited, as a result, a sufficiently high color formation can be hardly obtained.

The present invention should not be construed as being limited to these Examples and various changes and modifications can be made therein without departing from the spirit and scope of the present invention.

Example B

The preferred embodiment (b) of the present invention is described below by referring to Examples.

In Examples and Comparative Examples below, some organic or inorganic pigments are used as the colorant for use in the present invention, however, the present invention is not limited thereto and many organic or inorganic pigments can be used. In < >, the average particle size is shown by the unit of nm (nanometer).

In the present invention, the colorant can also be dispersed by a reactive dispersant and then subjected to an emulsification polymerization in the presence of a catalyst in water.
(Production of Black Dispersing Element B1)

For Black Dispersing Element B1, Raven C (produced by Columbian Carbon Co., Ltd.), which is carbon black and an inorganic pigment, was used as the colorant. In a reaction vessel equipped with an ultrasonic wave generator, a stirrer, a dripping device, a water cooled reflux condenser and a temperature controller, 58 parts (hereinafter "parts" means "parts by weight") of Raven C (produced by Columbian Carbon Co., Ltd.) and 5 parts of Adeka Reasoap SE-10N (produced by Asahi Denka Co., Ltd.) which is a polymerizable surfactant were added to 180 parts of ion exchanged water and dispersed by applying an ultrasonic wave for 4 hours.

Thereafter, a methyl ethyl ketone solution containing 5 parts of styrene, 1.6 parts of α-methylstyrene and 0.5 parts of azobisisobutyronitrile was added and the polymerization reaction was performed at 60° C. for 8 hours. The obtained solution was subjected to centrifugal filtration to take out a pigment encapsulated with a polymer and coarse particles were removed by filtering the pigment through a 0.4-μm membrane filter. This pigment solution encapsulated with a dispersing polymer was disaggregated and redispersed in a homogenizer.

Subsequently, in a reaction vessel, the methyl ethyl ketone solution of pigment obtained above, 27 parts of ion exchanged water and 0.05 parts of sodium laurylsulfate were added and then 100 parts of ion exchanged water and 0.5 parts of potassium persulfate as a polymerization initiator were charged. The resulting solution was kept at 70° C. in a nitrogen atmosphere. Thereto, a mixed solution containing 25 parts of styrene, 1 part of tetrahydrofurfuryl methacrylate, 15 parts of butyl methacrylate, 5 parts of triethylene glycol methacrylate and 0.02 parts of tert-dodecylmercaptan was added dropwise and reacted. Thereafter, the methyl ethyl ketone and a part of water were distilled off by a rotary evaporator and the residue was neutralized with sodium hydroxide to adjust the pH to 8.5 and then filtered through a 0.3-μm filter to obtain Black Dispersing Element B1.

A part of this dispersing element was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 40% based on the entire weight of the dispersing polymer.

(Production of Cyan Dispersing Element B1)

Cyan Dispersing Element B1 was produced by using the same composition and method as in the production of Black Dispersing Element B1 except that 58 parts of Pigment Blue 15:3 (copper phthalocyanine pigment, produced by Clariant) which is an organic pigment was used as the colorant.

(Production of Magenta Dispersing Element B1)

Magenta Dispersing Element B1 was produced by using the same composition and method as in the production of Black Dispersing Element B1 except that 58 parts of Pigment Red 81 (produced by Clariant) which is an organic pigment was used as the colorant.

(Production of Yellow Dispersing Element B1)

Yellow Dispersing Element B1 was produced by using the same composition and method as in the production of Black Dispersing Element B1 except that 58 parts of Pigment Yellow 180 (diketopyrrolopyrrole pigment, produced by Clariant) which is an organic pigment was used as the colorant.

(Production of Black Dispersing Element B2)

For Black Dispersing Element B2, Monac 880 (produced by Cabot Co.) which is carbon black was used as the colorant. A reaction vessel equipped with a stirrer, a thermometer, a reflux tube and a dropping funnel was purged with nitrogen and thereinto, 20 parts of styrene, 5 parts of α-methylstyrene, 15 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 50%.

Subsequently, 40 parts of the obtained dispersing polymer solution, 30 parts of Monac 880 (produced by Cabot Co.) which is carbon black, 100 parts of an aqueous solution containing 0.1 mol/liter of sodium hydroxide, and 30 parts of methyl ethyl ketone were mixed and stirred by a homogenizer for 30 minutes. Thereto, 300 parts of ion exchanged water was added and the resulting solution was further stirred for one hour. The entire amount of methyl ethyl ketone and a part of water were distilled off by a rotary evaporator and the residue was neutralized with 0.1 mol/liter of sodium hydroxide to adjust the pH to 9 and then filtered through a 0.3-μm membrane filter to obtain Black Dispersing Element B2 having a solid (dispersing polymer and carbon black) content of 20%.

A part of this dispersing element was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 36% based on the entire weight of the dispersing polymer.

(Production of Black Dispersing Element B3)

Black Dispersing Element B3 was produced by using the same composition and method as in the production of Black Dispersing Element B2 except that 2.2 parts of Monac 880 (produced by Cabot Co.) which is carbon black was used as the colorant.

(Production of Black Dispersing Element B4)

Black Dispersing Element B4 was produced by using the same composition and method as in the production of Black Dispersing Element B2 except that 5 parts of Monac 880 (produced by Cabot Co.) which is carbon black was used as the colorant.

(Production of Black Dispersing Element B5)

Black Dispersing Element B5 was produced by using the same composition and method as in the production of Black Dispersing Element B2 except that 8.6 parts of Monac 880 (produced by Cabot Co.) which is carbon black was used as the colorant.

(Production of Black Dispersing Element B6)

Black Dispersing Element B6 was produced by using the same composition and method as in the production of Black Dispersing Element B2 except that 13.3 parts of Monac 880 (produced by Cabot Co.) which is carbon black was used as the colorant.

(Production of Black Dispersing Element B7)

Black Dispersing Element B7 was produced by using the same composition and method as in the production of Black Dispersing Element B2 except that 20 parts of Monac 880 (produced by Cabot Co.) which is carbon black was used as the colorant.

(Production of Black Dispersing Element B8)

Black Dispersing Element B8 was produced by using the same composition and method as in the production of Black Dispersing Element B2 except that 46.7 parts of Monac 880 (produced by Cabot Co.) which is carbon black was used as the colorant.

(Production of Black Dispersing Element B9)

Black Dispersing Element B9 was produced by using the same composition and method as in the production of Black Dispersing Element B2 except that 80 parts of Monac 880 (produced by Cabot Co.) which is carbon black was used as the colorant.

(Production of Black Dispersing Element B10)

Black Dispersing Element B10 was produced by using the same composition and method as in the production of Black Dispersing Element B2 except that 180 parts of Monac 880 (produced by Cabot Co.) which is carbon black was used as the colorant.

(Production of Cyan Dispersing Element B2)

Cyan Dispersing Element B2 was produced by using the same composition and method as in the production of Black Dispersing Element B2 except that 30 parts of Pigment Blue 15:4 (copper phthalocyanine pigment, produced by Clariant) was used as the colorant.

(Production of Cyan Dispersing Element B3)

Cyan Dispersing Element B3 was produced by using the same composition and method as in the production of Black Dispersing Element B2 except that 2.2 parts of Pigment Blue 15:4 (copper phthalocyanine pigment, produced by Clariant) was used as the colorant.

(Production of Cyan Dispersing Element B4)

Cyan Dispersing Element B4 was produced by using the same composition and method as in the production of Black Dispersing Element B2 except that 5 parts of Pigment Blue 15:4 (copper phthalocyanine pigment, produced by Clariant) was used as the colorant.

(Production of Cyan Dispersing Element B5)

Cyan Dispersing Element B5 was produced by using the same composition and method as in the production of Black Dispersing Element B2 except that 8.6 parts of Pigment Blue 15:4 (copper phthalocyanine pigment, produced by Clariant) was used as the colorant.

(Production of Cyan Dispersing Element B6)

Cyan Dispersing Element B6 was produced by using the same composition and method as in the production of Black Dispersing Element B2 except that 13.3 parts of Pigment Blue 15:4 (copper phthalocyanine pigment, produced by Clariant) was used as the colorant.

(Production of Cyan Dispersing Element B7)

Cyan Dispersing Element B7 was produced by using the same composition and method as in the production of Black Dispersing Element B2 except that 20 parts of Pigment Blue 15:4 (copper phthalocyanine pigment, produced by Clariant) was used as the colorant.

(Production of Cyan Dispersing Element B8)

Cyan Dispersing Element B8 was produced by using the same composition and method as in the production of Black Dispersing Element B2 except that 46.7 parts of Pigment Blue 15:4 (copper phthalocyanine pigment, produced by Clariant) was used as the colorant.

(Production of Cyan Dispersing Element B9)

Cyan Dispersing Element B9 was produced by using the same composition and method as in the production of Black Dispersing Element B2 except that 80 parts of Pigment Blue 15:4 (copper phthalocyanine pigment, produced by Clariant) was used as the colorant.

(Production of Cyan Dispersing Element B10)

Cyan Dispersing Element B10 was produced by using the same composition and method as in the production of Black Dispersing Element B2 except that 180 parts of Pigment Blue 15:4 (copper phthalocyanine pigment, produced by Clariant) was used as the colorant.

(Production of Magenta Dispersing Element B2)

Magenta Dispersing Element B2 was produced by using the same composition and method as in the production of Black Dispersing Element B2 except that 30 parts of Pigment Red 122 (dimethylquinacridone pigment, produced by Clariant) was used as the colorant.

(Production of Magenta Dispersing Element B3)

Magenta Dispersing Element B3 was produced by using the same composition and method as in the production of Black Dispersing Element B2 except that 2.2 parts of Pigment Red 122 (dimethylquinacridone pigment, produced by Clariant) was used as the colorant.

(Production of Magenta Dispersing Element B4)

Magenta Dispersing Element B4 was produced by using the same composition and method as in the production of Black Dispersing Element B2 except that 5 parts of Pigment Red 122 (dimethylquinacridone pigment, produced by Clariant) was used as the colorant.

(Production of Magenta Dispersing Element B5)

Magenta Dispersing Element B5 was produced by using the same composition and method as in the production of Black Dispersing Element B2 except that 8.6 parts of Pigment Red 122 (dimethylquinacridone pigment, produced by Clariant) was used as the colorant.

(Production of Magenta Dispersing Element B6)

Magenta Dispersing Element B6 was produced by using the same composition and method as in the production of Black Dispersing Element B2 except that 13.3 parts of Pigment Red 122 (dimethylquinacridone pigment, produced by Clariant) was used as the colorant.

(Production of Magenta Dispersing Element B7)

Magenta Dispersing Element B7 was produced by using the same composition and method as in the production of Black Dispersing Element B2 except that 20 parts of Pigment Red 122 (dimethylquinacridone pigment, produced by Clariant) was used as the colorant.

(Production of Magenta Dispersing Element B8)

Magenta Dispersing Element B8 was produced by using the same composition and method as in the production of Black Dispersing Element B2 except that 46.7 parts of Pigment Red 122 (dimethylquinacridone pigment, produced by Clariant) was used as the colorant.

(Production of Magenta Dispersing Element B9)

Magenta Dispersing Element B9 was produced by using the same composition and method as in the production of Black Dispersing Element B2 except that 80 parts of Pigment Red 122 (dimethylquinacridone pigment, produced by Clariant) was used as the colorant.

(Production of Magenta Dispersing Element B10)

Magenta Dispersing Element B10 was produced by using the same composition and method as in the production of Black Dispersing Element B2 except that 180 parts of Pigment Red 122 (dimethylquinacridone pigment, produced by Clariant) was used as the colorant.

(Production of Yellow Dispersing Element B2)

Yellow Dispersing Element B2 was produced by using the same composition and method as in the production of Black Dispersing Element B2 except that 30 parts of Pigment Yellow 74 (produced by Clariant) was used as the colorant.

(Production of Yellow Dispersing Element B3)

Yellow Dispersing Element B3 was produced by using the same composition and method as in the production of Black Dispersing Element B2 except that 2.2 parts of Pigment Yellow 74 (produced by Clariant) was used as the colorant.

(Production of Yellow Dispersing Element B4)

Yellow Dispersing Element B4 was produced by using the same composition and method as in the production of Black Dispersing Element B2 except that 5 parts of Pigment Yellow 74 (produced by Clariant) was used as the colorant.
(Production of Yellow Dispersing Element B5)

Yellow Dispersing Element B5 was produced by using the same composition and method as in the production of Black Dispersing Element B2 except that 8.6 parts of Pigment Yellow 74 (produced by Clariant) was used as the colorant.
(Production of Yellow Dispersing Element B6)

Yellow Dispersing Element B6 was produced by using the same composition and method as in the production of Black Dispersing Element B2 except that 13.3 parts of Pigment Yellow 74 (produced by Clariant) was used as the colorant.
(Production of Yellow Dispersing Element B7)

Yellow Dispersing Element B7 was produced by using the same composition and method as in the production of Black Dispersing Element B2 except that 20 parts of Pigment Yellow 74 (produced by Clariant) was used as the colorant.
(Production of Yellow Dispersing Element B8)

Yellow Dispersing Element B8 was produced by using the same composition and method as in the production of Black Dispersing Element B2 except that 46.7 parts of Pigment Yellow 74 (produced by Clariant) was used as the colorant.
(Production of Yellow Dispersing Element B9)

Yellow Dispersing Element B9 was produced by using the same composition and method as in the production of Black Dispersing Element B2 except that 80 parts of Pigment Yellow 74 (produced by Clariant) was used as the colorant.
(Production of Yellow Dispersing Element B10)

Yellow Dispersing Element B10 was produced by using the same composition and method as in the production of Black Dispersing Element B2 except that 180 parts of Pigment Yellow 74 (produced by Clariant) was used as the colorant.
(Production of Yellow Dispersing Element B11)

Yellow Dispersing Element B11 was produced by using the same composition and method as in the production of Black Dispersing Element B2 except that 46.7 parts of Pigment Yellow 110 (isoindolinone pigment, produced by Clariant) was used as the colorant.
(Preparation Example of Aqueous Ink)

Examples of the aqueous ink composition suitable as the aqueous ink for aqueous inkjet recording according to the present invention are specifically described below. The amount of the dispersing element added is shown by the solid content (total amount of pigment and dispersing polymer surrounding the pigment) in the dispersing element. In < >, the particle size of pigment is shown by the unit of nm. In Examples, the water as balance was ion exchanged water where 0.05% of Proxel XL-2 for preventing septic activity of the aqueous ink, 0.02% of benzotriazole for preventing corrosion of an aqueous inkjet head member and 0.04% of EDTA 2Na salt for reducing the effect of metal ion in the aqueous ink system were added.

Example B-1

| Additive | Amount Added (%) |
| --- | --- |
| Black Dispersing Element B1 <105> | 9.5 |
| TEGmBE | 5.0 |
| Olfine E1010 | 1.0 |
| Glycerin | 9.0 |
| 1,5-Pentanediol | 5.0 |
| Triethanolamine | 0.8 |
| Water | balance |

In the composition above, TEGmBE denotes a tri-ethylene glycol monobutyl ether and Olfine E1010 is an acetylene glycol-base surfactant (trade name, produced by Nissin Chemical Industry Co., Ltd.).

Example B-2

| Additive | Amount Added (%) |
| --- | --- |
| Cyan Dispersing Element B1 <85> | 4.5 |
| DEGmBE | 10.0 |
| Dipropylene glycol | 5.0 |
| Surfynol 465 | 1.2 |
| Triethanolamine | 0.9 |
| Water | balance |

In the composition above, DEGmBE denotes a diethylene glycol monobutyl ether and Surfynol 465 is an acetylene glycol-base surfactant (trade name, produced by Air Products (USA)).

Example B-3

| Additive | Amount Added (%) |
| --- | --- |
| Magenta Dispersing Element B1 <90> | 8.5 |
| 1,2-Hexanediol | 4.0 |
| Olfine STG | 0.5 |
| Diethylene glycol | 7.0 |
| Thiodiglycol | 1.5 |
| 1,6-Hexanediol | 5.0 |
| Triethanolamine | 1.0 |
| Potassium hydroxide | 0.1 |
| Water | balance |

In the composition above, Olfine STG is an acetylene glycol-base surfactant (trade name, produced by Nissin Chemical Industry Co., Ltd.).

Example B-4

| Additive | Amount Added (%) |
| --- | --- |
| Yellow Dispersing Element B1 <80> | 10.0 |
| TEGmBE | 3.0 |
| 1,2-Pentanediol | 5.0 |
| Surfynol 61 | 0.5 |
| Tetraethylene glycol | 9.0 |
| 1,5-Pentanediol | 2.0 |
| Dimethyl-2-imidazolidinone | 2.0 |
| Sodium benzoate | 0.1 |
| Triethanolamine | 0.7 |
| Water | balance |

In the composition above, Surfynol 61 is an acetylene alcohol-base surfactant (trade name, produced by Air Products (USA)).

Example B-5

| Additive | Amount Added (%) |
| --- | --- |
| Black Dispersing Element B2 <110> | 8.0 |
| DPGmBE | 2.0 |

| Additive | Amount Added (%) |
|---|---|
| DEGmBE | 7.0 |
| Glycerin | 14.0 |
| Triethanolamine | 0.9 |
| Water | balance |

In the composition above, DPGmBE denotes a dipropylene glycol monobutyl ether.

Example B-6

The aqueous ink of Example B-6 was prepared by using the same composition as in Example B-5 except for using Black Dispersing Element B3 as the dispersing element.

Example B-7

The aqueous ink of Example B-7 was prepared by using the same composition as in Example B-5 except for using Black Dispersing Element B4 as the dispersing element.

Example B-8

The aqueous ink of Example B-8 was prepared by using the same composition as in Example B-5 except for using Black Dispersing Element B5 as the dispersing element.

Example B-9

The aqueous ink of Example B-9 was prepared by using the same composition as in Example B-5 except for using Black Dispersing Element B6 as the dispersing element.

Example B-10

The aqueous ink of Example B-10 was prepared by using the same composition as in Example B-5 except for using Black Dispersing Element B7 as the dispersing element.

Example B-11

The aqueous ink of Example B-11 was prepared by using the same composition as in Example B-5 except for using Black Dispersing Element B8 as the dispersing element.

Example B-12

The aqueous ink of Example B-12 was prepared by using the same composition as in Example B-5 except for using Black Dispersing Element B9 as the dispersing element.

Example B-13

The aqueous ink of Example B-13 was prepared by using the same composition as in Example B-5 except for using Black Dispersing Element B10 as the dispersing element.

Example B-14

| Additive | Amount Added (%) |
|---|---|
| Cyan Dispersing Element B2 <90> | 10.0 |
| Olfine E1010 | 1.0 |

| Additive | Amount Added (%) |
|---|---|
| TEGmBE | 6.0 |
| Glycerin | 15.0 |
| Thiodiglycol | 2.0 |
| 1,5-Pentanediol | 1.0 |
| Triethanolamine | 0.9 |
| Water | balance |

Example B-15

The aqueous ink of Example B-15 was prepared by using the same composition as in Example B-14 except for using Cyan Dispersing Element B3 as the dispersing element.

Example B-16

The aqueous ink of Example B-16 was prepared by using the same composition as in Example B-14 except for using Cyan Dispersing Element B4 as the dispersing element.

Example B-17

The aqueous ink of Example B-17 was prepared by using the same composition as in Example B-14 except for using Cyan Dispersing Element B5 as the dispersing element.

Example B-18

The aqueous ink of Example B-18 was prepared by using the same composition as in Example B-14 except for using Cyan Dispersing Element B6 as the dispersing element.

Example B-19

The aqueous ink of Example B-19 was prepared by using the same composition as in Example B-14 except for using Cyan Dispersing Element B7 as the dispersing element.

Example B-20

The aqueous ink of Example B-20 was prepared by using the same composition as in Example B-14 except for using Cyan Dispersing Element B8 as the dispersing element.

Example B-21

The aqueous ink of Example B-21 was prepared by using the same composition as in Example B-14 except for using Cyan Dispersing Element B9 as the dispersing element.

Example B-22

The aqueous ink of Example B-22 was prepared by using the same composition as in Example B-14 except for using Cyan Dispersing Element B10 as the dispersing element.

Example B-23

| Additive | Amount Added (%) |
|---|---|
| Magenta Dispersing Element B2 <105> | 12.0 |
| Surfynol 61 | 0.5 |
| DEGmBE | 8.0 |

-continued

| Additive | Amount Added (%) |
|---|---|
| Glycerin | 15.0 |
| Trimethylolpropane | 1.0 |
| Trimethylolethane | 1.0 |
| Surfynol 465 | 1.0 |
| Triethanolamine | 0.5 |
| Potassium hydroxide | 0.05 |
| Water | balance |

Example B-24

The aqueous ink of Example B-24 was prepared by using the same composition as in Example B-23 except for using Magenta Dispersing Element B3 as the dispersing element.

Example B-25

The aqueous ink of Example B-25 was prepared by using the same composition as in Example B-23 except for using Magenta Dispersing Element B4 as the dispersing element.

Example B-26

The aqueous ink of Example B-26 was prepared by using the same composition as in Example B-23 except for using Magenta Dispersing Element B5 as the dispersing element.

Example B-27

The aqueous ink of Example B-27 was prepared by using the same composition as in Example B-23 except for using Magenta Dispersing Element B6 as the dispersing element.

Example B-28

The aqueous ink of Example B-28 was prepared by using the same composition as in Example B-23 except for using Magenta Dispersing Element B7 as the dispersing element.

Example B-29

The aqueous ink of Example B-29 was prepared by using the same composition as in Example B-23 except for using Magenta Dispersing Element B8 as the dispersing element.

Example B-30

The aqueous ink of Example B-30 was prepared by using the same composition as in Example B-23 except for using Magenta Dispersing Element B9 as the dispersing element.

Example B-31

The aqueous ink of Example B-31 was prepared by using the same composition as in Example B-23 except for using Magenta Dispersing Element B10 as the dispersing element.

Example B-32

| Additive | Amount Added (%) |
|---|---|
| Yellow Dispersing Element B2 <85> | 10.5 |
| Olfine STG | 1.0 |
| PGmBE | 2.0 |
| DEGmBE | 10.0 |
| Glycerin | 7.0 |
| Diethylene glycol | 5.0 |
| Tetrapropylene glycol | 5.0 |
| Triethanolamine | 0.9 |
| Potassium hydroxide | 0.1 |
| Water | balance |

In the composition above, PGmBE denotes a propylene glycol monobutyl ether.

Example B-33

The aqueous ink of Example B-33 was prepared by using the same composition as in Example B-32 except for using Yellow Dispersing Element B3 as the dispersing element.

Example B-34

The aqueous ink of Example B-34 was prepared by using the same composition as in Example B-32 except for using Yellow Dispersing Element B4 as the dispersing element.

Example B-35

The aqueous ink of Example B-35 was prepared by using the same composition as in Example B-32 except for using Yellow Dispersing Element B5 as the dispersing element.

Example B-36

The aqueous ink of Example B-36 was prepared by using the same composition as in Example B-32 except for using Yellow Dispersing Element B6 as the dispersing element.

Example B-37

The aqueous ink of Example B-37 was prepared by using the same composition as in Example B-32 except for using Yellow Dispersing Element B7 as the dispersing element.

Example B-38

The aqueous ink of Example B-38 was prepared by using the same composition as in Example B-32 except for using Yellow Dispersing Element B8 as the dispersing element.

Example B-39

The aqueous ink of Example B-39 was prepared by using the same composition as in Example B-32 except for using Yellow Dispersing Element B9 as the dispersing element.

Example B-40

The aqueous ink of Example B-40 was prepared by using the same composition as in Example B-32 except for using Yellow Dispersing Element B10 as the dispersing element.

Example B-41

The aqueous ink of Example B-41 was prepared by using the same composition as in Example B-32 except for using Yellow Dispersing Element B11 as the dispersing element.

Example B-42

| Additive | Amount Added (%) |
| --- | --- |
| Yellow Dispersing Element B8 <85> | 9.5 |
| Yellow Dispersing Element B11 <105> | 0.5 |
| Surfynol 465 | 0.5 |
| Olfine STG | 0.3 |
| TEGmBE | 1.0 |
| Glycerin | 13.0 |
| 1,2-Hexanediol | 2.0 |
| Trimethylolpropane | 6.0 |
| Triethylene glycol | 5.0 |
| 2-Pyrrolidone | 2.0 |
| Water | balance |

In the composition above, TEGmBE denotes a tri-ethylene glycol monobutyl ether.

Example B-43

| Additive | Amount Added (%) |
| --- | --- |
| Yellow Dispersing Element B8 <85> | 4.29 |
| Magenta Dispersing Element B9 <105> | 3.75 |
| Surfynol 465 | 0.5 |
| Olfine STG | 0.3 |
| TEGmBE | 1.0 |
| Glycerin | 13.0 |
| 1,2-Hexanediol | 3.0 |
| Trimethylolpropane | 8.0 |
| Triethylene glycol | 5.0 |
| 2-Pyrrolidone | 2.0 |
| Water | balance |

In the composition above, TEGmBE denotes a tri-ethylene glycol monobutyl ether.

Example B-44

| Additive | Amount Added (%) |
| --- | --- |
| Yellow Dispersing Element B8 <85> | 4.29 |
| Cyan Dispersing Element B7 <90> | 6.0 |
| Surfynol 465 | 0.5 |
| Olfine STG | 0.3 |
| TEGmBE | 1.0 |
| Glycerin | 16.0 |
| 1,2-Hexanediol | 2.0 |
| Trimethylolpropane | 3.0 |
| Triethylene glycol | 5.0 |
| 2-Pyrrolidone | 2.0 |
| Water | balance |

In the composition above, TEGmBE denotes a tri-ethylene glycol monobutyl ether.

Example B-45

| Additive | Amount Added (%) |
| --- | --- |
| Magenta Dispersing Element B9 <105> | 3.75 |
| Cyan Dispersing Element B7 <90> | 6.0 |
| Surfynol 465 | 0.5 |
| Olfine STG | 0.3 |
| TEGmBE | 1.0 |
| Glycerin | 15.0 |
| 1,2-Hexanediol | 2.0 |
| Trimethylolpropane | 3.0 |
| Triethylene glycol | 5.0 |
| 2-Pyrrolidone | 2.0 |
| Water | balance |

In the composition above, TEGmBE denotes a tri-ethylene glycol monobutyl ether.

Comparative Example B-1

In Comparative Example B-1, an aqueous ink for aqueous inkjet recording was prepared by using, as the colorant, the carbon black pigment used in Black Dispersing Element B1 and, as the dispersant, a polymer dispersant and a surfactant. The composition thereof is shown below.

| Additive | Amount Added (%) |
| --- | --- |
| Carbon black pigment <105> | 7.0 |
| Glycerin | 10.0 |
| Polymer dispersant | 3.0 |
| Nonionic surfactant | 1.0 |
| Ion exchanged water | balance |

In the composition above, the carbon black pigment was Raven C (trade name, produced by Columbian Carbon Co., Ltd.), the nonionic surfactant was Noigen EA160 (produced by Dai-ichi Kogyo Seiyaku Co., Ltd.), and the polymer dispersant was Solsperse 27000 (produced by Avecia Limited) The composition above was dispersed in a bead mill MINIZETOR (manufactured by Ajisawa) for 2 hours to prepare the aqueous ink for aqueous inkjet recording of Comparative Example B-1. In this Comparative Example, Proxel XL-2, EDTA 2Na salt and benzotriazole were not added.

Comparative Example B-2

In Comparative Example B-2, an aqueous ink for aqueous inkjet recording was prepared by using, as the colorant, the carbon black pigment used in Black Dispersing Element B1 and, as the dispersant, a surfactant. The composition thereof is shown below.

| Additive | Amount Added (%) |
| --- | --- |
| Carbon black pigment <105> | 8.0 |
| Anionic surfactant | 1.5 |
| DEGmME | 7.0 |
| Diethylene glycol | 10.0 |
| 2-Pyrrolidone | 5.0 |
| Ion exchanged water | balance |

In the composition above, the carbon black pigment was Raven C (trade name, produced by Columbian Carbon Co., Ltd.) and the anionic surfactant was Hitenol N07 (trade name, produced by Dai-ichi Kogyo Seiyaku Co., Ltd.). DEGmME denotes a diethylene glycol monomethyl ether. In this Comparative Example, Proxel XL-2, EDTA 2Na salt and benzotriazole were not added.

Comparative Example B-3

In Comparative Example B-3, Black Dispersing Element B11 was produced by using, as the colorant, the carbon black pigment used in Black Dispersing Element B2 and, as the dispersant, the dispersing polymer used in Black Dispersing Element B2, and the aqueous ink of Comparative Example B-3 was prepared by using the obtained black dispersing element. However, Black Dispersing Element B11 used in this Comparative Example was produced by the following method.

The dispersing polymer solution (40 parts) having a concentration of 50% used in the production of Black Dispersing Element B2, 0.4 parts of Monac 880 (Pigment Black 7, trade name, produced by Cabot Co.) which is a carbon black pigment, 100 parts of an aqueous solution containing 0.1 mol/liter of sodium hydroxide and 30 parts of methyl ethyl ketone were mixed and dispersed by a homogenizer for 30 minutes. Thereto, 300 parts of ion exchanged water was added and the resulting solution was further stirred for one hour. The entire amount of methyl ethyl ketone and a part of water were distilled off by a rotary evaporator and the residue was neutralized with 0.1 mol/liter of sodium hydroxide to adjust the pH to 9 and then filtered through a 0.3-μm membrane filter to obtain Black Dispersing Element B11 having a solid (dispersing polymer and carbon black) content of 20% for use in Comparative Example B-3.

The aqueous ink composition used in Comparative Example B-3 is shown below. In the following, "%" of Black Dispersing Element B11 is a solid content (a total of pigment and dispersing polymer).

| Additive | Amount Added (%) |
| --- | --- |
| Black Dispersing Element B11 <80> | 15.0 |
| Diethylene glycol | 10.0 |
| Glycerin | 5.0 |
| Nonionic surfactant | 1.0 |
| Ion exchanged water | balance |

In the composition above, the nonionic surfactant was Epan 450 (trade name, produced by Dai-ichi Kogyo Seiyaku Co., Ltd.). In this Comparative Example, Proxel XL-2, EDTA 2Na salt and benzotriazole were not added.

Comparative Example B-4

In Comparative Example B-4, Black Dispersing Element B12 was produced by using, as the colorant, the carbon black pigment used in Black Dispersing Element B2 and, as the dispersant, the dispersing polymer used in Black Dispersing Element B2, and the aqueous ink of Comparative Example B-4 was prepared by using the obtained black dispersing element. However, Black Dispersing Element B12 used in this Comparative Example was produced by the following method.

The dispersing polymer solution (40 parts) having a concentration of 50% used in the production of Black Dispersing Element B2, 0.4 parts of Monac 880 (Pigment Black 7, trade name, produced by Cabot Co.) which is a carbon black pigment, 100 parts of an aqueous solution containing 0.1 mol/liter of sodium hydroxide and 30 parts of methyl ethyl ketone were mixed and dispersed by a homogenizer for 30 minutes. Thereto, 300 parts of ion exchanged water was added and the resulting solution was further stirred for one hour. The entire amount of methyl ethyl ketone and a part of water were distilled off by a rotary evaporator and the residue was neutralized with 0.1 mol/liter of sodium hydroxide to adjust the pH to 9 and then filtered through a 0.3-mm membrane filter to obtain Black Dispersing Element B11 having a solid (dispersing polymer and carbon black) content of 20% for use in Comparative Example B-4.

The aqueous ink composition used in Comparative Example B-4 is shown below. In the following, "%" of Black Dispersing Element B12 is a solid content (a total of pigment and dispersing polymer).

| Additive | Amount Added (%) |
| --- | --- |
| Black Dispersing Element B12 <180> | 8.0 |
| Diethylene glycol | 10.0 |
| Glycerin | 5.0 |
| Nonionic surfactant | 1.0 |
| Ion exchanged water | balance |

In the composition above, the nonionic surfactant was Epan 450 (trade name, produced by Dai-ichi Kogyo Seiyaku Co., Ltd.). In this Comparative Example, Proxel XL-2, EDTA 2Na salt and benzotriazole were not added.

(Evaluation of Dispersing Element and Aqueous Ink)
<Printing Quality on Plain Paper>

The aqueous inks prepared in Examples and Comparative Examples each was mounted in an aqueous inkjet printer PM-900C (trade name, manufactured by Seiko Epson Corporation) and a letter was printed on a plain paper. The printing quality was evaluated by the printing density and blurring. The plain papers used in this evaluation were Conqueror, Favorit, Modo Copy, Rapid Copy, EPSON EPP, Xerox 4024, Xerox 10, Neenha Bond, Ricopy 6200, Yamayuri and Xerox R which are plain papers commercially available in Europe, USA and Japan. The criteria for evaluation are shown below. The evaluation results are shown in Table 4.

A: The letter was thick and clear or blurring was not observed.
B: A fine letter was slightly thin or blurring was slightly observed (practicable level).
C: A fine letter was thin and broken or blurring such as fatting/bending of letter was observed.
D: Some letters could not be made out due to thin density or serious blurring.

TABLE 4

| Evaluation Results of Printing Quality | | | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- | --- |
| Species of | Example B | | | | | | | | | | | | | | | | | | | | | | | | |
| Paper | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Conqueror | A | A | A | A | A | A | A | A | A | A | A | A | A | A | A | A | A | A | A | A | A | A | A | A | A |
| Favorit | A | A | A | A | A | B | B | A | A | A | A | A | A | B | B | A | A | A | A | A | A | A | A | B | B |
| Modo Copy | A | A | A | A | A | B | A | A | A | A | A | A | B | A | A | A | A | A | A | A | A | A | A | B | A |
| Rapid Copy | A | A | A | A | A | A | A | A | A | A | A | A | A | A | A | A | A | A | A | A | A | A | A | A | A |
| EPSON EPP | A | A | A | A | A | A | A | A | A | A | A | A | A | A | A | A | A | A | A | A | A | A | A | A | A |
| Xerox P | A | A | A | A | A | A | A | A | A | A | A | A | A | A | A | A | A | A | A | A | A | A | A | A | A |

TABLE 4-continued

Evaluation Results of Printing Quality

| Species of | Example B | | | | | | | | | | | | | | | | | | | | | | |
|---|---|---|---|---|---|---|---|---|---|---|---|---|---|---|---|---|---|---|---|---|---|---|---|
| Paper | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Xerox 4024 | A | A | A | A | A | B | A | A | A | A | A | A | A | A | B | A | A | A | A | A | A | B | A |
| Xerox 10 | A | A | A | A | B | A | A | A | A | A | A | A | A | A | A | A | A | A | A | A | A | A | A |
| Neenha Bond | A | A | A | A | A | A | A | A | A | A | A | A | A | A | A | A | A | A | A | A | A | A | A |
| Ricopy 6200 | A | A | A | A | A | A | A | A | A | A | A | A | A | A | A | A | A | A | A | A | A | A | A |
| Yamayuri | A | A | A | A | B | B | A | A | A | A | A | A | B | A | A | A | A | A | A | A | A | B | B |
| Xerox R | A | A | B | B | A | B | B | B | A | A | A | A | A | B | B | A | A | A | A | A | A | B | B |

| Species of | Example B | | | | | | | | | | | | | | | | | | | | Comparative Example B | | | |
|---|---|---|---|---|---|---|---|---|---|---|---|---|---|---|---|---|---|---|---|---|---|---|---|---|
| Paper | 26 | 27 | 28 | 29 | 30 | 31 | 32 | 33 | 34 | 35 | 36 | 37 | 38 | 39 | 40 | 41 | 42 | 43 | 44 | 45 | 1 | 2 | 3 | 4 |
| Conqueror | A | A | A | A | A | A | A | A | A | A | A | A | A | A | A | A | A | A | A | A | C | C | C | C |
| Favorit | A | A | A | A | A | A | A | B | B | B | B | A | A | A | A | A | A | A | A | A | D | D | D | C |
| Modo Copy | A | A | A | A | A | A | A | B | B | B | B | A | A | A | A | A | A | A | A | A | D | D | D | D |
| Rapid Copy | A | A | A | A | A | A | A | B | B | B | B | A | A | A | A | A | A | A | A | A | D | D | D | D |
| EPSON EPP | A | A | A | A | A | A | A | A | A | A | A | A | A | A | A | A | A | A | A | A | C | C | C | C |
| Xerox P | A | A | A | A | A | A | A | A | A | A | A | A | A | A | A | A | A | A | A | A | C | C | D | C |
| Xerox 4024 | A | A | A | A | A | A | A | B | B | B | A | A | A | A | A | A | A | A | A | A | D | D | D | C |
| Xerox 10 | A | A | A | A | A | A | A | B | B | A | A | A | A | A | A | A | A | A | A | A | C | D | D | C |
| Neenha Bond | A | A | A | A | A | A | A | A | A | A | A | A | A | A | A | A | A | A | A | A | C | C | D | C |
| Ricopy 6200 | A | A | A | A | A | A | A | B | B | B | A | A | A | A | A | A | A | A | A | A | D | D | D | C |
| Yamayuri | A | A | A | A | A | A | A | B | B | B | A | A | A | A | A | A | A | A | A | A | D | D | D | C |
| Xerox R | B | B | A | A | A | A | A | B | B | B | B | A | A | A | A | A | A | A | A | A | D | D | D | D |

As apparent from the results in Table 4, the aqueous inks of Comparative Examples B-1 to B-4 gave a letter with low density or serious blurring, whereas the aqueous inks of Examples B-1 to 40 gave a letter with high density and less blurring. Among these, particularly the aqueous inks of Examples B-1, B-2, B-5, B-10, B-11, B-12, B-13, B-14, B-18, B-19, B-20, B-21, B-22, B-23, B-29, B-30, B-31, B-32, B-38, B-39, B-40, B-41, B-42, B-43, B-44 and B-45 gave a clear image with high letter density and free of blurring.

As verified above, the present invention can provide an aqueous ink suitable for aqueous inkjet recording, which gives a clear and thick image free of blurring on a plain paper and ensures high quality and high practicability.

<Glossiness on Gloss Media>

The aqueous inks prepared in Examples and Comparative Examples above each was mounted in an aqueous inkjet printer PM-900C (trade name, manufactured by Seiko Epson Corporation) and a solid pattern was printed on gloss media by varying the duty from 10% to 100% in steps of 10%. The printed matter was evaluated on the glossiness. The gloss media used in this evaluation were (1) Photo-Print Paper 2, (2) MC Photographic Paper (both (1) and (2) are trade names, produced by Seiko Epson Corporation), (3) Ink Jet Paper Photo Glossy Paper Super Photo Grade, (4) Ink Jet Paper Photo Paper High Grade (both (3) and (4) are trade names, produced by Fuji Photo Film Co., Ltd.), (5) Ink Jet Photographic Quality Paper Photo Weight (trade name, produced by Kodak) and (6) Photo-like QP QP20A4GH (trade name, produced by Konica Corporation) which are gloss media commercially available in Europe, USA and Japan. The evaluation was performed with an eye. The criteria for evaluation are shown below. The evaluation results are shown in Table 5. In Table 5, the species of paper is shown by the number described above.

A: In all solid patterns, glossiness was observed.
B: In the printing portion at 100% duty, glossiness was slightly lacking but no problem in practice.
C: In the printing portion at 50% duty or more, glossiness was lacking.
D: In all solid patterns, glossiness was lacking.

TABLE 5

Evaluation Results of Glossiness

| Species of | Example B | | | | | | | | | | | | | | | | | | | | | | | | |
|---|---|---|---|---|---|---|---|---|---|---|---|---|---|---|---|---|---|---|---|---|---|---|---|---|---|
| Paper | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| (1) | A | A | A | A | A | A | A | A | A | A | A | A | A | A | A | A | A | A | A | A | A | A | A | A | A |
| (2) | A | A | A | A | A | A | A | A | A | B | A | A | A | A | A | A | A | A | A | A | A | A | A | A | A |
| (3) | A | A | A | A | A | A | A | A | A | A | B | A | A | A | A | A | A | A | A | A | B | A | A | A | A |
| (4) | A | A | A | A | A | A | A | A | A | A | A | A | A | A | A | A | A | A | A | A | A | A | A | A | A |
| (5) | A | A | A | A | A | A | A | A | A | A | A | A | A | A | A | A | A | A | A | A | A | A | A | A | A |
| (6) | A | A | A | A | A | A | A | A | A | B | B | A | A | A | A | A | B | B | B | A | A | A | A | A | A |

| Species of | Example B | | | | | | | | | | | | | | | | | | | | Comparative Example B | | | |
|---|---|---|---|---|---|---|---|---|---|---|---|---|---|---|---|---|---|---|---|---|---|---|---|---|
| Paper | 26 | 27 | 28 | 29 | 30 | 31 | 32 | 33 | 34 | 35 | 36 | 37 | 38 | 39 | 40 | 41 | 42 | 43 | 44 | 45 | 1 | 2 | 3 | 4 |
| (1) | A | A | A | A | A | A | A | A | A | A | A | A | A | A | A | A | A | A | A | A | C | D | B | C |
| (2) | A | A | A | A | A | A | A | A | A | A | A | A | A | A | A | A | A | A | A | A | C | D | C | D |
| (3) | A | A | A | A | A | A | A | A | A | A | A | A | B | A | A | A | A | A | A | A | D | D | C | D |

TABLE 5-continued

Evaluation Results of Glossiness

| | | | | | | | | | | | | | | | | | | | | | | | |
|---|---|---|---|---|---|---|---|---|---|---|---|---|---|---|---|---|---|---|---|---|---|---|---|
| (4) | A | A | A | A | A | A | A | A | A | A | A | A | A | A | A | A | A | A | C | D | B | D | |
| (5) | A | A | A | A | A | A | A | A | A | A | A | A | A | A | A | A | A | A | C | D | B | D | |
| (6) | A | A | A | A | A | B | A | A | A | A | A | B | A | A | B | A | A | A | A | B | C | D | D | D |

As apparent from the results in Table 5, when printed with the aqueous inks of Comparative Examples B-1, B-2 and B-4, glossiness was lacking. In Comparative Example B-3, glossiness was relatively maintained but even a solid pattern at 100% duty was low in the density and practicability was lacking. On the other hand, when printed with the aqueous inks of Examples B-1 to B-40, glossiness was maintained. Among these, particularly the images printed with the aqueous inks of Examples B-1, B-2, B-3, B-4, B-5, B-9, B-10, B-11, B-14, B-17, B-18, B-19, B-23, B-28, B-29, B-30, B-32, B-37, B-38, B-39, B-41, B-42, B-43, B-44 and B-45 were clear with high density and exhibited excellent glossiness.

As verified above, the present invention can provide an aqueous ink suitable for aqueous inkjet recording, which ensures excellent glossiness, high quality and high practicability even on gloss media such as gloss paper commonly used for aqueous inkjet recording.

<Fixing Property of Printed Matter>

The aqueous inks prepared in Examples and Comparative Examples above each was mounted in an aqueous inkjet printer PM-900C (trade name, manufactured by Seiko Epson Corporation) and a letter was printed on the plain paper and gloss media used in the above-described evaluations. The printed matter was evaluated on the fixing property. In the evaluation, a printed matter was dried at 20 to 25° C./40 to 60% RH for one hour after printing and rubbed with a finger and the shifted/thinned state of letter was observed with an eye. The criteria for evaluation are shown below. The evaluation results are shown in Table 6. In Table 6, the paper species of gloss media is shown by the number of gloss media described above in <Glossiness on Gloss Media>.

A: Neither shifted nor thinned.
B: Slightly shifted but no problem in practice.
C: Shifted or thinned.
D: Seriously shifted and thinned and the letter could be hardly made out.

TABLE 6

Evaluation Results 1 of Fixing Property

| | Example B | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Species of Paper | | | | | | | | | | | | | | | | | | | | | | | | | |
| Conqueror | A | A | A | A | A | A | A | A | A | A | B | B | A | A | A | A | A | A | A | B | B | A | A | A | A |
| Favorit | A | A | A | A | A | A | A | A | A | A | A | A | A | A | A | A | A | A | A | A | A | A | A | A | A |
| Modo Copy | A | A | A | A | A | A | A | A | A | A | A | A | A | A | A | A | A | A | A | A | A | A | A | A | A |
| Rapid Copy | A | A | A | A | A | A | A | A | A | A | A | A | A | A | A | A | A | A | A | A | A | A | A | A | A |
| EPSON EPP | A | A | A | A | A | A | A | A | A | A | B | A | A | A | A | A | A | A | A | B | A | A | A | A | A |
| Xerox P | A | A | A | A | A | A | A | A | A | A | A | A | A | A | A | A | A | A | A | A | A | A | A | A | A |
| Xerox 4024 | A | A | A | A | A | A | A | A | A | A | A | A | A | A | A | A | A | A | A | A | A | A | A | A | A |
| Xerox 10 | A | A | A | A | A | A | A | A | A | A | A | A | A | A | A | A | A | A | A | A | A | A | A | A | A |
| Neenha Bond | A | A | A | A | A | A | A | A | A | A | B | B | A | A | A | A | A | A | A | B | B | A | A | A | A |
| Ricopy 6200 | A | A | A | A | A | A | A | A | A | A | A | A | A | A | A | A | A | A | A | A | A | A | A | A | A |
| Yamayuri | A | A | A | A | A | A | A | A | A | A | A | B | A | A | A | A | A | A | A | A | B | A | A | A | A |
| Xerox R | A | A | A | A | A | A | A | A | A | A | A | A | A | A | A | A | A | A | A | A | A | A | A | A | A |
| Species of Paper (gloss media) | | | | | | | | | | | | | | | | | | | | | | | | | |
| (1) | A | A | A | A | A | A | A | A | A | A | A | A | A | A | A | A | A | A | A | A | A | A | A | A | A |
| (2) | A | A | A | A | A | A | A | A | A | A | A | A | A | A | A | A | A | A | A | A | A | A | A | A | A |
| (3) | A | A | A | A | A | A | A | A | A | A | A | B | A | A | A | A | A | A | A | A | B | A | A | A | A |
| (4) | A | A | A | A | A | A | A | A | A | A | A | A | A | A | A | A | A | A | A | A | A | A | A | A | A |
| (5) | A | A | A | A | A | A | A | A | A | A | A | A | A | A | A | A | A | A | A | A | A | A | A | A | A |
| (6) | A | A | A | A | A | A | A | A | A | A | A | B | B | A | A | A | A | A | A | B | B | B | A | A | A |

TABLE 7

Evaluation Results 2 of Fixing Property

| | Example B | | | | | | | | | | | | | | | | | | | | Comparative Example B | | | |
|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 1 | 2 | 3 | 4 |
| Species of Paper | | | | | | | | | | | | | | | | | | | | | | | | |
| Conqueror | A | A | A | A | A | B | A | A | A | A | A | A | A | B | A | A | A | A | A | A | D | D | C | C |
| Favorit | A | A | A | A | A | A | A | A | A | A | B | A | A | A | A | A | A | A | A | A | D | D | B | C |

TABLE 7-continued

Evaluation Results 2 of Fixing Property

| | Example B | | | | | | | | | | | | | | | | | | | | | Comparative Example B | | | |
|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 1 | 2 | 3 | 4 |
| Modo Copy | A | A | A | A | A | A | A | A | A | A | A | A | A | A | A | A | A | A | A | A | B | D | B | B |
| Rapid Copy | A | A | A | A | A | A | A | A | A | A | A | A | A | A | A | A | A | A | A | A | C | D | A | B |
| EPSON EPP | A | A | A | A | A | A | A | A | A | A | A | A | A | A | A | A | A | A | A | A | D | D | C | C |
| Xerox P | A | A | A | A | A | A | A | A | A | A | A | A | A | A | A | A | A | A | A | A | C | D | C | C |
| Xerox 4024 | A | A | A | A | A | A | A | A | A | A | A | A | A | A | A | A | A | A | A | A | B | D | B | C |
| Xerox 10 | A | A | A | A | A | A | A | A | A | A | A | A | A | A | A | A | A | A | A | A | C | D | C | C |
| Neenha Bond | A | A | A | A | A | B | A | A | A | A | A | A | A | B | A | A | A | A | A | A | C | D | C | C |
| Ricopy 6200 | A | A | A | A | A | A | A | A | A | A | A | A | A | A | A | A | A | A | A | A | C | D | B | C |
| Yamayuri | A | A | A | A | A | A | A | A | A | A | A | B | A | A | A | A | A | A | A | A | D | D | C | C |
| Xerox R | A | A | A | A | A | A | A | A | A | A | A | A | A | A | A | A | A | A | A | A | B | C | A | A |
| Species of Paper (gloss media) | | | | | | | | | | | | | | | | | | | | | | | | |
| (1) | A | A | A | A | A | A | A | A | A | A | A | A | A | A | A | A | A | A | A | A | C | D | B | C |
| (2) | A | A | A | A | A | A | A | A | A | A | A | A | A | A | A | A | A | A | A | A | C | D | C | D |
| (3) | A | A | A | A | A | A | A | A | A | A | A | A | A | A | A | A | A | A | A | A | D | D | C | D |
| (4) | A | A | A | A | A | A | A | A | A | A | A | A | A | A | A | A | A | A | A | A | C | D | B | D |
| (5) | A | A | A | A | A | A | A | A | A | A | A | A | A | A | A | A | A | A | A | A | C | D | B | D |
| (6) | A | A | A | A | A | B | A | A | A | A | A | A | A | A | B | A | A | A | A | A | D | D | D | D |

As apparent from the results in Tables 6 and 7, when printed with the aqueous inks of Comparative Examples B-1, B-2 and B-4, the fixing property was lacking particularly on gloss media. In Comparative Example B-3, the fixing property was relatively good but the letter density was low and practicability was lacking. On the other hand, when printed with the aqueous inks of Examples B-1 to B-40, the fixing property was good on both plain paper and gloss media. Among these, particularly the images printed with the aqueous inks of Examples B-1, B-2, B-4, B-5, B-9, B-10, B-11, B-14, B-17, B-18, B-19, B-23, B-28, B-29, B-30, B-32, B-37, B-38, B-39, B-41, B-42, B-43, B-44 and B-45 exhibited good fixing property even on gloss media.

As verified above, the present invention can provide an aqueous ink suitable for aqueous inkjet recording, which ensures excellent fixing property, high quality and high practicability not only on plain paper but also on gloss media such as gloss paper commonly used for aqueous inkjet recording.

<Storability 1 of Aqueous Ink>

The aqueous inks prepared in Examples and Comparative Examples above each was charged in a sampling vial and after tightly plugging the vial, left standing at 60° C. for one week. The amount of foreign matters generated and physical values (viscosity, surface tension) were examined before and after each aqueous ink was left standing. The criteria for evaluation are shown below. The evaluation results are shown in Table 8.

A: The ratio of the amount of foreign matters generated and physical values after standing at 60° C. to those before standing was in the range from 0.99 to 1.01.

B: The ratio was from 0.95 to 0.99 or from 1.01 to 1.05 (practicable level).

C: The ratio was from 0.90 to 0.95 or from 1.05 to 1.10.

D: The ratio was less than 0.90 or more than 1.10.

TABLE 8

Evaluation Results of Storability of Aqueous Ink

| | Example B | | | | | | | | | | | | | | | | | | | | | | | | |
|---|---|---|---|---|---|---|---|---|---|---|---|---|---|---|---|---|---|---|---|---|---|---|---|---|---|
| Items | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Amount of foreign matters generated | A | A | A | A | A | A | A | A | A | A | A | A | A | A | A | A | A | A | A | A | A | A | A | A | A |
| Viscosity | A | A | A | A | A | A | A | A | A | A | A | A | B | A | A | A | A | A | A | A | B | A | A | A | A |
| Surface tension | A | A | A | A | A | A | A | A | A | A | A | A | A | A | A | A | A | A | A | A | A | A | A | A | A |

| | Example B | | | | | | | | | | | | | | | | | | | | | Comparative Example B | | | |
|---|---|---|---|---|---|---|---|---|---|---|---|---|---|---|---|---|---|---|---|---|---|---|---|---|---|
| Items | 26 | 27 | 28 | 29 | 30 | 31 | 32 | 33 | 34 | 35 | 36 | 37 | 38 | 39 | 40 | 41 | 42 | 43 | 44 | 45 | 1 | 2 | 3 | 4 |
| Amount of foreign matters generated | A | A | A | A | A | A | A | A | A | A | A | A | A | A | A | A | A | A | A | A | C | B | B | D |
| Viscosity | A | A | A | A | A | B | A | A | A | A | A | A | A | B | A | A | A | A | A | A | D | C | B | D |
| Surface tension | A | A | A | A | A | A | A | A | A | A | A | A | A | A | A | A | A | A | A | A | B | D | C | C |

As apparent from the results in Table 8, the aqueous inks of Comparative Examples B-1 to B-4 were poor in the storability, whereas the aqueous inks of Examples B-1 to B-40 exhibited good storability in both foreign matters and physical values. Among these, particularly the aqueous inks of Examples B-1, B-2, B-4, B-5, B-9, B-10, B-11, B-12, B-13, B-14, B-17, B-18, B-19, B-20, B-23, B-28, B-29, B-30, B-31, B-32, B-37, B-38, B-39, B-40, B-41, B-42, B-43, B-44 and B-45 were excellent by exhibiting almost no difference in the amount of foreign matters generated and physical values between before and after standing at 60° C.

Also, the same test was performed by changing the dispersant in the composition of Example B-1 to the pigment of Comparative Example B-1, as a result, the surface tension was less changed (B in the above-described criteria for evaluation) but a large amount of foreign matters were generated (D in the above-described criteria for evaluation) to reduce the filterability and the viscosity of the aqueous ink was increased (D in the above-described criteria for evaluation) to fail in obtaining stable storability.

As verified above, the present invention can provide an aqueous ink suitable for aqueous inkjet recording, which ensures excellent storability, high quality and high practicability. Also, it is seen that the weight ratio of colorant and dispersing polymer necessary for ensuring excellent results in all evaluations on the printing quality, glossiness and fixing property of the printed matter is in the range specified as preferred in the present invention. Even when two kinds of dispersing elements are mixed in the aqueous ink (aqueous inks of Examples B-41 to B-45), the present invention can provide an aqueous ink suitable for aqueous inkjet recording, which ensures excellent storability, high quality and high practicability.

Furthermore, aqueous inks prepared by using another additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) in place of DEGmBE and E1010 in the composition of Example B-1, and aqueous inks prepared by adding the additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) to the aqueous ink of Comparative Example B-1 (Aqueous Ink Compositions 1 to 10 in Table 8) each was similarly left standing at 60° C. for one week and each aqueous ink after standing was examined on the amount of foreign matters generated and physical values (viscosity, surface tension). The criteria for evaluation are the same as those in <Storability 1 of Aqueous Ink> above. The evaluation results are shown in Table 9.

Also, the aqueous inks obtained above were evaluated on the ejection stability. The ejection stability was evaluated by mounting each aqueous ink in an aqueous inkjet printer PM-900C (trade name, manufactured by Seiko Epson Corporation) and observing the printing disorder in continuous printing of 100 pages on A4-size Xerox P. The criteria for evaluation are shown below. The evaluation results are shown in Table 8.

A: Printing disorder was not generated at all.

B: Printing disorder was generated but at less than 10 portions (practicable level).

C: Printing disorder was generated at 10 to less than 100 portions.

D: Printing disorder was generated at 100 or more portions.

TABLE 9

Amount of Foreign Matters Generated, Physical Values (Viscosity, Surface Tension) and Ejection Stability when Additives were Changed in Compositions of Example B-1 and Comparative Example B-1

| Additive | Example 1 | 2 | 3 | 4 | 5 | 6 | 7 | 8 | 9 | 10 |
|---|---|---|---|---|---|---|---|---|---|---|
| DEGmBE | 5 | | 5 | | | 6 | 10 | | | |
| TEGmBE | | 8 | | 7 | | | | 8 | | |
| PGmBE | | | 2 | | | | | | | |
| DPGmBE | | | | 2 | | | 3 | | | |
| 1,2-HD | | | | | 3 | | | 2 | | 2 |
| 1,2-PD | | | | | | 5 | | | | 5 |
| Olfine E1010 | | 1 | 1 | | 1 | | | | 1 | |
| Olfine STG | 0.5 | | | 0.5 | | | 1 | 0.5 | | |
| Surfynol 61 | | | | | | 0.5 | | 0.5 | | |
| Example A-1 | | | | | | | | | | |
| Amount of foreign matters generated | A | A | A | A | A | A | A | A | A | A |
| Viscosity | A | A | A | A | A | A | A | A | A | A |
| Surface tension | A | A | A | A | A | A | A | A | A | A |
| Ejection stability | A | A | A | A | A | A | A | A | A | A |
| Comparative Example A-1 | | | | | | | | | | |
| Foreign matters generated | D | D | D | D | D | D | D | D | C | B |
| Viscosity | D | D | D | D | D | D | D | D | C | B |
| Surface tension | B | C | B | C | B | B | C | C | B | A |
| Ejection stability | D | D | D | D | D | D | D | D | C | C |

As seen from the evaluation results above, the aqueous ink prepared by using the dispersing element of the present invention exhibits good printing quality, excellent ejection stability and high storage stability irrespective of plain paper or gloss media and can be an aqueous ink suitable for aqueous inkjet recording. Examples B-2 to B-8 were also tested by similarly changing the additives, as a result, almost the same results were obtained.

<Stability 2 of Aqueous Ink>

In the polymerization of the dispersing polymer used for the production of Black Dispersing Element B1, the amount of aromatic ring in the dispersing polymer was changed by varying the ratio of styrene and α-methylstyrene as monomers containing the aromatic ring to tetrahydrofurfuryl methacrylate, butyl methacrylate and triethylene glycol methacrylate as other monomers. Using obtained dispersing polymers, Black Dispersing Elements B13 to B21 were produced and then, aqueous inks were prepared by using the same composition and method as in Example B-1 except for using these black dispersing elements. In Black Dispersing Elements B13 to B21, the weight ratio of Raven C (trade name, produced by Columbian Carbon Co., Ltd.) as the colorant, which is carbon black, to the dispersing polymer was the same as in Black Dispersing Element B1. The compositions of Black Dispersing Elements B13 to B21 are shown below. The amount of aromatic ring in the dispersing polymer was measured in the same manner as in Black Dispersing Element B1 and is shown after the name of dispersing element.

(Black Dispersing Element B13, Amount of Aromatic Ring in Dispersing Polymer: 0%)

| | |
|---|---|
| Raven C | 58 parts |
| Adeka Reasoap SE-10N (trade name, produced by Asahi Denka Co., Ltd., polymerizable surfactant) | 5 parts |
| Styrene | 0 part |
| α-Methylstyrene | 0 part |
| Azobisisobutyronitrile | 0.5 parts |
| Sodium laurylsulfate | 0.05 parts |
| Potassium persulfate | 0.5 parts |
| Styrene | 0 part |
| Tetrahydrofurfuryl methacrylate | 2.5 parts |
| Butyl methacrylate | 37.5 parts |
| Triethylene glycol methacrylate | 12.5 parts |
| tert-Dodecylmercaptan | 0.02 parts |

(Black Dispersing Element B14, Amount of Aromatic Ring in Dispersing Polymer: 10%)

| | |
|---|---|
| Raven C | 58 parts |
| Adeka Reasoap SE-10N (trade name, produced by Asahi Denka Co., Ltd., polymerizable surfactant) | 5 parts |
| Styrene | 1.3 parts |
| α-Methylstyrene | 0.45 parts |
| Azobisisobutyronitrile | 0.5 parts |
| Sodium laurylsulfate | 0.05 parts |
| Potassium persulfate | 0.5 parts |
| Styrene | 6.3 parts |
| Tetrahydrofurfuryl methacrylate | 2.1 parts |
| Butyl methacrylate | 31.9 parts |
| Triethylene glycol methacrylate | 10.6 parts |
| tert-Dodecylmercaptan | 0.02 parts |

(Black Dispersing Element B15, Amount of Aromatic Ring in Dispersing Polymer: 20%)

| | |
|---|---|
| Raven C | 58 parts |
| Adeka Reasoap SE-10N (trade name, produced by Asahi Denka Co., Ltd., polymerizable surfactant) | 5 parts |
| Styrene | 2.6 parts |
| α-Methylstyrene | 0.5 parts |
| Azobisisobutyronitrile | 0.5 parts |
| Sodium laurylsulfate | 0.05 parts |
| Potassium persulfate | 0.5 parts |
| Styrene | 12.6 parts |
| Tetrahydrofurfuryl methacrylate | 1.74 parts |
| Butyl methacrylate | 26.1 parts |
| Triethylene glycol methacrylate | 8.7 parts |
| tert-Dodecylmercaptan | 0.02 parts |

(Black Dispersing Element B16, Amount of Aromatic Ring in Dispersing Polymer: 25%)

| | |
|---|---|
| Raven C | 58 parts |
| Adeka Reasoap SE-10N (trade name, produced by Asahi Denka Co., Ltd., polymerizable surfactant) | 5 parts |
| Styrene | 3.25 parts |
| α-Methylstyrene | 1.125 parts |
| Azobisisobutyronitrile | 0.5 parts |
| Sodium laurylsulfate | 0.05 parts |
| Potassium persulfate | 0.5 parts |
| Styrene | 15.75 parts |
| Tetrahydrofurfuryl methacrylate | 1.55 parts |
| Butyl methacrylate | 23.25 parts |
| Triethylene glycol methacrylate | 7.75 parts |
| tert-Dodecylmercaptan | 0.02 parts |

(Black Dispersing Element B17, Amount of Aromatic Ring in Dispersing Polymer: 30%)

| | |
|---|---|
| Raven C | 58 parts |
| Adeka Reasoap SE-10N (trade name, produced by Asahi Denka Co., Ltd., polymerizable surfactant) | 5 parts |
| Styrene | 3.9 parts |
| α-Methylstyrene | 1.35 parts |
| Azobisisobutyronitrile | 0.5 parts |
| Sodium laurylsulfate | 0.05 parts |
| Potassium persulfate | 0.5 parts |
| Styrene | 18.9 parts |
| Tetrahydrofurfuryl methacrylate | 1.35 parts |
| Butyl methacrylate | 20.25 parts |
| Triethylene glycol methacrylate | 6.75 parts |
| tert-Dodecylmercaptan | 0.02 parts |

(Black Dispersing Element B18, Amount of Aromatic Ring in Dispersing Polymer: 50%)

| | |
|---|---|
| Raven C | 58 parts |
| Adeka Reasoap SE-10N (trade name, produced by Asahi Denka Co., Ltd., polymerizable surfactant) | 5 parts |
| Styrene | 6.5 parts |
| α-Methylstyrene | 2.25 parts |
| Azobisisobutyronitrile | 0.5 parts |
| Sodium laurylsulfate | 0.05 parts |
| Potassium persulfate | 0.5 parts |
| Styrene | 31.5 parts |
| Tetrahydrofurfuryl methacrylate | 0.59 parts |
| Butyl methacrylate | 8.82 parts |
| Triethylene glycol methacrylate | 2.94 parts |
| tert-Dodecylmercaptan | 0.02 parts |

(Black Dispersing Element B19, Amount of Aromatic Ring in Dispersing Polymer: 60%)

| | |
|---|---|
| Raven C | 58 parts |
| Adeka Reasoap SE-10N (trade name, produced by Asahi Denka Co., Ltd., polymerizable surfactant) | 5 parts |
| Styrene | 7.55 parts |
| α-Methylstyrene | 2.65 parts |
| Azobisisobutyronitrile | 0.5 parts |
| Sodium laurylsulfate | 0.05 parts |
| Potassium persulfate | 0.5 parts |
| Styrene | 36.55 parts |
| Tetrahydrofurfuryl methacrylate | 0.25 parts |
| Butyl methacrylate | 4.2 parts |
| Triethylene glycol methacrylate | 1.35 parts |
| tert-Dodecylmercaptan | 0.02 parts |

(Black Dispersing Element B20, Amount of Aromatic Ring in Dispersing Polymer: 70%)

| | |
|---|---|
| Raven C | 58 parts |
| Adeka Reasoap SE-10N (trade name, produced by Asahi Denka Co., Ltd., polymerizable surfactant) | 5 parts |
| Styrene | 7.8 parts |
| α-Methylstyrene | 3.15 parts |
| Azobisisobutyronitrile | 0.5 parts |
| Sodium laurylsulfate | 0.05 parts |
| Potassium persulfate | 0.5 parts |
| Styrene | 44.1 parts |
| Tetrahydrofurfuryl methacrylate | 0 part |
| Butyl methacrylate | 0 part |
| Triethylene glycol methacrylate | 0 part |
| tert-Dodecylmercaptan | 0.02 parts |

(Black Dispersing Element B21, Amount of Aromatic Ring in Dispersing Polymer: 72%)

| | |
|---|---|
| Raven C | 58 parts |
| Adeka Reasoap SE-10N (trade name, produced by Asahi Denka Co., Ltd., polymerizable surfactant) | 1 parts |
| Styrene | 10 parts |
| α-Methylstyrene | 0 part |
| Azobisisobutyronitrile | 0.5 parts |
| Sodium laurylsulfate | 0.05 parts |
| Potassium persulfate | 0.5 parts |
| Styrene | 46 parts |
| Tetrahydrofurfuryl methacrylate | 0 part |
| Butyl methacrylate | 0 part |
| Triethylene glycol methacrylate | 0 part |
| tert-Dodecylmercaptan | 0.02 parts |

The aqueous inks using the dispersing elements prepared according to the above-described method and materials were evaluated on the storage stability. In the evaluation, each aqueous ink was charged into a sampling vial and after tightly plugging the vial, left standing at 60° C. or 70° C. for one week. The foreign matters generated and physical value (viscosity) of the aqueous ink were examined before and after the aqueous ink was left standing. The criteria for evaluation were the same as those in <Storability 1 of Aqueous Ink> above. The evaluation results are shown in Table 10.

TABLE 10

Amount of Aromatic Ring in Dispersing Polymer and Storage Stability

| | | Amount of Aromatic Ring (%) | | | | | | | | |
|---|---|---|---|---|---|---|---|---|---|---|
| | | 0 | 10 | 20 | 25 | 30 | 40 | 50 | 60 | 70 | 72 |
| Foreign matters | 60° C. | D | D | B | A | A | A | A | A | B | C |
| | 70° C. | D | D | C | A | A | A | A | B | C | D |
| Viscosity | 60° C. | D | D | A | A | A | A | A | A | A | C |
| | 70° C. | D | D | A | A | A | A | A | A | B | D |

It is seen from the results in Table 10 that when the amount of aromatic ring in the dispersing polymer of the present invention is from 20 to 70%, the storage stability can be ensured. It is also seen that when the amount of aromatic ring is from 25 to 50%, neither generation of foreign matters nor change of viscosity occurs and this is a preferred embodiment.

These reveal that when the colorant is dispersed by using a general dispersant (for example, a water-soluble polymer dispersant or a surfactant) as in conventional techniques, the additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) is difficult to use and therefore, a sufficiently high printing quality cannot be obtained. However, in a dispersing element of the present invention where a pigment is encapsulated with a dispersing polymer and rendered dispersible in water and the amount of aromatic ring in the dispersing polymer is from 20 to 70% of the dispersing polymer, when the weight ratio of pigment to dispersing polymer is from 10:90 to 90:10, even an aqueous ink containing the above-described additives can be ensured with storage stability and ejection stability while keeping a sufficiently high color forming property. Furthermore, when the weight ratio of colorant to dispersing polymer is within the range preferred in the present invention, that is, from 40:60 to 90:10 for the black-type pigment, from 50:50 to 90:10 for the yellow-type pigment, from 50:50 to 90:10 for the red-type pigment, and from 20:80 to 70:30 for the blue-type pigment, an aqueous ink suitable for aqueous inkjet recording can be provided, which can form a high-density clear image with excellent glossiness/fixing property not only on plain paper but also on gloss media such as gloss paper commonly used for aqueous inkjet printers. Also, a pigment is suitably used as the colorant and this provides an effect of giving a printed matter more excellent in the water resistance and light fastness than those obtained by using a dye conventionally often used as the colorant in an aqueous ink for aqueous inkjet printers. In addition, the function of the dispersing polymer encapsulating the colorant can be freely changed by the polymerizing monomer or other reactive agents and this provides an effect that more various functions (for example, light fastness, gas resistance, colorability, glossiness and fixing property of printed matter) can be imparted. In the case of using a dispersant (for example, water-soluble polymer dispersant or surfactant) conventionally used for dispersing a colorant in an aqueous system, the adsorptive strength of the dispersant to the colorant is fundamentally weak and the dispersant is partially desorbed. Due to the resultant desorbed material or the dispersant not adsorbed, the viscosity of the aqueous ink increases and therefore, the amount of colorant added is limited, as a result, a sufficiently high color formation can be hardly obtained. The desorption conspicuously occurs particularly when the additive preferred in the present invention is used.

The present invention should not be construed as being limited to these Examples and various changes and modifications can be made therein without departing from the spirit and scope of the present invention.

Example C

The preferred embodiment (c) of the present invention is described below by referring to Examples.

A case where an organic or inorganic pigment is used as the colorant for use in the present invention is described. In Examples and Comparative Examples, Pigment C1 was a carbon black pigment, Pigment C2 was a phthalocyanine pigment, Pigment C3 was a dimethyl-quinacridone pigment, and Pigment C4 was a diketo-pyrrolopyrrole pigment. However, the present invention is not limited thereto and many organic or inorganic pigments can be used. In < >, the average particle size is shown by the unit of nm (nanometer).

In the present invention, the pigment can also be dispersed by a reactive dispersant and then subjected to an emulsification polymerization in the presence of a catalyst in water.
(Production of Dispersing Elements C1 to C4)

For Dispersing Element C1, Raven C (produced by Columbian Carbon Co., Ltd.), which is carbon black and an inorganic pigment, was used. In a reaction vessel equipped with an ultrasonic wave generator, a stirrer, a dripping device, a water cooled reflux condenser and a temperature controller, 25 parts (hereinafter "parts" means "parts by weight") of Raven C (produced by Columbian Carbon Co., Ltd.) and 5 parts of Adeka Reasoap SE-10N (produced by Asahi Denka Co., Ltd.) which is a polymerizable surfactant were added to 180 parts of ion exchanged water and dispersed by applying an ultrasonic wave for 4 hours.

Thereafter, a methyl ethyl ketone solution containing 5 parts of styrene, 1.6 parts of α-methylstyrene and 0.5 parts of azobisisobutyronitrile was added and the polymerization reaction was performed at 60° C. for 8 hours. The obtained solution was subjected to centrifugal filtration to take out a pigment encapsulated with a polymer and coarse particles were removed by filtering the pigment through a 0.4-μm membrane filter. This pigment solution encapsulated with a polymer was disaggregated and redispersed in a homogenizer.

Subsequently, in a reaction vessel, the methyl ethyl ketone solution of pigment obtained above, 27 parts of ion exchanged water and 0.05 parts of sodium laurylsulfate were added and then 100 parts of ion exchanged water and 0.5 parts of potassium persulfate as a polymerization initiator were charged. The resulting solution was kept at 70° C. in a nitrogen atmosphere. Thereto, a mixed solution containing 25 parts of styrene, 1 part of tetrahydrofurfuryl methacrylate, 15 parts of butyl methacrylate, 5 parts of triethylene glycol methacrylate and 0.02 parts of tert-dodecylmercaptan was added dropwise and reacted. Thereafter, the methyl ethyl ketone and a part of water were distilled off by a rotary evaporator and the residue was neutralized with sodium hydroxide to adjust the pH to 8.5 and then filtered through a 0.3-μm filter to obtain Dispersing Element C1.

A part of this dispersing element was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 40% based on the entire weight of the dispersing polymer.

Dispersing Elements C2 to C4 were obtained in the same manner as above except that Pigment Blue 15:3 (copper phthalocyanine pigment, produced by Clariant) which is an organic pigment was used for Dispersing Element C2, Pigment Red 122 (dimethylquinacridone pigment, produced by Clariant) which is an organic pigment was used for Dispersing Element C3, and Pigment Yellow 180 (diketopyrrolopyrrole, produced by Clariant) which is an organic pigment was used for Dispersing Element C4.

(Production of Dispersing Elements C5 to C8)

For Dispersing Element C5, Monac 880 (produced by Cabot Co.) which is carbon black was used. A reaction vessel equipped with a stirrer, a thermometer, a reflux tube and a dropping funnel was purged with nitrogen and thereinto, 20 parts of styrene, 5 parts of (x-methylstyrene, 15 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

Subsequently, 40 parts of the obtained dispersing polymer solution, 30 parts of Monac 880 (produced by Cabot Co.) which is carbon black, 100 parts of an aqueous solution containing 0.1 mol/liter of sodium hydroxide, and 30 parts of methyl ethyl ketone were mixed and stirred by a homogenizer for 30 minutes. Thereto, 300 parts of ion exchanged water was added and the resulting solution was further stirred for one hour. The entire amount of methyl ethyl ketone and a part of water were distilled off by a rotary evaporator and the residue was neutralized with 0.1 mol/liter of sodium hydroxide to adjust the pH to 9 and then filtered through a 0.3-μm membrane filter to obtain Dispersing Element C5 having a solid (dispersing polymer and carbon black) content of 20%.

A part of this dispersing element was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 36% based on the entire weight of the dispersing polymer.

Dispersing Elements C6 to C8 were obtained in the same manner as above except that Pigment Blue 15:3 (copper phthalocyanine pigment, produced by Clariant) was used for Dispersing Element C6, Pigment Red 122 (dimethyl-quinacridone pigment, produced by Clariant) was used for Dispersing Element C7, and Pigment Yellow 180 (diketo-pyrrolopyrrole, produced by Clariant) was used for Dispersing Element C8.

(Production of Polymer Fine Particle)

Into a reaction vessel equipped with a dropping device, a thermometer, a water cooled reflux condenser and a stirrer, 100 parts of ion exchanged water was charged and while stirring, 0.2 parts of potassium persulfate as a polymerization initiator was added at 70° C. in a nitrogen atmosphere. Thereto, a monomer solution obtained by adding 0.05 parts of sodium laurylsulfate, 4 parts of glycidoxy acrylate, 5 parts of styrene, 6 parts of tetrahydrofurfuryl acrylate, 5 parts of butyl methacrylate and 0.02 parts of tert-dodecylmercaptan to 7 parts of ion exchanged water was added dropwise at 70° C. and reacted to prepare a primary substance. To this primary substance, 2 parts of a 10% solution of ammonium persulfate was added and stirred and further, a reaction solution comprising 30 parts of ion exchanged water, 0.2 parts of lauryl sulfate, 30 parts of styrene, 25 parts of butyl methacrylate, 6 parts of butyl acrylate, 2 parts of acrylic acid, 1 part of 1,6-hexanediol dimethacrylate and 0.5 parts of tert-dodecylmercaptan was added at 70° C. while stirring, thereby performing the polymerization reaction. Thereafter, the obtained solution was neutralized with sodium hydroxide to a pH of 8 to 8.5 and then filtered through a 0.3-μm filter to prepare a 30% aqueous solution of polymer fine particle and this was designated as Emulsion A.

(Preparation Example of Aqueous Ink)

In the following, examples of the aqueous ink composition suitable as the aqueous ink for aqueous inkjet recording according to the present invention are specifically described. The amount of the dispersing element added is shown as the amount (solid content concentration; the total amount of pigment and dispersing polymer surrounding the pigment) in terms of weight. In < >, the particle size of pigment is shown by the unit of nm. In Examples, the water as balance was ion exchanged water where 0.05% of Proxel XL-2 for preventing septic activity of the aqueous ink, 0.02% of benzotriazole for preventing corrosion of an aqueous inkjet head member and 0.04% of EDTA 2Na salt for reducing the effect of metal ion in the aqueous ink system were added.

| (Example C-1) | Amount Added (%) |
|---|---|
| Dispersing Element C1 <105> | 9.5 |
| Emulsion A | 15.0 |
| TEGmBE | 5.0 |
| Olfine E1010 | 1.0 |
| Glycerin | 9.0 |
| 1,5-Pentanediol | 5.0 |
| Triethanolamine | 0.8 |
| Water | balance |

TEGmBE: triethylene glycol monobutyl ether Olfine E1010 (acetylene glycol-base surfactant, produced by Nissin Chemical Industry Col, Ltd.)

| (Example C-2) | Amount Added (%) |
|---|---|
| Dispersing Element C2 <85> | 4.5 |
| Emulsion A | 10.0 |
| DEGmBE | 10.0 |
| Dipropylene glycol | 5.0 |
| Surfynol 465 | 1.2 |
| Triethanolamine | 0.9 |
| Water | balance |

DEGmBE: diethylene glycol monobutyl ether Surfynol 465 (acetylene glycol-base surfactant, produced by Air Products (USA))

Example C-3

| (Example C-3) | Amount Added (%) |
|---|---|
| Dispersing Element C3 <90> | 8.5 |
| Emulsion A | 10.0 |
| 1,2-Hexanediol | 4.0 |
| Olfine STG | 0.5 |
| Diethylene glycol | 7.0 |
| Thiodiglycol | 1.5 |
| 1,6-Hexanediol | 5.0 |
| Triethanolamine | 1.0 |
| Potassium hydroxide | 0.1 |
| Water | balance |

Olfine STG (acetylene glycol-base surfactant, produced by Nissin Chemical Industry Co., Ltd.)

Example C-4

| (Example C-4) | Amount Added (%) |
|---|---|
| Dispersing Element C4 <80> | 10.0 |
| Emulsion A | 10.0 |
| TEGmBE | 3.0 |
| 1,2-Pentanediol | 5.0 |
| Surfynol 61 | 0.5 |
| Tetraethylene glycol | 9.0 |
| 1,5-Pentanediol | 2.0 |
| Dimethyl-2-imidazolidinone | 2.0 |
| Sodium benzoate | 0.1 |
| Triethanolamine | 0.7 |
| Water | balance |

Surfynol 61 (acetylene alcohol-base surfactant, produced by Air Products (USA))

Example C-5

| (Example C-5) | Amount Added (%) |
|---|---|
| Dispersing Element C5 | 8.0 |
| Emulsion A | 15.0 |
| DPGmBE | 2.0 |
| DEGmBE | 7.0 |
| Glycerin | 14.0 |
| Triethanolamine | 0.9 |
| Water | balance |

DPGmBE: dipropylene glycol monobutyl ether

Example C-6

| (Example C-6) | Amount Added (%) |
|---|---|
| Dispersing Element C6 | 10.0 |
| Emulsion A | 10.0 |
| Olfine E1010 | 1.0 |
| TEGmBE | 6.0 |
| Glycerin | 15.0 |
| Thiodiglycol | 2.0 |
| 1,5-Pentanediol | 1.0 |
| Triethanolamine | 0.9 |
| Water | balance |

Example C-7

| (Example C-7) | Amount Added (%) |
|---|---|
| Dispersing Element C7 | 12.0 |
| Emulsion A | 10.0 |
| Surfynol 61 | 0.5 |
| DEGmBE | 8.0 |
| Glycerin | 15.0 |
| Trimethylolpropane | 1.0 |
| Trimethylolethane | 1.0 |
| Surfynol 465 | 1.0 |
| Triethanolamine | 0.5 |
| KOH | 0.05 |
| Water | balance |

Example C-8

| (Example C-8) | Amount Added (%) |
|---|---|
| Dispersing Element C8 | 10.5 |
| Emulsion A | 10.0 |
| Olfine STG | 1.0 |
| PGmBE | 2.0 |
| DEGmBE | 10.0 |
| Glycerin | 7.0 |
| Diethylene glycol | 5.0 |
| Tetrapropylene glycol | 5.0 |
| Triethanolamine | 0.9 |
| KOH | 0.1 |
| Water | balance |

PGmBE: propylene glycol monobutyl ether

The aqueous ink compositions used in Comparative Examples are shown below.

Comparative Example C-1

| (Comparative Example C-1) | Amount Added (%) |
|---|---|
| Pigment C1 <105> | 7.0 |
| Glycerin | 10.0 |

-continued

| (Comparative Example C-1) | Amount Added (%) |
|---|---|
| Dispersant | 3.0 |
| Nonionic surfactant | 1.0 |
| Ion exchanged water | balance |

Nonionic surfactant: Noigen EA160 (produced by Dai-ichi Kogyo Seiyaku Co., Ltd.)

The dispersant was prepared by a dispersion treatment using Solsperse 27000 (produced by Avecia Limited) in a bead mill MINIZETOR (manufactured by Ajisawa) for 2 hours.

Comparative Example C-2

| (Comparative Example C-2) | Amount Added (%) |
|---|---|
| Acid Blue 9 | 6.5 |
| DEGmME | 7.0 |
| Diethylene glycol | 10.0 |
| 2-Pyrrolidone | 5.0 |
| Ion exchanged water | balance |

DEGmME: diethylene glycol monomethyl ether

Comparative Example C-3

| (Comparative Example C-3) | Amount Added (%) |
|---|---|
| Direct Black 154 | 2.5 |
| Diethylene glycol | 10.0 |
| Nonionic surfactant | 1.0 |
| Ion exchanged water | balance |

Nonionic surfactant: Epan 450 (produced by Dai-ichi Kogyo Seiyaku Co., Ltd.)

In Table 11, the evaluation results of blurring when a letter was printed are shown as the printing evaluation results. In Table 11, A denotes "very good", B denotes "good", C denotes "bad" and D denotes "very bad".

TABLE 11

Evaluation Results of Printing Quality

| | Example C | | | | | | | | Comparative Example C | | |
|---|---|---|---|---|---|---|---|---|---|---|---|
| | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | D | D | D |
| Rapid Copy | A | A | A | A | A | A | A | A | D | D | D |
| EPSON EPP | A | A | A | A | A | A | A | A | C | C | C |
| Xerox P | A | A | A | A | A | A | A | A | C | C | D |
| Xerox 4024 | A | A | A | A | A | A | A | A | D | D | D |
| Xerox 10 | A | A | A | A | A | A | A | A | C | D | D |
| Neenha Bond | A | A | A | A | A | A | A | A | C | D | D |
| Ricopy 6200 | A | A | A | A | A | A | A | A | D | C | D |
| Yamayuri | A | A | A | A | A | A | A | A | D | D | D |
| Xerox R | A | A | A | A | A | A | A | A | D | D | D |

As apparent from the results in Table 11, the aqueous ink used in Comparative Examples exhibits bad printing quality and the aqueous ink for use in the present invention exhibits good printing quality.

Incidentally, this printing evaluation was performed by using an aqueous inkjet printer PM-900C manufactured by Seiko Epson Corporation. The papers used in this evaluation were Conqueror, Favorit, Modo Copy, Rapid Copy, EPSON EPP, Xerox 4024, Xerox 10, Neenha Bond, Ricopy 6200, Yamayuri and Xerox R which are plain papers commercially available in Europe, USA and Japan.

As verified above, the present invention can provide an aqueous ink suitable for aqueous inkjet recording, which is reduced in blurring for a material on which a printed image is recorded, such as paper, and ensures high quality and high practicability.

The aqueous inks of Examples C-1 to C-8 each was charged into a sampling vial and after tightly plugging the vial, left standing at 60° C. for one week. The foreign matters generated and physical values (viscosity, surface tension) of the aqueous ink were examined before and after the aqueous ink was left standing.

As a result, all aqueous inks were almost free of generation of foreign matters and change in physical values and exhibited good storage stability.

The same test was performed by changing the dispersing element in the composition of Example C-1 to the pigment of Comparative Example C-1, as a result, the surface tension was less changed but foreign matters were generated to decrease the filterability and due to occurrence of a viscosity-increasing phenomenon, ejection stability could not be obtained.

Furthermore, aqueous inks prepared by using another additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) in place of DEGmBE and E1010 in the composition of Example C-1, and aqueous inks prepared by adding the additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) to the aqueous ink of Comparative Example C-1 (Examples C-9 to C-18 in Table 12) each was similarly left standing at 60° C. for one week and each aqueous ink after standing was examined on foreign matters generated, physical values (viscosity, surface tension) and ejection stability. The results obtained are shown in Table 12. The amount of foreign matters generated shows a value of amount of foreign matters after standing at 60° C./initial amount of foreign matters, the viscosity shows a value of viscosity after standing at 60° C./initial viscosity, and the surface tension shows a value of surface tension after standing at 60° C./initial surface tension. The ejection stability was evaluated by using an aqueous inkjet printer PM-900C manufactured by Seiko Epson Corporation and rated A when printing disorder was not generated at all even in continuous printing of 100 pages on A4-size Xerox P, rated B when printing disorder was generated at less than 10 portions, rated C when printing disorder was generated at 10 to less than 100 portions, and rated D when printing disorder was generated at 100 or more portions.

TABLE 2

Foreign Matters Generated, Physical Values (Viscosity, Surface Tension) and Ejection Stability when Additives were Changed in Compositions of Example C-1 and Comparative Example C-2

| Additive | Example 9 | 10 | 11 | 12 | 13 | 14 | 15 | 16 | 17 | 18 |
|---|---|---|---|---|---|---|---|---|---|---|
| DEGmBE | 5 | | 5 | | | 6 | 10 | | | |
| TEGmBE | | 8 | | 7 | | | | 8 | | |
| PGmBE | | | 2 | | | | | | | |
| DPGmBE | | | | 2 | | | 3 | | | |
| 1,2-HD | | | | | 3 | | | 2 | | 2 |
| 1,2-PD | | | | | | 5 | | | | 5 |
| Olfine E1010 | | 1 | 1 | | 1 | | | | 1 | |
| Olfine STG | 0.5 | | | 0.5 | | | 1 | 0.5 | | |
| Surfynol 61 | | | | | | 0.5 | | 0.5 | | |
| Example C-1 | | | | | | | | | | |
| Foreign matters generated | 1 | 1 | 1 | 1 | 1 | 1 | 1 | 1 | 1 | 1 |
| Viscosity | 1 | 1 | 1 | 1 | 1 | 1 | 1 | 1 | 1 | 1 |
| Surface tension | 1 | 1 | 1 | 1 | 1 | 1 | 1 | 1 | 1 | 1 |
| Ejection stability | A | A | A | A | A | A | A | A | A | A |
| Comparative Example C-1 | | | | | | | | | | |
| Foreign matters generated | 11 | 5 | 13 | 12 | 3 | 22 | 25 | 20 | 1.5 | 2.1 |
| Viscosity | 5 | 4 | 4 | 3.5 | 1.3 | 10 | 24 | 23 | 1.3 | 2.5 |
| Surface tension | 1.0 | 1.1 | 1 | 1.1 | 1 | 1 | 1.1 | 1.1 | 1 | 1 |
| Ejection stability | D | D | D | D | C | D | D | D | C | C |

As seen from the results in Tables 11 and 12, the aqueous ink prepared by using the dispersing element of the present invention exhibits good printing quality, excellent ejection stability and high storage stability and can be an aqueous ink suitable for aqueous inkjet recording. Examples C-2 to C-8 were also tested by similarly changing the additives, as a result, almost the same results were obtained.

Furthermore, the dispersing polymers used in Examples C-1 and C-5 each was polymerized by varying the amount of aromatic ring to determine the relationship between the aromatic ring amount and the storage stability. The results are shown in Table 13. In the evaluation of the storage stability, each aqueous ink of Examples C-1 to C-8 was charged in a sampling vial and after tightly plugging the vial, left standing at 60° C. or 70° C. for one week and the foreign matters generated and physical value (viscosity) of the aqueous ink was examined before and after the aqueous ink was left standing. The amount of foreign matters generated shows a value of amount of foreign matters after standing at 60° C. or 70° C./initial amount of foreign matters, and the viscosity shows a value of viscosity after standing at 60° C. or 70° C./initial viscosity.

TABLE 13

Amount of Benzene Ring in Dispersing Polymer and Storage Stability

| | | Amount of Benzene Ring (%) | | | | | | | | |
|---|---|---|---|---|---|---|---|---|---|---|
| | | 0 | 10 | 20 | 25 | 30 | 40 | 50 | 60 | 70 | 72 |
| Example C-1 | | | | | | | | | | | |
| Foreign matters | 60° C. | 5.0 | 3.0 | 1.1 | 1.0 | 1.0 | 1.0 | 1.0 | 1.0 | 1.2 | 10 |
| | 70° C. | 15 | 12 | 1.3 | 1.0 | 1.0 | 1.0 | 1.0 | 1.5 | 2.5 | 35 |
| Viscosity | 60° C. | 5.5 | 3.0 | 1.0 | 1.0 | 1.0 | 1.0 | 1.0 | 1.0 | 1.0 | 15 |
| | 70° C. | 20 | 13 | 1.0 | 1.0 | 1.0 | 1.0 | 1.0 | 1.1 | 1.1 | 55 |
| Example C-5 | | | | | | | | | | | |
| Foreign matters | 60° C. | 4.0 | 3.5 | 1.2 | 1.0 | 1.0 | 1.0 | 1.0 | 1.0 | 1.2 | 15 |
| | 70° C. | 10 | 8.5 | 1.5 | 1.0 | 1.0 | 1.0 | 1.0 | 1.3 | 2.8 | 20 |
| Viscosity | 60° C. | 4.2 | 2.5 | 1.0 | 1.0 | 1.0 | 1.0 | 1.0 | 1.0 | 1.0 | 10 |
| | 70° C. | 15 | 10 | 1.0 | 1.0 | 1.0 | 1.0 | 1.0 | 1.1 | 1.2 | 28 |

As seen from the results in Table 13, the amount of aromatic ring in the dispersing polymer of the present invention is from 20 to 70%, preferably from 25 to 50%.

Also, the aqueous inks of Examples C-1 to C-8 and these aqueous inks where, however, the emulsion was not used (Comparative Examples) were evaluated on the fixing property and the results obtained are shown in Table 14. In the evaluation of fixing property, a plain paper (Xerox 4024) and a special paper (PM photographic paper) were used, the printed surface and the back surface thereof were superposed under a load of 300 g and moved at a rate of 1 m/sec, and the degree of falling off of the image was observed. The results immediately after printing, after 5 minutess, after one hour, after 2 hours and after 3 hours are shown. In Table 14, the rating A is when the image does not fall off at all, B is when the image slightly falls off, C is when the image slightly falls off and is transferred to the back surface, and D when the image seriously falls off and is transferred to the back surface.

TABLE 14

Evaluation Results of Scratch Resistance

|  |  |  | 1 | 2 | 3 | 4 | 5 | 6 | 7 | 8 |
|---|---|---|---|---|---|---|---|---|---|---|
| Plain Paper | Example | immediately after | B | B | B | B | B | B | B | B |
|  |  | 5 minutes | A | A | A | A | A | A | A | A |
|  |  | 1 hour | A | A | A | A | A | A | A | A |
|  |  | 2 hours | A | A | A | A | A | A | A | A |
|  |  | 3 hours | A | A | A | A | A | A | A | A |
|  | Comparative Example | immediately after | B | B | B | B | B | B | B | B |
|  |  | 5 minutes | B | B | B | B | B | B | B | B |
|  |  | 1 hour | A | A | A | A | A | A | A | A |
|  |  | 2 hours | A | A | A | A | A | A | A | A |
|  |  | 3 hours | A | A | A | A | A | A | A | A |
| Special Paper | Example | immediately after | C | C | C | C | C | C | C | C |
|  |  | 5 minutes | B | B | B | B | B | B | B | B |
|  |  | 1 hour | A | A | A | A | A | A | A | A |
|  |  | 2 hours | A | A | A | A | A | A | A | A |
|  |  | 3 hours | A | A | A | A | A | A | A | A |
|  | Comparative Example | immediately after | D | D | D | D | D | D | D | D |
|  |  | 5 minutes | D | D | D | D | D | D | D | D |
|  |  | 1 hour | C | C | C | C | C | C | C | C |
|  |  | 2 hours | C | C | C | C | C | C | C | C |
|  |  | 3 hours | B | B | B | B | B | B | B | B |

As seen from the results in Table 14, no falling off of image occurs after one hour particularly on the special paper and good fixing property is exhibited.

In Table 15, zeta potentials of microcapsules (dispersing elements) of Examples C-1 to C-8, zeta potentials of polymer fine particles, and zeta potentials in the mixed state of microcapsule and polymer fine particle are shown. Also, the generation state of foreign matters when each aqueous ink was left standing at 60° C. for 7 days is shown. A dispersing element having a low absolute zeta potential value and a dispersing element having a large difference in the zeta potential from the polymer fine particle are shown together as Comparative Examples. The zeta potential was measured by a Zeta Sizer 3000HS, manufactured by Malvern Instruments Inc. to determine the pH dependency in the pH range from 4 to 11 and the value at a pH of 9 where the particle can be stably present is shown in Table 15.

TABLE 15

Evaluation Results of Zeta Potential and Foreign Matters

|  | Zeta Potential (−mV) |  |  | Evaluation of Foreign Matters |
|---|---|---|---|---|
|  | Microcapsule | Polymer Fine Particle | Mixture |  |
| Example C-1 | 50 | 46 | 48 | 1 |
| Example C-2 | 48 | 46 | 47 | 1 |
| Example C-3 | 47 | 46 | 46 | 1 |
| Example C-4 | 50 | 46 | 48 | 1 |
| Example C-5 | 51 | 46 | 47 | 1 |
| Example C-6 | 49 | 46 | 48 | 1 |
| Example C-7 | 46 | 46 | 46 | 1 |
| Example C-8 | 47 | 46 | 46 | 1 |
| Comparative Example C-1 | 28 | none | 28 | 10 |
| Comparative Example C-2 | 35 | 46 | 41 | 5 |

As seen from the results in Table 15, the aqueous ink of the present invention has excellent storage stability, whereas foreign matters are readily generated when the absolute value of zeta potential is low or when the difference in the zeta potential from the polymer fine particle is large.

From these, it is understood that when the colorant is dispersed by using a general dispersant as in conventional techniques, the additive preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) is difficult to use and therefore, a sufficiently high printing quality cannot be obtained. However, according to the present invention, a microcapsule is formed by encapsulating the colorant with a polymer to render it dispersible in water and the amount of aromatic ring in the polymer is controlled to 20 to 70 wt % based on the polymer, so that an aqueous ink suitable for aqueous inkjet recording can be obtained, which is ensured with storage stability and ejection stability while keeping a sufficiently high color forming property. Furthermore, a pigment is suitably used as the colorant and this provides an effect of giving a printed matter more excellent in the water resistance than those obtained by using a normal dye (for example, Comparative Examples C-2 and C-3). In addition, the function of the polymer encapsulating the colorant can be freely changed by the polymerizing monomer or other reactive agents and this provides an effect that a variety of functions (e.g., light fastness, gas resistance, colorability, glossiness, fixing property) can be imparted. In the case of using a normal dispersant as in conventional techniques, the adsorptive strength of the dispersant adsorbing to the colorant is fundamentally weak and the dispersant is partially desorbed. Due to the resultant desorbed material or the dispersant not adsorbed, the viscosity increases and therefore, the amount of colorant added is limited, as a result, a sufficiently high color formation can be hardly obtained.

The present invention should not be construed as being limited to these Examples C—and various changes and modifications can be made therein without departing from the spirit and scope of the present invention.

Example D

The preferred embodiment (d) of the present invention is specifically described below by referring to Examples.

The scope of the present invention is, however, not limited to these Examples. The physical values (surface tension, average particle size) of the dispersions obtained in these Examples were measured by the following methods.

Measurement of Surface Tension

The pigment dispersions obtained in Examples and Comparative Examples each was measured on the surface tension at 20° C. by a surface tension balance (CBVP-A3, manufactured by Kyowa Interface Science Co., Ltd.).

Measurement of Average Particle Size

The pigment dispersions obtained in Examples and Comparative Examples each was diluted with ion exchanged water to have a pigment concentration of 0.001 to 0.01 wt % (because the optimal concentration at the measurement slightly differs depending on the pigment) and the average particle size of dispersed particles at 20° C. was measured by a particle size distribution meter (DLS-800, manufactured by Otsuka Electronics Co., Ltd.). The particle size is shown in < > as the average particle size in the unit of nm (nanometer).

In Examples here, the pigment was encapsulated with a reactive dispersant and then subjected to an emulsification polymerization in the presence of a catalyst in water to produce a dispersing element. Subsequently, the produced dispersing element was dispersed in water by adding a neutralizer and a dispersion accelerator to obtain each dispersion.

The production method of dispersion according to the present invention is specifically described below.

Production of Dispersing Element
(Dispersing Element D1)

For the production of Dispersing Element D1, Raven C (produced by Columbian Carbon Co., Ltd.) which is a carbon black pigment was used. In a reaction vessel equipped with an ultrasonic wave generator, a stirrer, a dripping device, a water cooled reflux condenser and a temperature controller, 25 parts (hereinafter "parts" means "parts by weight") of the carbon black pigment and 6 parts of Adeka Reasoap SE-10N (produced by Asahi Denka Co., Ltd.) which is a polymerizable surfactant were added to 180 parts of ion exchanged water and an ultrasonic wave was applied thereto for 4 hours.

Thereafter, a methyl ethyl ketone solution containing 5 parts of styrene, 1.7 parts of α-methylstyrene and 0.5 parts of azobisisobutyronitrile was added and the polymerization reaction was performed at 60° C. for 8 hours. The obtained solution was subjected to centrifugal filtration to take out a pigment encapsulated with a polymer and coarse particles were removed by filtering the pigment through a 5-μm membrane filter.

This pigment solution encapsulated with a polymer was disaggregated by a homogenizer. Subsequently, in the reaction vessel, this methyl ethyl ketone solution of pigment, 30 parts of ion exchanged water and 0.05 parts of sodium laurylsulfate were added and then 100 parts of ion exchanged water and 0.5 parts of potassium persulfate as a polymerization initiator were charged. The resulting solution was kept at 70° C. in a nitrogen atmosphere. Thereto, a mixed solution containing 25 parts of styrene, 1 part of tetrahydrofurfuryl methacrylate, 15 parts of butyl methacrylate, 5 parts of triethylene glycol methacrylate and 0.02 parts of tert-dodecylmercaptan was added dropwise and reacted. Thereafter, the methyl ethyl ketone and a part of water were distilled off by a rotary evaporator and the residue was separated by filtration to obtain Dispersing Element D1.

Production of Dispersion (Dispersing Step)
(Dispersion D1)

15 Parts of Dispersing Element D1 obtained above, 0.5 parts of sodium hydroxide as a neutralizer and 84.5 parts of ion exchanged water were added and dispersed by using a paint shaker (using zirconia beads, bead filling percentage: 60%, media size: 1.7 mm) until the average particle size (secondary particle size) of the dispersing element became 110 nm to obtain Dispersion D1 (surface tension: 56 mN/m).

Measurement of Amount of Aromatic Ring

A necessary amount of Dispersion D1 was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 43% based on the entire weight of the dispersing polymer.

Measurement of Amount of Polyvalent Metal Ion

A necessary amount of Dispersion D1 was taken out and subjected to a centrifugal separation treatment in a centrifugal ultrafiltration apparatus (C-15, manufactured by Millipore). The filter used was Type NMWL10000 and the centrifugation conditions were 2500 G and 60 minutes. After 10 mg of the filtrate obtained was treated by an oxygen flask combustion method, an aqueous 0.2% nitric acid solution was absorbed thereinto. This product was quantified by ion chromatography (column ionpac AS12A; DX-500 produced by Nippon Dionex), as a result, the amounts of Si, Ca, Mg, Fe, Cr, Ni and Zr ions were 28 ppm, 36 ppm, 40 ppm, 55 ppm, 70 ppm, 62 ppm and 25 ppm, respectively, and all were lower than 100 ppm. The total amount of polyvalent metal ions was about 326 ppm and lower than 500 ppm.

Dispersions D2 to D7 were obtained in the same manner as Dispersion D1 except that a phthalocyanine green pigment (C.I. Pigment Green 7) which is an organic pigment was used for Dispersion D2, a condensed azo yellow pigment (C.I. Pigment Yellow 128) which is an organic pigment was used for Dispersion D3, a quinacridone violet pigment (C.I. Pigment Violet 19) which is an organic pigment was used for Dispersion D4, a perynone orange pigment (C.I. Pigment Orange 43) which is an organic pigment was used for Dispersion D5, a benzimidazolone brown pigment (C.I. Pigment Brown 32) which is an organic pigment was used for Dispersion D6, and a perynone red pigment (C.I. Pigment Red 178) which is an organic pigment was used for Dispersion D7. The pigments and dispersion methods such as neutralizer and dispersion bead species used for the production of Dispersions D1 to D7 are shown in Table 16 and the measurements results on the ratio of pigment to dispersing polymer and the amounts of aromatic ring and polyvalent metal ion are shown in Table 17.

TABLE 16

List of Materials Used in Dispersion for Dispersions D1 to D7

| | Name of Dispersion | | | | | | |
|---|---|---|---|---|---|---|---|
| | Dispersion D1 | Dispersion D2 | Dispersion D3 | Dispersion D4 | Dispersion D5 | Dispersion D6 | Dispersion D7 |
| Name of pigment used | Raven C | C.I. Pigment Green 7 | C.I. Pigment Yellow 128 | C.I. Pigment Violet 19 | C.I. Pigment Orange 43 | C.I. Pigment Brown 32 | C.I. Pigment Red 178 |
| Addition ratio | 15 parts | 15 parts | 15 parts | 15 parts | 15 parts | 15 parts | 15 parts |
| Neutralizer | sodium hydroxide | triethanol-amine | sodium hydroxide | lithium hydroxide | lithium hydroxide | potassium hydroxide | diethanol-amine |
| Addition ratio | 0.5 parts | 1.5 parts | 1 part | 0.5 parts | 0.8 parts | 0.9 parts | 1.2 parts |
| Dispersion solvent | ion exchanged water | ion exchanged water | ion exchanged water | ion exchanged water | ion exchanged water | ion exchanged water | ion exchanged water |
| Addition ratio | (balance) | (balance) | (balance) | (balance) | (balance) | (balance) | (balance) |
| Species of dispersion bead | zirconia | zirconia | zirconia | zirconia | glass | glass | zirconia |
| Surface tension | 56 mN/m | 44 mN/m | 48 mN/m | 47 mN/m | 52 mN/m | 58 mN/m | 50 mN/m |
| Average particle size | 110 nm | 105 nm | 110 nm | 105 nm | 120 nm | 125 nm | 105 nm |

TABLE 17

Ratio of Pigment to Dispersing Polymer, Amount of Benzene Ring and Amount of Metal Ion in Dispersions D1 to D7

| Name of Dispersion | Dispersion D1 | Dispersion D2 | Dispersion D3 | Dispersion D4 | Dispersion D5 | Dispersion D6 | Dispersion D7 |
|---|---|---|---|---|---|---|---|
| Pigment:polymer | 7.0:3.0 | 4.0:6.0 | 8.0:2.0 | 3.0:7.0 | 6.0:4.0 | 7.5:2.5 | 9.0:1.0 |
| Amount of benzene ring | 43% | 32% | 23% | 56% | 66% | 48% | 49% |
| Amount of metal ion | | | | | | | |
| Si | 28 ppm | 25 ppm | 45 ppm | 55 ppm | 85 ppm | 78 ppm | 61 ppm |
| Ca | 36 ppm | 26 ppm | 49 ppm | 33 ppm | 51 ppm | 68 ppm | 53 ppm |
| Mg | 55 ppm | 38 ppm | 25 ppm | 83 ppm | 43 ppm | 38 ppm | 89 ppm |
| Fe | 40 ppm | 73 ppm | 63 ppm | 91 ppm | 32 ppm | 29 ppm | 73 ppm |
| Cr | 70 ppm | 80 ppm | 39 ppm | 65 ppm | 29 ppm | 50 ppm | 69 ppm |
| Ni | 62 ppm | 56 ppm | 49 ppm | 70 ppm | 51 ppm | 39 ppm | 78 ppm |
| Zr | 25 ppm | 35 ppm | 31 ppm | 43 ppm | 10 ppm | 11 ppm | 49 ppm |
| Total | 326 ppm | 341 ppm | 316 ppm | 453 ppm | 306 ppm | 323 ppm | 472 ppm |

The production of Dispersion D8 by a production method different from that used for the production of Dispersion D1 is described below.

Production Step of Dispersing Element
(Dispersing Element D8)

For the production of Dispersing Element D8, Monac 880 (produced by Cabot Co.) which is a carbon black pigment was used. A reaction vessel equipped with a stirrer, a thermometer, a reflux tube and a dropping funnel was purged with nitrogen and thereinto, 21 parts of styrene, 5 parts of α-methylstyrene, 16 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

Subsequently, 40 parts of the obtained dispersing polymer solution, 30 parts of Monac 880 (produced by Cabot Co.) which is carbon black, 100 parts of an aqueous solution containing 0.1 mol/liter of sodium hydroxide, and 35 parts of methyl ethyl ketone were mixed and stirred by a homogenizer for 30 minutes. Thereto, 350 parts of ion exchanged water was added and the resulting solution was further stirred for one hour. The entire amount of methyl ethyl ketone and a part of water were distilled off by a rotary evaporator and the residue was separated by filtration to obtain Dispersing Element D8.
Production of Dispersion (Dispersing step)
(Dispersion D8)

15 Parts of Dispersing Element D8 obtained above, 1 part of Acetylenol EH (produced by Kawaken Fine Chemicals) as a dispersion accelerator, 1 part of sodium hydroxide as a neutralizer, and 83 parts of ion exchanged water were added and dispersed by using a paint shaker (using glass beads, bead filling percentage: 60%, media diameter: 1.7 mm) until the average particle size (secondary particle size) of the dispersing element became 100 nm to obtain Dispersion D8 (surface tension: 31 mN/m).

Measurement of Amount of Aromatic Ring

A part of Dispersion D8 was taken out and the amount of the aromatic ring was measured in the same manner as in the case of Dispersion D1 and found to be 46% based on the entire weight of the dispersing polymer.

Measurement of Amount of Polyvalent Metal Ion

A necessary amount of Dispersion D8 was taken out and the amounts of metal ions were measured in the same manner as in the case of Dispersion D1, as a result, the amounts of Si, Ca, Mg, Fe, Cr, Ni and Zr ions were 38 ppm, 21 ppm, 22 ppm, 9 ppm, 8 ppm, 12 ppm and 5 ppm, respectively, and all were lower than 100 ppm. The total amount of polyvalent metal ions was about 115 ppm and lower than 200 ppm.

Dispersions D9 to D14 were obtained in the same manner as above except that a phthalocyanine blue pigment (C.I. Pigment Blue 15:4) was used for Dispersion D9, an insoluble monoazo yellow pigment (C.I. Pigment Yellow 74) was used for Dispersion D10, a condensed azo yellow pigment (C.I. Yellow 110) was used for Dispersion D11, an anthraquinone yellow pigment (C.I. Pigment Yellow 147) was used for Dispersion D12, a benzimidazolone yellow pigment (C.I. Pigment Yellow 180) was used for Dispersion D13, and a quinacridone red pigment (C.I. Pigment Red 122) was used for Dispersion D14.

The pigments and dispersion methods such as dispersion accelerator, neutralizer and dispersion bead species used for the production of Dispersions D8 to D14 are shown in Table 18 and the measurements results on the ratio of pigment to dispersing polymer and the amounts of aromatic ring and polyvalent metal ion are shown in Table 19.

TABLE 18

List of Materials Used in Dispersion for Dispersions D8 to D14

| | Dispersion D8 | Dispersion D9 | Dispersion D10 | Dispersion D11 | Dispersion D12 | Dispersion D13 | Dispersion D14 |
|---|---|---|---|---|---|---|---|
| Name of pigment used | Monac 880 | C.I. Pigment Blue 15:4 | C.I. Pigment Yellow 74 | C.I. Pigment Yellow 110 | C.I. Pigment Yellow 147 | C.I. Pigment Yellow 180 | C.I. Pigment Red 122 |
| Addition ratio | 15 parts | 15 parts | 15 parts | 15 parts | 15 parts | 15 parts | 15 parts |
| Dispersion accelerator | Acetylenol EH | BYK-348 | TEGmBE | 1,2-hexanediol | Surfynol 485 | Olfine E1010 | Surfynol TG |
| Addition ratio | 1 part | 1 part | 5 parts | 1 part | 1.5 parts | 1 part | 0.1 part |
| Neutralizer | sodium hydroxide | triethanolamine | tripropanolamine | triethanolamine | lithium hydroxide | potassium hydroxide | sodium hydroxide |
| Addition ratio | 1 part | 1.5 parts | 1 part | 1 part | 0.5 parts | 0.6 parts | 0.8 parts |
| Dispersion solvent | ion exchanged water | ion exchanged water | ion exchanged water | ion exchanged water | ion exchanged water | ion exchanged water | ion exchanged water |
| Addition ratio | (balance) | (balance) | (balance) | (balance) | (balance) | (balance) | (balance) |
| Species of dispersion bead | glass | glass | glass | zirconia | glass | zirconia | glass |
| Surface tension | 31 mN/m | 30 mN/m | 35 mN/m | 36 mN/m | 30 mN/m | 32 mN/m | 31 mN/m |
| Average particle size | 95 nm | 85 nm | 90 nm | 95 nm | 95 nm | 95 nm | 98 nm |

TABLE 19

Ratio of Pigment to Dispersing Polymer, Amount of Benzene Ring and Amount of Metal Ion in Dispersions D8 to D14

| | Dispersion D8 | Dispersion D9 | Dispersion D10 | Dispersion D11 | Dispersion D12 | Dispersion D13 | Dispersion D14 |
|---|---|---|---|---|---|---|---|
| Pigment:polymer | 6.0:4.0 | 7.0:3.0 | 8.0:2.0 | 7.5:2.5 | 6.0:4.0 | 7.5:2.5 | 7.0:3.0 |
| Amount of benzene ring | 46% | 38% | 50% | 28% | 41% | 43% | 32% |
| Amount of metal ion | | | | | | | |
| Si | 38 ppm | 29 ppm | 23 ppm | 9 ppm | 31 ppm | 15 ppm | 12 ppm |
| Ca | 21 ppm | 33 ppm | 15 ppm | 25 ppm | 8 ppm | 11 ppm | 16 ppm |
| Mg | 22 ppm | 19 ppm | 36 ppm | 29 ppm | 18 ppm | 14 ppm | 38 ppm |
| Fe | 9 ppm | 12 ppm | 8 ppm | 15 ppm | 7 ppm | 18 ppm | 7 ppm |
| Cr | 8 ppm | 11 ppm | 9 ppm | 19 ppm | 8 ppm | 20 ppm | 6 ppm |
| Ni | 12 ppm | 15 ppm | 19 ppm | 22 ppm | 13 ppm | 25 ppm | 4 ppm |
| Zr | 5 ppm | *0 ppm | 1 ppm | 15 ppm | 4 ppm | 11 ppm | *0 ppm |
| Total | 115 ppm | 119 ppm | 111 ppm | 134 ppm | 89 ppm | 114 ppm | 83 ppm |

*"0 ppm" means a value lower than the detection limit of the apparatus.

(Preparation Example of Aqueous Ink)

In the following, examples of the aqueous ink composition suitable as the aqueous ink for aqueous inkjet recording according to the present invention are specifically described. In Examples, the ion exchanged water as balance was ion exchanged water where Proxel XL-2 for preventing septic activity of the aqueous ink and EDTA (ethylenediaminetetraacetic acid) for reducing the effect of metal ion in the aqueous ink system were added with stirring to have a concentration of 0.05% and 0.01%, respectively, in the aqueous ink.

Example D-1

The aqueous ink composition of Example D-1 is shown below.

| | Amount Added (%) |
|---|---|
| Dispersion D1 | 40.0 |
| Olfine E1010 | 0.5 |

-continued

| | Amount Added (%) |
|---|---|
| TEGmBE | 5.0 |
| 1,5-Pentanediol | 5.0 |
| Glycerin | 9.0 |
| Triethanolamine | 1.0 |
| Ion exchanged water | balance |

Olfine E1010 (acetylene glycols, produced by Nissin Chemical Industry Co., Ltd.)
TEGmBE: triethylene glycol monobutyl ether
Determination of Amount of Metal Ion A necessary amount of the aqueous ink prepared in Example D-1 was taken out and subjected to a centrifugal separation treatment in a centrifugal ultrafiltration apparatus (C-15, manufactured by Millipore). The filter used was Type NMWL10000 and the centrifugation conditions were 2500 G and 60 minutes. After 10 mg of the filtrate obtained was treated by an oxygen flask combustion method, an aqueous 0.2% nitric acid solution was absorbed thereinto. This product was quantified by ion chromatography (column ionPac AS12A; DX-500 produced by Nippon Dionex), as a result, the amounts of Si, Ca, Mg, Fe, Cr, Ni and Zr ions were 15 ppm, 19 ppm, 28 ppm, 20 ppm, 38 ppm, 31 ppm and 12 ppm, respectively, and all were lower than 50 ppm. The total amount of polyvalent metal ions was about 164 ppm and lower than 200 ppm.

Example D-2

The aqueous ink composition of Example D-2 is shown below.

|  | Amount Added (%) |
| --- | --- |
| Dispersion D2 | 30.0 |
| Surfynol TG | 0.3 |
| DEGmBE | 10.0 |
| Dipropylene glycol | 5.0 |
| Trimethylolethane | 4.0 |
| Triethanolamine | 0.9 |
| Ion exchanged water | balance |

Surfynol TG (acetylene glycols, produced by Air Products)
DEGmBE: diethylene glycol monobutyl ether Determination of Amount of Metal Ion A necessary amount of the aqueous ink prepared in Example D-2 was taken out and the amounts of metal ions in the aqueous ink were measured in the same manner as in Example D-1, as a result, the amounts of Si, Ca, Mg, Fe, Cr, Ni and Zr ions were 12 ppm, 10 ppm, 20 ppm, 35 ppm, 39 ppm, 29 ppm and 10 ppm, respectively, and all were lower than 50 ppm. The total amount of polyvalent metal ions was about 155 ppm and lower than 200 ppm.

Example D-3

The aqueous ink composition of Example D-3 is shown below.

|  | Amount Added (%) |
| --- | --- |
| Dispersion D3 | 50.0 |
| Olfine STG | 0.3 |
| 1,2-Hexanediol | 2.0 |
| 1,6-Hexanediol | 4.0 |
| Triethylene glycol | 10.0 |
| Thiodiglycol | 1.5 |
| Triethanolamine | 1.0 |
| Potassium hydroxide | 0.1 |
| Ion exchanged water | balance |

Olfine STG (acetylene glycols, produced by Nissin Chemical Industry Co., Ltd.)

Determination of Amount of Metal Ion

A necessary amount of the aqueous ink prepared in Example D-3 was taken out and the amounts of metal ions in the aqueous ink were measured in the same manner as in Example D-1, as a result, the amounts of Si, Ca, Mg, Fe, Cr, Ni and Zr ions were 22 ppm, 25 ppm, 13 ppm, 32 ppm, 20 ppm, 26 ppm and 15 ppm, respectively, and all were lower than 50 ppm. The total amount of polyvalent metal ions was about 153 ppm and lower than 200 ppm.

Example D-4

The aqueous ink composition of Example D-4 is shown below.

|  | Amount Added (%) |
| --- | --- |
| Dispersion D4 | 60.0 |
| Surfynol 104 | 0.5 |
| TEGmBE | 3.0 |
| 1,2-Pentanediol | 5.0 |
| 1,5-Pentanediol | 2.0 |
| Tetraethylene glycol | 9.0 |
| Dimethyl-2-imidazolidinone | 2.0 |
| Sodium benzoate | 0.1 |
| Triethanolamine | 0.7 |
| Ion exchanged water | balance |

Surfynol 104 (acetylene glycols, produced by Air Products)

Determination of Amount of Metal Ion

A necessary amount of the aqueous ink prepared in Example D-4 was taken out and the amounts of metal ions in the aqueous ink were measured in the same manner as in Example D-1, as a result, the amounts of Si, Ca, Mg, Fe, Cr, Ni and Zr ions were 26 ppm, 16 ppm, 43 ppm, 36 ppm, 37 ppm, 33 ppm and 5 ppm, respectively, and all were lower than 50 ppm. The total amount of polyvalent metal ions was about 196 ppm and lower than 200 ppm.

Example D-5

The aqueous ink composition of Example D-5 is shown below.

|  | Amount Added (%) |
| --- | --- |
| Dispersion D5 | 50.0 |
| DPGmBE | 2.0 |
| DEGmBE | 7.0 |
| Glycerin | 5.0 |
| Triethylene glycol | 5.0 |
| Trehalose | 5.0 |
| Triethanolamine | 0.9 |
| Ion exchanged water | balance |

DPGmBE: dipropylene glycol monobutyl ether

Determination of Amount of Metal Ion

A necessary amount of the aqueous ink prepared in Example D-5 was taken out and the amounts of metal ions in the aqueous ink were measured in the same manner as in Example D-1, as a result, the amounts of Si, Ca, Mg, Fe, Cr, Ni and Zr ions were 41 ppm, 25 ppm, 22 ppm, 15 ppm, 14 ppm, 26 ppm and 6 ppm, respectively, and all were lower than 50 ppm. The total amount of polyvalent metal ions was about 149 ppm and lower than 200 ppm.

Example D-6

The aqueous ink composition of Example D-6 is shown below.

|  | Amount Added (%) |
| --- | --- |
| Dispersion D6 | 40.0 |
| Acetylenol EO | 0.5 |
| TEGmBE | 5.0 |
| 1,2-Pentanediol | 1.0 |
| Glycerin | 13.0 |

-continued

|  | Amount Added (%) |
|---|---|
| Thiodiglycol | 2.0 |
| 2-Pyrrolidone | 2.0 |
| Triethanolamine | 0.9 |
| Ion exchanged water | balance |

Acetylenol EO (acetylene glycols, produced by Kawaken Fine Chemicals)

Determination of Amount of Metal Ion

A necessary amount of the aqueous ink prepared in Example D-6 was taken out and the amounts of metal ions in the aqueous ink were measured in the same manner as in Example D-1, as a result, the amounts of Si, Ca, Mg, Fe, Cr, Ni and Zr ions were 39 ppm, 34 ppm, 14 ppm, 18 ppm, 22 ppm, 15 ppm and 8 ppm, respectively, and all were lower than 50 ppm. The total amount of polyvalent metal ions was about 150 ppm and lower than 200 ppm.

Example D-7

The aqueous ink composition of Example D-7 is shown below.

|  | Amount Added (%) |
|---|---|
| Dispersion D7 | 30.0 |
| Surfynol 465 | 0.5 |
| Surfynol 61 | 0.5 |
| TEGmBE | 6.0 |
| Glycerin | 15.0 |
| Trimethylolpropane | 1.0 |
| Trimethylolethane | 1.0 |
| Triethanolamine | 0.5 |
| KOH | 0.05 |
| Ion exchanged water | balance |

Determination of Amount of Metal Ion

A necessary amount of the aqueous ink prepared in Example D-7 was taken out and the amounts of metal ions in the aqueous ink were measured in the same manner as in Example D-1, as a result, the amounts of Si, Ca, Mg, Fe, Cr, Ni and Zr ions were 20 ppm, 15 ppm, 27 ppm, 23 ppm, 21 ppm, 41 ppm and 7 ppm, respectively, and all were lower than 50 ppm. The total amount of polyvalent metal ions was about 154 ppm and lower than 200 ppm.

Example D-8

The aqueous ink composition of Example D-8 is shown below.

|  | Amount Added (%) |
|---|---|
| Dispersion D8 | 40.0 |
| Surfynol 420 | 0.5 |
| PGmBE | 2.0 |
| DEGmBE | 10.0 |
| Tetrapropylene glycol | 5.0 |
| Glycerin | 7.0 |
| Diethylene glycol | 0.9 |
| KOH | 0.1 |
| Ion exchanged water | balance |

Surfynol 420 (acetylene glycols, produced by Air Products)
PGmBE: propylene glycol monobutyl ether Determination of Amount of Metal Ion A necessary amount of the aqueous ink prepared in Example D-8 was taken out and the amounts of metal ions in the aqueous ink were measured in the same manner as in Example D-1, as a result, the amounts of Si, Ca, Mg, Fe, Cr, Ni and Zr ions were 15 ppm, 8 ppm, 10 ppm, 3 ppm, 5 ppm, 7 ppm and 1 ppm, respectively, and all were lower than 20 ppm. The total amount of polyvalent metal ions was about 49 ppm and lower than 100 ppm.

Example D-9

The aqueous ink composition of Example D-9 is shown below.

|  | Amount Added (%) |
|---|---|
| Dispersion D9 | 40.0 |
| Surfynol 485 | 1.5 |
| DEGmBE | 5.0 |
| 1,5-Pentanediol | 5.0 |
| Glycerin | 9.0 |
| 1,4-Cyclohexanedimethanol | 5.0 |
| Triethanolamine | 1.0 |
| Ion exchanged water | balance |

Surfynol 485 (acetylene glycols, produced by Air Products)

Determination of Amount of Metal Ion

A necessary amount of the aqueous ink prepared in Example D-9 was taken out and the amounts of metal ions in the aqueous ink were measured in the same manner as in Example D-1, as a result, the amounts of Si, Ca, Mg, Fe, Cr, Ni and Zr ions were 13 ppm, 14 ppm, 11 ppm, 7 ppm, 5 ppm, 7 ppm and 1 ppm, respectively, and all were lower than 20 ppm. The total amount of polyvalent metal ions was about 58 ppm and lower than 100 ppm.

Example D-10

The aqueous ink composition of Example D-10 is shown below.

|  | Amount Added (%) |
|---|---|
| Dispersion D10 | 30.0 |
| Surfynol TG | 0.3 |
| DEGmBE | 10.0 |
| Dipropylene glycol | 5.0 |
| Triethanolamine | 0.9 |
| Ion exchanged water | balance |

Surfynol TG (acetylene glycols, produced by Air Products)
DEGmBE: diethylene glycol monobutyl ether Determination of Amount of Metal Ion A necessary amount of the aqueous ink prepared in Example D-10 was taken out and the amounts of metal ions in the aqueous ink were measured in the same manner as in Example D-1, as a result, the amounts of Si, Ca, Mg, Fe, Cr, Ni and Zr ions were 11 ppm, 8 ppm, 19 ppm, 4 ppm, 5 ppm, 9 ppm and 4 ppm, respectively, and all were lower than 20 ppm. The total amount of polyvalent metal ions was about 60 ppm and lower than 100 ppm.

Example D-11

The aqueous ink composition of Example D-11 is shown below.

|  | Amount Added (%) |
| --- | --- |
| Dispersion D11 | 50.0 |
| Olfine STG | 0.3 |
| 1,2-Hexanediol | 4.0 |
| 1,6-Hexanediol | 4.0 |
| Diethylene glycol | 7.0 |
| Thiodiglycol | 1.5 |
| Triethanolamine | 1.0 |
| Ion exchanged water | balance |

Olfine STG (acetylene glycols, produced by Nissin Chemical Industry Co., Ltd.)

Determination of Amount of Metal Ion

A necessary amount of the aqueous ink prepared in Example D-11 was taken out and the amounts of metal ions in the aqueous ink were measured in the same manner as in Example D-1, as a result, the amounts of Si, Ca, Mg, Fe, Cr, Ni and Zr ions were 8 ppm, 15 ppm, 16 ppm, 10 ppm, 11 ppm, 13 ppm and 7 ppm, respectively, and all were lower than 20 ppm. The total amount of polyvalent metal ions was about 80 ppm and lower than 100 ppm.

Example D-12

The aqueous ink composition of Example D-12 is shown below.

|  | Amount Added (%) |
| --- | --- |
| Dispersion D12 | 60.0 |
| Surfynol 485 | 1.5 |
| TEGmBE | 3.0 |
| 1,2-Pentanediol | 2.0 |
| 1,5-Pentanediol | 2.0 |
| Tetraethylene glycol | 9.0 |
| Dimethyl-2-imidazolidinone | 2.0 |
| Sodium benzoate | 0.1 |
| Triethanolamine | 0.7 |
| Ion exchanged water | balance |

Surfynol 104 (acetylene glycols, produced by Air Products)

Determination of Amount of Metal Ion

A necessary amount of the aqueous ink prepared in Example D-12 was taken out and the amounts of metal ions in the aqueous ink were measured in the same manner as in Example D-1, as a result, the amounts of Si, Ca, Mg, Fe, Cr, Ni and Zr ions were 16 ppm, 5 ppm, 9 ppm, 5 ppm, 6 ppm, 5 ppm and 0 ppm (a value lower than the current detection limit), respectively, and all were lower than 20 ppm. The total amount of polyvalent metal ions was about 46 ppm and lower than 100 ppm.

Example D-13

The aqueous ink composition of Example D-13 is shown below.

|  | Amount Added (%) |
| --- | --- |
| Dispersion D13 | 50.0 |
| Surfynol 465 | 0.5 |
| Surfynol TG | 0.1 |
| TEGmBE | 2.0 |
| 1,2-Hexanediol | 2.0 |
| Glycerin | 5.0 |
| Triethylene glycol | 5.0 |
| Trimethylolpropane | 5.0 |
| Tripropanolamine | 0.9 |
| Ion exchanged water | balance |

Determination of Amount of Metal Ion

A necessary amount of the aqueous ink prepared in Example D-13 was taken out and the amounts of metal ions in the aqueous ink were measured in the same manner as in Example D-1, as a result, the amounts of Si, Ca, Mg, Fe, Cr, Ni and Zr ions were 8 ppm, 6 ppm, 7 ppm, 9 ppm, 10 ppm, 12 ppm and 4 ppm, respectively, and all were lower than 20 ppm. The total amount of polyvalent metal ions was about 56 ppm and lower than 100 ppm.

Example D-14

The aqueous ink composition of Example D-14 is shown below.

|  | Amount Added (%) |
| --- | --- |
| Dispersion D14 | 40.0 |
| Acetylenol EL | 0.5 |
| Acetylenol EO | 0.1 |
| TEGmBE | 6.0 |
| 1,2-Pentanediol | 1.0 |
| Glycerin | 15.0 |
| Thiodiglycol | 2.0 |
| Triethanolamine | 0.9 |
| Ion exchanged water | balance |

Acetylenol EL (acetylene glycols, produced by Kawaken Fine Chemicals)

Determination of Amount of Metal Ion

A necessary amount of the aqueous ink prepared in Example D-14 was taken out and the amounts of metal ions in the aqueous ink were measured in the same manner as in Example D-1, as a result, the amounts of Si, Ca, Mg, Fe, Cr, Ni and Zr ions were 5 ppm, 7 ppm, 20 ppm, 3 ppm, 2 ppm, 2 ppm and 0 ppm (a value lower than detection limit), respectively, and all were lower than 20 ppm. The total amount of polyvalent metal ions was about 39 ppm and lower than 100 ppm.

Comparative Example D-1

In Comparative Example D-1, Raven C (produced by Columbian Carbon Co., Ltd.) which is a carbon black pigment was used similarly to Example D-1 and dispersed by using Solsperse 27000 (produced by Avecia Limited) as a dispersant.

15 Parts of Raven C, 4 parts of Solsperse 27000 (produced by Avecia Limited), 4 parts of diethanolamine, 0.5 parts of 2-propanol and 76.5 parts of ion exchanged water were dispersed in a bead mill MINIZETOR (manufactured by Ajisawa) for 2 hours to obtain Dispersion D15 for use in Comparative Example D-1.

The aqueous ink composition of Comparative Example D-1 is shown below.

|  | Amount Added (%) |
|---|---|
| Dispersion D15 <120> | 7.0 |
| Glycerin | 15.0 |
| Dispersant | 3.0 |
| Nonionic surfactant | 1.0 |
| Ion exchanged water | balance |

Nonionic surfactant: Noigen EA160 (produced by Dai-ichi Kogyo Seiyaku Co., Ltd.)

Determination of Amount of Metal Ion

A necessary amount of the aqueous ink prepared in Comparative Example D-1 was taken out and the amounts of metal ions in the aqueous ink were measured in the same manner as in Example D-1, as a result, the amounts of Si, Ca, Mg, Fe, Cr, Ni and Zr ions were 68 ppm, 52 ppm, 72 ppm, 51 ppm, 54 ppm, 52 ppm and 50 ppm, respectively, and all were larger than 50 ppm. The total amount of polyvalent metal ions was about 399 ppm and greatly exceeded 200 ppm.

Comparative Example D-2

In Comparative Example D-2, Dispersion D1 was used similarly to Example D-1. Furthermore, in Comparative Example D-2, the aqueous ink was prepared by intentionally using water containing polyvalent metal ion.

The aqueous ink composition of Comparative Example D-2 is shown below.

|  | Amount Added (%) |
|---|---|
| Dispersion D1 | 40.0 |
| Ethylene glycol | 5.0 |
| Glycerin | 10.0 |
| Nonionic surfactant | 1.0 |
| Polyvalent metal ion-containing water | balance |

Determination of Amount of Metal Ion

A necessary amount of the aqueous ink prepared in Comparative Example D-2 was taken out and the amounts of metal ions in the aqueous ink were measured in the same manner as in Example D-1, as a result, the amounts of Si, Ca, Mg, Fe, Cr, Ni and Zr ions were 110 ppm, 105 ppm, 118 ppm, 103 ppm, 101 ppm, 108 ppm and 103 ppm, respectively, and all were greatly exceeded 50 ppm and larger than 100 ppm. The total amount of polyvalent metal ions was about 748 ppm and greatly exceeded 200 ppm.

In Table 20, the evaluation results of blurring when a letter was printed are shown as the printing evaluation results. In Table 20, A denotes "very good", B denotes "good", C denotes "bad" and D denotes "very bad".

TABLE 20

Printing Evaluation Results of Ink

|  | Example D |  |  |  |  |  |  |  |  |  |  |  |  |  | Comparative Example D |  |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 |
| Conqueror | A | A | A | A | A | A | A | A | A | A | A | A | A | A | D | D |
| Favorit | A | A | A | A | A | A | A | A | A | A | A | A | A | A | D | D |
| Modo Copy | A | A | A | A | A | A | A | A | A | A | A | A | A | A | D | D |
| Rapid Copy | A | A | A | A | A | A | A | A | A | A | A | A | A | A | D | D |
| EPSON EPP | A | A | A | A | A | A | A | A | A | A | A | A | A | A | C | C |
| Xerox P | A | A | A | A | A | A | A | A | A | A | A | A | A | A | C | C |
| Xerox 4024 | A | A | A | A | A | A | A | A | A | A | A | A | A | A | D | D |
| Xerox 10 | A | A | A | A | A | A | A | A | A | A | A | A | A | A | C | D |
| Neenha Bond | A | A | A | A | A | A | A | A | A | A | A | A | A | A | C | D |
| Ricopy 6200 | A | A | A | A | A | A | A | A | A | A | A | A | A | A | D | C |
| Yamayuri | A | A | A | B | A | A | A | A | A | A | A | A | A | A | D | D |
| Xerox R | A | A | A | A | A | A | A | A | A | A | A | A | A | A | D | D |

As apparent from the results in Table 20, the printing quality is bad when the aqueous ink of Comparative Example is used, and the printing quality is good when the aqueous ink of the present invention is used.

Incidentally, this printing evaluation was performed by using an aqueous inkjet printer PM-900C manufactured by Seiko Epson Corporation. The papers used in this evaluation were Conqueror, Favorit, Modo Copy, Rapid Copy, EPSON EPP, Xerox 4024, Xerox 10, Neenha Bond, Ricopy 6200, Yamayuri and Xerox R which are plain papers commercially available in Europe, USA and Japan.

As verified above, the present invention can provide an aqueous ink suitable for aqueous inkjet recording, which is reduced in blurring for a material on which a printed image is recorded, such as paper, and ensures high quality and high practicability.

The aqueous inks of Examples D-1 to D-14 and Comparative Examples D-1 and D-2 each was charged into a sampling vial and after tightly plugging the vial, left standing at 60° C. for one-week or at −20° C. for one week. The foreign matters generated and physical values (viscosity, surface tension) of the aqueous ink were examined before and after the aqueous ink was left standing. The results are shown in Table 21.

The amount of foreign matters generated shows a value of amount of foreign matters after standing/initial amount of foreign matters, the viscosity shows a value of viscosity after standing/initial viscosity, and the surface tension shows a value of surface tension after standing/initial surface tension. The ejection stability was evaluated by using an aqueous inkjet printer PM-900C manufactured by Seiko Epson Corporation and rated A when printing disorder was not generated at all even in continuous printing of 100 pages on A4-size Xerox P, rated B when printing disorder was generated at less than 10 portions, rated C when printing disorder was generated at 10 to less than 100 portions, and rated D when printing disorder was generated at 100 or more portions.

TABLE 21

Amount of Metal Ion in Ink and Evaluation Results of Storage Stability

| | Example D | | | | | | | | | | | | | | Comparative Example D | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 |
| Amount of metal ion (ppm) | | | | | | | | | | | | | | | | |
| Si | 15 | 12 | 22 | 26 | 41 | 39 | 20 | 15 | 13 | 11 | 8 | 16 | 8 | 5 | 68 | 110 |
| Ca | 19 | 10 | 25 | 16 | 25 | 34 | 15 | 8 | 14 | 8 | 15 | 5 | 6 | 7 | 52 | 105 |
| Mg | 28 | 20 | 13 | 43 | 22 | 14 | 27 | 10 | 11 | 19 | 16 | 9 | 7 | 20 | 72 | 118 |
| Fe | 20 | 35 | 32 | 36 | 15 | 18 | 23 | 3 | 7 | 4 | 10 | 5 | 9 | 3 | 51 | 103 |
| Cr | 38 | 39 | 20 | 37 | 14 | 22 | 21 | 5 | 5 | 5 | 11 | 6 | 10 | 2 | 54 | 101 |
| Ni | 31 | 29 | 26 | 33 | 26 | 15 | 41 | 7 | 7 | 9 | 13 | 5 | 12 | 2 | 52 | 108 |
| Zr | 12 | 10 | 15 | 5 | 6 | 8 | 7 | 1 | 1 | 4 | 7 | *0 | 4 | *0 | 50 | 103 |
| Total | 164 | 155 | 153 | 196 | 149 | 150 | 154 | 49 | 58 | 60 | 80 | 46 | 56 | 39 | 399 | 748 |
| Foreign matters generated | 1.5 | 1.5 | 1.4 | 1.9 | 1.3 | 1.3 | 1.4 | 1.0 | 1.0 | 1.0 | 1.0 | 1.0 | 1.0 | 1.0 | 5.0 | 9.0 |
| Viscosity | 1.4 | 1.3 | 1.3 | 1.5 | 1.2 | 1.2 | 1.2 | 1.0 | 1.1 | 1.1 | 1.2 | 1.0 | 1.1 | 1.0 | 15 | 20 |
| Surface tension | 1.1 | 1.1 | 1.0 | 1.2 | 1.0 | 1.0 | 1.1 | 1.0 | 1.0 | 1.0 | 1.0 | 1.0 | 1.0 | 1.0 | 1.5 | 1.6 |
| Ejection stability | A | A | A | B | A | A | A | A | A | A | A | A | A | A | C | D |

*"0 ppm" means a value lower than the detection limit of the apparatus.

As seen from the results in Tables 20 and 21, the aqueous ink prepared by using the dispersing element of the present invention exhibits good printing quality, excellent ejection stability and high storage stability and can be an aqueous ink suitable for aqueous inkjet recording. Furthermore, a pigment is suitably used as the colorant and this provides an effect of giving a printed matter more excellent in the water resistance than those obtained by using a normal dye. In addition, the function of the polymer encapsulating the colorant can be freely changed by the polymerizing monomer or other reactive agents and this provides an effect that a variety of functions (e.g., light fastness, gas resistance, colorability, glossiness, fixing property) can be imparted. In the case of using a normal dispersant as in conventional techniques, the adsorptive strength of the dispersant adsorbing to the colorant is fundamentally weak and the dispersant is partially desorbed. Due to the resultant desorbed material or the dispersant not adsorbed, the viscosity increases and therefore, the amount of colorant added is limited, as a result, a sufficiently high color formation can be hardly obtained.

Example E

The preferred embodiment (e) of the present invention is described below by referring to Examples.

The scope of the present invention is, however, not limited to these Examples.

(Measuring Methods of Amount of Aromatic Ring, Pigment/Polymer Ratio, Average Particle Size, Amount of Polyvalent Anion and Surface Tension)

The measured values (amount of aromatic ring, pigment/polymer ratio, average particle size, amount of polyvalent anion and surface tension) obtained in these Examples each was measured by the following method.

Measurement of Amount of Aromatic Ring

A part of each dispersing polymer solution obtained in Examples and Comparative Examples was taken out, then only the polymer component was taken out by distilling off the solvent components and dissolved in DMSO-$d_6$, and the amount of aromatic ring in the polymer was measured by using $^{13}$C-NMR and $^1$H-NMR (AMX400, manufactured by Bruker (Germany)).

Measurement of Pigment/Polymer Ratio

A part of each dispersion obtained in Examples and Comparative Examples was taken out and after precipitating only the dispersing element with an acid by adding HCl in a concentration of 0.1 mol/liter, measured on the dry weight. Then, only the dispersing polymer was taken out by a Soxhlet extraction method using acetone and measured on the dry weight. From the obtained values, the weight ratio of pigment/polymer was calculated.

Measurement of Average Particle Size

The aqueous inks obtained in Examples and Comparative Examples each was diluted with ion exchanged water to have a dispersing element concentration of 0.001 to 0.01 wt % (because the optimal concentration at the measurement slightly differs depending on the aqueous ink) and the average particle size of dispersed particles at 20° C. was measured by a particle size distribution meter (DLS-800, manufactured by Otsuka Electronics Co., Ltd.).

Measurement of Amount of Polyvalent Anion

A necessary amount of each aqueous ink obtained in Examples and Comparative Examples was taken out and subjected to a centrifugal separation treatment in a centrifugal ultrafiltration apparatus (C-15, manufactured by Millipore). The filter used was Type NMWL10000 and the centrifugation conditions were 2500 G and 60 minutes. Using the obtained filtrate, the amount of polyvalent anion was measured by ion chromatography (column ionPac AS12A; DX-500 produced by Nippon Dionex).

Measurement of Surface Tension

The aqueous inks obtained in Examples and Comparative Examples each was measured on the surface tension at 20° C. by a surface tension balance (CBVP-A3, manufactured by Kyowa Interface Science Co., Ltd.).

Example E-1

(1) Production of Dispersion

Dispersion E1

For the production of Dispersion E1 used in Example E-1, Color Black FW18 (produced by Degussa), which is an inorganic pigment and a carbon black pigment, was used.

A reaction vessel equipped with a stirrer, a thermometer, a reflux tube and a dropping funnel was purged with nitrogen and thereinto, 22 parts of styrene, 5 parts of α-methylstyrene, 15 parts of butyl methacrylate, 10 parts of lauryl methacrylate, 2.5 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 59%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was repeatedly subjected to separation by filtration and washing by using a Buechner funnel. To the pigment-including resin dispersing element separated by filtration, ion exchanged water and an aqueous sodium hydroxide solution as a neutralizer were appropriately added with stirring to adjust the pH to 7.5 and then the resulting solution was filtered through a filter having an average pore size of 0.5 mm to obtain Dispersion E1 containing 20% of Dispersing Element E1 (dispersing element where the carbon black pigment is encapsulated with the polymer having an aromatic ring amount of 59%).

In Table 22, the pigment used in Dispersion E1, the amount of aromatic ring in the dispersing polymer and the pigment/polymer ratio are shown. The pigment/polymer ratio was measured by the method described in "Measurement of Pigment/Polymer Ratio" above.

(2) Preparation of Aqueous Ink

In Example E-1, Dispersion E1 obtained in Example E-1 (1) above, Olfine E1010 (produced by Nissin Chemical Industry-Co., Ltd.) as an acetylene glycol-base surfactant, diethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion E1 was added to have a Dispersing Element E1 content of 8.0%. The value in < > shows an average particle size (unit: nm) of Dispersing Element E1 measured by the method described in "Measurement of Average Particle Size" above.

Also, the ion exchanged water added as "balance" in the aqueous ink composition of Example E-1 shown below was ion exchanged water where Proxel XL-2 for preventing septic activity of the aqueous ink, benzotriazole for preventing corrosion of an aqueous inkjet head member and EDTA 2Na salt for reducing the effect of metal ion in the aqueous ink system were added to a concentration of 0.01%, 0.01% and 0.02%, respectively, based on the entire weight of the aqueous ink.

| | |
|---|---|
| Dispersing Element E1 <120> | 8.0% |
| Olfine E1010 | 0.5% |
| Diethylene glycol monobutyl ether | 3.0% |
| 1,2-Pentanediol | 2.5% |
| Diethylene glycol | 3.0% |
| Glycerin | 11.5% |
| Trimethylolpropane | 6.0% |
| Tripropanolamine | 0.3% |
| Ion exchanged water | balance |

(3) Measurement of Amount of Polyvalent Anion

The aqueous ink prepared in Example E-1(2) was measured by the method described in "Measurement of Amount of Polyvalent Anion" above, as a result, the total amount of polyvalent anions was 640 ppm. The details of the measurement results are shown in Table 24.

(4) Printing Evaluation

In the printed image evaluation, the aqueous ink prepared in Example E-1(2) was evaluated on the printing quality by using an aqueous inkjet printer PM-950C (manufactured by Seiko Epson Corporation) which ejects an aqueous ink by an aqueous inkjet head using a piezoelectric element.

As for the paper used for evaluation, (a) Conqueror, (b) Reymat, (c) Mode Copy, (d) Rapid Copy, (e) Xerox P, (f) Xerox 4024, (g) Xerox 10, (h) Neenha Bond, (i) Ricopy 6200 and (j) Hammer mill Copy Plus which are plain papers commercially available in Europe, USA and Japan were used.

The evaluation was performed with an eye according to the following criteria.

A: No blurring was observed in letters of all points.
B: Blurring was slightly observed in letters of 5 point or less (practicable level).
C: Letters of 5 point or less were seen thickened due to blurring.
D: Blurring was serious and letters of 5 point or less could not be made out.

The printing evaluation results are shown in Table 23.

(5) Evaluation of Ejection Stability

A continuous printing of 200 pages was performed on A4-size Xerox P by using the same printer and aqueous ink as in Example E-1(4) above and the ejection stability was evaluated by observing the printing disorder.

The evaluation was performed with an eye according to the following criteria.

A: Printing disorder was not generated at all.
B: Printing disorder was generated but at less than 10 portions (practicable level).
C: Printing disorder was generated at 10 to less than 100 portions.
D: Printing disorder was generated at 100 or more portions.

The evaluation results of ejection stability are shown in Table 24.

(6) Evaluation of Storage Stability

The aqueous ink prepared in Example E-1(2) above was charged into a vial and after tightly plugging the vial, left standing at 60° C. for one week or at −20° C. for one week. The foreign matters generated and the change in physical values (viscosity, surface tension) of the aqueous ink before and after standing were evaluated.

The evaluation was performed according to the following criteria.

A: The ratio of the amount of foreign matters generated and physical values after standing at 60° C. or −20° C. to those before standing was in the range from 0.99 to 1.01.

B: The ratio was from 0.95 to 0.99 or from 1.01 to 1.05 (practicable level).

C: The ratio was from 0.90 to 0.95 or from 1.05 to 1.10.

D: The ratio was less than 0.90 or more than 1.10.

The evaluation results of storage stability are shown in Table 24.

Example E-2

(1) Production of Dispersion

Dispersion E2

For the production of Dispersion E2 used in Example E-2, an insoluble monoazo yellow pigment (C.I. Pigment Yellow 74) which is an organic pigment was used.

A reaction vessel equipped with a stirrer, a thermometer, a reflux tube and a dropping funnel was purged with nitrogen and thereinto, 12 parts of styrene, 9 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 3 parts of methacrylic acid and 0.3 parts of mercaptoethanol were charged and heated at 70° C. Thereafter, separately prepared 25 parts of styrene, 30 parts of lauryl methacrylate, 15 parts of methoxy-polyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 10 parts of methacrylic acid, 20 parts of methyl ethyl ketone and 1.0 part of mercaptoethanol were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 35%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 25%.

40 Parts of the dispersing polymer solution obtained above, 30 parts of an insoluble monoazo yellow pigment (C.I. Pigment Yellow 74) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 mm to obtain Dispersion E2 containing 20% of Dispersing Element E2 (dispersing element where the insoluble monoazo yellow pigment is encapsulated with the polymer having an aromatic ring amount of 25%)

In Table 22, the pigment used in Dispersion E2, the amount of aromatic ring in the dispersing polymer and the pigment/polymer ratio are shown. The amount of aromatic ring in the polymer and the pigment/polymer ratio were measured, similarly to Example E-1(1), by the methods described in "Measurement of Amount of Aromatic Ring" and "Measurement of Pigment/Polymer Ratio" above.

(2) Preparation of Aqueous Ink

In Example E-2, Dispersion E2 obtained in Example E-2 (1) above, Surfynol 440 (produced by Air Products) and Olfine STG (produced by Nissin Chemical Industry Co., Ltd.) as acetylene glycol-base surfactants, triethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion E2 was added to have a Dispersing Element E2 content of 7.0%. The value in < > shows an average particle size (unit: nm) of Dispersing Element E2 measured by the method described in "Measurement of Average Particle Size" above.

Also, the ion exchanged water added as "balance" in the aqueous ink composition of Example E-2 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element E2 <120> | 7.0% |
| Surfynol 440 | 0.2% |
| Olfine STG | 0.2% |
| Triethylene glycol monobutyl ether | 3.0% |
| 1,2-Pentanediol | 2.0% |
| 2-Pyrrolidone | 3.0% |
| Glycerin | 13.5% |
| Trimethylolethane | 5.0% |
| Triethanolamine | 0.1% |
| Ion exchanged water | balance |

(3) Measurement of Amount of Polyvalent Anion

The aqueous ink prepared in Example E-2(2) above was measured by the method described in "Measurement of Amount of Polyvalent Anion" above, as a result, the total amount of polyvalent anions was 451 ppm. The details of the measurement results are shown in Table 24.

(4) Printing Evaluation

The aqueous ink prepared in Example E-2(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Example E-2(4) according to the same evaluation criteria as in Example E-1 (5). The evaluation results of ejection stability are shown in Table 24.

(6) Evaluation of Storage Stability

The aqueous ink prepared in Example E-2(2) above was evaluated on the storage stability by the same evaluation method as in Example E-1(6) according to the same evaluation criteria as in Example E-1 (6). The evaluation results of storage stability are shown in Table 24.

Example E-3

(1) Production of Dispersion

Dispersion E3

For the production of Dispersion E3 used in Example E-3, a quinacridone red pigment (C.I. Pigment Red 122) which is an organic pigment was used.

A reaction vessel equipped with a stirrer, a thermometer, a reflux tube and a dropping funnel was purged with nitrogen and thereinto, 12 parts of styrene, 6 parts of styrene macromer (AS-6, produced by Toagosei Chemical Industry Co., Ltd.), 3.5 parts of n-dodecyl methacrylate, 12 parts of N,N-dimethylaminoethyl methacrylate, 25 parts of methoxypolyethylene glycol methacrylate (NK Ester M40G, produced by Shin-Nakamura Chemical Co., Ltd.) and 0.3 parts of azobisisobutyronitrile were charged and heated at 70° C. Thereafter, separately prepared 15 parts of styrene, 8 parts of styrene macromer (AS-6, produced by Toagosei Chemical Industry Co., Ltd.), 7 parts of n-dodecyl methacrylate, 20 parts of N,N-dimethylaminoethyl methacrylate, 30 parts of methoxypolyethylene glycol methacrylate (NK Ester M40G, produced by Shin-Nakamura Chemical Co., Ltd.), 50 parts of methyl ethyl ketone and 1.5 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 38%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 40%.

40 Parts of the dispersing polymer solution obtained above, 25 parts of a quinacridone red pigment (C.I. Pigment Red 122) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 mm to obtain Dispersion E3 containing 20% of Dispersing Element E3 (dispersing element where the quinacridone red pigment is encapsulated with the polymer having an aromatic ring amount of 40%).

In Table 22, the pigment used in Dispersion E3, the amount of aromatic ring in the dispersing polymer and the pigment/polymer ratio are shown. The amount of aromatic ring in the polymer and the pigment/polymer ratio were measured, similarly to Example E-1(1), by the methods described in "Measurement of Amount of Aromatic Ring" and "Measurement of Pigment/Polymer Ratio" above.

(2) Preparation of Aqueous Ink

In Example E-3, Dispersion E3 obtained in Example E-3 (1) above, Olfine E1010 (produced by Nissin Chemical Industry Co., Ltd.) and Surfynol 104PG50 (produced by Air Products) as acetylene glycol-base surfactants, triethylene glycol monobutyl ether as an alkylene glycol monoalkyl ether, and 1,2-hexanediol as a 1,2-alkylene glycol were used. The specific composition is shown below.

Incidentally, in the preparation of aqueous ink, Dispersion E3 was added to have a Dispersing Element E3 content of 7.5%. The value in < > shows an average particle size (unit: nm) of Dispersing Element E3 measured by the method described in "Measurement of Average Particle Size" above.

Also, the ion exchanged water added as "balance" in the aqueous ink composition of Example E-3 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element E3 <140> | 7.5% |
| Olfine E1010 | 0.1% |
| Surfynol 104PG50 | 0.4% |
| Triethylene glycol monobutyl ether | 1.0% |
| 1,2-Hexanediol | 2.5% |
| Triethylene glycol | 2.0% |
| 2-Pyrrolidone | 4.0% |
| Glycerin | 13.8% |
| Trimethylolpropane | 6.0% |
| Ion exchanged water | balance |

(3) Measurement of Amount of Polyvalent Anion

The aqueous ink prepared in Example E-3(2) above was measured by the method described in "Measurement of Amount of Polyvalent Anion" above, as a result, the total amount of polyvalent anions was 557 ppm. The details of the measurement results are shown in Table 24.

(4) Printing Evaluation

The aqueous ink prepared in Example E-3(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Example E-3(4) according to the same evaluation criteria as in Example E-1(5). The evaluation results of ejection stability are shown in Table 24.

(6) Evaluation of Storage Stability

The aqueous ink prepared in Example E-3(2) above was evaluated on the storage stability by the same evaluation method as in Example E-1(6) according to the same evaluation criteria as in Example E-1(6). The evaluation results of storage stability are shown in Table 24.

Example E-4

(1) Production of Dispersion

Dispersion E4

For the production of Dispersion E4 used in Example E-4, a phthalocyanine blue pigment (C.I. Pigment Blue 15:4) which is an organic pigment was used.

A reaction vessel equipped with a stirrer, a thermometer, a reflux tube and a dropping funnel was purged with nitrogen and thereinto, 20 parts of styrene, 9 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 10 parts of styrene macromer (AS-6, produced by Toagosei Chemical Industry Co., Ltd.), 5 parts of methacrylic acid, 5 parts of methyl ethyl ketone and 0.3 parts of n-dodecylmercaptan were charged and heated at 70° C. Thereafter, separately prepared 25 parts of styrene, 30 parts of lauryl methacrylate, 20 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 15 parts of styrene macromer (AS-6, produced by Toagosei Chemical Industry Co., Ltd.), 5 parts of methacrylic acid, 20 parts of methyl ethyl ketone and 1.5 parts of n-dodecylmercaptan were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 46%.

40 Parts of the dispersing polymer solution obtained above, 40 parts of a phthalocyanine blue pigment (C.I. Pigment Blue 15:4) which is an organic pigment, 100 parts of an aqueous solution containing 0.1 mol/liter of sodium hydroxide, and 40 parts of methyl ethyl ketone were mixed and dispersed by a homogenizer for 30 minutes or more.

Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 mm to obtain Dispersion E4 containing 20% of Dispersing Element E4 (dispersing element where the phthalocyanine blue pigment is encapsulated with the polymer having an aromatic ring amount of 46%).

In Table 22, the pigment used in Dispersion E4, the amount of aromatic ring in the dispersing polymer and the pigment/polymer ratio are shown. The amount of aromatic ring in the polymer and the pigment/polymer ratio were measured, similarly to Example E-1(1), by the methods described in "Measurement of Amount of Aromatic Ring" and "Measurement of Pigment/Polymer Ratio" above.

(2) Preparation of Aqueous Ink

In Example E-4, Dispersion E4 obtained in Example E-4 (1) above, Acetylenol E100 (produced by Kawaken Fine Chemicals) as an acetylene glycol-base surfactant, propylene glycol monobutyl ether as an alkylene glycol monoalkyl ether, and 1,2-hexanediol as a 1,2-alkylene glycol were used. The specific composition is shown below.

Incidentally, in the preparation of aqueous ink, Dispersion E4 was added to have a Dispersing Element E4 content of 8.0%. The value in < > shows an average particle size (unit: nm) of Dispersing Element E4 measured by the method described in "Measurement of Average Particle Size" above.

Also, the ion exchanged water added as "balance" in the aqueous ink composition of Example E-4 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element E4 <100> | 8.0% |
| Acetylenol E100 | 0.5% |
| Propylene glycol monobutyl ether | 3.0% |
| 1,2-Hexanediol | 1.0% |
| Triethylene glycol | 3.0% |
| Glycerin | 13.8% |
| Trimethylolpropane | 5.2% |
| Tripropanolamine | 0.2% |
| Ion exchanged water | balance |

(3) Measurement of Amount of Polyvalent Anion

The aqueous ink prepared in Example E-4(2) above was measured by the method described in "Measurement of Amount of Polyvalent Anion" above, as a result, the total amount of polyvalent anions was 563 ppm. The details of the measurement results are shown in Table 24.

(4) Printing Evaluation

The aqueous ink prepared in Example E-4(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Example E-4(4) according to the same evaluation criteria as in Example E-1(5). The evaluation results of ejection stability are shown in Table 24.

(6) Evaluation of Storage Stability

The aqueous ink prepared in Example E-4(2) above was evaluated on the storage stability by the same evaluation method as in Example E-1(6) according to the same evaluation criteria as in Example E-1(6). The evaluation results of storage stability are shown in Table 24.

Example E-5

(1) Production of Dispersion

Dispersion E5

For the production of Dispersion E5 used in Example E-5, a perynone orange pigment (C.I. Pigment Orange 43) was used. Except for this, Dispersion E5 containing 20% of Dispersing Element E5 (dispersing element where the perynone orange pigment is encapsulated with a polymer having an aromatic ring amount of 56%) was obtained in the same manner as in Example E-4(1).

In Table 22, the pigment used in Dispersion E5, the amount of aromatic ring in the dispersing polymer and the pigment/polymer ratio are shown. The amount of aromatic ring in the polymer and the pigment/polymer ratio were measured, similarly to Example E-1(1), by the methods described in "Measurement of Amount of Aromatic Ring" and "Measurement of Pigment/Polymer Ratio" above.

(2) Preparation of Aqueous Ink

In Example E-5, Dispersion E5 obtained in Example E-5 (1) above, Surfynol 485 and Surfynol TG (both produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion E5 was added to have a Dispersing Element E5 content of 10.0%. The value in < > shows an average particle size (unit: nm) of Dispersing Element E5 measured by the method described in "Measurement of Average Particle Size" above.

Also, the ion exchanged water added as "balance" in the aqueous ink composition of Example E-5 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element E5 <150> | 10.0% |
| Surfynol 485 | 0.5% |
| Surfynol TG | 0.2% |
| Dipropylene glycol monobutyl ether | 2.0% |
| 1,2-Pentanediol | 2.0% |
| N-Methyl-2-pyrrolidone | 5.0% |
| Glycerin | 11.2% |
| Trehalose | 5.8% |
| Ion exchanged water | balance |

(3) Measurement of Amount of Polyvalent Anion

The aqueous ink prepared in Example E-5(2) above was measured by the method described in "Measurement of Amount of Polyvalent Anion" above, as a result, the total amount of polyvalent anions was 362 ppm. The details of the measurement results are shown in Table 24.

(4) Printing Evaluation

The aqueous ink prepared in Example E-5(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Example E-5(4) according to the same evaluation criteria as in Example E-1 (5). The evaluation results of ejection stability are shown in Table 24.

(6) Evaluation of Storage Stability

The aqueous ink prepared in Example E-5(2) above was evaluated on the storage stability by the same evaluation method as in Example E-1(6) according to the same evaluation criteria as in Example E-1(6). The evaluation results of storage stability are shown in Table 24.

Example E-6

(1) Production of Dispersion

Dispersion E6

For the production of Dispersion E6 used in Example E-6, a benzimidazolone brown pigment (C.I. Pigment Brown 32) was used. Except for this, Dispersion E6 containing 20% of Dispersing Element E6 (dispersing element where the benzimidazolone brown pigment is encapsulated with a polymer having an aromatic ring amount of 69%) was obtained in the same manner as in Example E-4(1).

In Table 22, the pigment used in Dispersion E6, the amount of aromatic ring in the dispersing polymer and the pigment/polymer ratio are shown. The amount of aromatic ring in the polymer and the pigment/polymer ratio were measured, similarly to Example E-1(1), by the methods described in "Measurement of Amount of Aromatic Ring" and "Measurement of Pigment/Polymer Ratio" above.

(2) Preparation of Aqueous Ink

In Example E-6, Dispersion E6 obtained in Example E-6 (1) above, Surfynol 420 as an acetylene glycol-base surfactant, and diethylene glycol monobutyl ether as an alkylene glycol monoalkyl ether were used. The specific composition is shown below.

Incidentally, in the preparation of aqueous ink, Dispersion E6 was added to have a Dispersing Element E6 content of 5.0%. The value in < > shows an average particle size (unit: nm) of Dispersing Element E6 measured by the method described in "Measurement of Average Particle Size" above.

Also, the ion exchanged water added as "balance" in the aqueous ink composition of Example E-6 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element E6 <140> | 5.0% |
| Surfynol 420 | 0.1% |
| Diethylene glycol monobutyl ether | 3.0% |
| 1,6-Hexanediol | 2.0% |
| Tetraethylene glycol | 5.5% |
| Glycerin | 13.5% |
| Triethanolamine | 0.5% |
| Ion exchanged water | balance |

(3) Measurement of Amount of Polyvalent Anion

The aqueous ink prepared in Example E-6(2) above was measured by the method described in "Measurement of Amount of Polyvalent Anion" above, as a result, the total amount of polyvalent anions was 695 ppm. The details of the measurement results are shown in Table 24.

(4) Printing Evaluation

The aqueous ink prepared in Example E-6(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Example E-6(4) according to the same evaluation criteria as in Example E-1 (5). The evaluation results of ejection stability are shown in Table 24.

(6) Evaluation of Storage Stability

The aqueous ink prepared in Example E-6(2) above was evaluated on the storage stability by the same evaluation method as in Example E-1(6) according to the same evaluation criteria as in Example E-1(6). The evaluation results of storage stability are shown in Table 24.

Example E-7

(1) Production of Dispersion

Dispersion E7

For the production of Dispersion E7 used in Example E-7, a quinacridone violet pigment (C.I. Pigment Violet 19) which is an organic pigment was used. Except for this, Dispersion E7 containing 20% of Dispersing Element E7 (dispersing element where the quinacridone violet pigment is encapsulated with a polymer having an aromatic ring amount of 21%) was obtained in the same manner as in Example E-4(1).

In Table 22, the pigment used in Dispersion E7, the amount of aromatic ring in the dispersing polymer and the pigment/polymer ratio are shown. The amount of aromatic ring in the polymer and the pigment/polymer ratio were measured, similarly to Example E-1(1), by the methods described in "Measurement of Amount of Aromatic Ring" and "Measurement of Pigment/Polymer Ratio" above.

(2) Preparation of Aqueous Ink

In Example E-7, Dispersion E7 obtained in Example E-7 (1) above, Surfynol 61 as acetylene alcohol-base surfactant and Surfynol TG (both produced by Air Products), triethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion E7 was added to have a Dispersing Element E7 content of 6.0%. The value in < > shows an average particle size (unit: nm) of Dispersing Element E7 measured by the method described in "Measurement of Average Particle Size" above.

Also, the ion exchanged water added as "balance" in the aqueous ink composition of Example E-7 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element E7 <120> | 6.0% |
| Surfynol 61 | 0.3% |
| Surfynol TG | 0.1% |
| Triethylene glycol monobutyl ether | 1.5% |
| 1,2-Pentanediol | 2.0% |
| Diethylene glycol | 2.0% |
| Thiodiglycol | 4.0% |
| Glycerin | 12.6% |
| Trimethylolethane | 7.0% |
| Ion exchanged water | balance |

(3) Measurement of Amount of Polyvalent Anion

The aqueous ink prepared in Example E-7(2) above was measured by the method described in "Measurement of Amount of Polyvalent Anion" above, as a result, the total amount of polyvalent anions was 540 ppm. The details of the measurement results are shown in Table 24.

(4) Printing Evaluation

The aqueous ink prepared in Example E-7(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Example E-7(4) according to the same evaluation criteria as in Example E-1(5). The evaluation results of ejection stability are shown in Table 24.

(6) Evaluation of Storage Stability

The aqueous ink prepared in Example E-7(2) above was evaluated on the storage stability by the same evaluation method as in Example E-1(6) according to the same evaluation criteria as in Example E-1(6). The evaluation results of storage stability are shown in Table 24.

Example E-8

(1) Production of Dispersion

Dispersion E8

For the production of Dispersion E8 used in Example E-8, a phthalocyanine green pigment (C.I. Pigment Green 7)

which is an organic pigment was used. Except for this, Dispersion E8 containing 20% of Dispersing Element E8 (dispersing element where the phthalocyanine green pigment is encapsulated with a polymer having an aromatic ring amount of 30%) was obtained in the same manner as in Example E-1(1).

In Table 22, the pigment used in Dispersion E8, the amount of aromatic ring in the dispersing polymer and the pigment/polymer ratio are shown. The amount of aromatic ring in the polymer and the pigment/polymer ratio were measured, similarly to Example E-1(1), by the methods described in "Measurement of Amount of Aromatic Ring" and "Measurement of Pigment/Polymer Ratio" above.

(2) Preparation of Aqueous Ink

In Example E-8, Dispersion E8 obtained in Example E-8 (1) above, Olfine E1010 (produced by Nissin Chemical Industry Co., Ltd.) and Surfynol 104 (produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion E8 was added to have a Dispersing Element E8 content of 8.0%. The value in < > shows an average particle size (unit: nm) of Dispersing Element E8 measured by the method described in "Measurement of Average Particle Size" above.

Also, the ion exchanged water added as "balance" in the aqueous ink composition of Example E-8 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| Dispersing Element E8 <110> | 8.0% |
|---|---|
| Olfine E1010 | 0.3% |
| Surfynol 104 | 0.1% |
| Dipropylene glycol monobutyl ether | 1.0% |
| 1,2-Pentanediol | 3.0% |
| Triethylene glycol | 2.0% |
| Thiodiglycol | 4.0% |
| Glycerin | 13.8% |
| Trimethylolpropane | 6.0% |
| Triethanolamine | 0.1% |
| Ion exchanged water | balance |

(3) Measurement of Amount of Polyvalent Anion

The aqueous ink prepared in Example E-8(2) above was measured by the method described in "Measurement of Amount of Polyvalent Anion" above, as a result, the total amount of polyvalent anions was 798 ppm. The measurement results are shown in Table 24.

(4) Printing Evaluation

The aqueous ink prepared in Example E-8(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Example E-8(4) according to the same evaluation criteria as in Example E-1 (5). The evaluation results of ejection stability are shown in Table 24.

(6) Evaluation of Storage Stability

The aqueous ink prepared in Example E-8(2) above was evaluated on the storage stability by the same evaluation method as in Example E-1(6) according to the same evaluation criteria as in Example E-1(6). The evaluation results of storage stability are shown in Table 24.

Comparative Example E-1

(1) Production of Dispersion

Dispersion E9

In Comparative Example E-1, Dispersion E9 for use in Comparative Example E-1 was produced by using Color Black FW18 (produced by Degussa), which is an inorganic pigment and a carbon black pigment, similarly to Example E-1(1).

However, in Comparative Example E-1, the separation by filtration and washing, which were performed in Example E-1(1) by using a Buechner funnel, were not performed.

A reaction vessel equipped with a stirrer, a thermometer, a reflux tube and a dropping funnel was purged with nitrogen and thereinto, 25 parts of styrene, 5 parts of α-methylstyrene, 15 parts of butyl methacrylate, 10 parts of lauryl methacrylate, 2 parts of acrylic acid and 0.5 parts of tert-dodecylmercaptan were charged and, in this Comparative Example, heated at 60° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel, in this Comparative Example, over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 40%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and, in this Comparative Example, without performing separation by filtration and washing by using a Buechner funnel, ion exchanged water and an aqueous sodium hydroxide solution as a neutralizer were appropriately added with stirring to adjust the pH to 7.5. Then, the resulting solution was filtered through a membrane filter having an average pore size of 5 μm to obtain Dispersion E9 containing 20% of Dispersing Element E9 (dispersing element where the carbon black pigment is encapsulated with the polymer having an aromatic ring amount of 40%).

In Table 22, the pigment used in Dispersion E9, the amount of aromatic ring in the dispersing polymer and the pigment/polymer ratio are shown. The pigment/polymer ratio was measured by the method described in "Measurement of Pigment/Polymer Ratio" above.

(2) Preparation of Aqueous Ink

In Comparative Example E-1, an aqueous ink was prepared by using Dispersion E9 obtained in Comparative Example E-1(1) above. The specific composition is shown below.

Incidentally, in the preparation of aqueous ink, Dispersion E9 was added to have a Dispersing Element E9 content of 8.0%. The value in < > shows an average particle size (unit: nm) of Dispersing Element E9 measured by the method described in "Measurement of Average Particle Size" above.

Also, the ion exchanged water added as "balance" in the aqueous ink composition of Comparative Example E-1 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element E9 <140> | 8.0% |
| Nonionic surfactant | 1.0% |
| Ethylene glycol | 5.0% |
| Glycerin | 15.0% |
| Ion exchanged water | balance |

In the composition above, Epan 450 (trade name, produced by Dai-ichi Kogyo Seiyaku Co., Ltd.) was used as the nonionic surfactant.

(3) Measurement of Amount of Polyvalent Anion

The aqueous ink prepared in Comparative Example E-1(2) was measured by the method described in "Measurement of Amount of Polyvalent Anion" above, as a result, the total amount of polyvalent anions was 1,054 ppm. The details of the measurement results are shown in Table 24.

(4) Printing Evaluation

The aqueous ink prepared in Comparative Example E-1(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Comparative Example E-1(4) according to the same evaluation criteria as in Example E-1(5). The evaluation results of ejection stability are shown in Table 24.

(6) Evaluation of Storage Stability

The aqueous ink prepared in Comparative Example E-1(2) above was evaluated on the storage stability by the same evaluation method as in Example E-1(6) according to the same evaluation criteria as in Example E-1 (6). The evaluation results of storage stability are shown in Table 24.

Comparative Example E-2

(1) Production of Dispersion

Dispersion E10

For the production of Dispersion E10 used in Comparative Example E-2, a phthalocyanine green pigment (C.I. Pigment Green 7) which is an organic pigment was dispersed by using Solsperse 27000 (produced by Avecia Limited).

15 Parts of C.I. Pigment Green 7, 5 parts of Solsperse 27000, 5 parts of diethanolamine, 0.5 parts of 2-propanol and 74.5 parts of ion exchanged water were dispersed by a bead mill MINIZETOR (manufactured by Ajisawa) for 2 hours to obtain Dispersion E10 for use in Comparative Example E-2, containing 20% (pigment: 15%, dispersing resin: 5%) of Dispersing Element E10.

(2) Preparation of Aqueous Ink

In Comparative Example E-2, an aqueous ink was prepared by using Dispersion E10 obtained in Comparative Example E-2(1) above. The specific composition is shown below.

Incidentally, in the preparation of aqueous ink, Dispersion E10 was added to have a Dispersing Element E10 content of 8.0%. The value in < > shows an average particle size (unit: nm) of Dispersing Element E10 measured by the method described in "Measurement of Average Particle Size" above.

Also, the ion exchanged water added as "balance" in the aqueous ink composition of Comparative Example E-2 shown below was, similarly to Example E-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element E10 <150> | 8.0% |
| Nonionic surfactant | 1.0% |
| Ethylene glycol | 5.0% |
| Glycerin | 15.0% |
| Ion exchanged water | balance |

In the composition above, Noigen EA160 (trade name, produced by Dai-ichi Kogyo Seiyaku Co., Ltd.) was used as the nonionic surfactant.

(3) Measurement of Amount of Polyvalent Anion

The aqueous ink prepared in Comparative Example E-2(2) was measured by the method described in "Measurement of Amount of Polyvalent Anion" above, as a result, the total amount of polyvalent anions was 1,585 ppm. The details of the measurement results are shown in Table 24.

(4) Printing Evaluation

The aqueous ink prepared in Comparative Example E-2(2) was subjected to printing evaluation according to the same evaluation criteria as in Example E-1(4) by using the same aqueous inkjet printer PM-950C (manufactured by Seiko Epson Corporation) as in Example E-1(4) and using the same evaluation paper as in Example E-1(4). The printing evaluation results are shown in Table 23.

(5) Evaluation of Ejection Stability

The ejection stability was evaluated by the same evaluation method as in Example E-1(5) using the same printer and aqueous ink as in Comparative Example E-2(4) according to the same evaluation criteria as in Example E-1(5). The evaluation results of ejection stability are shown in Table 24.

(6) Evaluation of Storage Stability

The aqueous ink prepared in Comparative Example E-2(2) above was evaluated on the storage stability by the same evaluation method as in Example E-1(6) according to the same evaluation criteria as in Example E-1(6). The evaluation results of storage stability are shown in Table 24.

TABLE 22

List of Dispersions E1 to E9

| | Dispersion E1 | Dispersion E2 | Dispersion E3 | Dispersion E4 | Dispersion E5 | Dispersion E6 | Dispersion E7 | Dispersion E8 | Dispersion E9 |
|---|---|---|---|---|---|---|---|---|---|
| Pigment used | Color Black FW-18 | C.I. Pigment Yellow 74 | C.I. Pigment Red 122 | C.I. Pigment Blue 15:4 | C.I. Pigment Orange 43 | C.I. Pigment Brown 32 | C.I. Pigment Violet 19 | C.I. Pigment Green 7 | Color Black FW-18 |
| Amount of aromatic ring | 59% | 25% | 40% | 46% | 56% | 69% | 21% | 30% | 40% |
| Pigment:polymer ratio | 7.5:2.5 | 6.5:3.5 | 8.0:2.0 | 6.0:4.0 | 3.5:6.5 | 3.0:7.0 | 9.0:1.0 | 5.5:4.5 | 4.5:5.5 |

TABLE 23

Printing Evaluation Results of Ink Cartridge of Examples and Comparative Examples

| | Example E | | | | | | | | Comparative Example E | |
|---|---|---|---|---|---|---|---|---|---|---|
| Paper Evaluated | 1 | 2 | 3 | 4 | 5 | 6 | 7 | 8 | 1 | 2 |
| (a) Conqueror | A | A | A | A | A | A | A | A | D | D |
| (b) Reymat | A | A | A | A | A | A | A | A | C | C |
| (c) Mode Copy | A | A | A | A | A | A | A | A | D | D |
| (d) Rapid Copy | A | A | A | A | A | A | A | B | D | D |
| (e) Xerox P | A | A | A | A | A | A | A | A | C | C |
| (f) Xerox 4024 | A | A | A | A | A | A | A | A | C | D |
| (g) Xerox 10 | A | A | A | A | B | A | B | D | D | D |
| (h) Neenha Bond | A | A | A | A | A | A | A | A | C | D |
| (i) Ricopy 6200 | A | A | A | A | B | A | B | D | D | D |
| (j) Hammer mill Copy Plus | A | A | A | A | B | A | B | D | D | D |

As apparent from the results in Tables 22 and 23, the printing quality is bad when the aqueous ink of Comparative Example is used, and the printing quality is good when the aqueous ink of the present invention is used.

This reveals that by using the aqueous ink cartridge of the present invention, high-quality print recording can be obtained with reduced blurring on any species of paper.

ing quality. Furthermore, it is seen that when the amount of polyvalent anion is 600 ppm or less, very excellent ejection stability and storage stability can be obtained. On the other hand, when the amount of polyvalent anion exceeds 1,000 ppm as in Comparative Examples, the printing quality, ejection stability and storage stability all fail in reaching the practicable level.

These results reveal that good printing quality and ejection stability can be obtained by using the aqueous ink of the present invention and, moreover, the storage stability of the aqueous ink itself is excellent.

Example F

The preferred embodiment (f) of the present invention is described below by referring to Examples.

The scope of the present invention is, however, not limited to these Examples. The measured values (amount of aromatic ring, average particle size, amount of monovalent cation and surface tension) obtained in these Examples each was measured by the following method.

Measurement of Amount of Aromatic Ring

A part of each dispersing element obtained in Examples and Comparative Examples was taken out and precipitated with an acid by adding HCl in a concentration of 0.1 mol/liter and then only the dispersing polymer was taken out by a

TABLE 24

Amount of Polyvalent Anion in Ink Cartridge of Examples and Comparative Examples and Evaluation Results of Storage Stability and Ejection Stability

| | Example E | | | | | | | | Comparative Example E | |
|---|---|---|---|---|---|---|---|---|---|---|
| | 1 | 2 | 3 | 4 | 5 | 6 | 7 | 8 | 1 | 2 |
| Amount of polyvalent anion (ppm) | | | | | | | | | | |
| Sulfate ion | 19 | 48 | 119 | 38 | 18 | 64 | 51 | 62 | 96 | 253 |
| Phosphate ion | 571 | 403 | 438 | 525 | 344 | 607 | 489 | 697 | 883 | 1244 |
| Low molecular polycarboxylic acid | 50 | — | — | — | — | 24 | — | 39 | 75 | 88 |
| Total | 640 | 451 | 557 | 563 | 362 | 695 | 540 | 798 | 1054 | 1585 |
| Foreign matters | A | A | A | A | A | A | A | B | C | D |
| Viscosity | A | A | A | A | A | B | A | B | C | D |
| Surface tension | A | A | A | A | A | A | A | B | C | D |
| Ejection stability | B | A | A | A | A | B | A | B | C | D |

* In the Table, "—" shows that the amount is lower than the measurement limit value.

As apparent from the results in Table 24, the aqueous ink of the present invention where the amount of polyvalent anion in the liquid component of the aqueous ink is reduced to 800 ppm or less ensures excellent ejection stability and high storage stability and, from Table 23, also ensures excellent print- Soxhlet extraction method using acetone and measured by $^{13}$C-NMR and $^{1}$H-NMR (AMX400, manufactured by Bruker (Germany)) using DMSO-$d_6$ to determine the amount of aromatic ring based on the entire weight of the dispersing polymer.

Measurement of Average Particle Size

The aqueous inks obtained in Examples and Comparative Examples each was diluted with ion exchanged water to have a dispersing element concentration of 0.001 to 0.01 wt % (because the optimal concentration at the measurement slightly differs depending on the aqueous ink) and the average particle size of dispersed particles at 20° C. was measured by a particle size distribution meter (DLS-800, manufactured by Otsuka Electronics Co., Ltd.). The particle size is shown in < > as the average particle size in the unit of nm (nanometer).

Measurement of Amount of Monovalent Cation

A necessary amount of each aqueous ink obtained in Examples and Comparative Examples was taken out and subjected to a centrifugal separation treatment in a centrifugal ultrafiltration apparatus (C-15, manufactured by Millipore). The filter used was Type NMWL10000 and the centrifugation conditions were 2500 G and 60 minutes. Using the obtained filtrate, the amount of monovalent cation was measured by ion chromatography (column ionPac AS12A; DX-500 produced by Nippon Dionex).

Measurement of Surface Tension

The aqueous inks obtained in Examples and Comparative Examples each was measured on the surface tension at 20° C. by a surface tension balance (CBVP-A3, manufactured by Kyowa Interface Science Co., Ltd.).

The production method of the dispersing element according to the present invention is specifically described below.

In Examples here, the pigment was encapsulated with a reactive dispersant and then subjected to an emulsification polymerization in the presence of a catalyst in water to produce a dispersing element.

<Production of Dispersing Element (Production Method I)>

(Dispersing Element F1)

For the production of Dispersing Element F1, MA88 (produced by Mitsubishi Chemical Corporation) which is a carbon black pigment was used. In a reaction vessel equipped with an ultrasonic wave generator, a stirrer, a dripping device, a water cooled reflux condenser and a temperature controller, 25 parts (hereinafter "parts" means "parts by weight") of the carbon black pigment and 6 parts of Adeka Reasoap SE-10N (produced by Asahi Denka Co., Ltd.) which is a polymerizable surfactant were added to 180 parts of ion exchanged water and an ultrasonic wave was applied thereto for 4 hours.

Thereafter, a methyl ethyl ketone solution containing 5 parts of styrene, 1.7 parts of α-methylstyrene and 0.5 parts of azobisisobutyronitrile was added and the polymerization reaction was performed at 60° C. for 8 hours. The obtained solution was subjected to centrifugal filtration to take out a pigment encapsulated with a polymer and coarse particles were removed by filtering the pigment through a 5-μm membrane filter.

This pigment solution encapsulated with a polymer was disaggregated by a homogenizer. Subsequently, in the reaction vessel, this methyl ethyl ketone solution of pigment, 30 parts of ion exchanged water and 0.05 parts of sodium laurylsulfate were added and then 100 parts of ion exchanged water and 0.5 parts of potassium persulfate as a polymerization initiator were charged. The resulting solution was kept at 70° C. in a nitrogen atmosphere. Thereto, a mixed solution containing 25 parts of styrene, 1 part of tetrahydrofurfuryl methacrylate, 15 parts of butyl methacrylate, 5 parts of triethylene glycol methacrylate and 0.02 parts of tert-dodecylmercaptan was added dropwise and reacted. Thereafter, the methyl ethyl ketone and a part of water were distilled off by a rotary evaporator and the residue was adjusted to a pH of 8.5 by using an aqueous sodium hydroxide solution as a neutralizer and then filtered through a 0.3-μm filter to obtain Dispersing Element F1.

The obtained Dispersing Element F1 was measured on the ratio of aromatic ring to the entire weight of dispersing polymer by the method described in "Measurement of Amount of Aromatic Ring" above and found to be 39%.

Dispersing Elements F2 to F7 were obtained in the same manner as Dispersing Element F1 (production method I) except that a phthalocyanine blue pigment. (C.I. Pigment Blue 15:4) was used for Dispersing Element F2, an insoluble monoazo yellow pigment (C.I. Pigment Yellow 74) was used for Dispersing Element F3, an isoindolinone pigment (C.I. Yellow 109) was used for Dispersing Element F4, an anthraquinone yellow pigment (C.I. Pigment Yellow 147) was used for Dispersing Element F5, a benzimidazolone yellow pigment (C.I. Pigment Yellow 180) was used for Dispersing Element F6, and a 9:1 mixture of quinacridone red pigment (C.I. Pigment Red 122) and dioxazine violet pigment (C.I. Pigment Violet 23) was used for Dispersing Element F7.

The pigment, neutralizer, pigment/dispersing polymer ratio and amount of aromatic ring in Dispersing Elements F1 to F7 produced by the production method I are shown in Table 25.

TABLE 25

List of Dispersing Elements F1 to F7

| | Dispersing Element F1 | Dispersing Element F2 | Dispersing Element F3 | Dispersing Element F4 | Dispersing Element F5 | Dispersing Element F6 | Dispersing Element F7 |
|---|---|---|---|---|---|---|---|
| Pigment used | MA88 | C.I. Pigment Blue 15:4 | C.I. Pigment Yellow 74 | C.I. Pigment Yellow 109 | C.I. Pigment Yellow 147 | C.I. Pigment Yellow 180 | C.I. Pigment Red 122 C.I. Pigment Violet 23 |
| Neutralizer | sodium hydroxide | triethanolamine | sodium hydroxide, lithium hydroxide | sodium hydroxide, potassium hydroxide | lithium hydroxide | potassium hydroxide | propanolamine |
| Pigment:polymer ratio | 7.0:3.0 | 4.0:6.0 | 8.0:2.0 | 3.0:7.0 | 6.0:4.0 | 7.5:2.5 | 9.0:1.0 |
| Amount of aromatic ring | 39% | 60% | 25% | 54% | 36% | 48% | 29% |

The production of Dispersing Element F8 by using a production method different from that for Dispersing Element F1 is described below.

<Production of Dispersing Element (Production Method II)>
(Dispersing Element F8)

For the production of Dispersing Element F8, Color Black FW18 (produced by Degussa) which is a carbon black pigment was used. A reaction vessel equipped with a stirrer, a thermometer, a reflux tube and a dropping funnel was purged with nitrogen and thereinto, 21 parts of styrene, 5 parts of α-methylstyrene, 16 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

40 Parts of the dispersing polymer solution obtained above, 30 parts of Color Black FW18 (produced by Degussa) which is carbon black, 100 parts of an aqueous solution containing 0.1 mol/liter of sodium hydroxide, and 35 parts of methyl ethyl ketone were mixed and stirred by a homogenizer for 30 minutes. Thereto, 350 parts of ion exchanged water was added and the resulting solution was further stirred for one hour. The entire amount of methyl ethyl ketone and a part of water were distilled off by a rotary evaporator and the residue was adjusted to a pH of 7.5 by using a mixed solution of aqueous sodium hydroxide solution and aqueous ammonia solution as the neutralizer and then filtered through a 0.3-μm filter to obtain Dispersing Element F8.

The ratio of aromatic ring to the entire weight of dispersing polymer in Dispersing Element F8 was measured by the method described in "Measurement of Amount of Aromatic Ring" above and found to be 56%.

Dispersing Elements F9 to F14 were obtained in the same manner as above (Production Method II) except that a phthalocyanine green pigment (C.I. Pigment Green 7) which is an organic pigment was used for Dispersing Element F9, a condensed azo yellow pigment (C.I. Pigment Yellow 128) which is an organic pigment was used for Dispersing Element F10, an azo lake pigment (C.I. Pigment 53:1) which is an organic pigment was used for Dispersing Element F11, a perynone orange pigment (C.I. Pigment Orange 43) which is an organic pigment was used for Dispersing Element F12, a benzimidazolone brown pigment (C.I. Pigment Brown 32) which is an organic pigment was used for Dispersing Element F13, and a perynone red pigment (C.I. Pigment Red 178) which is an organic pigment was used for Dispersing Element F14.

The pigment, neutralizer, pigment/dispersing polymer ratio and amount of aromatic ring in Dispersing Elements F8 to F14 produced by the production method II are shown in Table 26.

TABLE 26

List of Dispersing Elements F8 to F14

| | Name of Dispersing Element | | | | | | |
|---|---|---|---|---|---|---|---|
| | Dispersing Element F8 | Dispersing Element F9 | Dispersing Element F10 | Dispersing Element F11 | Dispersing Element F12 | Dispersing Element F13 | Dispersing Element F14 |
| Pigment used | Color Black FW-18 | C.I. Pigment Green 7 | C.I. Pigment Yellow 128 | C.I. Pigment Red 53:1 | C.I. Pigment Orange 43 | C.I. Pigment Brown 32 | C.I. Pigment Red 178 |
| Neutralizer | sodium hydroxide, ammonia | lithium hydroxide, triethanolamine | tripropanolamine | triethanolamine | lithium hydroxide | potassium hydroxide | sodium hydroxide, lithium hydroxide, potassium hydroxide |
| Pigment:polymer ratio | 6.0:4.0 | 2.0:8.0 | 8.0:2.0 | 7.5:2.5 | 1.5:8.5 | 2.5:7.5 | 7.0:3.0 |
| Amount of aromatic ring | 56% | 68% | 53% | 27% | 41% | 43% | 32% |

(Preparation of Aqueous Ink)

In the following, examples of the aqueous ink according to the present invention, particularly the aqueous ink composition suitable for aqueous inkjet recording are described. The amount of the dispersing element added is shown by the solid content concentration (total amount of pigment and dispersing polymer surrounding the pigment) in terms of weight. In < >, the particle size of pigment is shown by the unit of nm. In Examples, the ion exchanged water added as balance was ion exchanged water where Proxel XL-2 for preventing septic activity of the aqueous ink, benzotriazole for preventing corrosion of an aqueous inkjet head member and EDTA (ethylenediaminetetraacetic acid) for reducing the effect of metal ion in the aqueous ink system were added to a concentration of 0.05%, 0.02% and 0.01%, respectively, and stirred.

Example F-1

The aqueous ink composition of Example F-1 is shown below.

| | Amount Added (%) |
|---|---|
| Dispersing Element F1 | 8.0 |
| Olfine E1010 | 0.5 |
| TEGmBE | 5.0 |
| 1,5-Pentanediol | 2.5 |
| Glycerin | 9.0 |
| Triethanolamine | 0.5 |
| Ion exchanged water | balance |

In the composition above, TEGmBE denotes a triethylene glycol monobutyl ether, and Olfine E1010 is an acetylene glycol-base surfactant (trade name, produced by Nissin Chemical Industry Co., Ltd.).

"Determination of Amount of Monovalent Cation"

The aqueous ink prepared in Example F-1 was measured by the method described in "Measurement of Amount of Monovalent Cation" above.

The amounts of lithium ion, sodium ion, potassium ion and ammonium ion were 120 ppm, 1,300 ppm, 115 ppm and 80 ppm, respectively. The total amount of monovalent cations was 1,615 ppm.

Example F-2

The aqueous ink composition of Example F-2 is shown below.

|  | Amount Added (%) |
| --- | --- |
| Dispersing Element F2 | 3.0 |
| Surfynol TG | 0.3 |
| DEGmBE | 5.0 |
| Dipropylene glycol | 5.0 |
| Trimethylolethane | 4.0 |
| Triethanolamine | 0.1 |
| Ion exchanged water | balance |

In the composition above, Surfynol TG is an acetylene glycol-base surfactant (trade name, produced by Air Products) and DEGmBE denotes a diethylene glycol monobutyl ether.

"Determination of Amount of Monovalent Cation"

The aqueous ink prepared in Example F-2 was measured by the method described in "Measurement of Amount of Monovalent Cation" above.

The amounts of lithium ion, sodium ion, potassium ion and ammonium ion were 135 ppm, 460 ppm, 160 ppm and 710 ppm, respectively. The total amount of monovalent cations was 1,465 ppm.

Example F-3

The aqueous ink composition of Example F-3 is shown below.

|  | Amount Added (%) |
| --- | --- |
| Dispersing Element F3 | 5.0 |
| Olfine STG | 0.3 |
| 1,2-Hexanediol | 1.0 |
| 1,6-Hexanediol | 2.0 |
| Triethylene glycol | 10.0 |
| Thiodiglycol | 1.5 |
| Triethanolamine | 0.3 |
| Potassium hydroxide | 0.1 |
| Ion exchanged water | balance |

In the composition above, Olfine STG is an acetylene glycol-base surfactant (trade name, produced by Nissin Chemical Industry Co., Ltd.).

"Determination of Amount of Monovalent Cation"

The aqueous ink prepared in Example F-3 was measured by the method described in "Measurement of Amount of Monovalent Cation" above.

The amounts of lithium ion, sodium ion, potassium ion and ammonium ion were 450 ppm, 1,050 ppm, 640 ppm and 240 ppm, respectively. The total amount of monovalent cations was 1,920 ppm.

Example F-4

The aqueous ink composition of Example F-4 is shown below.

|  | Amount Added (%) |
| --- | --- |
| Dispersing Element F4 | 6.5 |
| Surfynol 104 | 0.1 |
| TEGmBE | 3.0 |
| 1,2-Pentanediol | 5.0 |
| 1,5-Pentanediol | 2.0 |
| Tetraethylene glycol | 9.0 |
| Dimethyl-2-imidazolidinone | 2.0 |
| Sodium benzoate | 0.1 |
| Triethanolamine | 0.7 |
| Ion exchanged water | balance |

In the composition above, Surfynol 104 is an acetylene glycol-base surfactant (trade name, produced by Air Products).

"Determination of Amount of Monovalent Cation"

The aqueous ink prepared in Example F-4 was measured by the method described in "Measurement of Amount of Monovalent Cation" above.

The amounts of lithium ion, sodium ion, potassium ion and ammonium ion were 80 ppm, 1,390 ppm, 550 ppm and 190 ppm, respectively. The total amount of monovalent cations was 2,210 ppm.

Example F-5

The aqueous ink composition of Example F-5 is shown below.

|  | Amount Added (%) |
| --- | --- |
| Dispersing Element F5 | 7.0 |
| DPGmBE | 2.0 |
| DEGmBE | 7.0 |
| Glycerin | 5.0 |
| Triethylene glycol | 5.0 |
| Trehalose | 5.0 |
| Triethanolamine | 0.2 |
| LiOH | 0.1 |
| Ion exchanged water | balance |

In the composition above, DPGmBE denotes a dipropylene glycol monobutyl ether.

"Determination of Amount of Monovalent Cation"

The aqueous ink prepared in Example F-5 was measured by the method described in "Measurement of Amount of Monovalent Cation" above.

The amounts of lithium ion, sodium ion, potassium ion and ammonium ion were 1,800 ppm, 260 ppm, 150 ppm and 250 ppm, respectively. The total amount of monovalent cations was 2,460 ppm.

Example F-6

The aqueous ink composition of Example F-6 is shown below.

|  | Amount Added (%) |
| --- | --- |
| Dispersing Element F6 | 7.0 |
| Acetylenol EO | 0.5 |
| TEGmBE | 5.0 |

|   | Amount Added (%) |
|---|---|
| 1,2-Pentanediol | 1.0 |
| Glycerin | 13.0 |
| Thiodiglycol | 2.0 |
| 2-Pyrrolidone | 2.0 |
| Triethanolamine | 0.3 |
| Ion exchanged water | balance |

In the composition above, Acetylenol EC is an acetylene glycol-base surfactant (trade name, produced by Kawaken Fine Chemicals).

"Determination of Amount of Monovalent Cation"

The aqueous ink prepared in Example F-6 was measured by the method described in "Measurement of Amount of Monovalent Cation" above.

The amounts of lithium ion, sodium ion, potassium ion and ammonium ion were 460 ppm, 850 ppm, 1,050 ppm and 65 ppm, respectively. The total amount of monovalent cations was 2,425 ppm.

Example F-7

The aqueous ink composition of Example F-7 is shown below.

|   | Amount Added (%) |
|---|---|
| Dispersing Element F7 | 7.2 |
| Surfynol 465 | 0.5 |
| Surfynol 61 | 0.5 |
| TEGmBE | 6.0 |
| Glycerin | 15.0 |
| Trimethylolpropane | 1.0 |
| Trimethylolethane | 1.0 |
| Triethanolamine | 0.1 |
| NaOH | 0.05 |
| Ion exchanged water | balance |

In the composition above, Surfynol 465 is an acetylene glycol-base surfactant (trade name, produced by Air Products) and Surfynol 61 is an acetylene alcohol-base surfactant (trade name, produced by Air Products).

"Determination of Amount of Monovalent Cation"

The aqueous ink prepared in Example F-7 was measured by the method described in "Measurement of Amount of Monovalent Cation" above.

The amounts of lithium ion, sodium ion, potassium ion and ammonium ion were 265 ppm, 500 ppm, 390 ppm and 595 ppm, respectively. The total amount of monovalent cations was 1,750 ppm.

Example F-8

The aqueous ink composition of Example F-8 is shown below.

|   | Amount Added (%) |
|---|---|
| Dispersing Element F8 | 10.0 |
| Surfynol 420 | 0.5 |
| PGmBE | 2.0 |
| DEGmBE | 10.0 |
| Tetrapropylene glycol | 5.0 |
| Glycerin | 7.0 |
| Diethylene glycol | 5.0 |
| Triethanolamine | 0.1 |
| NaOH | 0.1 |
| Ion exchanged water | balance |

In the composition above, Surfynol 420 is an acetylene glycol-base surfactant (trade name, produced by Air Products) and PGmBE denotes a propylene glycol monobutyl ether.

"Determination of Amount of Monovalent Cation"

The aqueous ink prepared in Example F-8 was measured by the method described in "Measurement of Amount of Monovalent Cation" above.

The amounts of lithium ion, sodium ion, potassium ion and ammonium ion were 90 ppm, 1,000 ppm, 210 ppm and 950 ppm, respectively. The total amount of monovalent cations was 2,250 ppm.

Example F-9

The aqueous ink composition of Example F-9 is shown below.

|   | Amount Added (%) |
|---|---|
| Dispersing Element F9 | 5.0 |
| Surfynol 485 | 1.5 |
| DEGmBE | 5.0 |
| 1,5-Pentanediol | 5.0 |
| Glycerin | 9.0 |
| 1,4-Cyclohexanedimethanol | 5.0 |
| Triethanolamine | 0.2 |
| Ion exchanged water | balance |

In the composition above, Surfynol 485 is an acetylene glycol-base surfactant (trade name, produced by Air Products).

"Determination of Amount of Monovalent Cation"

The aqueous ink prepared in Example F-9 was measured by the method described in "Measurement of Amount of Monovalent Cation" above.

The amounts of lithium ion, sodium ion, potassium ion and ammonium ion were 950 ppm, 350 ppm, 290 ppm and 510 ppm, respectively. The total amount of monovalent cations was 2,100 ppm.

Example F-10

The aqueous ink composition of Example F-10 is shown below.

|   | Amount Added (%) |
|---|---|
| Dispersing Element F10 | 5.0 |
| Surfynol TG | 0.3 |
| DEGmBE | 10.0 |
| Dipropylene glycol | 5.0 |
| Triethanolamine | 0.5 |
| Ion exchanged water | balance |

In the composition above, Surfynol TG is an acetylene glycol-base surfactant (trade name, produced by Air Products) and DEGmBE denotes a diethylene glycol monobutyl ether.

"Determination of Amount of Monovalent Cation"

The aqueous ink prepared in Example F-10 was measured by the method described in "Measurement of Amount of Monovalent Cation" above.

The amounts of lithium ion, sodium ion, potassium ion and ammonium ion were 330 ppm, 450 ppm, 250 ppm and 350 ppm, respectively. The total amount of monovalent cations was 1,380 ppm.

Example F-11

The aqueous ink composition of Example F-11 is shown below.

|  | Amount Added (%) |
|---|---|
| Dispersing Element F11 | 4.5 |
| Olfine STG | 0.3 |
| 1,2-Hexanediol | 2.0 |
| 1,6-Hexanediol | 2.0 |
| Diethylene glycol | 7.0 |
| Thiodiglycol | 1.5 |
| Triethanolamine | 0.2 |
| Ion exchanged water | balance |

In the composition above, Olfine STG is an acetylene glycol-base surfactant (trade name, produced by Nissin Chemical Industry Co., Ltd.).

"Determination of Amount of Monovalent Cation"

The aqueous ink prepared in Example F-11 was measured by the method described in "Measurement of Amount of Monovalent Cation" above.

The amounts of lithium ion, sodium ion, potassium ion and ammonium ion were 465 ppm, 560 ppm, 350 ppm and 450 ppm, respectively. The total amount of monovalent cations was 1,825 ppm.

Example F-12

The aqueous ink composition of Example F-12 is shown below.

|  | Amount Added (%) |
|---|---|
| Dispersing Element F12 | 6.5 |
| Surfynol 104 | 0.1 |
| TEGmBE | 3.0 |
| 1,2-Pentanediol | 2.0 |
| 1,5-Pentanediol | 2.0 |
| Tetraethylene glycol | 9.0 |
| Dimethyl-2-imidazolidinone | 2.0 |
| Sodium benzoate | 0.1 |
| Triethanolamine | 0.5 |
| Ion exchanged water | balance |

In the composition above, Surfynol 104 is an acetylene glycol-base surfactant (trade name, produced by Air Products).

"Determination of Amount of Monovalent Cation"

The aqueous ink prepared in Example F-12 was measured by the method described in "Measurement of Amount of Monovalent Cation" above.

The amounts of lithium ion, sodium ion, potassium ion and ammonium ion were 1,200 ppm, 480 ppm, 220 ppm and 90 ppm, respectively. The total amount of monovalent cations was 1,950 ppm.

Example F-13

The aqueous ink composition of Example F-13 is shown below.

|  | Amount Added (%) |
|---|---|
| Dispersing Element F13 | 5.0 |
| Surfynol 465 | 0.5 |
| Surfynol TG | 0.1 |
| TEGmBE | 2.0 |
| 1,2-Hexanediol | 2.0 |
| Glycerin | 5.0 |
| Triethylene glycol | 5.0 |
| Trimethylolpropane | 5.0 |
| Tripropanolamine | 0.1 |
| Ion exchanged water | balance |

"Determination of Amount of Monovalent Cation"

The aqueous ink prepared in Example F-13 was measured by the method described in "Measurement of Amount of Monovalent Cation" above.

The amounts of lithium ion, sodium ion, potassium ion and ammonium ion were 350 ppm, 380 ppm, 980 ppm and 290 ppm, respectively. The total amount of monovalent cations was 2,000 ppm.

Example F-14

The aqueous ink composition of Example F-14 is shown below.

|  | Amount Added (%) |
|---|---|
| Dispersing Element F14 | 8.5 |
| Acetylenol EL | 0.5 |
| Acetylenol EO | 0.1 |
| TEGmBE | 6.0 |
| 1,2-Pentanediol | 1.0 |
| Glycerin | 15.0 |
| Thiodiglycol | 2.0 |
| Triethanolamine | 0.2 |
| Ion exchanged water | balance |

In the composition above, Acetylenol EL is an acetylene glycol-base surfactant (trade name, produced by Kawaken Fine Chemicals).

"Determination of Amount of Monovalent Cation"

The aqueous ink prepared in Example F-14 was measured by the method described in "Measurement of Amount of Monovalent Cation" above.

The amounts of lithium ion, sodium ion, potassium ion and ammonium ion were 750 ppm, 890 ppm, 710 ppm and 100 ppm, respectively. The total amount of monovalent cations was 2,450 ppm.

Comparative Example F-1

In Comparative Example F-1, Dispersing Element F1 was used similarly to Example F-1. Furthermore, in Comparative Example F-1, the aqueous ink was prepared by using water intentionally containing a large amount of monovalent cation.

The aqueous ink composition of Comparative Example F-1 is shown below.

| | Amount Added (%) |
|---|---|
| Dispersing Element F1 | 8.0 |
| Ethylene glycol | 5.0 |
| Glycerin | 10.0 |
| Nonionic surfactant | 1.0 |
| Monovalent metal ion-containing water | balance |

In the composition above, Epan 450 (trade name, produced by Dai-ichi Kogyo Seiyaku Co., Ltd.) was used as the nonionic surfactant.

"Determination of Amount of Monovalent Cation"

The aqueous ink prepared in Comparative Example F-1 was measured by the method described in "Measurement of Amount of Monovalent Cation" above.

The amounts of lithium ion, sodium ion, potassium ion and ammonium ion were 1,350 ppm, 1,640 ppm, 1,090 ppm and 1,100 ppm, respectively. The total amount of monovalent cations was 5,180 ppm.

Comparative Example F-2

In Comparative Example F-2, MA88 (produced by Mitsubishi Chemical Corporation) which is a carbon black pigment was used similarly to Example F-1 and dispersed by using Solsperse 27000 (produced by Avecia Limited) as a dispersant.

15 Parts of MA88, 5 parts of Solsperse 27000 (produced by Avecia Limited), 5 parts of diethanolamine, 0.5 parts of 2-propanol and 74.5 parts of ion exchanged water were dispersed in a bead mill MINIZETOR (manufactured by Ajisawa) for 2 hours to obtain Dispersion F15 for use in Comparative Example F-2.

The aqueous ink composition of Comparative Example F-2 is shown below.

| | Amount Added (%) |
|---|---|
| Dispersion F15 <120> | 7.0 |
| Glycerin | 15.0 |
| Dispersant | 3.0 |
| Nonionic surfactant | 1.0 |
| Ion exchanged water | balance |

In the composition above, Noigen EA160 (trade name, produced by Dai-ichi Kogyo Seiyaku Co., Ltd.) was used as the nonionic surfactant.

"Determination of Amount of Monovalent Cation"

The aqueous ink prepared in Comparative Example F-2 was measured by the method described in "Measurement of Amount of Monovalent Cation" above.

The amounts of lithium ion, sodium ion, potassium ion and ammonium ion were 540 ppm, 810 ppm, 220 ppm and 490 ppm, respectively. The total amount of monovalent cations was 2,060 ppm.

The aqueous inks of Examples F-1 to F-14 and Comparative Examples F-1 and F-2 each was subjected to the printing evaluation. The printing evaluation was performed by using an aqueous inkjet printer PM-900C (manufactured by Seiko Epson Corporation) which ejects an aqueous ink by an aqueous inkjet head using a piezoelectric element. The papers used in this evaluation were Conqueror, Favorit, Modo Copy, Rapid Copy, EPSON EPP, Xerox 4024, Xerox 10, Neenha Bond, Ricopy 6200, Yamayuri and Xerox R which are plain papers commercially available in Europe, USA and Japan.

In Table 27, the evaluation results of blurring when a letter was printed are shown as the printing evaluation results. In Table 27, A denotes "very good", B denotes "good", C denotes "bad" and D denotes "very bad".

TABLE 27

Printing Evaluation Results of Ink

| Species of Paper | Example F | | | | | | | | | | | | | | Comparative Example F | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 |
| Conqueror | A | A | A | A | A | A | A | A | A | A | A | A | A | A | D | D |
| Favorit | A | A | A | A | A | A | A | A | A | A | A | A | A | A | D | D |
| Modo Copy | A | A | A | A | A | A | A | A | A | A | A | A | A | A | D | D |
| Rapid Copy | A | A | A | A | A | A | A | A | A | A | A | A | A | A | D | D |
| EPSON EPP | A | A | A | A | A | A | A | A | A | A | A | A | A | A | C | C |
| Xerox P | A | A | A | A | A | A | A | A | A | A | A | A | A | A | C | C |
| Xerox 4024 | A | A | A | A | A | A | A | A | A | A | A | A | A | A | D | D |
| Xerox 10 | A | A | A | A | A | A | A | A | A | A | A | A | A | A | C | D |
| Neenha Bond | A | A | A | A | A | A | A | A | A | A | A | A | A | A | C | D |
| Ricopy 6200 | A | A | A | A | A | A | A | A | A | A | A | A | A | A | D | C |
| Yamayuri | A | A | A | B | A | A | A | A | A | A | A | A | A | A | D | D |
| Xerox R | A | A | A | A | A | A | A | A | A | A | A | A | A | A | D | D |

As apparent from the results in Table 27, the printing quality is bad when the aqueous ink of Comparative Example is used, and the printing quality is good when the aqueous ink of the present invention is used.

As verified above, the present invention can provide an aqueous ink suitable for aqueous inkjet recording, which is reduced in blurring for a material on which a printed image is recorded, such as paper, and ensures high quality and high practicability.

Also, the aqueous inks of Examples F-1 to F-14 and Comparative Examples F-1 and F-2 were evaluated on the storage stability and the ejection stability.

In the evaluation of storage stability, each aqueous ink was charged into a sampling vial and after tightly plugging the vial, left standing at 60° C. for one week or at −20° C. for one week. The foreign matters generated and physical values (viscosity, surface tension) of the aqueous ink were examined before and after the aqueous ink was left standing.

The amount of foreign matters generated shows a value of amount of foreign matters after standing/initial amount of foreign matters, the viscosity shows a value of viscosity after standing/initial viscosity, and the surface tension shows a value of surface tension after standing/initial surface tension.

The ejection stability was evaluated by using an aqueous inkjet printer PM-900C manufactured by Seiko Epson Corporation and rated A when printing disorder was not generated at all even in continuous printing of 200 pages on A4-size Xerox P, rated B when printing disorder was generated at less than 10 portions, rated C when printing disorder was generated at 10 to less than 100 portions, and rated D when printing disorder was generated at 100 or more portions.

The results in the determination of amount of monovalent cation, in the evaluation of storage stability and in the evaluation of ejection stability of each aqueous ink of Examples F-1 to F-14 and Comparative Examples F-1 and F-2 are shown in Table 28.

As seen from the results in Tables 27 and 28, the aqueous ink prepared by using the dispersing element of the present invention exhibits good printing quality, excellent ejection stability and high storage stability and can be an aqueous ink suitable for aqueous inkjet recording. Furthermore, this aqueous ink can be suitably used for an aqueous inkjet head using a piezoelectric element as in Examples above. Also, a pigment is suitably used as the colorant and this provides an effect of giving a printed matter more excellent in the water resistance than those obtained by using a normal dye. In addition, the function of the polymer encapsulating the colorant can be freely changed by the polymerizing monomer or other reactive agents and this provides an effect that a variety of functions (e.g., light fastness, gas resistance, colorability, glossiness, fixing property) can be imparted. In the case of using a normal dispersant as in conventional techniques, the adsorptive strength of the dispersant adsorbing to the colorant is fundamentally weak and the dispersant is partially desorbed. Due to the resultant desorbed material or the dispersant not adsorbed, the viscosity increases and therefore, the

TABLE 28

Amount of Monovalent Cation in Ink and Evaluation Results of Stability (Storage Stability, Ejection Stability)

| | Example F | | | | | | | | |
|---|---|---|---|---|---|---|---|---|---|
| | 1 | 2 | 3 | 4 | 5 | 6 | 7 | 8 | 9 |
| Amount of monovalent cation (ppm) | | | | | | | | | |
| $Li^+$ | 120 | 135 | 450 | 80 | 1800 | 460 | 265 | 90 | 950 |
| $Na^+$ | 1300 | 460 | 590 | 1390 | 260 | 850 | 550 | 1000 | 350 |
| $K^+$ | 115 | 160 | 640 | 550 | 150 | 1050 | 390 | 210 | 290 |
| $NH_4^+$ | 80 | 710 | 240 | 190 | 250 | 65 | 595 | 950 | 500 |
| Total | 1615 | 1465 | 1920 | 2210 | 2460 | 2425 | 1800 | 2250 | 2090 |
| Foreign matters | 1.1 | 1.1 | 1.2 | 1.3 | 1.4 | 1.5 | 1.2 | 1.2 | 1.1 |
| Viscosity | 1.1 | 1.0 | 1.2 | 1.3 | 1.2 | 1.5 | 1.1 | 1.2 | 1.2 |
| Surface tension | 1.0 | 1.0 | 1.0 | 1.2 | 1.2 | 1.2 | 1.1 | 1.1 | 1.1 |
| Ejection stability | A | A | A | A | A | B | A | A | A |

| | Example F | | | | | Comparative Example F | |
|---|---|---|---|---|---|---|---|
| | 10 | 11 | 12 | 13 | 14 | 1 | 2 |
| Amount of monovalent cation (ppm) | | | | | | | |
| $Li^+$ | 330 | 465 | 1200 | 350 | 750 | 1350 | 540 |
| $Na^+$ | 450 | 560 | 480 | 380 | 890 | 1640 | 810 |
| $K^+$ | 250 | 350 | 220 | 980 | 710 | 1090 | 220 |
| $NH_4^+$ | 350 | 450 | 90 | 290 | 100 | 1100 | 490 |
| Total | 1380 | 1825 | 1950 | 2000 | 2450 | 5180 | 2060 |
| Foreign matters | 1.0 | 1.0 | 1.2 | 1.3 | 1.3 | 4.0 | 8.0 |
| Viscosity | 1.1 | 1.2 | 1.1 | 1.2 | 1.2 | 10 | 19 |
| Surface tension | 1.0 | 1.0 | 1.0 | 1.1 | 1.1 | 1.5 | 1.6 |
| Ejection stability | A | A | A | A | A | C | D | amount of colorant added is limited, as a result, a sufficiently high color formation can be hardly obtained.

Example G

The preferred embodiment (g) of the present invention is described below by referring to Examples, however, the scope of the present invention is not limited to these Examples. The measured values (amount of aromatic ring, average particle size, amount of monovalent anion and surface tension) obtained in these Examples each was measured by the following method.

"Measurement of Amount of Aromatic Ring"

A part of each dispersing element obtained in Examples and Comparative Examples was taken out and precipitated with an acid by adding HCl in a concentration of 0.1 mol/liter and then only the dispersing polymer was taken out by a Soxhlet extraction method using acetone and measured by $^{13}$C-NMR and $^1$H-NMR (AMX400, manufactured by Bruker (Germany)) using DMSO-$d_6$ to determine the amount of aromatic ring based on the entire weight of the dispersing polymer.

"Measurement of Average Particle Size"

The aqueous inks obtained in Examples and Comparative Examples each was diluted with ion exchanged water to have a dispersing element concentration of 0.001 to 0.01 wt % (because the optimal concentration at the measurement slightly differs depending on the ink) and the average particle size of dispersed particles at 20° C. was measured by a particle size distribution meter (ELS-800, manufactured by Otsuka Electronics Co., Ltd.). The particle size is shown in < > as the average particle size in the unit of nm (nanometer).

"Measurement of Amount of Monovalent Anion"

A necessary amount of each aqueous ink obtained in Examples and Comparative Examples was taken out and subjected to a centrifugal separation treatment in a centrifugal ultrafiltration apparatus (C-15, manufactured by Millipore). The filter used was Type NMWL10000 and the centrifugation conditions were 2500 G and 60 minutes. Using the obtained filtrate, the amount of monovalent anion was measured by ion chromatography (column ionPac AS12A; DX-500 produced by Nippon Dionex).

"Measurement of Surface Tension"

The aqueous inks obtained in Examples and Comparative Examples each was measured on the surface tension at 20° C. by a surface tension balance (CBVP-A3, manufactured by Kyowa Interface Science Co., Ltd.).

The production method of the dispersing element according to the present invention is specifically described below.

In Examples here, the pigment was encapsulated with a reactive dispersant and then subjected to an emulsification polymerization in the presence of a catalyst in water to produce a dispersing element.

<Production of Dispersing Element (Production Method I)>
(Dispersing Element G1)

For the production of Dispersing Element G1, MA7 (produced by Mitsubishi Chemical Corporation) which is a carbon black pigment was used. In a reaction vessel equipped with an ultrasonic wave generator, a stirrer, a dripping device, a water cooled reflux condenser and a temperature controller, 25 parts (hereinafter "parts" means "parts by weight") of the carbon black pigment and 6 parts of Adeka Reasoap SE-10N (produced by Asahi Denka Co., Ltd.) which is a polymerizable surfactant were added to 180 parts of ion exchanged water and an ultrasonic wave was applied thereto for 4 hours.

Thereafter, a methyl ethyl ketone solution containing 5 parts of styrene, 1.7 parts of α-methylstyrene and 0.5 parts of azobisisobutyronitrile was added and the polymerization reaction was performed at 60° C. for 8 hours. The obtained solution was subjected to centrifugal filtration to take out a pigment encapsulated with a polymer and coarse particles were removed by filtering the pigment through a 5-μm membrane filter.

This pigment solution encapsulated with a polymer was disaggregated by a homogenizer. Subsequently, in the reaction vessel, this methyl ethyl ketone solution of pigment, 30 parts of ion exchanged water and 0.05 parts of sodium laurylsulfate were added and then 100 parts of ion exchanged water and 0.5 parts of potassium persulfate as a polymerization initiator were charged. The resulting solution was kept at 70° C. in a nitrogen atmosphere. Thereto, a mixed solution containing 25 parts of styrene, 1 part of tetrahydrofurfuryl methacrylate, 15 parts of butyl methacrylate, 5 parts of triethylene glycol methacrylate and 0.02 parts of tert-dodecylmercaptan was added dropwise and reacted. Thereafter, the methyl ethyl ketone and a part of water were distilled off by a rotary evaporator and the residue was adjusted to a pH of 8.5 by using an aqueous sodium hydroxide solution as a neutralizer and then filtered through a 0.3-μm filter to obtain Dispersing Element G1.

The obtained Dispersing Element G1 was measured on the ratio of aromatic ring to the entire weight of dispersing polymer by the method described in "Measurement of Amount of Aromatic Ring" above and found to be 45%.

Dispersing Elements G2 to G7 were obtained in the same manner as Dispersing Element G1 (production method I) except that a phthalocyanine blue pigment (C.I. Pigment Blue 15:4) was used for Dispersing Element G2, an insoluble monoazo yellow pigment (C.I. Pigment Yellow 74) was used for Dispersing Element G3, an isoindolinone pigment (C.I. Yellow 109) was used for Dispersing Element G4, an anthraquinone yellow pigment (C.I. Pigment Yellow 147) was used for Dispersing Element G5, a benzimidazolone yellow pigment (C.I. Pigment Yellow 180) was used for Dispersing Element G6, and a 8:2 mixture of quinacridone red pigment (C.I. Pigment Red 122) and dioxazine violet pigment (C.I. Pigment Violet 23) was used for Dispersing Element G7.

The pigment, neutralizer, pigment/dispersing polymer ratio and amount of aromatic ring in Dispersing Elements G1 to G7 produced by the production method I are shown in Table 29.

TABLE 29

| | | | List of Dispersing Elements G1 to G7 | | | | | |
|---|---|---|---|---|---|---|---|---|
| Name of Dispersing Element | Dispersing Element G1 | Dispersing Element G2 | Dispersing Element G3 | Dispersing Element G4 | Dispersing Element G5 | Dispersing Element G6 | Dispersing Element G7 |
| Pigment used | MA7 | C.I. Pigment Blue 15:4 | C.I. Pigment Yellow 74 | C.I. Pigment Yellow 109 | C.I. Pigment Yellow 147 | C.I. Pigment Yellow 180 | C.I. Pigment Red 122 C.I. Pigment Violet 23 |

TABLE 29-continued

| Name of Dispersing Element | Dispersing Element G1 | Dispersing Element G2 | Dispersing Element G3 | Dispersing Element G4 | Dispersing Element G5 | Dispersing Element G6 | Dispersing Element G7 |
|---|---|---|---|---|---|---|---|
| Neutralizer | sodium hydroxide | triethanol-amine | lithium hydroxide | potassium hydroxide | sodium hydroxide | sodium hydroxide | propanol-amine |
| Pigment: polymer ratio | 7.0:3.0 | 7.0:3.0 | 5.0:5.0 | 3.0:7.0 | 6.5:3.5 | 7.5:2.5 | 9.0:1.0 |
| Amount of aromatic ring | 45% | 64% | 35% | 54% | 26% | 48% | 59% |

The production of Dispersing Element G8 by using a production method different from that for Dispersing Element G1 is described below.

<Production of Dispersing Element (Production Method II)>
(Dispersing Element G8)

For the production of Dispersing Element G8, Color Black FW18 (produced by Degussa) which is a carbon black pigment was used. A reaction vessel equipped with a stirrer, a thermometer, a reflux tube and a dropping funnel was purged with nitrogen and thereinto, 21 parts of styrene, 5 parts of α-methylstyrene, 16 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

40 Parts of the dispersing polymer solution obtained above, 30 parts of Color Black FW18 (produced by Degussa) which is carbon black, 100 parts of an aqueous solution containing 0.1 mol/liter of sodium hydroxide, and 35 parts of methyl ethyl ketone were mixed and stirred by a homogenizer for 30 minutes. Thereto, 350 parts of ion exchanged water was added and the resulting solution was further stirred for one hour. The entire amount of methyl ethyl ketone and a part of water were distilled off by a rotary evaporator and the residue was adjusted to a pH of 7.5 by using a mixed solution of aqueous sodium hydroxide solution and aqueous ammonia solution as the neutralizer and then filtered through a 0.3-μm filter to obtain Dispersing Element G8.

The ratio of aromatic ring to the entire weight of dispersing polymer in Dispersing Element G8 was measured by the method described in "Measurement of Amount of Aromatic Ring" above and found to be 56%.

Dispersing Elements G9 to G14 were obtained in the same manner as above (Production Method II) except that a phthalocyanine green pigment (C.I. Pigment Green 7) which is an organic pigment was used for Dispersing Element G9, a condensed azo yellow pigment (C.I. Pigment Yellow 128) which is an organic pigment was used for Dispersing Element G10, an azo lake pigment (C.I. Pigment 53:1) which is an organic pigment was used for Dispersing Element G11, a perynone orange pigment (C.I. Pigment Orange 43) which is an organic pigment was used for Dispersing Element G12, a benzimidazolone brown pigment (C.I. Pigment Brown 32) which is an organic pigment was used for Dispersing Element G13, and a perynone red pigment (C.I. Pigment Red 178) which is an organic pigment was used for Dispersing Element G14.

The pigment, neutralizer, pigment/dispersing polymer ratio and amount of aromatic ring in Dispersing Elements G8 to G14 produced by the production method II are shown in Table 29.

TABLE 30

| Name of Dispersing Element | Dispersing Element G8 | Dispersing Element G9 | Dispersing Element G10 | Dispersing Element G11 | Dispersing Element G12 | Dispersing Element G13 | Dispersing Element G14 |
|---|---|---|---|---|---|---|---|
| Pigment used | Color Black FW-18 | C.I. Pigment Green 7 | C.I. Pigment Yellow 128 | C.I. Pigment Red 53:1 | C.I. Pigment Orange 43 | C.I. Pigment Brown 32 | C.I. Pigment Red 178 |
| Neutralizer | sodium hydroxide | triethanol-amine | tripropanol-amine | sodium hydroxide | lithium hydroxide | sodium hydroxide | sodium hydroxide |
| Pigment: polymer ratio | 6.0:4.0 | 2.5:7.5 | 7.0:3.0 | 5.5:4.5 | 1.0:9.0 | 4.0:6.0 | 7.0:3.0 |
| Amount of aromatic ring | 56% | 68% | 53% | 47% | 21% | 43% | 35% |

(Preparation of Inkjet Ink)

In the following, examples of the aqueous ink according to the present invention, particularly the composition suitable for aqueous inkjet recording are described. The amount of the dispersing element added is shown by the solid content concentration (total amount of pigment and dispersing polymer surrounding the pigment) in terms of weight. In < >, the particle size of pigment is shown by the unit of nm. In Examples, the ion exchanged water added as balance was ion exchanged water where Proxel XL-2 for preventing septic activity of the aqueous ink, benzotriazole for preventing corrosion of an aqueous inkjet head member and EDTA (ethylenediaminetetraacetic acid) for reducing the effect of metal ion in the ink system were added to a concentration of 0.05%, 0.02% and 0.01%, respectively, and stirred.

Example G-1

The ink composition of Example G-1 is shown below.

| | Amount Added (%) |
|---|---|
| Dispersing Element G1 | 8.0 |
| Olfine E1010 | 0.5 |
| TEGmBE | 5.0 |
| 1,5-Pentanediol | 2.5 |
| Glycerin | 9.0 |
| Triethanolamine | 0.5 |
| Ion exchanged water | balance |

In the composition above, TEGmBE denotes a triethylene glycol monobutyl ether, and Olfine E1010 is an acetylene glycol-base surfactant (trade name, produced by Nissin Chemical Industry Co., Ltd.).

"Determination of Amount of Monovalent Anion"

The aqueous ink prepared in Example G-1 was measured by the method described in "Measurement of Amount of Monovalent Anion" above.

The amounts of chlorine ion, bromine ion, iodine ion and nitrate ion were 600 ppm, 100 ppm, 115 ppm and 40 ppm, respectively. The total amount of monovalent anions was 855 ppm.

Example G-2

The aqueous ink composition of Example G-2 is shown below.

| | Amount Added (%) |
|---|---|
| Dispersing Element G2 | 3.0 |
| Surfynol TG | 0.3 |
| DEGmBE | 5.0 |
| Dipropylene glycol | 5.0 |
| Trimethylolethane | 4.0 |
| Triethanolamine | 0.1 |
| Ion exchanged water | balance |

In the composition above, Surfynol TG is an acetylene glycol-base surfactant (trade name, produced by Air Products) and DEGmBE denotes a diethylene glycol monobutyl ether.

"Determination of Amount of Monovalent Anion"

The ink prepared in Example G-2 was measured by the method described in "Measurement of Amount of Monovalent Anion" above.

The amounts of chlorine ion, bromine ion, iodine ion and nitrate ion were 735 ppm, 90 ppm, 160 ppm and 30 ppm, respectively. The total amount of monovalent anions was 1,015 ppm.

Example G-3

The ink composition of Example G-3 is shown below.

| | Amount Added (%) |
|---|---|
| Dispersing Element G3 | 5.0 |
| Olfine STG | 0.3 |
| 1,2-Hexanediol | 1.0 |
| 1,6-Hexanediol | 2.0 |
| Triethylene glycol | 10.0 |
| Thiodiglycol | 1.5 |
| Triethanolamine | 0.3 |
| Potassium hydroxide | 0.1 |
| Ion exchanged water | balance |

In the composition above, Olfine STG is an acetylene glycol-base surfactant (trade name, produced by Nissin Chemical Industry Co., Ltd.).

"Determination of Amount of Monovalent Anion"

The ink prepared in Example G-3 was measured by the method described in "Measurement of Amount of Monovalent Anion" above.

The amounts of chlorine ion, bromine ion, iodine ion and nitrate ion were 490 ppm, 80 ppm, 40 ppm and 140 ppm, respectively. The total amount of monovalent anions was 750 ppm.

Example G-4

The ink composition of Example G-4 is shown below.

| | Amount Added (%) |
|---|---|
| Dispersing Element G4 | 6.5 |
| Surfynol 104 | 0.1 |
| TEGmBE | 3.0 |
| 1,2-Pentanediol | 5.0 |
| 1,5-Pentanediol | 2.0 |
| Tetraethylene glycol | 9.0 |
| Dimethyl-2-imidazolidinone | 2.0 |
| Sodium benzoate | 0.1 |
| Triethanolamine | 0.7 |
| Ion exchanged water | balance |

In the composition above, Surfynol 104 is an acetylene glycol-base surfactant (trade name, produced by Air Products).

"Determination of Amount of Monovalent Anion"

The ink prepared in Example G-4 was measured by the method described in "Measurement of Amount of Monovalent Anion" above.

The amounts of chlorine ion, bromine ion, iodine ion and nitrate ion were 680 ppm, 190 ppm, 150 ppm and 90 ppm, respectively. The total amount of monovalent anions was 1,110 ppm.

Example G-5

The ink composition of Example G-5 is shown below.

| | Amount Added (%) |
|---|---|
| Dispersing Element G5 | 7.0 |
| DPGmBE | 2.0 |
| DEGmBE | 7.0 |
| Glycerin | 5.0 |
| Triethylene glycol | 5.0 |
| Trehalose | 5.0 |
| Triethanolamine | 0.8 |
| Ion exchanged water | balance |

In the composition above, DPGmBE denotes a dipropylene glycol monobutyl ether.

"Determination of Amount of Monovalent Anion"

The ink prepared in Example G-5 was measured by the method described in "Measurement of Amount of Monovalent Anion" above.

The amounts of chlorine ion, bromine ion, iodine ion and nitrate ion were 500 ppm, 65 ppm, 100 ppm and 55 ppm, respectively. The total amount of monovalent anions was 720 ppm.

Example G-6

The ink composition of Example G-6 is shown below.

|  | Amount Added (%) |
| --- | --- |
| Dispersing Element G6 | 7.0 |
| Acetylenol EO | 0.5 |
| TEGmBE | 5.0 |
| 1,2-Pentanediol | 1.0 |
| Glycerin | 13.0 |
| Thiodiglycol | 2.0 |
| 2-Pyrrolidone | 2.0 |
| Triethanolamine | 0.3 |
| Ion exchanged water | balance |

In the composition above, Acetylenol EO is an acetylene glycol-base surfactant (trade name, produced by Kawaken Fine Chemicals).

"Determination of Amount of Monovalent Anion"

The ink prepared in Example G-6 was measured by the method described in "Measurement of Amount of Monovalent Anion" above.

The amounts of chlorine ion, bromine ion, iodine ion and nitrate ion were 460 ppm, 55 ppm, 80 ppm and 65 ppm, respectively. The total amount of monovalent anions was 660 ppm.

Example G-7

The ink composition of Example G-7 is shown below.

|  | Amount Added (%) |
| --- | --- |
| Dispersing Element G7 | 7.2 |
| Surfynol 465 | 0.5 |
| Surfynol 61 | 0.5 |
| TEGmBE | 6.0 |
| Glycerin | 15.0 |
| Trimethylolpropane | 1.0 |
| Trimethylolethane | 1.0 |
| Triethanolamine | 0.1 |
| NaOH | 0.05 |
| Ion exchanged water | balance |

In the composition above, Surfynol 465 is an acetylene glycol-base surfactant (trade name, produced by Air Products) and Surfynol 61 is an acetylene alcohol-base surfactant (trade name, produced by Air Products).

"Determination of Amount of Monovalent Anion"

The ink prepared in Example G-7 was measured by the method described in "Measurement of Amount of Monovalent Anion" above.

The amounts of chlorine ion, bromine ion, iodine ion and nitrate ion were 845 ppm, 60 ppm, 90 ppm and 45 ppm, respectively. The total amount of monovalent anions was 1,040 ppm.

Example G-8

The ink composition of Example G-8 is shown below.

|  | Amount Added (%) |
| --- | --- |
| Dispersing Element G8 | 10.0 |
| Surfynol 420 | 0.5 |
| PGmBE | 2.0 |
| DEGmBE | 10.0 |
| Tetrapropylene glycol | 5.0 |
| Glycerin | 7.0 |
| Diethylene glycol | 5.0 |
| Triethanolamine | 0.1 |
| KOH | 0.1 |
| Ion exchanged water | balance |

In the composition above, Surfynol 420 is an acetylene glycol-base surfactant (trade name, produced by Air Products) and PGmBE denotes a propylene glycol monobutyl ether.

"Determination of Amount of Monovalent Anion"

The ink prepared in Example G-8 was measured by the method described in "Measurement of Amount of Monovalent Anion" above.

The amounts of chlorine ion, bromine ion, iodine ion and nitrate ion were 550 ppm, 110 ppm, 75 ppm and 100 ppm, respectively. The total amount of monovalent anions was 835 ppm.

Example G-9

The ink composition of Example G-9 is shown below.

|  | Amount Added (%) |
| --- | --- |
| Dispersing Element G9 | 5.0 |
| Surfynol 485 | 1.5 |
| DEGmBE | 5.0 |
| 1,5-Pentanediol | 5.0 |
| Glycerin | 9.0 |
| 1,4-Cyclohexanedimethanol | 5.0 |
| Triethanolamine | 0.2 |
| Ion exchanged water | balance |

In the composition above, Surfynol 485 is an acetylene glycol-base surfactant (trade name, produced by Air Products).

"Determination of Amount of Monovalent Anion"

The ink prepared in Example G-9 was measured by the method described in "Measurement of Amount of Monovalent Anion" above.

The amounts of chlorine ion, bromine ion, iodine ion and nitrate ion were 950 ppm, 250 ppm, 190 ppm and 105 ppm, respectively. The total amount of monovalent anions was 1,495 ppm.

Example G-10

The ink composition of Example G-10 is shown below.

|  | Amount Added (%) |
| --- | --- |
| Dispersing Element G10 | 5.0 |
| Surfynol TG | 0.3 |
| DEGmBE | 10.0 |

-continued

| | Amount Added (%) |
|---|---|
| Dipropylene glycol | 5.0 |
| Triethanolamine | 0.9 |
| Ion exchanged water | balance |

In the composition above, Surfynol TG is an acetylene glycol-base surfactant (trade name, produced by Air Products) and DEGmBE denotes a diethylene glycol monobutyl ether.

"Determination of Amount of Monovalent Anion"

The ink prepared in Example G-10 was measured by the method described in "Measurement of Amount of Monovalent Anion" above.

The amounts of chlorine ion, bromine ion, iodine ion and nitrate ion were 630 ppm, 250 ppm, 120 ppm and 50 ppm, respectively. The total amount of monovalent anions was 1,050 ppm.

Example G-11

The ink composition of Example G-11 is shown below.

| | Amount Added (%) |
|---|---|
| Dispersing Element G11 | 4.5 |
| Olfine STG | 0.3 |
| 1,2-Hexanediol | 2.0 |
| 1,6-Hexanediol | 2.0 |
| Diethylene glycol | 7.0 |
| Thiodiglycol | 1.5 |
| Triethanolamine | 0.2 |
| Ion exchanged water | balance |

In the composition above, Olfine STG is an acetylene glycol-base surfactant (trade name, produced by Nissin Chemical Industry Co., Ltd.).

"Determination of Amount of Monovalent Anion"

The ink prepared in Example G-11 was measured by the method described in "Measurement of Amount of Monovalent Anion" above.

The amounts of chlorine ion, bromine ion, iodine ion and nitrate ion were 465 ppm, 160 ppm, 135 ppm and 80 ppm, respectively. The total amount of monovalent anions was 840 ppm.

Example G-12

The ink composition of Example G-12 is shown below.

| | Amount Added (%) |
|---|---|
| Dispersing Element G12 | 6.5 |
| Surfynol 104 | 0.1 |
| TEGmBE | 3.0 |
| 1,2-Pentanediol | 2.0 |
| 1,5-Pentanediol | 2.0 |
| Tetraethylene glycol | 9.0 |
| Dimethyl-2-imidazolidinone | 2.0 |
| Sodium benzoate | 0.1 |
| Triethanolamine | 0.5 |
| Ion exchanged water | balance |

In the composition above, Surfynol 104 is an acetylene glycol-base surfactant (trade name, produced by Air Products).

"Determination of Amount of Monovalent Anion"

The ink prepared in Example G-12 was measured by the method described in "Measurement of Amount of Monovalent Anion" above.

The amounts of chlorine ion, bromine ion, iodine ion and nitrate ion were 300 ppm, 280 ppm, 260 ppm and 75 ppm, respectively. The total amount of monovalent anions was 915 ppm.

Example G-13

The ink composition of Example G-13 is shown below.

| | Amount Added (%) |
|---|---|
| Dispersing Element G13 | 5.0 |
| Surfynol 465 | 0.5 |
| Surfynol TG | 0.1 |
| TEGmBE | 2.0 |
| 1,2-Hexanediol | 2.0 |
| Glycerin | 5.0 |
| Triethylene glycol | 5.0 |
| Trimethylolpropane | 5.0 |
| Tripropanolamine | 0.1 |
| Ion exchanged water | balance |

"Determination of Amount of Monovalent Anion"

The ink prepared in Example G-13 was measured by the method described in "Measurement of Amount of Monovalent Anion" above.

The amounts of chlorine ion, bromine ion, iodine ion and nitrate ion were 650 ppm, 80 ppm, 70 ppm and 30 ppm, respectively. The total amount of monovalent anions was 830 ppm.

Example G-14

The ink composition of Example G-14 is shown below.

| | Amount Added (%) |
|---|---|
| Dispersing Element G14 | 8.5 |
| Acetylenol EL | 0.5 |
| Acetylenol EO | 0.1 |
| TEGmBE | 6.0 |
| 1,2-Pentanediol | 1.0 |
| Glycerin | 15.0 |
| Thiodiglycol | 2.0 |
| Triethanolamine | 0.2 |
| Ion exchanged water | balance |

In the composition above, Acetylenol EL is an acetylene glycol-base surfactant (trade name, produced by Kawaken Fine Chemicals).

"Determination of Amount of Monovalent Anion"

The ink prepared in Example G-14 was measured by the method described in "Measurement of Amount of Monovalent Anion" above.

The amounts of chlorine ion, bromine ion, iodine ion and nitrate ion were 250 ppm, 190 ppm, 210 ppm and 150 ppm, respectively. The total amount of monovalent anions was 800 ppm.

Comparative Example G-1

In Comparative Example G-1, Dispersing Element G1 was used similarly to Example G-1. Furthermore, in Comparative Example G-1, the ink was prepared by using water intentionally containing a large amount of monovalent anion.

The ink composition of Comparative Example G-1 is shown below.

|  | Amount Added (%) |
|---|---|
| Dispersing Element G1 | 8.0 |
| Ethylene glycol | 5.0 |
| Glycerin | 10.0 |
| Nonionic surfactant | 1.0 |
| Monovalent metal ion-containing water | balance |

In the composition above, Epan 450 (trade name, produced by Dai-ichi Kogyo Seiyaku Co., Ltd.) was used as the nonionic surfactant.

"Determination of Amount of Monovalent Anion"

The ink prepared in Comparative Example G-1 was measured by the method described in "Measurement of Amount of Monovalent Anion" above.

The amounts of chlorine ion, bromine ion, iodine ion and nitrate ion were 1,250 ppm, 640 ppm, 590 ppm and 530 ppm, respectively. The total amount of monovalent anions was 3,010 ppm.

Comparative Example G-2

In Comparative Example G-2, MA88 (produced by Mitsubishi Chemical Corporation) which is a carbon black pigment was used similarly to Example G-1 and dispersed by using Solsperse 27000 (produced by Avecia Limited) as a dispersant.

15 Parts of MA88, 5 parts of Solsperse 27000 (produced by Avecia Limited), 5 parts of diethanolamine, 0.5 parts of 2-propanol and 74.5 parts of ion exchanged water were dispersed in a bead mill MINIZETOR (manufactured by Ajisawa) for 2 hours to obtain Dispersion G15 for use in Comparative Example G-2.

The ink composition of Comparative Example G-2 is shown below.

|  | Amount Added (%) |
|---|---|
| Dispersion G15 <120> | 7.0 |
| Glycerin | 15.0 |
| Dispersant | 3.0 |
| Nonionic surfactant | 1.0 |
| Ion exchanged water | balance |

In the composition above, Noigen EA160 (trade name, produced by Dai-ichi Kogyo Seiyaku Co., Ltd.) was used as the nonionic surfactant.

"Determination of Amount of Monovalent Anion"

The ink prepared in Comparative Example G-2 was measured by the method described in "Measurement of Amount of Monovalent Anion" above.

The amounts of chlorine ion, bromine ion, iodine ion and nitrate ion were 660 ppm, 190 ppm, 120 ppm and 80 ppm, respectively. The total amount of monovalent anions was 1,050 ppm.

The inks of Examples G-1 to G-14 and Comparative Examples G-1 and G-2 each was subjected to the printing evaluation. The printing evaluation was performed by using an inkjet printer PM-900C (manufactured by Seiko Epson Corporation) which ejects an ink by an inkjet head using a piezoelectric element. The papers used in this evaluation were Conqueror, Favorit, Modo Copy, Rapid Copy, EPSON EPP, Xerox 4024, Xerox 10, Neenha Bond, Ricopy 6200, Yamayuri and Xerox R which are plain papers commercially available in Europe, USA and Japan.

In Table 31, the evaluation results of blurring when a letter was printed are shown as the printing evaluation results. In Table 31, A denotes "very good", B denotes "good", C denotes "bad" and D denotes "very bad"

TABLE 31

Printing Evaluation Results of Ink

| Species of Paper | Example G | | | | | | | | | | | | | | Comparative Example G | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 |
| Conqueror | A | A | A | A | A | A | A | A | A | A | A | A | A | A | D | D |
| Favorit | A | A | A | A | A | A | A | A | A | A | A | A | A | A | D | D |
| Modo Copy | A | A | A | A | A | A | A | A | A | A | A | A | A | A | D | D |
| Rapid Copy | A | A | A | A | A | A | A | A | A | A | A | A | A | A | D | D |
| EPSON EPP | A | A | A | A | A | A | A | A | A | A | A | A | A | A | C | C |
| Xerox P | A | A | A | A | A | A | A | A | A | A | A | A | A | A | C | C |
| Xerox 4024 | A | A | A | A | A | A | A | A | A | A | A | A | A | A | D | D |
| Xerox 10 | A | A | A | A | A | A | A | A | A | A | A | A | A | A | C | D |
| Neenha Bond | A | A | A | A | A | A | A | A | A | A | A | A | A | A | C | D |
| Ricopy 6200 | A | A | A | A | A | A | A | A | A | A | A | A | A | A | D | C |
| Yamayuri | A | A | A | B | A | A | A | A | A | A | A | A | A | A | D | D |
| Xerox R | A | A | A | A | A | A | A | A | A | A | A | A | A | A | D | D |

As apparent from the results in Table 30, the printing quality is bad when the ink of Comparative Example is used, and the printing quality is good when the ink for inkjet recording of the present invention is used.

As verified above, the present invention can provide an ink for inkjet recording, which is reduced in blurring for a material on which a printed image is recorded, such as paper, and ensures high quality and high practicability.

Also, the inks of Examples G-1 to G-14 and Comparative Examples G-1 and G-2 were evaluated on the storage stability and the ejection stability.

In the evaluation of storage stability, each ink was charged into a sampling vial and after tightly plugging the vial, left standing at 60° C. for one week or at −20° C. for one week. The foreign matters generated and physical values (viscosity, surface tension) of the ink were examined before and after the ink was left standing.

The amount of foreign matters generated shows a value of amount of foreign matters after standing/initial amount of foreign matters, the viscosity shows a value of viscosity after standing/initial viscosity, and the surface tension shows a value of surface tension after standing/initial surface tension.

The ejection stability was evaluated by using an inkjet printer PM-900C manufactured by Seiko Epson Corporation and rated A when printing disorder was not generated at all even in continuous printing of 200 pages on A4-size Xerox P, rated B when printing disorder was generated at less than 10 portions, rated C when printing disorder was generated at 10 to less than 100 portions, and rated D when printing disorder was generated at 100 or more portions.

The results in the determination of amount of monovalent anion, in the evaluation of storage stability and in the evaluation of ejection stability of each ink of Examples G-1 to G-14 and Comparative Examples G-1 and G-2 are shown in Table 32.

(Measuring Methods of Amount of Aromatic Ring, Pigment/Polymer Ratio, Average Particle Size, Amount of Free Polymer and Surface Tension)

The measured values (amount of aromatic ring, pigment/polymer ratio, average particle size, amount of free polymer and surface tension) obtained in these Examples each was measured by the following method.

"Measurement of Amount of Aromatic Ring"

A part of each dispersing polymer solution obtained in Examples and Comparative Examples was taken out, then only the polymer component was taken out by distilling off the solvent components and dissolved in DMSO-$d_6$, and the amount of aromatic ring in the polymer was measured by using $^{13}$C-NMR and $^1$H-NMR (AMX400, manufactured by Bruker (Germany)).

"Measurement of Pigment/Polymer Ratio"

A part of each dispersion obtained in Examples and Comparative Examples was taken out and after precipitating only

TABLE 32

Amount of Monovalent Anion in Ink and Evaluation Results of Stability (Storage Stability, Ejection Stability)

| | Example G | | | | | | | | | | | | | | Comparative Example G | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 |
| Amount of monovalent anion (ppm) | | | | | | | | | | | | | | | | |
| Cl- | 600 | 735 | 490 | 680 | 500 | 460 | 845 | 550 | 950 | 630 | 465 | 300 | 650 | 250 | 1250 | 660 |
| Br- | 100 | 90 | 80 | 190 | 65 | 55 | 60 | 110 | 250 | 250 | 160 | 280 | 80 | 190 | 640 | 190 |
| I- | 115 | 160 | 40 | 150 | 100 | 80 | 90 | 75 | 190 | 120 | 135 | 260 | 70 | 210 | 590 | 120 |
| $NO_3$- | 40 | 30 | 140 | 90 | 55 | 65 | 45 | 100 | 105 | 50 | 80 | 75 | 30 | 150 | 530 | 80 |
| Total | 855 | 1015 | 750 | 1110 | 720 | 660 | 1040 | 835 | 1495 | 1050 | 840 | 915 | 830 | 800 | 3010 | 1050 |
| Foreign matters | 1.1 | 1.2 | 1.2 | 1.3 | 1.1 | 1.1 | 1.1 | 1.2 | 1.4 | 1.2 | 1.1 | 1.1 | 1.1 | 1.1 | 4.5 | 7.5 |
| Viscosity | 1.1 | 1.3 | 1.2 | 1.3 | 1.1 | 1.0 | 1.1 | 1.1 | 1.3 | 1.1 | 1.1 | 1.1 | 1.2 | 1.1 | 11 | 18 |
| Surface tension | 1.0 | 1.1 | 1.0 | 1.1 | 1.0 | 1.0 | 1.1 | 1.0 | 1.1 | 1.0 | 1.0 | 1.0 | 1.0 | 1.1 | 1.4 | 1.6 |
| Ejection stability | A | A | A | A | A | A | A | A | B | A | A | A | A | A | C | D |

As seen from the results in Tables 31 and 32, the aqueous ink prepared by using the dispersing element of the present invention exhibits good printing quality, excellent ejection stability and high storage stability and can be an ink suitable for inkjet recording. Furthermore, this ink can be suitably used for an inkjet head using a piezoelectric element as in Examples above. Also, a pigment is used and this provides an effect of giving a printed matter more excellent in the water resistance than those obtained by using a normal dye. In addition, the function of the polymer encapsulating the colorant can be freely changed by the polymerizing monomer or other reactive agents and this provides an effect that a variety of functions (e.g., light fastness, gas resistance, colorability, glossiness, fixing property) can be imparted. In the case of using a normal dispersant as in conventional techniques, the adsorptive strength of the dispersant adsorbing to the pigment is fundamentally weak and the dispersant is partially desorbed. Due to the resultant desorbed material or the dispersant not adsorbed, the viscosity increases and therefore, the amount of colorant added is limited, as a result, a sufficiently high color formation can be hardly obtained.

Example H

The preferred embodiment (h) of the present invention is described below by referring to Examples, however, the scope of the present invention is not limited to these Examples.

the dispersing element with an acid by adding HCl in a concentration of 0.1 mol/liter, measured on the dry weight. Then, only the dispersing polymer was taken out by a Soxhlet extraction method using acetone and measured on the dry weight. From the obtained values, the weight ratio of pigment/polymer was calculated.

"Measurement of Average Particle Size"

The aqueous inks obtained in Examples and Comparative Examples each was diluted with ion exchanged water to have a dispersing element concentration of 0.001 to 0.01 wt % (because the optimal concentration at the measurement slightly differs depending on the ink) and the average particle size of dispersed particles at 20° C. was measured by a particle size distribution meter (ELS-800, manufactured by Otsuka Electronics Co., Ltd.).

"Measurement of Amount of Free Polymer"

A necessary amount of each aqueous ink obtained in Examples and Comparative Examples was taken out and the solid contents in the ink, such as dispersing element, were precipitated as the precipitated component by centrifugal acceleration (conditions: 2,500 G×60 minutes).

Then, the liquid component of ink obtained as the supernatant component was heated under reduced pressure to vaporize the solvent components, the weight of free polymer present in the liquid component was measured, and the amount of free polymer based on the entire weight of ink was determined.

"Measurement of Surface Tension"

The aqueous inks obtained in Examples and Comparative Examples each was measured on the surface tension at 20° C. by a surface tension balance (CBVP-A3, manufactured by Kyowa Interface Science Co., Ltd.).

Example H-1

(1) Production of Dispersion

Dispersion H1

For the production of Dispersion H1 used in Example H-1, Color Black FW18 (produced by Degussa), which is an inorganic pigment and a carbon black pigment, was used.

A reaction vessel equipped with a stirrer, a thermometer, a reflux tube and a dropping funnel was purged with nitrogen and thereinto, 15 parts of methyl ethyl ketone, 21 parts of styrene, 5 parts of α-methylstyrene, 16 parts of butyl methacrylate, 10 parts of lauryl methacrylate, 2 parts of acrylic acid and 0.3 parts of tert-dodecylmercaptan were charged and heated at 70° C. Thereafter, separately prepared 100 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer.

Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 58%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was repeatedly subjected to separation by filtration and washing by using a Buechner funnel. To the pigment-including resin dispersing element separated by filtration, ion exchanged water and an aqueous sodium hydroxide solution as a neutralizer were appropriately added with stirring to adjust the pH to 7.5 and then the resulting solution was filtered through a membrane filter having an average pore size of 5 mm to obtain Dispersion H1 containing 20% of Dispersing Element H1 (dispersing element where the carbon black pigment is encapsulated with the polymer having an aromatic ring amount of 58%).

TABLE 32

Amount of Monovalent Anion in Ink and Evaluation Results of Stability (Storage Stability, Ejection Stability)

| | Example G | | | | | | | | | Example G | | | | | Comparative Example G | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 |
| Amount of monovalent anion (ppm) | | | | | | | | | | | | | | | | |
| $Cl^-$ | 600 | 735 | 490 | 680 | 500 | 460 | 845 | 550 | 950 | 630 | 465 | 300 | 650 | 250 | 1250 | 660 |
| $Br^-$ | 100 | 90 | 80 | 190 | 65 | 55 | 60 | 110 | 250 | 250 | 160 | 280 | 80 | 190 | 640 | 190 |
| $I^-$ | 115 | 160 | 40 | 150 | 100 | 80 | 90 | 75 | 190 | 120 | 135 | 260 | 70 | 210 | 590 | 120 |
| $NO_3^-$ | 40 | 30 | 140 | 90 | 55 | 65 | 45 | 100 | 105 | 50 | 80 | 75 | 30 | 150 | 530 | 80 |
| Total | 855 | 1015 | 750 | 1110 | 720 | 660 | 1040 | 835 | 1495 | 1050 | 840 | 915 | 830 | 800 | 3010 | 1050 |
| Foreign matters | 1.1 | 1.2 | 1.2 | 1.3 | 1.1 | 1.1 | 1.1 | 1.2 | 1.4 | 1.2 | 1.1 | 1.1 | 1.1 | 1.1 | 4.5 | 7.5 |
| Viscosity | 1.1 | 1.3 | 1.2 | 1.3 | 1.1 | 1.0 | 1.1 | 1.1 | 1.3 | 1.1 | 1.1 | 1.1 | 1.2 | 1.1 | 11 | 18 |
| Surface tension | 1.0 | 1.1 | 1.0 | 1.1 | 1.0 | 1.0 | 1.1 | 1.0 | 1.1 | 1.0 | 1.0 | 1.0 | 1.0 | 1.1 | 1.4 | 1.6 |
| Ejection stability | A | A | A | A | A | A | A | A | B | A | A | A | A | A | C | D |

(2) Preparation of Ink

In Example H-1, Dispersion H1 obtained in Example H-1 (1) above, Olfine E1010 (produced by Nissin Chemical Industry Co., Ltd.) as an acetylene glycol-base surfactant, diethylene glycol monobutyl ether as an alkylene glycol monoalkyl ether, and 1,2-pentanediol as a 1,2-alkylene glycol were used. The specific composition is shown below.

Incidentally, in the preparation of ink, Dispersion H1 was added to have a Dispersing Element H1 content of 8.0%. The value in < > shows an average particle size (unit: nm) of Dispersing Element H1 measured by the method described in "Measurement of Average Particle Size" above.

Also, the ion exchanged water added as "balance" in the ink composition of Example H-1 shown below was ion exchanged water where Proxel XL-2 for preventing septic activity of the aqueous ink, benzotriazole for preventing corrosion of an aqueous inkjet head member and EDTA 2Na salt for reducing the effect of metal ion in the aqueous ink system were added to a concentration of 0.01%, 0.01% and 0.02%, respectively, based on the entire weight of the ink.

| | |
|---|---|
| Dispersing Element H1 <120> | 8.0% |
| Olfine E1010 | 0.5% |
| Diethylene glycol monobutyl ether | 3.0% |
| 1,2-Pentanediol | 2.5% |
| Diethylene glycol | 3.0% |
| Glycerin | 11.5% |
| Trimethylolpropane | 6.0% |
| Tripropanolamine | 0.3% |
| Ion exchanged water | balance |

(3) Measurement of Amount of Free Polymer

The ink prepared in Example H-1(2) was measured by the method described in "Measurement of Amount of Free Polymer" above, as a result, the amount of free polymer based on the entire weight of ink was 1.18%.

(4) Printing Evaluation

In the printed image evaluation, the ink prepared in Example H-1(2) was evaluated on the printing quality by using an aqueous inkjet printer PM-950C (manufactured by Seiko Epson Corporation) which ejects an ink by an inkjet head using a piezoelectric element.

As for the paper used for evaluation, (a) Conqueror, (b) Reymat, (c) Mode Copy, (d) Rapid Copy, (e) Xerox P, (f) Xerox 4024, (g) Xerox 10, (h) Neenha Bond, (i) Ricopy 6200 and (j) Hammer mill Copy Plus which are plain papers commercially available in Europe, USA and Japan were used.

The evaluation was performed with an eye according to the following criteria.

A: No blurring was observed in letters of all points.
B: Blurring was slightly observed in letters of 5 point or less (practicable level).
C: Letters of 5 point or less were seen thickened due to blurring.
D: Blurring was serious and letters of 5 point or less could not be made out.

The evaluation results are shown in Table 34.

(5) Evaluation of Ejection Stability

A continuous printing of 200 pages was performed on A4-size Xerox P by using the same printer and ink as in Example H-1(4) above and the ejection stability was evaluated by observing the printing disorder.

The evaluation was performed with an eye according to the following criteria.

A: Printing disorder was not generated at all.
B: Printing disorder was generated but at less than 10 portions (practicable level).
C: Printing disorder was generated at 10 to less than 100 portions.
D: Printing disorder was generated at 100 or more portions.

The evaluation results of ejection stability are shown in Table 35.

(6) Evaluation of Storage Stability

The ink prepared in Example H-1(2) above was charged into a vial and after tightly plugging the vial, left standing at 60° C. for one week or at −20° C. for one week. The foreign matters generated and the change in physical values (viscosity, surface tension) of ink before and after standing were evaluated.

The evaluation was performed according to the following criteria.

A: The ratio of the amount of foreign matters generated and physical values after standing at 60° C. or −20° C. to those before standing was in the range from 0.99 to 1.01.
B: The ratio was from 0.95 to 0.99 or from 1.01 to 1.05 (practicable level).
C: The ratio was from 0.90 to 0.95 or from 1.05 to 1.10.
D: The ratio was less than 0.90 or more than 1.10.

The evaluation results of storage stability are shown in Table 34.

Example H-2

(1) Production of Dispersion

Dispersion H2

For the production of Dispersion H2 used in Example H-2, an insoluble monoazo yellow pigment (C.I. Pigment Yellow 74) which is an organic pigment was used.

A reaction vessel equipped with a stirrer, a thermometer, a reflux tube and a dropping funnel was purged with nitrogen and thereinto, 12 parts of styrene, 9 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 3 parts of methacrylic acid, 5 parts of methyl ethyl ketone and 0.3 parts of mercaptoethanol were charged and heated at 70° C. Thereafter, separately prepared 25 parts of styrene, 30 parts of lauryl methacrylate, 15 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 10 parts of methacrylic acid, 20 parts of methyl ethyl ketone and 1.0 part of mercaptoethanol were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 26%.

40 Parts of the dispersing polymer solution obtained above, 30 parts of an insoluble monoazo yellow pigment (C.I. Pigment Yellow 74) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion H2 containing 20% of Dispersing Element H2 (dispersing element where the insoluble monoazo yellow pigment is encapsulated with the polymer having an aromatic ring amount of 26%).

In Table 32, the pigment used in Dispersion H2, the amount of aromatic ring in the dispersing polymer and the pigment/polymer ratio are shown. The amount of aromatic ring in the polymer and the pigment/polymer ratio were measured, similarly to Example H-1 (1), by the methods described in "Measurement of Amount of Aromatic Ring" and "Measurement of Pigment/Polymer Ratio" above.

(2) Preparation of Ink

In Example H-2, Dispersion H2 obtained in Example H-2 (1) above, Surfynol 440 (produced by Air Products) and Olfine STG (produced by Nissin Chemical Industry Co., Ltd.) as acetylene glycol-base surfactants, triethylene glycol monobutyl ether as an alkylene glycol monoalkyl ether, and 1,2-pentanediol as a 1,2-alkylene glycol were used. The specific composition is shown below.

Incidentally, in the preparation of ink, Dispersion H2 was added to have a Dispersing Element H2 content of 7.0%. The value in < > shows an average particle size (unit: nm) of Dispersing Element H2 measured by the method described in "Measurement of Average Particle Size" above.

Also, the ion exchanged water added as "balance" in the ink composition of Example H-2 shown below was, similarly to Example H-1 (2), ion exchanged water where 0.01% of Proxel XL-2, 0.01% of benzotriazole and 0.02% of EDTA 2Na salt were added based on the entire weight of the ink.

| | |
|---|---|
| Dispersing Element H2 <120> | 7.0% |
| Surfynol 440 | 0.2% |
| Olfine STG | 0.2% |
| Triethylene glycol monobutyl ether | 3.0% |
| 1,2-Pentanediol | 2.0% |
| 2-Pyrrolidone | 3.0% |
| Glycerin | 13.5% |
| Trimethylolethane | 5.0% |
| Triethanolamine | 0.1% |
| Ion exchanged water | balance |

(3) Measurement of Amount of Free Polymer

The ink prepared in Example H-2 (2) above was measured by the method described in "Measurement of Amount of Free Polymer" above, as a result, the amount of free polymer based on the entire weight of ink was 0.48%.

(4) Printing Evaluation

The ink prepared in Example H-2(2) was subjected to printing evaluation according to the same evaluation criteria as in Example H-1 (4) by using the same inkjet printer PM-950C (manufactured by Seiko Epson Corporation) as in Example H-1 (4) and using the same evaluation paper as in Example H-1 (4). The printing evaluation results are shown in Table 34.

(5) Evaluation of Ejection Stability

The ejection stability was evaluated by the same evaluation method as in Example H-1 (5) using the same printer and ink as in Example H-2(4) according to the same evaluation criteria as in Example H-1 (5). The evaluation results of ejection stability are shown in Table 35.

(6) Evaluation of Storage Stability

The ink prepared in Example H-2(2) above was evaluated on the storage stability by the same evaluation method as in Example H-1 (6) according to the same evaluation criteria as in Example H-1 (6). The evaluation results of storage stability are shown in Table 34.

Example H-3

(1) Production of Dispersion

Dispersion H3

For the production of Dispersion H3 used in Example H-3, a quinacridone red pigment (C.I. Pigment Red 122) which is an organic pigment was used.

A reaction vessel equipped with a stirrer, a thermometer, a reflux tube and a dropping funnel was purged with nitrogen and thereinto, 12 parts of styrene, 6 parts of styrene macromer (AS-6, produced by Toagosei Chemical Industry Co., Ltd.), 3.5 parts of n-dodecyl methacrylate, 12 parts of N,N-dimethylaminoethyl methacrylate, 25 parts of methoxypolyethylene glycol methacrylate (NK Ester M40G, produced by Shin-Nakamura Chemical Co., Ltd.), 5 parts of methyl ethyl ketone and 0.3 parts of mercaptoethanol were charged and heated at 70° C. Thereafter, separately prepared 15 parts of styrene, 8 parts of styrene macromer (AS-6, produced by Toagosei Chemical Industry Co., Ltd.), 7 parts of n-dodecyl methacrylate, 20 parts of N,N-dimethylaminoethyl methacrylate, 30 parts of methoxypolyethylene glycol methacrylate (NK Ester M40G, produced by Shin-Nakamura Chemical Co., Ltd.), 50 parts of methyl ethyl ketone and 1.5 parts of azobisisobutyronitrile were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 36%.

40 Parts of the dispersing polymer solution obtained above, 25 parts of a quinacridone red pigment (C.I. Pigment Red 122) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion H3 containing 20% of Dispersing Element H3 (dispersing element where the quinacridone red pigment is encapsulated with the polymer having an aromatic ring amount of 36%).

In Table 32, the pigment used in Dispersion H3, the amount of aromatic ring in the dispersing polymer and the pigment/polymer ratio are shown. The amount of aromatic ring in the polymer and the pigment/polymer ratio were measured, similarly to Example H-1 (1), by the methods described in "Measurement of Amount of Aromatic Ring" and "Measurement of Pigment/Polymer Ratio" above.

(2) Preparation of Ink

In Example H-3, Dispersion H3 obtained in Example H-3 (1) above, Olfine E1010 (produced by Nissin Chemical Industry Co., Ltd.) and Surfynol 104PG50 (produced by Air Products) as acetylene glycol-base surfactants, triethylene glycol monobutyl ether as an alkylene glycol monoalkyl ether, and 1,2-hexanediol as a 1,2-alkylene glycol were used. The specific composition is shown below.

Incidentally, in the preparation of ink, Dispersion H3 was added to have a Dispersing Element H3 content of 7.5%. The value in < > shows an average particle size (unit: nm) of Dispersing Element H3 measured by the method described in "Measurement of Average Particle Size" above.

Also, the ion exchanged water added as "balance" in the ink composition of Example H-3 shown below was, similarly to Example H-1 (2), ion exchanged water where 0.01% of Proxel XL-2, 0.01% of benzotriazole and 0.02% of EDTA 2Na salt were added based on the entire weight of the ink.

| | |
|---|---|
| Dispersing Element H3 <140> | 7.5% |
| Olfine E1010 | 0.1% |
| Surfynol 104PG50 | 0.4% |
| Triethylene glycol monobutyl ether | 1.0% |
| 1,2-Hexanediol | 2.5% |
| Triethylene glycol | 2.0% |
| 2-Pyrrolidone | 4.0% |
| Glycerin | 13.8% |
| Trimethylolpropane | 6.0% |
| Ion exchanged water | balance |

(3) Measurement of Amount of Free Polymer

The ink prepared in Example H-3(2) above was measured by the method described in "Measurement of Amount of Free Polymer" above, as a result, the amount of free polymer based on the entire weight of ink was 0.63%.

(4) Printing Evaluation

The ink prepared in Example H-3(2) was subjected to printing evaluation according to the same evaluation criteria as in Example H-1 (4) by using the same inkjet printer PM-950C (manufactured by Seiko Epson Corporation) as in Example H-1 (4) and using the same evaluation paper as in Example H-1 (4). The printing evaluation results are shown in Table 34.

(5) Evaluation of Ejection Stability

The ejection stability was evaluated by the same evaluation method as in Example H-1 (5) using the same printer and ink as in Example H-3(4) according to the same evaluation criteria as in Example H-1 (5). The evaluation results of ejection stability are shown in Table 35.

(6) Evaluation of Storage Stability

The ink prepared in Example H-3(2) above was evaluated on the storage stability by the same evaluation method as in Example H-1 (6) according to the same evaluation criteria as in Example H-1 (6). The evaluation results of storage stability are shown in Table 35.

Example H-4

(1) Production of Dispersion

Dispersion H4

For the production of Dispersion H4 used in Example H-4, a phthalocyanine blue pigment (C.I. Pigment Blue 15:4) which is an organic pigment was used.

A reaction vessel equipped with a stirrer, a thermometer, a reflux tube and a dropping funnel was purged with nitrogen and thereinto, 20 parts of styrene, 9 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 10 parts of styrene macromer (AS-6, produced by Toagosei Chemical Industry Co., Ltd.), 5 parts of methacrylic acid, 5 parts of methyl ethyl ketone and 0.3 parts of n-dodecylmercaptan were charged and heated at 70° C. Thereafter, separately prepared 25 parts of styrene, 30 parts of lauryl methacrylate, 20 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 15 parts of styrene macromer (AS-6, produced by Toagosei Chemical Industry Co., Ltd.), 5 parts of methacrylic acid, 20 parts of methyl ethyl ketone and 1.5 parts of n-dodecylmercaptan were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 49%.

40 Parts of the dispersing polymer solution obtained above, 40 parts of a phthalocyanine blue pigment (C.I. Pigment Blue 15:4) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion H4 containing 20% of Dispersing Element H4 (dispersing element where the phthalocyanine blue pigment is encapsulated with the polymer having an aromatic ring amount of 46%).

In Table 32, the pigment used in Dispersion H4, the amount of aromatic ring in the dispersing polymer and the pigment/polymer ratio are shown. The amount of aromatic ring in the polymer and the pigment/polymer ratio were measured, similarly to Example H-1 (1), by the methods described in "Measurement of Amount of Aromatic Ring" and "Measurement of Pigment/Polymer Ratio" above.

(2) Preparation of Ink

In Example H-4, Dispersion H4 obtained in Example H-4 (1) above, Acetylenol E100 (produced by Kawaken Fine Chemicals) as an acetylene glycol-base surfactant, propylene glycol monobutyl ether as an alkylene glycol monoalkyl ether, and 1,2-hexanediol as a 1,2-alkylene glycol were used. The specific composition is shown below.

Incidentally, in the preparation of ink, Dispersion H4 was added to have a Dispersing Element H4 content of 8.0%. The value in < > shows an average particle size (unit: nm) of Dispersing Element H4 measured by the method described in "Measurement of Average Particle Size" above.

Also, the ion exchanged water added as "balance" in the ink composition of Example H-4 shown below was, similarly to Example H-1 (2), ion exchanged water where 0.01% of Proxel XL-2, 0.01% of benzotriazole and 0.02% of EDTA 2Na salt were added based on the entire weight of the ink.

| | |
|---|---|
| Dispersing Element H4 <100> | 8.0% |
| Acetylenol E100 | 0.5% |
| Propylene glycol monobutyl ether | 3.0% |
| 1,2-Hexanediol | 1.0% |
| Triethylene glycol | 3.0% |
| Glycerin | 13.8% |
| Trimethylolpropane | 5.2% |
| Tripropanolamine | 0.2% |
| Ion exchanged water | balance |

(3) Measurement of Amount of Free Polymer

The ink prepared in Example H-4(2) above was measured by the method described in "Measurement of Amount of Free Polymer" above, as a result, the amount of free polymer based on the entire weight of ink was 0.54%.

(4) Printing Evaluation

The ink prepared in Example H-4(2) was subjected to printing evaluation according to the same evaluation criteria as in Example H-1 (4) by using the same inkjet printer PM-950C (manufactured by Seiko Epson Corporation) as in Example H-1 (4) and using the same evaluation paper as in Example H-1 (4). The printing evaluation results are shown in Table 34.

(5) Evaluation of Ejection Stability

The ejection stability was evaluated by the same evaluation method as in Example H-1 (5) using the same printer and ink as in Example H-4(4) according to the same evaluation criteria as in Example H-1 (5). The evaluation results of ejection stability are shown in Table 35.

(6) Evaluation of Storage Stability

The ink prepared in Example H-4(2) above was evaluated on the storage stability by the same evaluation method as in Example H-1 (6) according to the same evaluation criteria as in Example H-1 (6). The evaluation results of storage stability are shown in Table 35.

Example H-5

(1) Production of Dispersion

Dispersion H5

For the production of Dispersion H5 used in Example H-5, a perynone orange pigment (C.I. Pigment Orange 43) was used. Except for this, Dispersion H5 containing 20% of Dispersing Element H5 (dispersing element where the perynone orange pigment is encapsulated with a polymer having an aromatic ring amount of 44%) was obtained in the same manner as in Example H-1 (1).

In Table 32, the pigment used in Dispersion H5, the amount of aromatic ring in the dispersing polymer and the pigment/polymer ratio are shown. The amount of aromatic ring in the polymer and the pigment/polymer ratio were measured, similarly to Example H-1 (1), by the methods described in "Measurement of Amount of Aromatic Ring" and "Measurement of Pigment/Polymer Ratio" above.

(2) Preparation of Ink

In Example H-5, Dispersion H5 obtained in Example H-5 (1) above, Surfynol 485 and Surfynol TG (both produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of ink, Dispersion H5 was added to have a Dispersing Element H5 content of 10.0%. The value in < > shows an average particle size (unit: nm) of Dispersing Element H5 measured by the method described in "Measurement of Average Particle Size" above.

Also, the ion exchanged water added as "balance" in the ink composition of Example H-5 shown below was, similarly to Example H-1 (2), ion exchanged water where 0.01% of Proxel XL-2, 0.01% of benzotriazole and 0.02% of EDTA 2Na salt were added based on the entire weight of the ink.

| | |
|---|---|
| Dispersing Element H5 <150> | 10.0% |
| Surfynol 485 | 0.5% |
| Surfynol TG | 0.2% |
| Dipropylene glycol monobutyl ether | 2.0% |

-continued

| | |
|---|---|
| 1,2-Pentanediol | 2.0% |
| N-Methyl-2-pyrrolidone | 5.0% |
| Glycerin | 11.2% |
| Trehalose | 5.8% |
| Ion exchanged water | balance |

(3) Measurement of Amount of Free Polymer

The ink prepared in Example H-5(2) above was measured by the method described in "Measurement of Amount of Free Polymer" above, as a result, the amount of free polymer based on the entire weight of ink was 1.62%.

(4) Printing Evaluation

The ink prepared in Example H-5(2) was subjected to printing evaluation according to the same evaluation criteria as in Example H-1 (4) by using the same inkjet printer PM-950C (manufactured by Seiko Epson Corporation) as in Example H-1 (4) and using the same evaluation paper as in Example H-1 (4). The printing evaluation results are shown in Table 34.

(5) Evaluation of Ejection Stability

The ejection stability was evaluated by the same evaluation method as in Example H-1(5) using the same printer and ink as in Example H-5(4) according to the same evaluation criteria as in Example H-1 (5). The evaluation results of ejection stability are shown in Table 35.

(6) Evaluation of Storage Stability

The ink prepared in Example H-5(2) above was evaluated on the storage stability by the same evaluation method as in Example H-1 (6) according to the same evaluation criteria as in Example H-1 (6). The evaluation results of storage stability are shown in Table 35.

Example H-6

(1) Production of Dispersion

Dispersion H6

For the production of Dispersion H6 used in Example H-6, a benzimidazolone brown pigment (C.I. Pigment Brown 32) was used. Except for this, Dispersion H6 containing 20% of Dispersing Element H6 (dispersing element where the benzimidazolone brown pigment is encapsulated with a polymer having an aromatic ring amount of 70%) was obtained in the same manner as in Example H-1 (1).

In Table 32, the pigment used in Dispersion H6, the amount of aromatic ring in the dispersing polymer and the pigment/polymer ratio are shown. The amount of aromatic ring in the polymer and the pigment/polymer ratio were measured, similarly to Example H-1 (1), by the methods described in "Measurement of Amount of Aromatic Ring" and "Measurement of Pigment/Polymer Ratio" above.

(2) Preparation of Ink

In Example H-6, Dispersion H6 obtained in Example H-6 (1) above, Surfynol 420 as an acetylene glycol-base surfactant, and diethylene glycol monobutyl ether as an alkylene glycol monoalkyl ether were used. The specific composition is shown below.

Incidentally, in the preparation of ink, Dispersion H6 was added to have a Dispersing Element H6 content of 5.0%. The value in < > shows an average particle size (unit: nm) of Dispersing Element H6 measured by the method described in "Measurement of Average Particle Size" above.

Also, the ion exchanged water added as "balance" in the ink composition of Example H-6 shown below was, similarly to Example H-1 (2), ion exchanged water where 0.01% of Proxel XL-2, 0.01% of benzotriazole and 0.02% of EDTA 2Na salt were added based on the entire weight of the ink.

| | |
|---|---|
| Dispersing Element H6 <140> | 5.0% |
| Surfynol 420 | 0.1% |
| Diethylene glycol monobutyl ether | 3.0% |
| 1,6-Hexanediol | 2.0% |
| Tetraethylene glycol | 5.5% |
| Glycerin | 13.5% |
| Triethanolamine | 0.5% |
| Ion exchanged water | balance |

The ink prepared in Example H-6(2) above was measured by the method described in "Measurement of Amount of Free Polymer" above, as a result, the amount of free polymer based on the entire weight of ink was 1.98%.

(4) Printing Evaluation

The ink prepared in Example H-6(2) was subjected to printing evaluation according to the same evaluation criteria as in Example H-1 (4) by using the same inkjet printer PM-950C (manufactured by Seiko Epson Corporation) as in Example H-1 (4) and using the same evaluation paper as in Example H-1 (4). The printing evaluation results are shown in Table 34.

(5) Evaluation of Ejection Stability

The ejection stability was evaluated by the same evaluation method as in Example H-1 (5) using the same printer and ink as in Example H-6(4) according to the same evaluation criteria as in Example H-1 (5). The evaluation results of ejection stability are shown in Table 35.

(6) Evaluation of Storage Stability

The ink prepared in Example H-6(2) above was evaluated on the storage stability by the same evaluation method as in Example H-1 (6) according to the same evaluation criteria as in Example H-1 (6). The evaluation results of storage stability are shown in Table 35.

Example H-7

(1) Production of Dispersion

Dispersion H7

For the production of Dispersion H7 used in Example H-7, a quinacridone violet pigment (C.I. Pigment Violet 19) which is an organic pigment was used. Except for this, Dispersion H7 containing 20% of Dispersing Element H7 (dispersing element where the quinacridone violet pigment is encapsulated with a polymer having an aromatic ring amount of 52%) was obtained in the same manner as in Example H-2(1).

In Table 32, the pigment used in Dispersion H7, the amount of aromatic ring in the dispersing polymer and the pigment/polymer ratio are shown. The amount of aromatic ring in the polymer and the pigment/polymer ratio were measured, similarly to Example H-1 (1), by the methods described in "Measurement of Amount of Aromatic Ring" and "Measurement of Pigment/Polymer Ratio" above.

(2) Preparation of Ink

In Example H-7, Dispersion H7 obtained in Example H-7 (1) above, Surfynol 61 as acetylene alcohol-base surfactant and Surfynol TG (both produced by Air Products), triethylene glycol monobutyl ether as an alkylene glycol monoalkyl ether, and 1,2-pentanediol as a 1,2-alkylene glycol were used. The specific composition is shown below.

Incidentally, in the preparation of ink, Dispersion H7 was added to have a Dispersing Element H7 content of 6.0%. The value in < > shows an average particle size (unit: nm) of Dispersing Element H7 measured by the method described in "Measurement of Average Particle Size" above.

Also, the ion exchanged water added as "balance" in the ink composition of Example H-7 shown below was, similarly to Example H-1 (2), ion exchanged water where 0.01% of Proxel XL-2, 0.01% of benzotriazole and 0.02% of EDTA 2Na salt were added based on the entire weight of the ink.

| | |
|---|---|
| Dispersing Element H7 <120> | 6.0% |
| Surfynol 61 | 0.3% |
| Surfynol TG | 0.1% |
| Triethylene glycol monobutyl ether | 1.5% |
| 1,2-Pentanediol | 2.0% |
| Diethylene glycol | 2.0% |
| Thiodiglycol | 4.0% |
| Glycerin | 12.6% |
| Trimethylolethane | 7.2% |
| Ion exchanged water | balance |

(3) Measurement of Amount of Free Polymer

The ink prepared in Example H-7(2) above was measured by the method described in "Measurement of Amount of Free Polymer" above, as a result, the amount of free polymer based on the entire weight of ink was 0.39%.

(4) Printing Evaluation

The ink prepared in Example H-7(2) was subjected to printing evaluation according to the same evaluation criteria as in Example H-1 (4) by using the same inkjet printer PM-950C (manufactured by Seiko Epson Corporation) as in Example H-1 (4) and using the same evaluation paper as in Example H-1 (4). The printing evaluation results are shown in Table 34.

(5) Evaluation of Ejection Stability

The ejection stability was evaluated by the same evaluation method as in Example H-1 (5) using the same printer and ink as in Example H-7(4) according to the same evaluation criteria as in Example H-1 (5). The evaluation results of ejection stability are shown in Table 34.

(6) Evaluation of Storage Stability

The ink prepared in Example H-7(2) above was evaluated on the storage stability by the same evaluation method as in Example H-1 (6) according to the same evaluation criteria as in Example H-1 (6). The evaluation results of storage stability are shown in Table 35.

Example H-8

(1) Production of Dispersion

Dispersion H8

For the production of Dispersion H8 used in Example H-8, a phthalocyanine green pigment (C.I. Pigment Green 7) which is an organic pigment was used. Except for this, Dispersion H8 containing 20% of Dispersing Element H8 (dispersing element where the phthalocyanine green pigment is encapsulated with a polymer having an aromatic ring amount of 38%) was obtained in the same manner as in Example H-3(1).

In Table 32, the pigment used in Dispersion H8, the amount of aromatic ring in the dispersing polymer and the pigment/polymer ratio are shown. The amount of aromatic ring in the polymer and the pigment/polymer ratio were measured, similarly to Example H-1 (1), by the methods described in "Measurement of Amount of Aromatic Ring" and "Measurement of Pigment/Polymer Ratio" above.

(2) Preparation of Ink

In Example H-8, Dispersion H8 obtained in Example H-8 (1) above, Olfine E1010 (produced by Nissin Chemical Industry Co., Ltd.) and Surfynol 104 (produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of ink, Dispersion H8 was added to have a Dispersing Element H8 content of 8.0%. The value in < > shows an average particle size (unit: nm) of Dispersing Element H8 measured by the method described in "Measurement of Average Particle Size" above.

Also, the ion exchanged water added as "balance" in the ink composition of Example H-8 shown below was, similarly to Example H-1 (2), ion exchanged water where 0.01% of Proxel XL-2, 0.01% of benzotriazole and 0.02% of EDTA 2Na salt were added based on the entire weight of the ink.

| | |
|---|---|
| Dispersing Element H8 <110> | 8.0% |
| Olfine E1010 | 0.3% |
| Surfynol 104 | 0.1% |
| Dipropylene glycol monobutyl ether | 1.0% |
| 1,2-Pentanediol | 3.0% |
| Triethylene glycol | 2.0% |
| Thiodiglycol | 4.0% |
| Glycerin | 13.8% |
| Trimethylolpropane | 6.4% |
| Triethanolamine | 0.1% |
| Ion exchanged water | balance |

(3) Measurement of Amount of Free Polymer

The ink prepared in Example H-8(2) above was measured by the method described in "Measurement of Amount of Free Polymer" above, as a result, the amount of free polymer based on the entire weight of ink was 0.72%.

(4) Printing Evaluation

The ink prepared in Example H-8(2) was subjected to printing evaluation according to the same evaluation criteria as in Example H-1 (4) by using the same inkjet printer PM-950C (manufactured by Seiko Epson Corporation) as in Example H-1 (4) and using the same evaluation paper as in Example H-1 (4). The printing evaluation results are shown in Table 34.

(5) Evaluation of Ejection Stability

The ejection stability was evaluated by the same evaluation method as in Example H-1 (5) using the same printer and ink as in Example H-8(4) according to the same evaluation criteria as in Example H-1 (5). The evaluation results of ejection stability are shown in Table 35.

(6) Evaluation of Storage Stability

The ink prepared in Example H-8(2) above was evaluated on the storage stability by the same evaluation method as in Example H-1 (6) according to the same evaluation criteria as in Example H-1 (6). The evaluation results of storage stability are shown in Table 35.

Comparative Example H-1

(1) Production of Dispersion

Dispersion H9

In Comparative Example H-1, Dispersion H9 for use in Comparative Example H-1 was produced by using Color Black FW18 (produced by Degussa), which is an inorganic pigment and a carbon black pigment, similarly to Example H-1 (1).

However, in Comparative Example H-1, the dispersion was produced by intentionally using the conditions different from those in Example H-1 (1) so as to change the amount of free polymer in the ink from that in Example H-1.

A reaction vessel equipped with a stirrer, a thermometer, a reflux tube and a dropping funnel was purged with nitrogen and thereinto, 26 parts of styrene, 5 parts of α-methylstyrene, 15 parts of butyl methacrylate, 12 parts of lauryl methacrylate, 2 parts of acrylic acid and 0.6 parts of tert-dodecylmercaptan were charged and, in this Comparative Example, heated at 55° C. Thereafter, separately prepared 160 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel, in this Comparative Example, over 2 hours, thereby polymerizing a dispersing polymer. Then, methyl ethyl ketone was added to the reaction vessel to prepare a dispersing polymer solution having a concentration of 38%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 20%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and, in this Comparative Example, without performing washing by using a Buechner funnel, ion exchanged water and an aqueous sodium hydroxide solution as a neutralizer were appropriately added with stirring to the pigment-including resin dispersing element separated by filtration to adjust the pH to 7.5. Then, the resulting solution was filtered through a membrane filter having an average pore size of 5 mm to obtain Dispersion H9 containing 20% of Dispersing Element H9 (dispersing element where the carbon black pigment is encapsulated with the polymer having an aromatic ring amount of 20%).

In Table 32, the pigment used in Dispersion H9, the amount of aromatic ring in the dispersing polymer and the pigment/polymer ratio are shown. The pigment/polymer ratio was measured by the method described in "Measurement of Pigment/Polymer Ratio" above.

(2) Preparation of Ink

In Comparative Example H-1, an ink was prepared by using Dispersion H9 obtained in Comparative Example H-1 (1) above. The specific composition is shown below.

Incidentally, in the preparation of ink, Dispersion H9 was added to have a Dispersing Element H9 content of 8.0%. The value in < > shows an average particle size (unit: nm) of Dispersing Element H9 measured by the method described in "Measurement of Average Particle Size" above.

Also, the ion exchanged water added as "balance" in the ink composition of Comparative Example H-1 shown below was, similarly to Example H-1 (2), ion exchanged water where 0.01% of Proxel XL-2, 0.01% of benzotriazole and 0.02% of EDTA 2Na salt were added based on the entire weight of the ink.

| Dispersing Element H9 <140> | 8.0% |
|---|---|
| Nonionic surfactant | 1.0% |
| Ethylene glycol | 5.0% |
| Glycerin | 15.0% |
| Ion exchanged water | balance |

In the composition above, Epan 450 (trade name, produced by Dai-ichi Kogyo Seiyaku Co., Ltd.) was used as the nonionic surfactant.

(3) Measurement of Amount of Free Polymer

The ink prepared in Comparative Example H-1 (2) was subjected to printing evaluation according to the same evaluation criteria as in Example H-1 (4) by using the same inkjet printer PM-950C (manufactured by Seiko Epson Corporation) as in Example H-1 (4) and using the same evaluation paper as in Example H-1 (4). The printing evaluation results are shown in Table 34.

(4) Printing Evaluation

The ink prepared in Comparative Example H-1(2) was subjected to printing evaluation according to the same evaluation criteria as in Example 1(4) by using the same inkjet printer PM-950C (manufactured by Seiko Epson Corporation) as in Example 1(4) and using the same evaluation paper as in Example 1(4). The printing evaluation results are shown in Table 33.

(5) Evaluation of Ejection Stability

The ejection stability was evaluated by the same evaluation method as in Example H-1 (5) using the same printer and ink as in Comparative Example H-1(4) according to the same evaluation criteria as in Example H-1 (5). The evaluation results of ejection stability are shown in Table 35.

(6) Evaluation of Storage Stability

The ink prepared in Comparative Example H-1(2) above was evaluated on the storage stability by the same evaluation method as in Example H-1 (6) according to the same evaluation criteria as in Example H-1 (6). The evaluation results of storage stability are shown in Table 35.

Comparative Example H-2

(1) Production of Dispersion

Dispersion H10

For the production of Dispersion H10 used in Comparative Example H-2, a phthalocyanine green pigment (C.I. Pigment Green 7) which is an organic pigment was dispersed by using Solsperse 12000 (produced by Avecia Limited).

15 Parts of the phthalocyanine green pigment, 5 parts of Solsperse 12000, 5 parts of diethanolamine, 0.5 parts of 2-propanol and 74.5 parts of ion exchanged water were dispersed by a bead mill MINIZETOR (manufactured by Ajisawa) for 2 hours to obtain Dispersion H10 for use in Comparative Example H-2, containing 20% (pigment: 15%, dispersing resin: 5%) of Dispersing Element H10.

(2) Preparation of Ink

In Comparative Example H-2, an ink was prepared by using Dispersion H10 obtained in Comparative Example H-2 (1) above. The specific composition of this Comparative Example is shown below.

Incidentally, in the preparation of ink, Dispersion H10 was added to have a Dispersing Element H10 content of 8.0%. The value in < > shows an average particle size (unit: nm) of Dispersing Element H10 measured by the method described in "Measurement of Average Particle Size" above.

In the composition above, Noigen EA160 (trade name, produced by Dai-ichi Kogyo Seiyaku Co., Ltd.) was used as the nonionic surfactant.

(3) Measurement of Amount of Free Polymer

The ink prepared in Comparative Example H-2(2) was measured by the method described in "Measurement of Amount of Free Polymer" above, as a result, the amount of free polymer based on the entire weight of ink was 4.23%.

(4) Printing Evaluation

The ink prepared in Comparative Example H-2(2) was subjected to printing evaluation according to the same evaluation criteria as in Example H-1 (4) by using the same inkjet printer PM-950C (manufactured by Seiko Epson Corporation) as in Example H-1(4) and using the same evaluation paper as in Example H-1 (4). The printing evaluation results are shown in Table 34.

(5) Evaluation of Ejection Stability

The ejection stability was evaluated by the same evaluation method as in Example H-1(5) using the same printer and ink as in Comparative Example H-2(4) according to the same evaluation criteria as in Example H-1 (5). The evaluation results of ejection stability are shown in Table 35.

(6) Evaluation of Storage Stability

The ink prepared in Comparative Example H-2(2) above was evaluated on the storage stability by the same evaluation method as in Example H-1 (6) according to the same evaluation criteria as in Example H-1 (6). The evaluation results of storage stability are shown in Table 35.

TABLE 33

List of Dispersions H1 to H9

| | Dispersion H1 | Dispersion H2 | Dispersion H3 | Dispersion H4 | Dispersion H5 | Dispersion H6 | Dispersion H7 | Dispersion H8 | Dispersion H9 |
|---|---|---|---|---|---|---|---|---|---|
| Pigment used | Color Black FW-18 | C.I. Pigment Yellow 147 | C.I. Pigment Red 122 | C.I. Pigment Blue 15:4 | C.I. Pigment Orange 43 | C.I. Pigment Brown 32 | C.I. Pigment Violet 19 | C.I. Pigment Green 7 | Color Black FW-18 |
| Amount of aromatic ring | 58% | 26% | 36% | 49% | 44% | 70% | 52% | 38% | 20% |
| Pigment:polymer ratio | 7.0:3.0 | 6.5:3.5 | 8.0:2.0 | 6.0:4.0 | 3.5:6.5 | 3.0:7.0 | 9.0:1.0 | 5.5:4.5 | 5.5:4.5 |

Also, the ion exchanged water added as "balance" in the ink composition of Comparative Example H-2 shown below was, similarly to Example H-1 (2), ion exchanged water where 0.01% of Proxel XL-2, 0.01% of benzotriazole and 0.02% of EDTA 2Na salt were added based on the entire weight of the ink.

| | |
|---|---|
| Dispersing Element H10 <150> | 20.0% |
| Nonionic surfactant | 1.0% |
| Ethylene glycol | 5.0% |
| Glycerin | 15.0% |
| Ion exchanged water | balance |

TABLE 34

Printing Evaluation Results of Ink of Examples and Comparative Examples

| Paper Evaluated | Example H | | | | | | | | Comparative Example H | |
|---|---|---|---|---|---|---|---|---|---|---|
| | 1 | 2 | 3 | 4 | 5 | 6 | 7 | 8 | 1 | 2 |
| (a) Conqueror | A | A | A | A | A | A | A | A | D | D |
| (b) Reymat | A | A | A | A | A | A | A | A | C | C |
| (c) Mode Copy | A | A | A | A | A | B | A | A | D | D |
| (d) Rapid Copy | A | A | A | A | A | A | A | B | D | D |
| (e) Xerox P | A | A | A | A | A | A | A | A | C | C |

TABLE 34-continued

Printing Evaluation Results of Ink of
Examples and Comparative Examples

| Paper | Example H | | | | | | | | Comparative Example H | |
|---|---|---|---|---|---|---|---|---|---|---|
| Evaluated | 1 | 2 | 3 | 4 | 5 | 6 | 7 | 8 | 1 | 2 |
| (f) Xerox 4024 | A | A | A | A | A | A | A | A | C | D |
| (g) Xerox 10 | A | A | A | A | A | B | A | A | D | D |
| (h) Neenha Bond | A | A | A | A | A | A | A | A | C | D |
| (i) Ricopy 6200 | A | A | A | A | A | B | A | B | D | D |
| (j) Hammer mill Copy Plus | A | A | A | A | A | B | A | A | D | D |

As apparent from the results in Tables 33 and 34, the printing quality is bad when the ink of Comparative Example is used, and the printing quality is good when the ink of the present invention is used.

This reveals that by using the aqueous ink of the present invention, a high-quality printed image can be obtained with reduced blurring on any species of paper.

TABLE 35

Amount of Free Polymer in Ink of Examples and Comparative Examples
and Evaluation Results of Storage Stability and Ejection Stability

| | Example H | | | | | | | | Comparative Example H | |
|---|---|---|---|---|---|---|---|---|---|---|
| | 1 | 2 | 3 | 4 | 5 | 6 | 7 | 8 | 1 | 2 |
| Amount of free polymer | 1.18% | 0.48% | 0.63% | 0.54% | 1.62% | 1.98% | 0.39% | 0.72% | 3.02% | 4.23% |
| Foreign matters | A | A | A | A | B | B | A | A | C | D |
| Viscosity | A | A | A | A | A | B | A | A | C | D |
| Surface tension | A | A | A | A | A | B | A | A | C | D |
| Ejection stability | B | A | A | A | B | B | A | A | C | D |

As apparent from the results in Table 35, the aqueous ink of the present invention where the amount of free polymer in the ink is reduced to 2% or less ensures excellent ejection stability and high storage stability and, from Table 34, also ensures excellent printing quality. Furthermore, it is seen that when the amount of free polymer is 1% or less, very excellent ejection stability and storage stability can be obtained. On the other hand, when the amount of free polymer exceeds 3% as in Comparative Examples, the printing quality, ejection stability and storage stability all fail in reaching the practicable level.

These results reveal that good printing quality and ejection stability can be obtained by using the aqueous ink of the present invention and moreover, the storage stability of the ink is excellent.

Example I

The preferred embodiment (i) of the present invention is described below by referring to Examples, however, the scope of the present invention is not limited to these Examples.

In Examples and Comparative Examples below, some organic or inorganic pigments are used as the colorant for use in the present invention, however, the present invention is not limited thereto and organic or inorganic pigments described as examples of the colorant suitable for the present invention can be used. In < >, the average particle size is shown by the unit of nm (nanometer).

Other than the experimental examples described below, the pigment dispersing element for use in the aqueous ink set of the present invention can also be obtained by dispersing the pigment by using a reactive dispersant and then subjecting it to an emulsification polymerization in the presence of a catalyst in water.

(Production of Black Dispersion I1)

For Black Dispersion I1, Monac 880 (produced by Cabot Co.) which is carbon black was used as the colorant. A reaction vessel equipped with a stirrer, a thermometer, a reflux tube and a dropping funnel was purged with nitrogen and thereinto, 30 parts of styrene, 10 parts of α-methylstyrene, 15 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 50%.

Subsequently, 40 parts of the obtained dispersing polymer solution, 30 parts of Monac 880 (produced by Cabot Co.) which is carbon black, 100 parts of an aqueous solution containing 0.1 mol/liter of sodium hydroxide, and 30 parts of methyl ethyl ketone were mixed and stirred by a homogenizer for 30 minutes. Thereto, 300 parts of ion exchanged water was added and the resulting solution was further stirred for one hour. The entire amount of methyl ethyl ketone and a part of water were distilled off by a rotary evaporator and the residue was neutralized with 0.1 mol/liter of sodium hydroxide to adjust the pH to 9 and then filtered through a 0.3-μm membrane filter to obtain Black Dispersion I1 having a solid (dispersing polymer and carbon black) content of 20%.

A part of this dispersion was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 50% based on the entire weight of the dispersing polymer.

(Production of Black Dispersion I2)

Black Dispersion I2 was produced by using the same composition and method as in the production of Black Dispersion I1 except that 20 parts of Raven C (trade name, produced by Columbian Carbon Co., Ltd., C.I. Pigment Black 7) which is carbon black was used as the colorant.

(Production of Black Dispersion I3)

Black Dispersion I3 was produced by using the same composition and method as in the production of Black Dispersion I1 except that 46.7 parts of Pigment Black A (trade name, produced by BASF, C.I. Pigment Black 1) which is carbon black was used as the molecular chromogen.

(Production of Yellow Dispersion I1)

Yellow Dispersion I1 was produced by using the same composition and method as in the production of Black Dispersion I1 except that 30 parts of C.I. Pigment Yellow 180 was used as the colorant.

(Production of Yellow Dispersion I2)

Yellow Dispersion I2 was produced by using the same composition and method as in the production of Black Dispersion I1 except that 46.7 parts of C.I. Pigment Yellow 74 (insoluble monoazo pigment) was used as the colorant.

(Production of Yellow Dispersion I3)

Yellow Dispersion I3 was produced by using the same composition and method as in the production of Black Dispersion I1 except that 80 parts of C.I. Pigment Yellow 128 (condensed azo pigment) was used as the colorant.

(Production of Magenta Dispersion I1)

Magenta Dispersion I1 was produced by using the same composition and method as in the production of Black Dispersion I1 except that 30 parts of C.I. Pigment Violet 19 (quinacridone pigment) was used as the colorant.

(Production of Magenta Dispersion I2)

Magenta Dispersion I2 was produced by using the same composition and method as in the production of Black Dispersion I1 except that 46.7 parts of C.I. Pigment Red 202 (quinacridone pigment) was used as the colorant.

(Production of Magenta Dispersion I3)

Magenta Dispersion I3 was produced by using the same composition and method as in the production of Black Dispersion I1 except that 80 parts of C.I. Pigment Red 122 (dimethylquinacridone pigment) was used as the colorant.

(Production of Cyan Dispersion I1)

Cyan Dispersion I1 was produced by using the same composition and method as in the production of Black Dispersion I1 except that 30 parts of C.I. Pigment Blue 15:3 (copper phthalocyanine pigment) was used as the colorant.

(Production of Cyan Dispersion I2)

Cyan Dispersion I2 was produced by using the same composition and method as in the production of Black Dispersion I1 except that 20 parts of C.I. Pigment Blue 15:4 (copper phthalocyanine pigment) was used as the colorant.

(Production of Cyan Dispersion I3)

Cyan Dispersion I 3 was produced by using the same composition and method as in the production of Black Dispersion I1 except that 13.3 parts of C.I. Pigment Blue 16 (nonmetallic phthalocyanine pigment) was used as the colorant.

(Production of Red Dispersion I1)

Red Dispersion I1 was produced by using the same composition and method as in the production of Black Dispersion I1 except that 30 parts of C.I. Pigment Red 190 (perylene pigment) was used as the colorant.

(Production of Blue Dispersion I1)

Blue Dispersion I1 was produced by using the same composition and method as in the production of Black Dispersion I1 except that 30 parts of C.I. Pigment Violet 23 (dioxazine pigment) was used as the colorant.

(Production of Green Dispersion I1)

Green Dispersion I1 was produced by using the same composition and method as in the production of Black Dispersion I1 except that 30 parts of C.I. Pigment Green 7 (highly chlorinated copper phthalocyanine pigment) was used as the colorant.

(Preparation Example of Aqueous Ink)

Examples of the ink composition suitable for the aqueous ink set of the present invention are specifically described below. The amount of the pigment dispersion added is shown by the solid content (solid content: the amount of pigment and dispersing polymer surrounding the pigment) in terms of weight. The numerical value in < > shows "an average particle size at 20° C." of dispersed particles in each pigment dispersion obtained in Examples and Comparative Examples and diluted with ion exchanged water to have a pigment concentration of 0.001 to 0.01 wt % (because the optimal concentration at the measurement slightly differs depending on the pigment). The particle size was measured by a particle size distribution meter (ELS-800, manufactured by Otsuka Electronics Co., Ltd.) and is shown by the unit of nm. The water as balance in the ink composition shown below was ion exchanged water where 0.05% of Proxel XL-2 for preventing septic activity of the ink, 0.02% of benzotriazole for preventing corrosion of an inkjet head member and 0.04% of EDTA 2Na salt for reducing the effect of metal ion in the ink system were added.

Composition Example I1

Black Ink I1

| Additive | Amount Added (%) |
| --- | --- |
| Black Dispersion I1 <105> | 10.0 |
|  | (as solid content) |
| DEGmBE | 2.0 |
| Olfine E1010 | 1.0 |
| Olfine STG | 0.2 |
| 1,2-Pentanediol | 2.0 |
| Glycerin | 12.0 |
| Tetraethylene glycol | 5.0 |
| 2-Pyrrolidone | 2.0 |
| Water | balance |

In the composition above, DEGmBE denotes a diethylene glycol monobutyl ether and Olfine E1010 and Olfine STG each is an acetylene glycol-base surfactant (both are trade name, produced by Nissin Chemical Industry Co., Ltd.).

Composition Example I2

Black Ink I2

| Additive | Amount Added (%) |
| --- | --- |
| Black Dispersion I2 <100> | 10.0 |
|  | (as solid content) |
| Surfynol 465 | 1.0 |
| Glycerin | 10.0 |
| Tetraethylene glycol | 5.0 |
| Triethanolamine | 0.3 |
| Water | balance |

In the composition above, Surfynol 465 is an acetylene glycol-base surfactant (trade name, produced by Air Products (USA)).

Composition Example I3

Black Ink I3

| Additive | Amount Added (%) |
| --- | --- |
| Black Dispersion I3 <110> | 10.0 (as solid content) |
| Surfynol 61 | 0.5 |
| DPGmBE | 3.0 |
| 1,5-Pentanediol | 5.0 |
| Maltose | 3.0 |
| Thiodiglycol | 7.0 |
| Water | balance |

In the composition above, Surfynol 61 is an acetylene alcohol-base surfactant (trade name, produced by Air Products (USA) and DPGmBE denotes a dipropylene glycol monobutyl ether.

Composition Example I4

Yellow Ink I1

| Additive | Amount Added (%) |
| --- | --- |
| Yellow Dispersion I1 <90> | 13.0 (as solid content) |
| Surfynol 465 | 1.0 |
| Surfynol 61 | 0.3 |
| DPGmBE | 10.0 |
| Diethylene glycol | 5.0 |
| 2-Pyrrolidone | 1.0 |
| Glycerin | 5.0 |
| Water | balance |

In the composition above, Surfynol 465 is an acetylene glycol-base surfactant (trade name, produced by Air Products (USA)), Surfynol 61 is an acetylene alcohol-base surfactant (trade name, produced by Air Products (USA)) and DPGmBE denotes a dipropylene glycol monobutyl ether.

Composition Example I5

Yellow Ink I2

| Additive | Amount Added (%) |
| --- | --- |
| Yellow Dispersion I2 <80> | 8.0 (as solid content) |
| Olfine STG | 0.5 |
| TEGmBE | 1.0 |
| 1,2-Hexanediol | 3.0 |
| 2-Pyrrolidone | 2.0 |
| Trimethylolpropane | 8.0 |
| Glycerin | 15.0 |
| Water | balance |

In the composition above, Olfine STG is an acetylene glycol-base surfactant (trade name, produced by Nissin Chemical Industry Co., Ltd.) and TEGmBE denotes a triethylene glycol monobutyl ether.

Composition Example I6

Yellow Ink I3

| Additive | Amount Added (%) |
| --- | --- |
| Yellow Dispersion I3 <90> | 10.0 (as solid content) |
| DEGmBE | 5.0 |
| DPGmBE | 5.0 |
| Ethylene glycol | 2.0 |
| 2-Pyrrolidone | 1.0 |
| Trimethylolpropane | 10.0 |
| Glycerin | 5.0 |
| Water | balance |

In the composition above, DEGmBE denotes a diethylene glycol monobutyl ether and DPGmBE denotes a dipropylene glycol monobutyl ether.

Composition Example I7

Magenta Ink I1

| Additive | Amount Added (%) |
| --- | --- |
| Magenta Dispersion I1 <120> | 8.0 (as solid content) |
| 1,2-Hexanediol | 5.0 |
| DEGmBE | 5.0 |
| Diethylene glycol | 5.0 |
| Glycerin | 10.0 |
| Urea | 2.0 |
| Water | balance |

In the composition above, DEGmBE denotes a diethylene glycol monobutyl ether.

Composition Example I8

Magenta Ink I2

| Additive | Amount Added (%) |
| --- | --- |
| Magenta Dispersion I2 <90> | 10.0 (as solid content) |
| Surfynol 61 | 1.0 |
| Trimethylolethane | 8.0 |
| 1,3-Dimethyl-2-imidazolidinone | 2.0 |
| Triethylene glycol | 10.0 |
| 28% Aqueous ammonia | 0.5 |
| Water | balance |

In the composition above, Surfynol 61 is an acetylene alcohol-base surfactant (trade name, produced by Air Products (USA)).

Composition Example I9

Magenta Ink I3

| Additive | Amount Added (%) |
| --- | --- |
| Magenta Dispersion I3 <140> | 7.5 (as solid content) |
| Olfine E1010 | 0.1 |
| Olfine STG | 0.5 |
| TEGmBE | 1.0 |
| 1,2-Hexanediol | 2.5 |
| Triethylene glycol | 2.0 |
| 2-Pyrrolidone | 4.0 |
| Trimethylolpropane | 6.0 |
| Glycerin | 14.0 |
| Water | balance |

In the composition above, Olfine E1010 and Olfine STG each is an acetylene glycol-base surfactant (both are trade name, produced by Nissin Chemical Industry Co., Ltd.) and TEGmBE denotes a triethylene glycol monobutyl ether.

Composition Example I10

Cyan Ink I1

| Additive | Amount Added (%) |
| --- | --- |
| Cyan Dispersion I1 <95> | 6.0 (as solid content) |
| DEGmBE | 10.0 |
| Diethylene glycol | 3.0 |
| N-Methyl-2-pyrrolidone | 1.0 |
| Glycerin | 10.0 |
| Water | balance |

In the composition above, DEGmBE denotes a diethylene glycol monobutyl ether.

Composition Example I11

Cyan Ink I2

| Additive | Amount Added (%) |
| --- | --- |
| Cyan Dispersion I2 <105> | 8.0 (as solid content) |
| Surfynol 465 | 0.5 |
| Olfine STG | 0.3 |
| TEGmBE | 1.0 |
| 1,2-Hexanediol | 3.0 |
| Glycerin | 17.0 |
| Triethylene glycol | 2.0 |
| 2-Pyrrolidone | 2.0 |
| Water | balance |

In the composition above, Surfynol 465 is an acetylene glycol-base surfactant (trade name, produced by Air Products (USA)), Olfine STG is an acetylene glycol-base surfactant (trade name, produced by Nissin Chemical Industry Co., Ltd.) and TEGmBE denotes a triethylene glycol monobutyl ether.

Composition Example I12

Cyan Ink I3

| Additive | Amount Added (%) |
| --- | --- |
| Cyan Dispersion I3 <110> | 10.0 (as solid content) |
| Surfynol 61 | 0.5 |
| PGmBE | 5.0 |
| Fructose | 5.0 |
| 1,3-Dimethyl-2-imidazolidinone | 2.0 |
| Tetraethylene glycol | 10.0 |
| Water | balance |

In the composition above, Surfynol 61 is an acetylene alcohol-base surfactant (trade name, produced by Air Products (USA)) and PGmBE denotes a propylene glycol monobutyl ether.

Composition Example I13

Red Ink I1

| Additive | Amount Added (%) |
| --- | --- |
| Red Dispersion I1 <130> | 10.0 (as solid content) |
| DEGmBE | 5.0 |
| Olfine STG | 0.5 |
| 1,2-Pentanediol | 2.0 |
| Glycerin | 8.0 |
| Triethylene glycol | 5.0 |
| Trimethylolethane | 5.0 |
| N-Methyl-2-pyrrolidone | 1.0 |
| Triisopropanolamine | 1.0 |
| Water | balance |

In the composition above, DEGmBE denotes a diethylene glycol monobutyl ether and Olfine STG is an acetylene glycol-base surfactant (trade name, produced by Nissin Chemical Industry Co., Ltd.).

Composition Example I14

Blue Ink I1

| Additive | Amount Added (%) |
| --- | --- |
| Blue Dispersion I1 <90> | 7.5 (as solid content) |
| Olfine E1010 | 1.0 |
| 1,2-Pentanediol | 10.0 |
| Thiodiglycol | 2.0 |
| Ethylene glycol | 5.0 |
| Trimethylolpropane | 10.5 |
| 1,3-Dimethyl-2-imidazolidinone | 2.0 |
| Triethanolamine | 0.5 |
| Water | balance |

In the composition above, Olfine E1010 is an acetylene glycol-base surfactant (trade name, produced by Nissin Chemical Industry Co., Ltd.).

Composition Example I15

Green Ink I1

| Additive | Amount Added (%) |
|---|---|
| Green Dispersion I1 <120> | 10.0 (as solid content) |
| TEGmBE | 5.0 |
| Olfine E1010 | 1.0 |
| Olfine STG | 0.5 |
| Surfynol 61 | 0.2 |
| 1,2-Hexanediol | 2.0 |
| Glycerin | 5.0 |
| Trimethylolpropane | 5.0 |
| Triethylene glycol | 5.0 |
| 2-Pyrrolidone | 2.0 |
| Trehalose | 1.0 |
| Water | balance |

In the composition above, TEGmBE denotes a triethylene glycol monobutyl ether, Olfine E1010 and Olfine STG each is an acetylene glycol-base surfactant (both are trade name, produced by Nissin Chemical Industry Co., Ltd.) and Surfynol 61 is an acetylene alcohol-base surfactant (trade name, produced by Air Products (USA))

By combining the aqueous color inks prepared in these Composition Examples, aqueous ink sets were produced and used for the printing evaluation described later. The combination in each aqueous ink set is shown below.

Example I-1

Aqueous Ink Set I-1

In Example I-1, four color inks prepared above in Composition Examples, namely, Black Ink I1, Yellow Ink I2, Magenta Ink I3 and Cyan Ink I2, were combined and this combination was designated as Aqueous Ink Set I-1.

Example I-2

Aqueous Ink Set I-2

In Example I-2, four color inks prepared above in Composition Examples, namely, Black Ink I2, Yellow Ink I1, Magenta Ink I1 and Cyan Ink I1, were combined and this combination was designated as Aqueous Ink Set I-2.

Example I-3

Aqueous Ink Set I-3

In Example I-3, four color inks prepared above in Composition Examples, namely, Black Ink I3, Yellow Ink I3, Magenta Ink I2 and Cyan Ink I3, were combined and this combination was designated as Aqueous Ink Set I-3.

Example I-4

Aqueous Ink Set I-4

In Example I-4, seven color inks prepared above in Composition Examples, namely, Black Ink I1, Yellow Ink I2, Magenta Ink I3, Cyan Ink I2, Red Ink I1, Blue Ink I1 and Green Ink I1, were combined and this combination was designated as Aqueous Ink Set I-4.

Comparative Example

Comparative Example I-1

Preparation of Aqueous Ink Set I-5

In Comparative Example I-1, Black Aqueous Ink I4 for use in Comparative Example I-1 was prepared by using, as the colorant, the carbon black pigment used in Black Dispersing Element I1 and, as the dispersant, a polymer dispersant and a surfactant. The composition thereof is shown below.

| Additive | Amount Added (%) |
|---|---|
| Carbon black pigment <105> | 7.0 |
| Glycerin | 10.0 |
| Polymer dispersant | 3.0 |
| Nonionic surfactant | 1.0 |
| Ion exchanged water | balance |

In the composition above, the carbon black pigment was Raven C (trade name, produced by Columbian Carbon Co., Ltd., C.I. Pigment Black 7), the nonionic surfactant was Noigen EA160 (produced by Dai-ichi Kogyo Seiyaku Co., Ltd.), and the polymer dispersant was Solsperse 27000 (produced by Avecia Limited). The composition above was dispersed in a bead mill MINIZETOR (manufactured by Ajisawa) for 2 hours to prepare an aqueous ink for inkjet recording for use in Comparative Example I-1. In this Comparative Example, Proxel XL-2, EDTA 2Na salt and benzotriazole were not added.

Yellow Ink I4 for use in Comparative Example I-1 was prepared by using the same composition as above except for changing the carbon black pigment to C.I. Pigment Yellow 14 (insoluble disazo pigment) in the composition above.

Magenta Ink I4 for use in Comparative Example I-1 was prepared by using the same composition as above except for changing the carbon black pigment to C.I. Pigment Red 81 (basic dye lake pigment) in the composition above.

Cyan Ink I4 for use in Comparative Example I-1 was prepared by using the same composition as above except for changing the carbon black pigment to C.I. Pigment Blue 2 (basic dye lake pigment) in the composition above.

The thus-prepared Black Ink I4, Yellow Ink I4, Magenta Ink I4 and Cyan Ink I4 were combined and this combination was designated as Aqueous Ink Set I-5 of Comparative Example I-1.

Comparative Example I-2

In Comparative Example I-2, an aqueous ink set described in JP-A-2001-354886 was prepared. The compositions of the pigment dispersing element and the aqueous ink using it are shown below.

<Production of Black Dispersion I5>

| Additive | Amount Added (%) |
|---|---|
| Carbon black pigment | 20.0 |
| Styrene-acrylic acid copolymer | 10.0 |
| Glycerin | 10.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Black Dispersion I5 for use in Comparative Example I-2. The average particle size of dispersed particles in the obtained Black Dispersion I5 was 90 nm.

In the composition above, the carbon black pigment was Raven C (trade name, produced by Columbian Carbon Co., Ltd., C.I. Pigment Black 7) and the styrene-acrylic acid copolymer used had a weight average molecular weight of 7,000 and an acid value of 150.

<Preparation of Black Ink I5>

Using Black Dispersion I5 produced according to the above-described composition and method, Black Ink I5 for use in Comparative Example I-2 was prepared. The composition is shown below.

| Additive | Amount Added (%) |
| --- | --- |
| Black Dispersion I5 | 4.5 (as solid content) |
| Ethylene glycol | 20.0 |
| TEGmBE | 5.0 |
| Pelex OP-T | 0.2 |
| Ion exchanged water | balance |

In the composition above, Pelex OP-T is an anionic surfactant (trade name, produced by Kao Corporation) and TEGmEE denotes a triethylene glycol monoethyl ether. Other than the composition above, 1.5% of glycerin was contained in Black Dispersion I5.

<Production of Yellow Dispersion I5>

| Additive | Amount Added (%) |
| --- | --- |
| C.I. Pigment Yellow 128 | 20.0 |
| Styrene-acrylic acid copolymer | 12.0 |
| Diethylene glycol | 15.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Yellow Dispersion I5 for use in Comparative Example I-2. The average particle size of dispersed particles in the obtained Yellow Dispersion I5 was 120 nm.

In the composition above, the styrene-acrylic acid copolymer used had a weight average molecular weight of 10,000 and an acid value of 120.

<Preparation of Yellow Ink I5>

Using Yellow Dispersion I5 produced according to the above-described composition and method, Yellow Ink I5 for use in Comparative Example I-2 was prepared. The composition is shown below.

| Additive | Amount Added (%) |
| --- | --- |
| Yellow Dispersion I5 | 3.2 (as solid content) |
| Ethylene glycol | 25.0 |
| DEGmBE | 15.0 |
| Emulgen 120 | 0.2 |
| Ion exchanged water | balance |

In the composition above, Emulgen 120 is a nonionic surfactant (trade name, produced by Kao Corporation) and DEGmEE denotes a diethylene glycol monoethyl ether. Other than the composition above, 1.5% of diethylene glycol was contained in Yellow Dispersion I5.

<Production of Magenta Dispersion I5>

| Additive | Amount Added (%) |
| --- | --- |
| C.I. Pigment Red 122 | 20.0 |
| Styrene-acrylic acid copolymer | 15.0 |
| Glycerin | 10.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Magenta Dispersion I5 for use in Comparative Example I-2. The average particle size of dispersed particles in the obtained Magenta Dispersion I5 was 100 nm.

In the composition above, the styrene-acrylic acid copolymer used had a weight average molecular weight of 7,000 and an acid value of 150.

<Preparation of Magenta Ink I5>

Using Magenta Dispersion I5 produced according to the above-described composition and method, Magenta Ink I5 for use in Comparative Example I-2 was prepared. The composition is shown below.

| Additive | Amount Added (%) |
| --- | --- |
| Magenta Dispersion I5 | 7.0 (as solid content) |
| Diethylene glycol | 25.0 |
| Ethylene glycol | 10.0 |
| Levenol WX | 0.2 |
| Ion exchanged water | balance |

In the composition above, Levenol WX is an anionic surfactant (trade name, produced by Kao Corporation). Other than the composition above, 2.0% of glycerin was contained in Magenta Dispersion I5.

<Production of Cyan Dispersion I5>

| Additive | Amount Added (%) |
| --- | --- |
| C.I. Pigment Blue 15:3 | 25.0 |
| Joncryl 61 | 15.0 (as solid content) |
| Glycerin | 10.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Cyan Dispersion I5 for use in Comparative Example I-2. The average particle size of dispersed particles in the obtained Cyan Dispersion I5 was 90 nm.

In the composition above, Joncryl 61 is a styrene-acrylic acid resin (trade name, produced by Johnson Polymer Corporation).

<Preparation of Cyan Ink I5>

Using Cyan Dispersion I5 produced according to the above-described composition and method, Cyan Ink I5 for use in Comparative Example I-2 was prepared. The composition is shown below.

| Additive | Amount Added (%) |
| --- | --- |
| Cyan Dispersion I5 | 4.0 (as solid content) |
| Ethylene glycol | 30.0 |
| DEGmBE | 10.0 |
| Pluronic L-44 | 1.0 |
| Ion exchanged water | balance |

In the composition above, DEGmBE denotes a diethylene glycol monobutyl ether and Pluronic L-44 is a surfactant (trade name, produced by Asahi Denka Co., Ltd.). Other than the composition above, 1.0% of glycerin was contained in Cyan Dispersion I5.

<Production of Red Dispersion I2>

| Additive | Amount Added (%) |
| --- | --- |
| C.I. Pigment Red 177 | 20.0 |
| Styrene-acrylic acid copolymer | 12.0 |
| Diethylene glycol | 15.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Red Dispersion I2 for use in Comparative Example I-2. The average particle size of dispersed particles in the obtained Red Dispersion I2 was 110 nm.

In the composition above, the styrene-acrylic acid copolymer used had a weight average molecular weight of 10,000 and an acid value of 120.

<Preparation of Red Ink I2>

Using Red Dispersion I2 produced according to the above-described composition and method, Red Ink I2 for use in Comparative Example I-2 was prepared. The composition is shown below.

| Additive | Amount Added (%) |
| --- | --- |
| Red Dispersion I2 | 6.4 (as solid content) |
| Ethylene glycol | 20.0 |
| Levenol WX | 0.2 |
| Ion exchanged water | balance |

In the composition above, Levenol WX is an anionic surfactant (trade name, produced by Kao Corporation). Other than the composition above, 3.0% of diethylene glycol was contained in Red Dispersion I2.

<Production of Green Dispersion I2>

| Additive | Amount Added (%) |
| --- | --- |
| C.I. Pigment Green 7 | 25.0 |
| Joncryl | 15.0 (as solid content) |
| Ethylene glycol | 10.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Green Dispersion I2 for use in Comparative Example I-2. The average particle size of dispersed particles in the obtained Green Dispersion I2 was 110 nm.

In the composition above, Joncryl is a styrene-acrylic acid resin (trade name, produced by Johnson Polymer Corporation).

<Preparation of Green Ink I2>

Using Green Dispersion I2 produced according to the above-described composition and method, Green Ink I2 for use in Comparative Example I-2 was prepared. The composition is shown below.

| Additive | Amount Added (%) |
| --- | --- |
| Green Dispersion I2 | 4.0 (as solid content) |
| Ethylene glycol | 30.0 |
| Pluronic L-44 | 1.0 |
| Ion exchanged water | balance |

In the composition above, Pluronic L-44 is a surfactant (trade name, produced by Asahi Denka Co., Ltd.). Other than the composition above, 1.0% of ethylene glycol was contained in Green Dispersion I2.

These Black Ink I5, Yellow Ink I5, Magenta Ink I5, Cyan Ink I5, Red Ink I2 and Green Ink I2 were combined and this combination was designated as Aqueous Ink Set I-6 of Comparative Example I-2.

(Evaluation of Aqueous Ink Set)

<Printing Quality of Printed Image>

The aqueous ink sets prepared in Examples and Comparative Examples each was mounted in an inkjet printer PM-950C (trade name, manufactured by Seiko Epson Corporation) and a full color image was printed on a plain paper and a gloss medium. Then, the printing quality of the printed image was evaluated. The plain papers used in this evaluation were (1) Conqueror, (2) Reymat, (3) Mode Copy, (4) Rapid Copy, (5) Xerox P, (6) Xerox 4024, (7) Xerox 10, (8) Neenah Bond, (9) Ricopy 6200 and (10) Hammer mill Copy Plus which are plain papers commercially available in Europe, USA and Japan. The gloss media were (11) Photo-Print Paper 2, (12) MC Photo-Paper ((11) and (12) both are trade name, produced by Seiko Epson Corporation), (13) Ink Jet Paper Photo Glossy Paper Super Photo Grade, (14) Ink Jet Paper Photo Paper High Grade ((13) and (14) both are trade name, produced by Fuji Photo Film Co., Ltd.), (15) Ink Jet Photographic Quality Paper Photo Weight (trade name, produced by Kodak) and (16) Photo-like QP QP20A4GH (trade name, produced by Konica Corporation) which are gloss media commercially available in Europe, USA and Japan. The evaluation was performed by observing the degree of blurring of the printed image with an eye. The criteria for evaluation are shown below. The evaluation results are shown in Table 36. In Table 36, the parenthesized number shown in the "Species of Printing Medium" is the same as the number affixed to the name of plain paper or gloss medium above.

A: Blurring was not observed even in the image portions of secondary colors (red color, blue color and green color).

B: Blurring was slightly observed in the image portions of secondary colors (red color, blue color and green color) (practical level).

C: Blurring was observed in the image portions of primary colors (black, yellow, magenta and cyan).

D: Blurring was serious even in the image portions of primary colors (black, yellow, magenta and cyan).

In the evaluation above, in the case of Ink Set I-1 of Example I-1, Ink Set I-2 of Example I-2, Ink Set I-3 of Example I-3 and Ink Set I-5 of Comparative Example I-1, the image was printed by using the magenta ink and the yellow ink at a ratio of 1:1 for the red color, the magenta ink and the cyan ink at a ratio of 1:1 for the blue color and the yellow ink and the cyan ink at a ratio of 1:1 for the green color. In the case of Ink Set I-4 of Example I-4, the image was printed by using the red ink for the red color, the blue ink for the blue color and the green ink for the green color. In the case of Ink Set I-6 of Comparative Example I-2, the image was printed by using the red ink for the red color, the magenta ink and the cyan ink at a ratio of 1:1 for the blue color and the green ink for the green color.

TABLE 36

Evaluation Results of Printing Quality

| Species of Printing Medium | | Example I | | | | Comparative Example I | |
|---|---|---|---|---|---|---|---|
| | | Ink Set I1 | Ink Set I2 | Ink Set I3 | Ink Set I4 | Ink Set I5 | Ink Set I6 |
| Plain Paper | (1) | A | A | A | A | D | C |
| | (2) | A | A | A | A | C | C |
| | (3) | A | A | A | A | D | D |
| | (4) | A | A | A | A | D | D |
| | (5) | A | A | A | A | D | D |
| | (6) | A | A | A | A | D | D |
| | (7) | A | B | B | A | D | D |
| | (8) | A | A | A | A | D | D |
| | (9) | A | A | A | A | D | D |
| | (10) | B | B | B | A | D | D |
| Gloss Media | (11) | A | A | A | A | C | C |
| | (12) | A | A | A | A | D | C |
| | (13) | A | A | A | A | D | C |
| | (14) | A | A | A | A | D | C |
| | (15) | A | A | A | A | D | C |
| | (16) | A | A | A | A | D | B |

As apparent from the results in Table 36, the image printed by using Aqueous Ink Set I-5 of Comparative Example I-1 and Aqueous Ink Set I-6 of Comparative Example I-2 was seriously blurred particularly on plain paper, whereas the image printed by using Ink Sets I-1 to I-4 of Examples I-1 to I-4 was less blurred irrespective of plain paper or gloss media. Among these, particularly in the image portions of red color, blue color and green color printed by using Aqueous Ink Set I-4 of Example I-4, a clear image free of blurring was obtained irrespective of plain paper or gloss media.

As verified above, the present invention can provide an aqueous ink suitable for inkjet printing, which gives a clear image reduced in the blurring irrespective of plain paper or gloss media and ensures high quality and high practicability.

<Chroma (C*) of Printed Image>

The aqueous ink sets prepared in Examples and Comparative Examples above each was mounted in an inkjet printer PM-950C (trade name, manufactured by Seiko Epson Corporation) and a solid pattern was printed on plain paper and gloss media by varying the duty from 10% to 100% in steps of 5%. The printed image was measured on the chroma (C*). The plain paper and gloss media used in this evaluation were the same as those used in the evaluation of printing quality of printed image. The evaluation was performed by measuring the printed image by means of an optical densitometer X-Rite 938 (manufactured by X-Rite), determining it according to the L*a*b* color specification system prescribed by CIE, and calculating the chroma (C*) defined by the following formula.

$$C^* = \{(a^*)^2 + (b^*)^2\}^{1/2}$$

The results obtained were evaluated according to the following criteria for evaluation. The evaluation results are shown in Table 37. In Table 37, the parenthesized numbers shown in the "Species of Printing Medium" are the same as those in Table 36.

A: In all color image regions (yellow region, magenta region, cyan region, red region, blue region and green region), the maximum value of chroma (C*) was 50 or more for plain paper and 60 or more for gloss media.

B: In some color image regions, the maximum value of chroma (C*) was from 45 to less than 50 for plain paper and from 55 to less than 60 for gloss media.

C: In some color image regions, the maximum value of chroma (C*) was from 40 to less than 45 for plain paper and from 50 to less than 60 for gloss media.

D: In some color image regions, the maximum value of chroma (C*) was less than 40 for plain paper and less than 50 for gloss media.

In the evaluation above, in the case of Ink Set I-1 of Example I-1, Ink Set I-2 of Example I-2, Ink Set I-3 of Example I-3 and Ink Set I-5 of Comparative Example I-1, the image was printed by using the magenta ink and the yellow ink at a ratio of 1:1 for the red color, the magenta ink and the cyan ink at a ratio of 1:1 for the blue color and the yellow ink and the cyan ink at a ratio of 1:1 for the green color. In the case of Ink Set I-4 of Example I-4, the image was printed by using the red ink for the red color, the blue ink for the blue color and the green ink for the green color. In the case of Ink Set I-6 of Comparative Example I-2, the image was printed by using the red ink for the red color, the magenta ink and the cyan ink at a ratio of 1:1 for the blue color and the green ink for the green color.

TABLE 37

Evaluation Results of Chrome (C*)

| Species of Printing Medium | | Example I | | | | Comparative Example I | |
|---|---|---|---|---|---|---|---|
| | | Ink Set I1 | Ink Set I2 | Ink Set I3 | Ink Set I4 | Ink Set I5 | Ink Set I6 |
| Plain Paper | (1) | A | A | A | A | C | C |
| | (2) | A | A | A | A | C | C |
| | (3) | B | B | B | A | D | D |
| | (4) | A | A | A | A | D | D |
| | (5) | A | A | A | A | D | D |
| | (6) | A | A | A | A | D | D |
| | (7) | A | B | B | A | D | D |
| | (8) | A | A | A | A | C | C |
| | (9) | A | B | B | A | D | D |
| | (10) | B | B | B | A | D | D |
| Gloss Media | (11) | A | B | B | A | C | C |
| | (12) | A | A | A | A | D | C |
| | (13) | A | A | A | A | D | C |
| | (14) | A | A | A | A | D | C |
| | (15) | A | A | A | A | D | B |
| | (16) | A | A | A | A | C | B |

As apparent from the results in Table 37, when printed with Aqueous Ink Set I-5 of Comparative Example I-1 and Aqueous Ink Set I-6 of Comparative Example I-2, the chroma (C*) on plain paper was low, whereas when printed with Aqueous Ink Sets I-1 to I-4 of Examples I-1 to I-4, the chroma (C*) was high and the image was clear on both plain paper and gloss media. In particular, when printed with Ink Set I-4 of Example I-4 using red ink, blue ink and green ink, a clear image having a higher chroma in the red, blue and green regions was obtained.

As verified above, the present invention can provide an aqueous ink set for inkjet printing, which can give a clear image having a high chroma not only on gloss media but also on plain paper and ensures high quality and high practicability.

<Optical Density (O.D. value) of Printed Image>

The aqueous ink sets prepared in Examples and Comparative Examples above each was mounted in an inkjet printer PM-950C (trade name, manufactured by Seiko Epson Corporation) and a solid pattern was printed on plain paper and gloss media at 100% duty. The printed image was measured on the optical density (O.D. value). The plain paper and gloss media used in this evaluation were the same as those used in the evaluation of printing quality of printed image. The evaluation was performed by measuring the optical density (O.D. value) of the printed image by means of an optical densitometer X-Rite 938 (manufactured by X-Rite). The results obtained were evaluated according to the criteria for evaluation shown below. The evaluation results are shown in Table 38. In Table 38, the parenthesized numbers shown in the "Species of Printing Medium" are the same as those in Table 36.

A: In all image regions (black region, yellow region, magenta region, cyan region, red region, blue region and green region), the optical density (O.D. value) was 1.2 or more for plain paper and 1.6 or more for gloss media.

B: In some image regions, the optical density (O.D. value) was from 1.1 to less than 1.2 for plain paper and from 1.5 to less than 1.6 for gloss media.

C: In some image regions, the optical density (O.D. value) was from 1.0 to less than 1.1 for plain paper and from 1.4 to less than 1.5 for gloss media.

D: In some image regions, the optical density (O.D. value) was less than 1.0 for plain paper and less than 1.4 for gloss media.

In the evaluation above, in the case of Ink Set I-1 of Example I-1, Ink Set I-2 of Example I-2, Ink Set I-3 of Example I-3 and Ink Set I-5 of Comparative Example I-1, the image was printed by using the magenta ink and the yellow ink at a ratio of 1:1 for the red color, the magenta ink and the cyan ink at a ratio of 1:1 for the blue color and the yellow ink and the cyan ink at a ratio of 1:1 for the green color. In the case of Ink Set I-4 of Example I-4, the image was printed by using the red ink for the red color, the blue ink for the blue color and the green ink for the green color. In the case of Ink Set I-6 of Comparative Example I-2, the image was printed by using the red ink for the red color, the magenta ink and the cyan ink at a ratio of 1:1 for the blue color and the green ink for the green color.

TABLE 38

Evaluation Results of Optical Density (O.D. Value)

| Species of Printing Medium | | Example I | | | | Comparative Example I | |
|---|---|---|---|---|---|---|---|
| | | Ink Set I1 | Ink Set I2 | Ink Set I3 | Ink Set I4 | Ink Set I5 | Ink Set I6 |
| Plain Paper | (1) | A | A | A | A | C | D |
| | (2) | A | A | A | A | C | C |
| | (3) | A | A | A | A | D | D |
| | (4) | A | A | A | A | D | D |
| | (5) | A | A | A | A | D | D |
| | (6) | A | A | A | A | D | D |
| | (7) | A | A | A | A | D | D |
| | (8) | A | A | A | A | C | D |
| | (9) | A | A | A | A | D | D |
| | (10) | A | A | A | A | D | D |
| Gloss Media | (11) | A | A | A | A | C | D |
| | (12) | A | A | A | A | D | C |

TABLE 38-continued

Evaluation Results of Optical Density (O.D. Value)

| Species of Printing Medium | Example I | | | | Comparative Example I | |
|---|---|---|---|---|---|---|
| | Ink Set I1 | Ink Set I2 | Ink Set I3 | Ink Set I4 | Ink Set I5 | Ink Set I6 |
| (13) | A | A | A | A | D | C |
| (14) | A | A | A | A | D | C |
| (15) | A | A | A | A | C | C |
| (16) | A | A | A | A | C | B |

As apparent from the results in Table 38, when printed with Aqueous Ink Set I-5 of Comparative Example I-1 and Aqueous Ink Set I-6 of Comparative Example I-2, particularly the optical density (O.D. value) on plain paper was low, whereas when printed with Aqueous Ink Sets I-1 to I-4 of Examples I-1 to I-4, the optical density (O.D. value) was high and a thick and clear image was obtained on both plain paper and gloss media.

As verified above, the present invention can provide an aqueous ink set for inkjet printing, which can give a clear image having a high optical density (O.D. value) not only on gloss media but also on plain paper and ensures high quality and high practicability.

<Fixing Property of Printed Matter>

The aqueous inks prepared in Examples and Comparative Examples above each was mounted in an inkjet printer PM-950C (trade name, manufactured by Seiko Epson Corporation) and a letter was printed on plain paper and gloss media. The printed matter was evaluated on the fixing property. The gloss media used in this evaluation were the same as those used in the evaluation of printing quality of the printed image. In the evaluation, a printed image was dried at 20 to 25° C./40 to 60% RH for one hour after printing and rubbed with a finger and the shifted/thinned state of letter was observed with an eye. The criteria for evaluation are shown below. The evaluation results are shown in Table 39. In Table 39, the parenthesized numbers shown in the "Species of Printing Medium" are the same as those in Table 36.

A: Neither shifted nor thinned.

B: Slightly shifted but no problem in practice.

C: Shifted or thinned.

D: Seriously shifted and thinned and the letter could be hardly made out.

In the evaluation above, in the case of Ink Set I-1 of Example I-1, Ink Set I-2 of Example I-2, Ink Set I-3 of Example I-3 and Ink Set I-5 of Comparative Example I-1, the image was printed by using the magenta ink and the yellow ink at a ratio of 1:1 for the red color, the magenta ink and the cyan ink at a ratio of 1:1 for the blue color and the yellow ink and the cyan ink at a ratio of 1:1 for the green color. In the case of Ink Set I-4 of Example I-4, the image was printed by using the red ink for the red color, the blue ink for the blue color and the green ink for the green color. In the case of Ink Set I-6 of Comparative Example I-2, the image was printed by using the red ink for the red color, the magenta ink and the cyan ink at a ratio of 1:1 for the blue color and the green ink for the green color.

TABLE 39

Evaluation Results of Fixing Property

| Species of Printing Medium | | Example I | | | | Comparative Example I | |
|---|---|---|---|---|---|---|---|
| | | Ink Set I1 | Ink Set I2 | Ink Set I3 | Ink Set I4 | Ink Set I5 | Ink Set I6 |
| Gloss Media | (11) | A | A | A | A | C | C |
| | (12) | A | A | A | A | D | D |
| | (13) | A | B | A | A | D | D |
| | (14) | A | A | A | A | D | C |
| | (15) | A | A | B | A | D | D |
| | (16) | B | B | B | A | C | C |

As apparent from the results in Table 39, when printed with Aqueous Ink Set I-5 of Comparative Example I-1 and Aqueous Ink Set I-6 of Comparative Example I-2, the fixing property was lacking, whereas when printed with Aqueous Ink Sets I-1 to I-4 of Examples I-1 to I-4, good fixing property was exhibited. Among these, particularly when printed with Aqueous Ink Set I-4 of Example I-4, the letters of red color, blue color and green color exhibited excellent fixing property.

As verified above, the present invention can provide an aqueous ink set for inkjet printing, which ensures excellent fixing property, high quality and high practicability not only on plain paper but also on gloss media such as gloss paper commonly used for inkjet recording.

<Storage Stability and Ejection Stability of Aqueous Ink>

The aqueous inks prepared in Composition Examples and Comparative Examples above each was charged in a sampling vial and after tightly plugging the vial, left standing at 60° C. for one week. The amount of foreign matters generated and physical values (viscosity, surface tension) were examined before and after each aqueous ink was left standing. The criteria for evaluation are shown below. The evaluation results are shown in Table 40.

A: The ratio of the amount of foreign matters generated and physical values after standing at 60° C. to those before standing was in the range from 0.99 to 1.01.

B: The ratio was from 0.95 to 0.99 or from 1.01 to 1.05 (practicable level).

C: The ratio was from 0.90 to 0.95 or from 1.05 to 1.10.

D: The ratio was less than 0.90 or more than 1.10.

Also, the aqueous ink sets prepared in Examples and Comparative Examples above were evaluated on the ejection stability. The ejection stability was evaluated by mounting each aqueous ink set in an inkjet printer PM-950C (trade name, manufactured by Seiko Epson Corporation) and observing the printing disorder in continuous printing of 100 pages on A4-size Xerox P. The criteria for evaluation are shown below. The evaluation results are shown in Table 40.

A: Printing disorder was not generated at all.

B: Printing disorder was generated but at less than 10 portions (practicable level).

C: Printing disorder was generated at 10 to less than 100 portions.

D: Printing disorder was generated at 100 or more portions.

TABLE 40

Evaluation Results of Storage Stability and Ejection Stability of Aqueous Ink

| | Example I | | | | | | | | | | | | | | |
|---|---|---|---|---|---|---|---|---|---|---|---|---|---|---|---|
| | Black Ink | | | Yellow Ink | | | Magenta Ink | | | Cyan Ink | | | Red | Blue | Green |
| Items | I1 | I2 | I3 | I1 | I2 | I3 | I1 | I2 | I3 | I1 | I2 | I3 | I1 | I1 | I1 |
| Amount of foreign matters generated | A | A | A | A | A | A | A | A | A | A | A | A | A | A | A |
| Viscosity | A | A | A | A | A | A | A | B | A | A | A | A | B | A | A |
| Surface tension | A | A | A | A | A | A | A | A | A | A | A | A | A | A | A |
| Ejection stability | A | A | A | A | A | A | A | A | A | A | A | A | A | A | A |

| | Comparative Example I-1 | | | | Comparative Example I-2 | | | | | |
|---|---|---|---|---|---|---|---|---|---|---|
| | Black | Yellow | Magenta | Cyan | Black | Yellow | Magenta | Cyan | Red | Green |
| Items | I4 | I4 | I4 | I4 | I5 | I5 | I5 | I5 | I2 | I2 |
| Amount of foreign matters generated | C | D | C | D | C | C | C | C | C | C |
| Viscosity | D | D | D | D | D | D | C | D | C | C |
| Surface tension | B | C | B | C | C | B | B | B | C | C |
| Ejection stability | D | D | D | D | D | D | D | D | D | D |

As apparent from the results in Table 40, the aqueous ink used for the aqueous ink sets of Comparative Examples I-1 and I-2 was poor in the storage stability and ejection stability, whereas the aqueous ink used for the aqueous ink sets of Examples I-1 to I-4 exhibited good storage stability in both foreign matters and physical values and also exhibited good ejection stability.

Also, the same test was performed by changing Black Dispersion I1 in the ink composition shown as Composition Example I1 to Black Dispersion I4 of Comparative Example I-2, as a result, the surface tension was less changed (B in the above-described criteria for evaluation) but a large amount of foreign matters were generated (D in the above-described criteria for evaluation) to reduce the filterability and the viscosity of the ink was increased (D in the above-described criteria for evaluation) to fail in obtaining stable storability.

As verified from these evaluation results, the aqueous ink set for inkjet printing prepared by using the pigment dispersing element according to the present invention is reduced in the blurring irrespective of plain paper or gloss media, ensures good printing quality with high chrome, optical density and fixing property, and exhibits excellent ejection stability and storage stability.

<Evaluation of Stability of Aqueous Ink>

In the polymerization of the dispersing polymer used for the production of Black Dispersion I1, the amount of aromatic ring in the dispersing polymer was changed by varying the ratio of styrene and α-methylstyrene as monomers containing the aromatic ring to butyl methacrylate, lauryl methacrylate and acrylic acid as other monomers. Using obtained dispersing polymers, Black Dispersions I6 to I13 were produced and then, aqueous inks were prepared by using the same composition and method as in Composition Example I1 of Examples except for using these black dispersions. In Black Dispersions I6 to I14, the weight ratio of Monac 880 (trade name, produced by Cabot Co., C.I. Pigment Black 7) used as the colorant, which is a carbon black pigment, to the dispersing polymer was the same as in Black Dispersion I1. The compositions of Black Dispersions I6 to I13 are shown below. The amount of aromatic ring in the dispersing polymer was measured in the same manner as in Black Dispersion I1 and is shown after the name of dispersing element.

(Black Dispersion I6, Amount of Aromatic Ring in Dispersing Polymer: 0%)

| | |
|---|---|
| Monac 880 (trade name, produced by Cabot Co., C.I. Pigment Black 7) | 30 parts |
| Styrene | 0 part |
| α-Methylstyrene | 0 part |
| Butyl methacrylate | 46 parts |
| Lauryl methacrylate | 30.7 parts |
| Acrylic acid | 6.1 parts |
| tert-Dodecylmercaptan | 0.3 parts |
| Styrene | 0 part |
| Acrylic acid | 46 parts |
| Butyl methacrylate | 153.3 parts |
| tert-Dodecylmercaptan | 1 part |
| Azobisisobutyronitrile | 3 parts |

(Black Dispersion I7, Amount of Aromatic Ring in Dispersing Polymer: 10%)

| | |
|---|---|
| Monac 880 (trade name, produced by Cabot Co., C.I. Pigment Black 7) | 30 parts |
| Styrene | 6 parts |
| α-Methylstyrene | 2.3 parts |
| Butyl methacrylate | 39.7 parts |
| Lauryl methacrylate | 26.5 parts |
| Acrylic acid | 5.3 parts |
| tert-Dodecylmercaptan | 0.3 parts |
| Styrene | 30 parts |
| Acrylic acid | 39.7 parts |
| Butyl methacrylate | 132.4 parts |
| tert-Dodecylmercaptan | 1 part |
| Azobisisobutyronitrile | 3 parts |

(Black Dispersion I8, Amount of Aromatic Ring in Dispersing Polymer: 20%)

| | |
|---|---|
| Monac 880 (trade name, produced by Cabot Co., C.I. Pigment Black 7) | 30 parts |
| Styrene | 12 parts |
| α-Methylstyrene | 4.6 parts |
| Butyl methacrylate | 33.5 parts |
| Lauryl methacrylate | 22.3 parts |
| Acrylic acid | 4.5 parts |
| tert-Dodecylmercaptan | 0.3 parts |
| Styrene | 60 parts |
| Acrylic acid | 33.5 parts |
| Butyl methacrylate | 111.7 parts |
| tert-Dodecylmercaptan | 1 part |
| Azobisisobutyronitrile | 3 parts |

(Black Dispersion I9, Amount of Aromatic Ring in Dispersing Polymer: 25%)

| | |
|---|---|
| Monac 880 (trade name, produced by Cabot Co., C.I. Pigment Black 7) | 30 parts |
| Styrene | 15 parts |
| α-Methylstyrene | 5.8 parts |
| Butyl methacrylate | 30.4 parts |
| Lauryl methacrylate | 20.2 parts |
| Acrylic acid | 4.1 parts |
| tert-Dodecylmercaptan | 0.3 parts |
| Styrene | 75 parts |
| Acrylic acid | 30.4 parts |
| Butyl methacrylate | 101.2 parts |
| tert-Dodecylmercaptan | 1 part |
| Azobisisobutyronitrile | 3 parts |

(Black Dispersion I10, Amount of Aromatic Ring in Dispersing Polymer: 30%)

| | |
|---|---|
| Monac 880 (trade name, produced by Cabot Co., C.I. Pigment Black 7) | 30 parts |
| Styrene | 18 parts |
| α-Methylstyrene | 6.9 parts |
| Butyl methacrylate | 27.2 parts |
| Lauryl methacrylate | 18.2 parts |
| Acrylic acid | 3.6 parts |
| tert-Dodecylmercaptan | 0.3 parts |
| Styrene | 90 parts |
| Acrylic acid | 27.2 parts |
| Butyl methacrylate | 90.8 parts |
| tert-Dodecylmercaptan | 1 part |
| Azobisisobutyronitrile | 3 parts |

(Black Dispersion I11, Amount of Aromatic Ring in Dispersing Polymer: 60%)

| | |
|---|---|
| Monac 880 (trade name, produced by Cabot Co., C.I. Pigment Black 7) | 30 parts |
| Styrene | 36 parts |
| α-Methylstyrene | 13.8 parts |
| Butyl methacrylate | 8.5 parts |
| Lauryl methacrylate | 5.7 parts |
| Acrylic acid | 1.1 parts |
| tert-Dodecylmercaptan | 0.3 parts |
| Styrene | 180 parts |
| Acrylic acid | 8.5 parts |
| Butyl methacrylate | 28.4 parts |
| tert-Dodecylmercaptan | 1 part |
| Azobisisobutyronitrile | 3 parts |

(Black Dispersion I12, Amount of Aromatic Ring in Dispersing Polymer: 70%)

| | |
|---|---|
| Monac 880 (trade name, produced by Cabot Co., C.I. Pigment Black 7) | 30 parts |
| Styrene | 42 parts |
| α-Methylstyrene | 16.1 parts |
| Butyl methacrylate | 2.3 parts |
| Lauryl methacrylate | 1.5 parts |
| Acrylic acid | 0.3 parts |
| tert-Dodecylmercaptan | 0.3 parts |
| Styrene | 210 parts |

-continued

| | |
|---|---|
| Acrylic acid | 2.3 parts |
| Butyl methacrylate | 7.6 parts |
| tert-Dodecylmercaptan | 1 part |
| Azobisisobutyronitrile | 3 parts |

(Black Dispersion I13, Amount of Aromatic Ring in Dispersing Polymer: 73%)

| | |
|---|---|
| Monac 880 (trade name, produced by Cabot Co., C.I. Pigment Black 7) | 30 parts |
| Styrene | 67 parts |
| α-Methylstyrene | 0 part |
| Butyl methacrylate | 0 part |
| Lauryl methacrylate | 0 part |
| Acrylic acid | 0 part |
| tert-Dodecylmercaptan | 0.3 parts |
| Styrene | 215 parts |
| Acrylic acid | 0 part |
| Butyl methacrylate | 0 part |
| tert-Dodecylmercaptan | 1 part |
| Azobisisobutyronitrile | 3 parts |

The aqueous inks using the dispersions prepared according to the above-described method and materials were evaluated on the storage stability. In the evaluation, each ink was charged into a sampling vial and after tightly plugging the vial, left standing at 60° C. or 70° C. for one week. The foreign matters generated and physical value (viscosity) of the ink were examined before and after the aqueous ink was left standing. The criteria for evaluation were the same as those in the evaluation of storage stability above examining the storage stability and ejection stability of aqueous ink. The evaluation results are shown in Table 41.

TABLE 41

Amount of Aromatic Ring in Dispersing Polymer and Evaluation Results of Storage Stability

| | | Black Dispersing Element Used in Aqueous Ink | | | | | | | |
|---|---|---|---|---|---|---|---|---|---|
| | | I6 | I7 | I8 | I9 | I10 | I1 | I11 | I12 | I13 |
| | | Amount of Aromatic Ring (%) | | | | | | | |
| | | 0 | 10 | 20 | 25 | 30 | 50 | 60 | 70 | 73 |
| Foreign matters | 60° C. | D | D | B | A | A | A | A | B | C |
| | 70° C. | D | D | C | A | A | A | B | C | D |
| Viscosity | 60° C. | D | D | A | A | A | A | A | A | C |
| | 70° C. | D | D | A | A | A | A | A | B | D |

It is seen from the results in Table 41 that when the amount of aromatic ring in the dispersing polymer of the present invention is from 20 to 70%, the storage stability can be ensured. It is also seen that when the amount of aromatic ring is from 25 to 50%, neither generation of foreign matters nor change of viscosity occurs and this is a preferred embodiment.

As verified above, the present invention can provide an aqueous ink set for inkjet printing, which ensures excellent stability in both storage stability and ejection stability, high quality and high practicability. When an aqueous ink set obtained by combining such aqueous inks is used, in all evaluations of chrome (C*), optical density (O.D. value) and fixing property of the printed image, excellent printing quality is exhibited not only on plain paper but also on gloss media commonly used for inkjet recording.

These reveal that when the colorant is dispersed by using a general dispersant (for example, a water-soluble polymer dispersant or a surfactant) as in conventional techniques, a penetrant preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) is difficult to use and therefore, a sufficiently high printing quality cannot be obtained. However, in the case of using the dispersing element of the present invention where a pigment is encapsulated with a dispersing polymer and rendered dispersible in water and the amount of aromatic ring in the dispersing polymer is from 20 to 70% of the dispersing polymer, even an aqueous ink containing the above-described penetrant can be ensured with storage stability and ejection stability while keeping sufficiently high color forming properties (chrome, optical density) and fixing property and an aqueous ink set suitable for inkjet printing can be provided. Furthermore, a pigment is used in the aqueous ink of the present invention and this provides an effect of giving a printed matter more excellent in the water resistance and light fastness than those obtained by using a dye conventionally often used as the colorant in an ink for inkjet printers. In addition, the function of the dispersing polymer encapsulating the colorant can be freely changed by the polymerizing monomer or other reactive agents and this provides an effect that more various functions (functions for more enhancing, for example, light fastness, gas resistance, colorability, glossiness and fixing property of printed image) can be imparted. In the case of using a dispersant (for example, water-soluble polymer dispersant or surfactant) conventionally used for dispersing a pigment in an aqueous system, the adsorptive strength of the dispersant to the pigment is fundamentally weak and the dispersant is partially desorbed. Due to the resultant desorbed material or the dispersant not adsorbed, the viscosity of ink increases and therefore, the amount of colorant added is limited, as a result, a sufficiently high color formation can be hardly obtained. The desorption conspicuously occurs particularly when the penetrant preferred in the present invention is used.

The present invention should not be construed as being limited to these Examples and various changes and modifications can be made therein without departing from the spirit and scope of the present invention.

Example J

The present invention is described below by referring to Examples, however, the present invention is not limited to these Examples.

In Examples and Comparative Examples below, some organic or inorganic pigments are used as the colorant for use in the present invention, however, the present invention is not limited thereto and organic or inorganic pigments described as examples of the colorant suitable for the present invention can be used. In < >, the average particle size is shown by the unit of nm (nanometer).

Other than the experimental examples described below, the pigment dispersing element for use in the aqueous ink set of the present invention can also be obtained by dispersing the pigment by using a reactive dispersant and then subjecting it to an emulsification polymerization in the presence of a catalyst in water.

(Production of Black Dispersing Element J1)

For Black Dispersing Element J1, Monac 880 (produced by Cabot Co.) which is carbon black was used as the colorant. A reaction vessel equipped with a stirrer, a thermometer, a reflux tube and a dropping funnel was purged with nitrogen and thereinto, 30 parts of styrene, 10 parts of α-methylstyrene, 15 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 50%.

Subsequently, 40 parts of the obtained dispersing polymer solution, 30 parts of Monac 880 (produced by Cabot Co.) which is carbon black, 100 parts of an aqueous solution containing 0.1 mol/liter of sodium hydroxide, and 30 parts of methyl ethyl ketone were mixed and stirred by a homogenizer for 30 minutes. Thereto, 300 parts of ion exchanged water was added and the resulting solution was further stirred for one hour. The entire amount of methyl ethyl ketone and a part of water were distilled off by a rotary evaporator and the residue was neutralized with 0.1 mol/liter of sodium hydroxide to adjust the pH to 9 and then filtered through a 0.3-µm membrane filter to obtain Black Dispersing Element J1 having a solid (dispersing polymer and carbon black) content of 20%.

A part of this dispersing element was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 50% based on the entire weight of the dispersing polymer.

(Production of Black Dispersing Element J2)

Black Dispersing Element J2 was produced by using the same composition and method as in the production of Black Dispersing Element J1 except that 20 parts of Raven C (trade name, produced by Columbian Carbon Co., Ltd., C.I. Pigment Black 7) which is carbon black was used as the colorant.

(Production of Black Dispersing Element J3)

Black Dispersing Element J3 was produced by using the same composition and method as in the production of Black Dispersing Element J1 except that 46.7 parts of Pigment Black A (trade name, produced by BASF, C.I. Pigment Black 1) which is carbon black was used as the colorant.

(Production of Yellow Dispersing Element J1)

Yellow Dispersing Element J1 was produced by using the same composition and method as in the production of Black Dispersing Element J1 except that 30 parts of C.I. Pigment Yellow 180 was used as the colorant.

(Production of Yellow Dispersing Element J2)

Yellow Dispersing Element J2 was produced by using the same composition and method as in the production of Black Dispersing Element J1 except that 46.7 parts of C.I. Pigment Yellow 74 (insoluble monoazo pigment) was used as the colorant.

(Production of Yellow Dispersing Element J3)

Yellow Dispersing Element J3 was produced by using the same composition and method as in the production of Black Dispersing Element J1 except that 80 parts of C.I. Pigment Yellow 128 (condensed azo pigment) was used as the colorant.

(Production of Magenta Dispersing Element J1)

Magenta Dispersing Element J1 was produced by using the same composition and method as in the production of Black Dispersing Element J1 except that 30 parts of C.I. Pigment Violet 19 (quinacridone pigment) was used as the colorant.

(Production of Magenta Dispersing Element J2)

Magenta Dispersing Element J2 was produced by using the same composition and method as in the production of Black Dispersing Element J1 except that 46.7 parts of C.I. Pigment Red 202 (quinacridone pigment) was used as the colorant.

(Production of Magenta Dispersing Element J3)

Magenta Dispersing Element J3 was produced by using the same composition and method as in the production of Black Dispersing Element J1 except that 80 parts of C.I. Pigment Red 122 (dimethylquinacridone pigment) was used as the colorant.

(Production of Cyan Dispersing Element J1)

Cyan Dispersing Element J1 was produced by using the same composition and method as in the production of Black Dispersing Element J1 except that 30 parts of C.I. Pigment Blue 15:3 (copper phthalocyanine pigment) was used as the colorant.

(Production of Cyan Dispersing Element J2)

Cyan Dispersing Element J2 was produced by using the same composition and method as in the production of Black Dispersing Element J1 except that 20 parts of C.I. Pigment Blue 15:4 (copper phthalocyanine pigment) was used as the colorant.

(Production of Cyan Dispersing Element J3)

Cyan Dispersing Element J3 was produced by using the same composition and method as in the production of Black Dispersing Element J1 except that 13.3 parts of C.I. Pigment Blue 16 (nonmetallic phthalocyanine pigment) was used as the colorant.

(Preparation Example of Aqueous Ink)

Examples of the ink composition suitable for the aqueous ink set of the present invention are specifically described below. The amount of the dispersing element added is shown as the amount (solid content concentration: the total amount of pigment and dispersing polymer surrounding the pigment) in terms of weight. The numerical value in < > shows "an average particle size at 20° C." of dispersed particles in each dispersing element obtained in Examples and Comparative Examples and diluted with ion exchanged water to have a pigment concentration of 0.001 to 0.01 wt % (because the optimal concentration at the measurement slightly differs depending on the pigment). The particle size was measured by a particle size distribution meter (ELS-800, manufactured by Otsuka Electronics Co., Ltd.) and is shown by the unit of nm. The water as balance shown in Examples was ion exchanged water where 0.05 wt % of Proxel XL-2 for preventing septic activity of the ink, 0.02 wt % of benzotriazole for preventing corrosion of an inkjet head member and 0.04 wt % of EDTA 2Na salt for reducing the effect of metal ion in the ink system were added.

Composition Example J1

Dark Black Ink J1

| Additive | Amount Added (wt %) |
| --- | --- |
| Black Dispersing Element J1 <105> | 10.0 |
| DEGmBE | 2.0 |
| Olfine E1010 | 1.0 |
| Olfine STG | 0.2 |
| 1,2-Pentanediol | 2.0 |

| Additive | Amount Added (wt %) |
| --- | --- |
| Glycerin | 12.0 |
| Tetraethylene glycol | 5.0 |
| 2-Pyrrolidone | 2.0 |
| Water | balance |

In the composition above, DEGmBE denotes a diethylene glycol monobutyl ether and Olfine E1010 and Olfine STG each is an acetylene glycol-base surfactant (both are trade name, produced by Nissin Chemical Industry Co., Ltd.).

Composition Example J2

Light Black Ink J1

In Composition Example J2, Light Black Ink J1 was prepared by using the same composition as in Composition Example J1 except for changing the amount of Black Dispersing Element J1 added to 3.0 wt % as the solid content concentration.

Composition Example J3

Dark Black Ink J2

| Additive | Amount Added (wt %) |
| --- | --- |
| Black Dispersing Element J2 <100> | 10.0 |
| Surfynol 465 | 1.0 |
| Glycerin | 10.0 |
| Tetraethylene glycol | 5.0 |
| Triethanolamine | 0.3 |
| Water | balance |

In the composition above, Surfynol 465 is an acetylene glycol-base surfactant (trade name, produced by Air Products (USA)).

Composition Example J4

Dark Black Ink J3

| Additive | Amount Added (wt %) |
| --- | --- |
| Black Dispersing Element J3 <110> | 10.0 |
| Surfynol 61 | 0.5 |
| DPGmBE | 3.0 |
| 1,5-Pentanediol | 5.0 |
| Maltose | 3.0 |
| Thiodiglycol | 7.0 |
| Water | balance |

In the composition above, Surfynol 61 is an acetylene alcohol-base surfactant (trade name, produced by Air Products (USA) and DPGmBE denotes a dipropylene glycol monobutyl ether.

Composition Example J5

Dark Yellow Ink J1

| Additive | Amount Added (wt %) |
| --- | --- |
| Yellow Dispersing Element J1 <90> | 13.0 |
| Surfynol 465 | 1.0 |
| Surfynol 61 | 0.3 |
| DPGmBE | 10.0 |
| Diethylene glycol | 5.0 |
| 2-Pyrrolidone | 1.0 |
| Glycerin | 5.0 |
| Water | balance |

In the composition above, Surfynol 465 is an acetylene glycol-base surfactant (trade name, produced by Air Products (USA)), Surfynol 61 is an acetylene alcohol-base surfactant (trade name, produced by Air Products (USA)) and DPGmBE denotes a dipropylene glycol monobutyl ether.

Composition Example J6

Dark Yellow Ink J2

| Additive | Amount Added (wt %) |
| --- | --- |
| Yellow Dispersing Element J2 <80> | 8.0 |
| Olfine STG | 0.5 |
| TEGmBE | 1.0 |
| 1,2-Hexanediol | 3.0 |
| 2-Pyrrolidone | 2.0 |
| Trimethylolpropane | 8.0 |
| Glycerin | 15.0 |
| Water | balance |

In the composition above, Olfine STG is an acetylene glycol-base surfactant (trade name, produced by Nissin Chemical Industry Co., Ltd.) and TEGmBE denotes a triethylene glycol monobutyl ether.

Composition Example J7

Dark Yellow Ink J3

| Additive | Amount Added (wt %) |
| --- | --- |
| Yellow Dispersing Element J3 <90> | 10.0 |
| DEGmBE | 5.0 |
| DPGmBE | 5.0 |
| Ethylene glycol | 2.0 |
| 2-Pyrrolidone | 1.0 |
| Trimethylolpropane | 10.0 |
| Glycerin | 5.0 |
| Water | balance |

In the composition above, DEGmBE denotes a diethylene glycol monobutyl ether and DPGmBE denotes a dipropylene glycol monobutyl ether.

Composition Example J8

Light Yellow Ink J1

In Composition Example J8, Light Yellow Ink J1 was prepared by using the same composition as in Composition Example J7 except for changing the amount of Yellow Dispersing Element J3 added to 2.0 wt % as the solid content concentration.

Composition Example J9

Dark Magenta Ink J1

| Additive | Amount Added (wt %) |
|---|---|
| Magenta Dispersing Element J1 <120> | 8.0 |
| 1,2-Hexanediol | 5.0 |
| DEGmBE | 5.0 |
| Diethylene glycol | 5.0 |
| Glycerin | 10.0 |
| Urea | 2.0 |
| Water | balance |

In the composition above, DEGmBE denotes a diethylene glycol monobutyl ether.

Composition Example J10

Light Magenta Ink J1

In Composition Example J10, Light Magenta Ink J1 was prepared by using the same composition as in Composition Example J9 except for changing the amount of Magenta Dispersing Element J1 added to 4.0 wt % as the solid content concentration.

Composition Example J11

Dark Magenta Ink J2

| Additive | Amount Added (wt %) |
|---|---|
| Magenta Dispersing Element J2 <90> | 10.0 |
| Surfynol 61 | 1.0 |
| Trimethylolethane | 8.0 |
| 1,3-Dimethyl-2-imidazolidinone | 2.0 |
| Triethylene glycol | 10.0 |
| 28% Aqueous ammonia | 0.5 |
| Water | balance |

In the composition above, Surfynol 61 is an acetylene alcohol-base surfactant (trade name, produced by Air Products (USA)).

Composition Example J12

Light Magenta Ink J2

In Composition Example J12, Light Magenta Ink J2 was prepared by using the same composition as in Composition Example J11 except for changing the amount of Magenta Dispersing Element J2 added to 3.0 wt % as the solid content concentration.

Composition Example J13

Light Magenta Ink J3

| Additive | Amount Added (wt %) |
|---|---|
| Magenta Dispersing Element J3 <140> | 7.5 |
| Olfine E1010 | 0.1 |
| Olfine STG | 0.5 |
| TEGmBE | 1.0 |
| 1,2-Hexanediol | 2.5 |
| Triethylene glycol | 2.0 |
| 2-Pyrrolidone | 4.0 |
| Trimethylolpropane | 6.0 |
| Glycerin | 14.0 |
| Water | balance |

In the composition above, Olfine E1010 and Olfine STG each is an acetylene glycol-base surfactant (both are trade name, produced by Nissin Chemical Industry Co., Ltd.) and TEGmBE denotes a triethylene glycol monobutyl ether.

Composition Example J14

Light Magenta Ink J3

In Composition Example J14, Light Magenta Ink J3 was prepared by using the same composition as in Composition Example J15 except for changing the amount of Magenta Dispersing Element J3 added to 2.0 wt % as the solid content concentration.

Composition Example J15

Dark Cyan Ink J1

| Additive | Amount Added (wt %) |
|---|---|
| Cyan Dispersing Element J1 <95> | 6.0 |
| DEGmBE | 10.0 |
| Diethylene glycol | 3.0 |
| N-Methyl-2-pyrrolidone | 1.0 |
| Glycerin | 10.0 |
| Water | balance |

In the composition above, DEGmBE denotes a diethylene glycol monobutyl ether.

Composition Example J16

Light Cyan Ink J1

In Composition Example J16, Light Cyan Ink J1 was prepared by using the same composition as in Composition Example J15 except for changing the amount of Cyan Dispersing Element J1 added to 1.2 wt % as the solid content concentration.

Composition Example J17

Dark Cyan Ink J2

| Additive | Amount Added (wt %) |
|---|---|
| Cyan Dispersing Element J2 <105> | 8.0 |
| Surfynol 465 | 0.5 |
| Olfine STG | 0.3 |
| TEGmBE | 1.0 |
| 1,2-Hexanediol | 3.0 |
| Glycerin | 17.0 |
| Triethylene glycol | 2.0 |
| 2-Pyrrolidone | 2.0 |
| Water | balance |

In the composition above, Surfynol 465 is an acetylene glycol-base surfactant (trade name, produced by Air Products (USA)), Olfine STG is an acetylene glycol-base surfactant (trade name, produced by Nissin Chemical Industry Co., Ltd.) and TEGmBE denotes a triethylene glycol monobutyl ether.

Composition Example J18

Light Cyan Ink J2

In Composition Example J18, Light Cyan Ink J2 was prepared by using the same composition as in Composition Example J17 except for changing the amount of Cyan Dispersing Element J2 added to 1.6 wt % as the solid content concentration.

Composition Example J19

Dark Cyan Ink J3

| Additive | Amount Added (wt %) |
|---|---|
| Cyan Dispersing Element J3 <110> | 10.0 |
| Surfynol 61 | 0.5 |
| PGmBE | 5.0 |
| Fructose | 5.0 |
| 1,3-Dimethyl-2-imidazolidinone | 2.0 |
| Tetraethylene glycol | 10.0 |
| Water | balance |

In the composition above, Surfynol 61 is an acetylene alcohol-base surfactant (trade name, produced by Air Products (USA)) and PGmBE denotes a propylene glycol monobutyl ether.

Composition Example J20

Light Cyan Ink J3

In Composition Example J20, Light Cyan Ink J3 was prepared by using the same composition as in Composition Example J19 except for changing the amount of Cyan Dispersing Element J3 added to 1.5 wt % as the solid content concentration.

By combining the aqueous color inks prepared in these Composition Examples, aqueous ink sets were produced and used for the printing evaluation described later. The combination in each aqueous ink set is shown below.

Example J-1

Aqueous Ink Set J1

In Example J-1, six color inks prepared above in Composition Examples, namely, Dark Black Ink J1, Dark Yellow Ink J2, Dark Magenta Ink J3, Dark Cyan Ink J2, Light Magenta Ink J1 and Light Cyan Ink J1, were combined and this combination was used as Aqueous Ink Set J1.

Example J-2

Aqueous Ink Set J2

In Example J-2, six color inks prepared above in Composition Examples, namely, Dark Black Ink J2, Dark Yellow Ink J1, Dark Magenta Ink J1, Dark Cyan Ink J1, Light Magenta Ink J2 and Light Cyan Ink J2, were combined and this combination was used as Aqueous Ink Set J2.

Example J-3

Aqueous Ink Set J3

In Example J-3, six color inks prepared above in Composition Examples, namely, Dark Black Ink J3, Dark Yellow Ink J3, Dark Magenta Ink J2, Dark Cyan Ink J3, Light Magenta Ink J3 and Light Cyan Ink J3, were combined and this combination was used as Aqueous Ink Set J3.

Example J-4

Aqueous Ink Set J4

In Example J-4, seven color inks prepared above in Composition Examples, namely, Dark Black Ink J1, Dark Yellow Ink J1, Dark Magenta Ink J1, Dark Cyan Ink J1, Light Yellow Ink J1, Light Magenta Ink J1 and Light Cyan Ink J1, were combined and this combination was used as Aqueous Ink Set J4.

Example J-5

Aqueous Ink Set J5

In Example J-5, seven color inks prepared above in Composition Examples, namely, Dark Black Ink J2, Dark Yellow Ink J2, Dark Magenta Ink J2, Dark Cyan Ink J2, Light Black Ink J1, Light Magenta Ink J2 and Light Cyan Ink J2, were combined and this combination was used as Aqueous Ink Set J5.

Example J-6

Aqueous Ink Set J6

In Example J-6, eight color inks prepared above in Composition Examples, namely, Dark Black Ink J3, Dark Yellow Ink J3, Dark Magenta Ink J3, Dark Cyan Ink J3, Light Black Ink J1, Light yellow Ink J1, Light Magenta Ink J3 and Light Cyan Ink J3, were combined and this combination was used as Aqueous Ink Set J6.

Comparative Example J

Comparative Example J-1

Preparation of Aqueous Ink Set J7

In Comparative Example J-1, Dark Black Ink J4 for use in Comparative Example J-1 was prepared by using, as the colorant, the carbon black pigment used in Black Dispersing Element J1 and, as the dispersant, a polymer dispersant and a surfactant. The composition thereof is shown below.

| Additive | Amount Added (wt %) |
| --- | --- |
| Carbon black pigment <105> | 7.0 |
| Glycerin | 10.0 |
| Polymer dispersant | 3.0 |
| Nonionic surfactant | 1.0 |
| Ion exchanged water | balance |

In the composition above, the carbon black pigment was Raven C (trade name, produced by Columbian Carbon Co., Ltd., C.I. Pigment 7), the nonionic surfactant was Noigen EA160 (produced by Dai-ichi Kogyo Seiyaku Co., Ltd.), and the polymer dispersant was Solsperse 27000 (produced by Avecia Limited). The composition above was dispersed in a bead mill MINIZETOR (manufactured by Ajisawa) for 2 hours to prepare Dark Black Ink J4 for use in Comparative Example J-1. In this Comparative Example, Proxel XL-2, EDTA 2Na salt and benzotriazole were not added.

Dark Yellow Ink J4 for use in Comparative Example J-1 was prepared by using the same composition as above except for changing the carbon black pigment to C.I. Pigment Yellow 14 (insoluble disazo pigment) in the composition above.

Dark Magenta Ink J4 for use in Comparative Example J-1 was prepared by using the same composition as above except for changing the carbon black pigment to C.I. Pigment Red 81 (basic dye lake pigment) in the composition above.

Light Magenta Ink J4 for use in Comparative Example J-1 was prepared by using the same composition as above except for changing the carbon black pigment to C.I. Pigment Red 81 (basic dye lake pigment) and changing the amount added thereof to 2.0 wt % in the composition above.

Dark Cyan Ink J4 for use in Comparative Example J-1 was prepared by using the same composition as above except for changing the carbon black pigment to C.I. Pigment Blue 2 (basic dye lake pigment) in the composition above.

Light Cyan Ink J4 for use in Comparative Example J-1 was prepared by using the same composition as above except for changing the carbon black pigment to C.I. Pigment Blue 2 (basic dye lake pigment) and changing the amount added thereof to 1.5 wt % in the composition above.

The thus-prepared 6 color inks, namely, Dark Black Ink J4, Dark Yellow Ink J4, Dark Magenta Ink J4, Dark Cyan Ink J4, Light Magenta Ink J4 and Light Cyan Ink J4, were combined to provide an ink set and this was designated as Aqueous Ink Set J7 of Comparative Example J-1.

Comparative Example J-2

In Comparative Example J-2, a dispersing element and an aqueous ink set described in JP-A-2002-30235 were produced. In this Comparative Example, a water-soluble resin was used as the dispersing polymer for use in the dispersing element. The compositions of the dispersing element and the aqueous ink using it are shown below.

Production of Black Dispersing Element J4

| Additive | Amount Added (wt %) |
| --- | --- |
| Carbon black pigment | 20.0 |
| Styrene-acrylic acid copolymer | 10.0 |
| Glycerin | 10.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Black Dispersing Element J for use in Comparative Example J-2. The average particle size of the obtained Black Dispersing Element J was 75 nm.

In the composition above, the carbon black pigment was Raven C (trade name, produced by Columbian Carbon Co., Ltd., C.I. Pigment Black 7) and the styrene-acrylic acid copolymer used had a weight average molecular weight of 7,000 and an acid value of 150.

<Preparation of Dark Black Ink J5>

Using Black Dispersing Element J4 produced according to the above-described composition and method, Dark Black Ink J5 for use in Comparative Example J-2 was prepared. The composition is shown below.

| Additive | Amount Added (wt %) |
| --- | --- |
| Black Dispersing Element J4 | 10.0 |
| Acryl emulsion | 8.0 |
| Ethylene glycol | 20.0 |
| Diethylene glycol | 10.0 |
| Maltitol | 5.0 |
| Surfynol 465 | 0.1 |
| Ion exchanged water | balance |

In the composition above, the acryl emulsion is Iodosol GD86B (trade name, produced by Nippon NCS, glass transition temperature: 60° C., average particle size: 90 nm) and Surfynol 465 is an acetylene glycol-base surfactant (trade name, produced by Air Products (USA)). Other than the composition above, 1.0 wt % of glycerin was contained in Black Dispersing Element J4.

<Preparation of Light Black Ink J2>

Using Black Dispersing Element J4 produced according to the above-described composition and method, Light Black Ink J2 for use in Comparative Example J-2 was prepared. The composition is shown below.

| Additive | Amount Added (wt %) |
| --- | --- |
| Black Dispersing Element J4 | 2.0 |
| Acryl emulsion | 8.0 |
| Ethylene glycol | 25.0 |
| Diethylene glycol | 10.0 |
| Maltitol | 10.0 |
| Surfynol 465 | 0.1 |
| Ion exchanged water | balance |

In the composition above, the acryl emulsion is Iodosol GD86B (trade name, produced by Nippon NCS, glass transition temperature: 60° C., average particle size: 90 nm) and Surfynol 465 is an acetylene glycol-base surfactant (trade name, produced by Air Products (USA)). Other than the composition above, 0.2 wt % of glycerin was contained in Black Dispersing Element J4.

<Production of Yellow Dispersing Element J4>

| Additive | Amount Added (wt %) |
|---|---|
| C.I. Pigment Yellow 74 | 20.0 |
| Styrene-acrylic acid copolymer | 12.0 |
| Diethylene glycol | 15.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Yellow Dispersing Element J4 for use in Comparative Example J-2. The average particle size of the obtained Yellow Dispersing Element J4 was 112 nm.

In the composition above, the styrene-acrylic acid copolymer used had a weight average molecular weight of 10,000 and an acid value of 120.

<Preparation of Dark Yellow Ink J5>

Using Yellow Dispersing Element J4 produced according to the above-described composition and method, Dark Yellow Ink J5 for use in Comparative Example J-2 was prepared. The composition is shown below.

| Additive | Amount Added (wt %) |
|---|---|
| Yellow Dispersing Element J4 | 15.0 |
| Acryl emulsion | 10.0 |
| Ethylene glycol | 20.0 |
| Diethylene glycol | 10.0 |
| Maltitol | 5.0 |
| Surfynol 465 | 0.1 |
| Ion exchanged water | balance |

In the composition above, the acryl emulsion is Iodosol AD53 (trade name, produced by Nippon NCS, glass transition temperature: 80° C., average particle size: 80 nm) and Surfynol 465 is an acetylene glycol-base surfactant (trade name, produced by Air Products (USA)). Other than the composition above, 2.25 wt % of diethylene glycol was contained in Yellow Dispersing Element J4.

<Preparation of Light Yellow Ink J2>

Using Yellow Dispersing Element J4 produced according to the above-described composition and method, Light Yellow Ink J2 for use in Comparative Example J-2 was prepared. The composition is shown below.

| Additive | Amount Added (wt %) |
|---|---|
| Yellow Dispersing Element J4 | 3.0 |
| Acryl emulsion | 10.0 |
| Ethylene glycol | 25.0 |
| Diethylene glycol | 10.0 |
| Maltitol | 10.0 |
| Surfynol 465 | 0.1 |
| Ion exchanged water | balance |

In the composition above, the acryl emulsion is Iodosol AD53 (trade name, produced by Nippon NCS, glass transition temperature: 80° C., average particle size: 80 nm) and Surfynol 465 is an acetylene glycol-base surfactant (trade name, produced by Air Products (USA)). Other than the composition above, 0.45 wt % of diethylene glycol was contained in Yellow Dispersing Element J4.

<Production of Magenta Dispersing Element J4>

| Additive | Amount Added (wt %) |
|---|---|
| C.I. Pigment Red 122 | 25.0 |
| Joncryl 61J | 18.0 (as solid content) |
| Diethylene glycol | 15.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Magenta Dispersing Element J for use in Comparative Example J-2. The average particle size of the obtained Magenta Dispersing Element J4 was 100 nm.

In the composition above, Joncryl 61J is a styrene-acrylic acid copolymer (trade name, produced by Johnson Polymer Corporation, concentration: 30.5 wt %, weight average molecular weight: 10,000, acid value: 195).

<Preparation of Dark Magenta Ink J5>

Using Magenta Dispersing Element J4 produced according to the above-described composition and method, Dark Magenta Ink J5 for use in Comparative Example J-2 was prepared. The composition is shown below.

| Additive | Amount Added (wt %) |
|---|---|
| Magenta Dispersing Element J4 | 15.0 |
| Styrene-acryl emulsion | 10.0 |
| Ethylene glycol | 20.0 |
| Diethylene glycol | 10.0 |
| Maltitol | 5.0 |
| Surfynol 465 | 0.1 |
| Ion exchanged water | balance |

In the composition above, the styrene-acryl emulsion is Microgel E-1002 (trade name, produced by Nippon Paint Co., Ltd., glass transition temperature: about 60° C., average particle size: 100 nm) and Surfynol 465 is an acetylene glycol-base surfactant (trade name, produced by Air Products (USA)). Other than the composition above, 2.25 wt % of diethylene glycol was contained in Magenta Dispersing Element J4.

<Preparation of Light Magenta Ink J5>

Using Magenta Dispersing Element J4 produced according to the above-described composition and method, Light Magenta Ink J5 for use in Comparative Example J-2 was prepared. The composition is shown below.

| Additive | Amount Added (wt %) |
|---|---|
| Magenta Dispersing Element J4 | 3.0 |
| Styrene-acryl emulsion | 8.0 |
| Ethylene glycol | 25.0 |
| Diethylene glycol | 10.0 |
| Maltitol | 10.0 |
| Surfynol 465 | 0.1 |
| Ion exchanged water | balance |

In the composition above, the styrene-acryl emulsion is Microgel E-1002 (trade name, produced by Nippon Paint Co., Ltd., glass transition temperature: about 60° C., average particle size: 100 nm) and Surfynol 465 is an acetylene glycol-base surfactant (trade name, produced by Air Products (USA)). Other than the composition above, 0.45 wt % of diethylene glycol was contained in Magenta Dispersing Element J4.

<Production of Cyan Dispersing Element J4>

| Additive | Amount Added (wt %) |
|---|---|
| C.I. Pigment Blue 15:3 | 25.0 |
| Joncryl 61J | 15.0 (as solid content) |
| Glycerin | 10.0 |
| Ion exchanged water | balance |

The additives shown above were mixed and dispersed by Eiger Motor Mill Model M250 (manufactured by Eiger Japan) filled in 60% by volume with 0.3-mm zirconia beads at a rotation number of 5,000 rpm for 2 hours to produce Cyan Dispersing Element J for use in Comparative Example J-2. The average particle size of the obtained Cyan Dispersing Element J4 was 87 nm.

In the composition above, Joncryl 61J is a styrene-acrylic acid copolymer (trade name, produced by Johnson Polymer Corporation, concentration: 30.5 wt %, weight average molecular weight: 10,000, acid value: 195).

<Preparation of Dark Cyan Ink J5>

Using Cyan Dispersing Element J4 produced according to the above-described composition and method, Dark Cyan Ink J5 for use in Comparative Example J-2 was prepared. The composition is shown below.

| Additive | Amount Added (wt %) |
|---|---|
| Cyan Dispersing Element J4 | 10.0 |
| Acryl emulsion | 10.0 |
| Ethylene glycol | 20.0 |
| Diethylene glycol | 10.0 |
| Maltitol | 5.0 |
| Surfynol 465 | 0.1 |
| Ion exchanged water | balance |

In the composition above, the acryl emulsion is Iodosol GD86B (trade name, produced by Nippon NCS, glass transition temperature: 60° C., average particle size: 90 nm) and Surfynol 465 is an acetylene glycol-base surfactant (trade name, produced by Air Products (USA)). Other than the composition above, 1.0 wt % of glycerin was contained in Cyan Dispersing Element J4.

<Preparation of Light Cyan Ink J5>

Using Cyan Dispersing Element J4 produced according to the above-described composition and method, Light Cyan Ink J5 for use in Comparative Example J-2 was prepared. The composition is shown below.

| Additive | Amount Added (wt %) |
|---|---|
| Cyan Dispersing Element J4 | 2.0 |
| Acryl emulsion | 10.0 |
| Ethylene glycol | 20.0 |
| Diethylene glycol | 10.0 |
| Maltitol | 5.0 |
| Surfynol 465 | 0.1 |
| Ion exchanged water | balance |

In the composition above, the acryl emulsion is Iodosol GD86B (trade name, produced by Nippon NCS, glass transition temperature: 60° C., average particle size: 90 nm) and Surfynol 465 is an acetylene glycol-base surfactant (trade name, produced by Air Products (USA)). Other than the composition above, 0.2 wt % of glycerin was contained in Cyan Dispersing Element J4.

These eight color inks prepared according to the above-described materials and compositions, namely, Dark Black Ink J5, Light Black Ink J2, Dark Yellow Ink J5, Light Yellow Ink J2, Dark Magenta Ink J5, Light Magenta Ink J5, Dark Cyan Ink J5 and Light Cyan Ink J5, were combined and this combination was designated as Aqueous Ink Set J8 of Comparative Example J-2.

(Evaluation of Aqueous Ink Set)

<(1) Evaluation of Printing Quality on Plain Paper and Gloss Media>

The aqueous ink sets prepared in Examples and Comparative Examples each was mounted in a modified inkjet printer PM-950C (trade name, manufactured by Seiko Epson Corporation) and a full color image of a person was printed on a plain paper and a gloss medium. Then, the printing quality of the printed image was evaluated by examining the blurring and graininess. The plain papers used in this evaluation were (1) Conqueror, (2) Reymat, (3) Mode Copy, (4) Rapid Copy, (5) Xerox P, (6) Xerox 4024, (7) Xerox 10, (8) Neenah Bond, (9) Ricopy 6200 and (10) Hammer mill Copy Plus which are plain papers commercially available in Europe, USA and Japan. The gloss media were (11) Photo-Print Paper 2, (12) MC Photo-Paper ((11) and (12) both are trade name, produced by Seiko Epson Corporation), (13) Ink Jet Paper Photo Glossy Paper Super Photo Grade, (14) Ink Jet Paper Photo Paper High Grade ((13) and (14) both are trade name, produced by Fuji Photo Film Co., Ltd.), (15) Ink Jet Photographic Quality Paper Photo Weight (trade name, produced by Kodak) and (16) Photo-like QP QP20A4GH (trade name, produced by Konica Corporation) which are gloss media commercially available in Europe, USA and Japan. The evaluation was performed with an eye. The criteria for evaluation are shown below. The evaluation results are shown in Table 42. In Table 42, the parenthesized number shown in the Species of Printing Medium is the same as the parenthesized number affixed to the name of plain paper or gloss medium above.

A: Blurring was not observed in all image portions and the shadow portion in the skin of person looked smooth.

B: Blurring was slightly observed in the image portions where two or more color inks were superposed, and the shadow portion in the skin of person had a slightly grainy feeling (practicable level).

C: Blurring was slightly observed in the mono-chromatic image portions and the shadow portion in the skin of person had a grainy feeling.

D: Blurring was serious even in the monochromatic image portion and the shadow portion in the skin of person had a conspicuously grainy feeling.

TABLE 42

(1) Evaluation Results of Printing Quality on Plain Paper and Gloss Media

|  |  | Example J | | | | | | Comparative Example J | |
|---|---|---|---|---|---|---|---|---|---|
| Species of Printing Medium |  | Ink Set J1 | Ink Set J2 | Ink Set J3 | Ink Set J4 | Ink Set J5 | Ink Set J6 | Ink Set J7 | Ink Set J8 |
| Plain | (1) | A | A | A | A | A | A | D | C |
| Paper | (2) | A | A | A | A | A | A | C | C |
|  | (3) | A | A | A | A | A | A | D | D |
|  | (4) | A | A | A | A | A | A | D | D |
|  | (5) | A | A | A | A | A | A | D | D |
|  | (6) | A | A | A | A | A | A | D | D |
|  | (7) | A | B | B | A | A | A | D | D |
|  | (8) | A | A | A | A | A | A | D | D |
|  | (9) | A | A | A | A | A | A | D | D |
|  | (10) | B | B | B | A | A | A | D | D |
| Gloss | (11) | A | A | A | A | A | A | C | C |
| Media | (12) | A | A | A | A | A | A | D | C |
|  | (13) | B | A | A | A | A | A | D | C |
|  | (14) | A | A | A | A | A | A | D | C |
|  | (15) | B | A | A | A | A | A | D | C |
|  | (16) | A | A | A | A | A | A | D | B |

As apparent from the results in Table 42, the image printed by using Aqueous Ink Set J7 of Comparative Example J-1 and Aqueous Ink Set J8 of Comparative Example J-2 was seriously blurred and inferior in the graininess particularly on plain paper, whereas the image printed by using Ink Sets J1 to J6 of Examples J-1 to J-6 was less blurred irrespective of plain paper or gloss media. Among these, particularly in the case of image printed by using Aqueous Ink Set J5 or J6, a clear image with smooth gradation in the gray portion and free of blurring and graininess was obtained irrespective of plain paper or gloss media.

As verified above, the present invention can provide an aqueous ink for inkjet recording, which gives a clear image reduced in the blurring irrespective of plain paper or gloss media and ensures high quality and high practicability.

<(2) Evaluation of Glossiness on Gloss Media>

The aqueous ink sets prepared in Examples and Comparative Examples each was mounted in a modified inkjet printer PM-950C (trade name, manufactured by Seiko Epson Corporation) and a solid pattern was printed on gloss media with a resolution of 720 dpi×720 dpi by varying the duty from 5% to 100% in steps of 10%. The printed matter was evaluated on the glossiness. The gloss media used in this evaluation were the gross media ((11) to (16)) used in (1) Evaluation of Printing Quality on Plain Paper and Gloss Media. The evaluation was performed with an eye. The criteria for evaluation are shown below. The evaluation results are shown in Table 43. In Table 43, the parenthesized numbers shown in the Species of Printing Medium are the same as those in Table 42.

A: In all solid patterns, glossiness was observed.

B: In the printing portion at 100% duty, glossiness was slightly lacking but no problem in practice.

C: In the printing portion at 50% duty or more, glossiness was lacking.

D: In all solid patterns, glossiness was lacking.

TABLE 43

(2) Evaluation Results of Glossiness on Gloss Media

|  |  | Example J | | | | | | Comparative Example J | |
|---|---|---|---|---|---|---|---|---|---|
| Species of Printing Medium |  | Ink Set J1 | Ink Set J2 | Ink Set J3 | Ink Set J4 | Ink Set J5 | Ink Set J6 | Ink Set J7 | Ink Set J8 |
| Gloss | (11) | A | B | B | A | A | A | C | C |
| Media | (12) | A | A | A | A | A | A | D | D |
|  | (13) | A | A | A | A | A | A | D | C |
|  | (14) | A | A | A | A | A | A | D | C |
|  | (15) | A | A | A | A | A | A | D | C |
|  | (16) | A | A | A | A | A | A | C | B |

As apparent from the results in Table 43, when printed by using Aqueous Ink Set J7 of Comparative Example J-1 and Aqueous Ink Set J8 of Comparative Example J-2, the glossiness was lacking and the printing density was low, whereas when printed by using Ink Sets J1 to J6 of Examples J-1 to J-6, the density was high and the image was clear and excellent in the glossiness.

As verified above, the present invention can provide an aqueous ink suitable for inkjet recording, which ensures excellent glossiness, high quality and high practicability even on gloss media such as gloss paper commonly used for inkjet recording.

<(3) Evaluation of Fixing Property of Printed Matter>

The aqueous ink sets prepared in Examples and Comparative Examples above each was mounted in a modified inkjet printer PM-950C (trade name, manufactured by Seiko Epson Corporation) and a letter was printed on plain paper and gloss media. The printed matter was evaluated on the fixing property. The plain paper and gloss media used in this evaluation were the same as those used in <(1) Evaluation of Printing Quality on Plain Paper and Gloss Media>. In the evaluation, a printed image was dried at 20 to 25° C./40 to 60% RH for one hour after printing and rubbed with a finger and the shifted/thinned state of letter was observed with an eye. The criteria for evaluation are shown below. The evaluation results are shown in Table 44. In Table 44, the parenthesized numbers shown in the Species of Printing Medium are the same as those in Table 42.

A: Neither shifted nor thinned.

B: Slightly shifted but no problem in practice.

C: Shifted or thinned.

D: Seriously shifted and thinned and the letter could be hardly made out.

TABLE 44

(3) Evaluation of Fixing Property of Printed Matter

|  |  | Example J | | | | | | Comparative Example J | |
|---|---|---|---|---|---|---|---|---|---|
| Species of Printing Medium |  | Ink Set J1 | Ink Set J2 | Ink Set J3 | Ink Set J4 | Ink Set J5 | Ink Set J6 | Ink Set J7 | Ink Set J8 |
| Plain | (1) | A | A | A | A | A | A | D | D |
| Paper | (2) | A | A | A | A | A | A | D | D |
|  | (3) | A | A | A | A | A | A | C | C |
|  | (4) | A | A | A | A | A | A | C | C |
|  | (5) | A | A | A | A | A | A | C | C |
|  | (6) | A | A | A | A | A | A | C | B |
|  | (7) | A | B | B | A | A | A | D | C |
|  | (8) | A | A | A | A | A | A | D | D |
|  | (9) | A | A | A | A | A | A | C | D |

TABLE 44-continued (3) Evaluation of Fixing Property of Printed Matter

| Species of Printing Medium | | Example J | | | | | | Comparative Example J | |
|---|---|---|---|---|---|---|---|---|---|
| | | Ink Set J1 | Ink Set J2 | Ink Set J3 | Ink Set J4 | Ink Set J5 | Ink Set J6 | Ink Set J7 | Ink Set J8 |
| Gloss Media | (10) | B | B | B | A | A | A | C | B |
| | (11) | A | A | A | A | A | A | C | D |
| | (12) | A | A | A | A | A | A | D | D |
| | (13) | B | A | A | A | A | A | D | D |
| | (14) | A | A | A | A | A | A | D | D |
| | (15) | B | A | A | A | A | A | D | C |
| | (16) | A | A | A | A | A | A | D | D |

As apparent from the results in Table 44, when printed with Aqueous Ink Set J7 of Comparative Example J-1 and Aqueous Ink Set J8 of Comparative Example J-2, the fixing property was lacking particularly on gloss media, whereas when printed with Aqueous Ink Sets J1 to J6 of Examples J-1 to J-6, good fixing property was exhibited on both plain paper and gloss media.

As verified above, the present invention can provide an aqueous ink set for inkjet recording, which ensures excellent fixing property, high quality and high practicability not only on plain paper but also on gloss media such as gloss paper commonly used for inkjet recording.

<(4) Evaluation of Storage Stability and Ejection Stability of Aqueous Ink>

The aqueous inks prepared in Composition Examples and Comparative Examples above each was charged in a sampling vial and after tightly plugging the vial, left standing at 60° C. for one week. The amount of foreign matters generated and physical values (viscosity, surface tension) were examined before and after each aqueous ink was left standing. The criteria for evaluation are shown below. The evaluation results are shown in Table 45.

A: The ratio of the amount of foreign matters generated and physical values after standing at 60° C. to those before standing was in the range from 0.99 to 1.01.

B: The ratio was from 0.95 to 0.99 or from 1.01 to 1.05 (practicable level).

C: The ratio was from 0.90 to 0.95 or from 1.05 to 1.10.

D: The ratio was less than 0.90 or more than 1.10.

Also, the aqueous ink sets prepared in Examples and Comparative Examples above were evaluated on the ejection stability. The ejection stability was evaluated by mounting each aqueous ink set in a modified inkjet printer PM-950C (trade name, manufactured by Seiko Epson Corporation) and observing the printing disorder in continuous printing of 100 pages on A4-size Xerox P. The criteria for evaluation are shown below. The evaluation results are shown in Table 45.

A: Printing disorder was not generated at all with any aqueous ink.

B: Printing disorder was generated with some aqueous ink but at less than 10 portions (practicable level).

C: With some aqueous inks, printing disorder was generated at 10 to less than 100 portions.

D: With some aqueous inks, printing disorder was generated at 100 or more portions.

TABLE 45

(4) Evaluation Results of Storage Stability and Ejection Stability of Aqueous Ink

| | Example J | | | | | | | | | | | | | | | | | | |
|---|---|---|---|---|---|---|---|---|---|---|---|---|---|---|---|---|---|---|---|
| | Dark Bk Ink | | | Dark Y Ink | | | Dark M Ink | | | Dark C Ink | | | Light Bk Ink | Light Y Ink | Light M Ink | | | Light C Ink | | |
| Items | J1 | J2 | J3 | J1 | J2 | J3 | J1 | J2 | J3 | J1 | J2 | J3 | J1 | J1 | J1 | J2 | J3 | J1 | J2 | J3 |
| Amount of foreign matters generated | A | A | A | A | A | A | A | A | A | A | A | A | A | A | A | A | A | A | A | A |
| Viscosity | A | A | A | A | A | A | A | B | A | A | A | A | B | A | A | B | A | A | A | A |
| Surface tension | A | A | A | A | A | A | A | A | A | A | A | A | A | A | A | A | A | A | A | A |
| Ejection stability | A | A | A | A | A | A | A | A | A | A | A | A | A | A | A | A | A | A | A | A |

| | Comparative Example J | | | | | | | | | | | | |
|---|---|---|---|---|---|---|---|---|---|---|---|---|---|
| | Dark Bk Ink | | Dark Y Ink | | Dark M Ink | | Dark C Ink | | Light Bk Ink | Light Y Ink | Light M Ink | | Light C Ink | |
| Items | J4 | J5 | J4 | J5 | J4 | J5 | J4 | J5 | J2 | J2 | J4 | J5 | J4 | J5 |
| Amount of foreign matters generated | C | D | D | C | D | C | D | D | C | B | C | C | C | C |
| Viscosity | D | C | D | C | D | D | D | D | C | C | D | C | C | C |
| Surface tension | B | B | C | B | C | D | D | C | B | B | B | C | C | C |
| Ejection stability | D | D | D | C | D | D | D | D | D | C | C | C | D | C |

As apparent from the results in Table 45, the aqueous ink used for the aqueous ink sets of Comparative Examples J-1 and J-2 was poor in the storage stability and ejection stability, whereas the aqueous ink used for the aqueous ink sets of Examples J-1 to J-6 exhibited good storage stability in both foreign matters and physical values and also exhibited good ejection stability.

Also, the same test was performed by changing Black Dispersing Element J1 in the ink composition shown as Composition Example J1 to Black Dispersing Element J4 of Comparative Example J-2, as a result, the surface tension was less changed (B in the above-described criteria for evaluation) but a large amount of foreign matters were generated (D in the above-described criteria for evaluation) to reduce the filterability and the viscosity of the ink was increased (D in the above-described criteria for evaluation) to fail in obtaining stable storability.

As verified from these evaluation results, the aqueous ink set using the dispersing element according to the present invention is an aqueous ink set suitable for inkjet recording, which exhibits good printing quality irrespective of plain paper or gloss media and also exhibits excellent ejection stability and storage stability.

<(5) Evaluation of Stability of Aqueous Ink>

In the polymerization of the dispersing polymer used for the production of Black Dispersing Element J1, the amount of aromatic ring in the dispersing polymer was changed by varying the ratio of styrene and α-methylstyrene as monomers containing the aromatic ring to butyl methacrylate, lauryl methacrylate and acrylic acid as other monomers. Using obtained dispersing polymers, Black Dispersing Elements J5 to J12 were produced and then, aqueous inks were prepared by using the same composition and method as in Composition Example J1 of Examples except for using these black dispersing elements. In Black Dispersing Elements J5 to J12, the weight ratio of Monac 880 (trade name, produced by Cabot Co., C.I. Pigment Black 7) used as the colorant, which is a carbon black pigment, to the dispersing polymer was the same as in Black Dispersing Element J1. The compositions of Black Dispersing Elements J5 to J12 are shown below. The amount of aromatic ring in the dispersing polymer was measured in the same manner as in Black Dispersing Element J1 and is shown after the name of dispersing element.

(Black Dispersing Element J5, Amount of Aromatic Ring in Dispersing Polymer: 0 wt %)

| | |
|---|---|
| Monac 880 (trade name, produced by Cabot Co., C.I. Pigment Black 7) | 30 parts |
| Styrene | 0 part |
| α-Methylstyrene | 0 part |
| Butyl methacrylate | 46 parts |
| Lauryl methacrylate | 30.7 parts |
| Acrylic acid | 6.1 parts |
| tert-Dodecylmercaptan | 0.3 parts |
| Styrene | 0 part |
| Acrylic acid | 46 parts |
| Butyl methacrylate | 153.3 parts |
| tert-Dodecylmercaptan | 1 part |
| Azobisisobutyronitrile | 3 parts |

(Black Dispersing Element J6, Amount of Aromatic Ring in Dispersing Polymer: 10 wt %)

| | |
|---|---|
| Monac 880 (trade name, produced by Cabot Co., C.I. Pigment Black 7) | 30 parts |
| Styrene | 6 parts |
| α-Methylstyrene | 2.3 parts |
| Butyl methacrylate | 39.7 parts |
| Lauryl methacrylate | 26.5 parts |
| Acrylic acid | 5.3 parts |
| tert-Dodecylmercaptan | 0.3 parts |
| Styrene | 30 parts |
| Acrylic acid | 39.7 parts |
| Butyl methacrylate | 132.4 parts |
| tert-Dodecylmercaptan | 1 part |
| Azobisisobutyronitrile | 3 parts |

(Black Dispersing Element J7, Amount of Aromatic Ring in Dispersing Polymer: 20 wt %)

| | |
|---|---|
| Monac 880 (trade name, produced by Cabot Co., C.I. Pigment Black 7) | 30 parts |
| Styrene | 12 parts |
| α-Methylstyrene | 4.6 parts |
| Butyl methacrylate | 33.5 parts |
| Lauryl methacrylate | 22.3 parts |
| Acrylic acid | 4.5 parts |
| tert-Dodecylmercaptan | 0.3 parts |
| Styrene | 60 parts |
| Acrylic acid | 33.5 parts |
| Butyl methacrylate | 111.7 parts |
| tert-Dodecylmercaptan | 1 part |
| Azobisisobutyronitrile | 3 parts |

(Black Dispersing Element J8, Amount of Aromatic Ring in Dispersing Polymer: 25 wt %)

| | |
|---|---|
| Monac 880 (trade name, produced by Cabot Co., C.I. Pigment Black 7) | 30 parts |
| Styrene | 15 parts |
| α-Methylstyrene | 5.8 parts |
| Butyl methacrylate | 30.4 parts |
| Lauryl methacrylate | 20.2 parts |
| Acrylic acid | 4.1 parts |
| tert-Dodecylmercaptan | 0.3 parts |
| Styrene | 75 parts |
| Acrylic acid | 30.4 parts |
| Butyl methacrylate | 101.2 parts |
| tert-Dodecylmercaptan | 1 part |
| Azobisisobutyronitrile | 3 parts |

(Black Dispersing Element J9, Amount of Aromatic Ring in Dispersing Polymer: 30 wt %)

| | |
|---|---|
| Monac 880 (trade name, produced by Cabot Co., C.I. Pigment Black 7) | 30 parts |
| Styrene | 18 parts |
| α-Methylstyrene | 6.9 parts |
| Butyl methacrylate | 27.2 parts |
| Lauryl methacrylate | 18.2 parts |
| Acrylic acid | 3.6 parts |
| tert-Dodecylmercaptan | 0.3 parts |
| Styrene | 90 parts |
| Acrylic acid | 27.2 parts |
| Butyl methacrylate | 90.8 parts |
| tert-Dodecylmercaptan | 1 part |
| Azobisisobutyronitrile | 3 parts |

(Black Dispersing Element J10, Amount of Aromatic Ring in Dispersing Polymer: 60 wt %)

| | |
|---|---|
| Monac 880 (trade name, produced by Cabot Co., C.I. Pigment Black 7) | 30 parts |
| Styrene | 36 parts |
| α-Methylstyrene | 13.8 parts |
| Butyl methacrylate | 8.5 parts |
| Lauryl methacrylate | 5.7 parts |
| Acrylic acid | 1.1 parts |
| tert-Dodecylmercaptan | 0.3 parts |
| Styrene | 180 parts |
| Acrylic acid | 8.5 parts |
| Butyl methacrylate | 28.4 parts |
| tert-Dodecylmercaptan | 1 part |
| Azobisisobutyronitrile | 3 parts |

(Black Dispersing Element J11, Amount of Aromatic Ring in Dispersing Polymer: 70 wt %)

| | |
|---|---|
| Monac 880 (trade name, produced by Cabot Co., C.I. Pigment Black 7) | 30 parts |
| Styrene | 42 parts |
| α-Methylstyrene | 16.1 parts |
| Butyl methacrylate | 2.3 parts |
| Lauryl methacrylate | 1.5 parts |
| Acrylic acid | 0.3 parts |
| tert-Dodecylmercaptan | 0.3 parts |
| Styrene | 210 parts |
| Acrylic acid | 2.3 parts |

-continued

| | |
|---|---|
| Butyl methacrylate | 7.6 parts |
| tert-Dodecylmercaptan | 1 part |
| Azobisisobutyronitrile | 3 parts |

(Black Dispersing Element J12, Amount of Aromatic Ring in

| | |
|---|---|
| Monac 880 (trade name, produced by Cabot Co., C.I. Pigment Black 7) | 30 parts |
| Styrene | 67 parts |
| α-Methylstyrene | 0 part |
| Butyl methacrylate | 0 part |
| Lauryl methacrylate | 0 part |
| Acrylic acid | 0 part |
| tert-Dodecylmercaptan | 0.3 parts |
| Styrene | 215 parts |
| Acrylic acid | 0 part |
| Butyl methacrylate | 0 part |
| tert-Dodecylmercaptan | 1 part |
| Azobisisobutyronitrile | 3 parts |

The aqueous inks using the dispersing elements according to the above-described method and materials were evaluated on the storage stability. In the evaluation, each ink was charged into a sampling vial and after tightly plugging the vial, left standing at 60° C. or 70° C. for one week. The foreign matters generated and physical value (viscosity) of the ink were examined before and after the aqueous ink was left standing. The criteria for evaluation were the same as those in the evaluation of storage stability shown in (4) Evaluation of Storage Stability and Ejection Stability of Aqueous Ink> above. The evaluation results are shown in Table 46.

TABLE 46

(5) Evaluation Results of Stability of Aqueous Ink

| | | Black Dispersing Element Used in Aqueous Ink | | | | | | | |
|---|---|---|---|---|---|---|---|---|---|
| | | J5 | J6 | J7 | J8 | J9 | J1 | J10 | J11 | J12 |
| | | Amount of Aromatic Ring (wt %) | | | | | | | |
| | | 0 | 10 | 20 | 25 | 30 | 50 | 60 | 70 | 73 |
| Foreign matters | left standing at 60° C. | D | D | B | A | A | A | A | B | C |
| | left standing at 70° C. | D | D | C | A | A | A | B | C | D |
| Viscosity | left standing at 60° C. | D | D | A | A | A | A | A | A | C |
| | left standing at 70° C. | D | D | A | A | A | A | A | B | D |

It is seen from the results in Table 46 that when the amount of aromatic ring in the dispersing polymer of the present invention is from 20 to 70 wt %, the storage stability can be ensured. It is also seen that when the amount of aromatic ring is from 25 to 50 wt %, neither generation of foreign matters nor change of viscosity occurs and this is a preferred embodiment.

As verified above, the present invention can provide an aqueous ink set for inkjet recording, which ensures excellent storage stability, high quality and high practicability. When an aqueous ink set obtained by combining such aqueous inks is used, in both evaluations of printing quality (blurring, graininess) and fixing property of the printed image, excellent printed matter properties are exhibited not only on plain paper but also on gloss media commonly used for inkjet recording.

These reveal that when the colorant is dispersed by using a general dispersant (for example, a water-soluble polymer dispersant or a surfactant) as in conventional techniques, a penetrant preferred in the present invention (a substance comprising one or more member selected from an acetylene glycol-base surfactant, an acetylene alcohol-base surfactant, a silicon-base surfactant, a di(tri)ethylene glycol monobutyl ether, a (di)propylene glycol monobutyl ether and a 1,2-alkylene glycol) is difficult to use and therefore, a sufficiently high printing quality cannot be obtained. However, in the case of using the dispersing element of the present invention where a pigment is encapsulated with a dispersing polymer and rendered dispersible in water and the amount of aromatic ring in the dispersing polymer is from 20 to 70 wt % of the dispersing polymer, even an aqueous ink containing the above-described penetrant can be ensured with storage stability and ejection stability while keeping sufficiently high printing quality and fixing property and an aqueous ink set suitable for inkjet recording can be provided. Furthermore, a pigment is used in the aqueous ink of the present invention and this provides an effect of giving a printed matter more excellent in the water resistance and light fastness than those obtained by using a dye conventionally often used as the colorant in an ink for inkjet printers. In addition, the function of the dispersing polymer encapsulating the colorant can be freely changed by the polymerizing monomer or other reactive agents and this provides an effect that more various functions (functions for more enhancing, for example, light fastness, gas resistance, colorability, glossiness and fixing property of printed matter) can be imparted. In the case of using a dispersant (for example, water-soluble polymer dispersant or surfactant) conventionally used for dispersing a pigment in an aqueous system, the adsorptive strength of the dispersant to the pigment is fundamentally weak and the dispersant is partially desorbed. Due to the resultant desorbed material or the dispersant not adsorbed, the viscosity of ink increases and therefore, the amount of colorant added is limited, as a result, a sufficiently high color formation can be hardly obtained. The desorption conspicuously occurs particularly when the penetrant preferred in the present invention is used.

The present invention should not be construed as being limited to these Examples and various changes and modifications can be made therein without departing from the spirit and scope of the present invention.

Example K

The present invention is specifically described below by referring to Examples, however, the scope of the present invention is not limited thereto. The physical values (surface tension, average particle size) of the dispersions obtained in these Examples were measured by the following methods.

"Measurement of Surface Tension"

The pigment dispersions obtained in Examples and Comparative Examples each was measured on the surface tension at 20° C. by a surface tension balance (CBVP-A3, manufactured by Kyowa Interface Science Co., Ltd.).

"Measurement of Average Particle Size"

The pigment dispersions obtained in Examples and Comparative Examples each was diluted with ion exchanged water to have a pigment concentration of 0.001 to 0.01 wt % (because the optimal concentration at the measurement slightly differs depending on the pigment) and the average particle size of dispersed particles at 20° C. was measured by a particle size distribution meter (DLS-800, manufactured by Otsuka Electronics Co., Ltd.). The particle size is shown in < > as the average particle size in the unit of nm (nanometer).

In Examples here, the pigment was encapsulated with a reactive dispersant and then subjected to an emulsification polymerization in the presence of a catalyst in water to produce a dispersing element. Subsequently, the produced dispersing element was dispersed in water by adding a neutralizer and a dispersion accelerator to obtain each dispersion.

The production method of dispersion according to the present invention is specifically described below.

Production Step of Dispersing Element
(Dispersing Element K1)

For the production of Dispersing Element K1, Monac 880 (produced by Cabot Co.) which is a carbon black pigment was used.

A reaction vessel equipped with a stirrer, a thermometer, a reflux tube and a dropping funnel was purged with nitrogen and thereinto, 20 parts of styrene, 5 parts of α-methylstyrene, 15 parts of butyl methacrylate, 10 parts of lauryl methacrylate, 2 parts of acrylic acid and 0.3 parts of tert-dodecylmercaptan were charged and heated at 70° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

Subsequently, 40 parts of the obtained dispersing polymer solution, 30 parts of Monac 880 (produced by Cabot Co.) which is carbon black, 100 parts of an aqueous solution containing 0.1 mol/liter of sodium hydroxide, and 30 parts of methyl ethyl ketone were mixed and stirred by a homogenizer for 30 minutes. Thereto, 300 parts of ion exchanged water was added and the resulting solution was further stirred for one hour. The entire amount of methyl ethyl ketone and a part of water were distilled off by a rotary evaporator and the residue was separated by filtration to obtain Dispersing Element K1.

Production of Dispersion (Dispersing Step)
(Dispersion K1)

15 Parts of Dispersing Element K1 obtained above, 1.5 parts of Surfynol 485 (produced by Air Products) as a dispersion accelerator, 0.5 parts of sodium hydroxide as a neutralizer, and 82.5 parts of ion exchanged water were added and dispersed by using a paint shaker (using glass beads, bead filling percentage: 60%, media diameter: 1.7 mm) until the average particle size (secondary particle size) of the dispersing element became 95 nm to obtain Dispersion K1 (surface tension: 33 mN/m).

A part of Dispersion K1 was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the aromatic ring was 36% based on the entire weight of the dispersing polymer.

Dispersions K2 to K4 were obtained in the same manner as above except that a phthalocyanine blue pigment (C.I. Pigment Blue 15:4) which is an organic pigment was used for Dispersion K2, a dimethylquinacridone pigment (C.I. Pigment Red 122) which is an organic pigment was used for Dispersion K3, and a quinacridone pigment (C.I. Pigment Violet 19) which is an organic pigment was used for Dispersion K4. The dispersion accelerator, neutralizer used in the production of these dispersions and the addition ratio thereof are shown in Table 47.

TABLE 47

Dispersion Accelerator and Neutralizer Used in Production of Dispersion and Addition Ratio Thereof

| | Name of Dispersion | | | |
|---|---|---|---|---|
| | Dispersion K1 | Dispersion K2 | Dispersion K3 | Dispersion K4 |
| Name of Dispersing Element | Dispersing Element K1 | Dispersing Element K2 | Dispersing Element K3 | Dispersing Element K4 |
| Addition ratio Pigment used | 15 parts Raven C | 15 parts C.I. Pigment Blue 15:4 | 15 parts C.I. Pigment Red 122 | 15 parts C.I. Pigment Violet 19 |
| Dispersion accelerator | Surfynol 485 | BYK-348 | TEGmBE | 1,2-hexanediol |
| Addition ratio Neutralizer | 1.5 parts sodium hydroxide | 1 part triethanolamine | 5 parts sodium hydroxide | 1 part lithium hydroxide |
| Addition ratio Dispersion solvent | 0.5 parts ion exchanged water | 1.5 parts ion exchanged water | 0.6 parts ion exchanged water | 0.3 parts ion exchanged water |
| Addition ratio | (balance) | (balance) | (balance) | (balance) |
| Surface tension | 32 mN/m | 33 mN/m | 35 mN/m | 36 mN/m |
| Average particle size | 95 nm | 85 nm | 90 nm | 95 nm |

TEGmBE: triethylene glycol monobutyl ether

The production of Dispersion K5 by a production method different from that used for the production of Dispersion K1 is described below.

Production of Dispersing Element
(Dispersing Element K5)

For the production of Dispersing Element K5, Raven C (produced by Columbian Carbon Co., Ltd.) which is a carbon black pigment was used.

In a reaction vessel equipped with an ultrasonic wave generator, a stirrer, a dripping device, a water cooled reflux condenser and a temperature controller, 25 parts (hereinafter "parts" means "parts by weight") of the carbon black pigment and 5 parts of Adeka Reasoap SE-10N (produced by Asahi Denka Co., Ltd.) which is a polymerizable surfactant were added to 180 parts of ion exchanged water and an ultrasonic wave was applied thereto for 4 hours.

Thereafter, 5 parts of styrene, 1.6 parts of α-methylstyrene, 0.5 parts of azobisisobutyronitrile and 3 parts of Adeka Reasoap SE-10N were further added and the polymerization reaction was performed at 60° C. for 8 hours. The obtained solution was subjected to centrifugal filtration to take out a pigment encapsulated with a polymer and coarse particles were removed by filtering the pigment through a 0.4-μm membrane filter.

This pigment solution encapsulated with a polymer was disaggregated by a homogenizer. Subsequently, in the reaction vessel, 27 parts of ion exchanged water and 0.05 parts of sodium laurylsulfate were added and then 100 parts of ion exchanged water and 0.5 parts of potassium persulfate as a polymerization initiator were charged. The resulting solution was kept at 70° C. in a nitrogen atmosphere. Thereto, a mixed solution containing 25 parts of styrene, 1 part of tetrahydrofurfuryl methacrylate, 15 parts of butyl methacrylate, 5 parts of triethylene glycol methacrylate and 0.02 parts of tert-dodecylmercaptan was added dropwise and reacted. Thereafter, the methyl ethyl ketone and a part of water were distilled off by a rotary evaporator and the residue was separated by filtration to obtain Dispersing Element K5.

Production of Dispersion (Dispersing Step)

(Dispersion K5)

15 Parts of Dispersing Element K5 obtained above, 0.5 parts of Acetylenol EH (produced by Kawaken Fine Chemicals) and 2.5 parts of triethylene glycol monobutyl ether as dispersion accelerators, 0.5 parts of sodium hydroxide as a neutralizer and 81 parts of ion exchanged water were added and dispersed by using a paint shaker (using glass beads, bead filling percentage: 60%, media size: 1.7 mm) until the average particle size (secondary particle size) of the dispersing element became 100 nm to obtain Dispersion K5 (surface tension: 30 mN/m). In this production, two kinds of dispersion accelerators, that is, Acetylenol EH and TEGmBE, were used.

A part of Dispersion K5 was taken out and precipitated with an acid by adding HCl in a concentration of 0.1 mol/liter and only the dispersing polymer was taken out by a Soxhlet extraction method using acetone and measured by $C^{13}$-NMR and $H^1$-NMR (AMX400, manufactured by Bruker (Germany)) using DMSO-$d_6$, as a result, the amount of the benzene ring was 40% based on the entire weight of the dispersing polymer.

Dispersions K6 to K8 were obtained in the same manner as Dispersion K5 except that a phthalocyanine green pigment (C.I. Pigment Green 7) was used for Dispersion K6, a condensed azo yellow pigment (C.I. Pigment Yellow 128) was used for Dispersion K7 and a benzimidazolone orange pigment (C.I. Pigment Orange 36) was used for Dispersion K8. The dispersion accelerator and neutralizer used for the production of these dispersions and the addition ratio thereof are shown in Table 48.

TABLE 48

Dispersion Accelerator and Neutralizer Used in Production of Dispersion and Addition Ratio Thereof

| | Name of Dispersion | | | |
|---|---|---|---|---|
| | Dispersion K5 | Dispersion K6 | Dispersion K7 | Dispersion K8 |
| Name of Dispersing Element | Dispersing Element K5 | Dispersing Element K6 | Dispersing Element K7 | Dispersing Element K8 |
| Addition ratio | 15 parts | 15 parts | 15 parts | 15 parts |
| Pigment used | Monac 880 | C.I. Pigment Green 7 | C.I. Pigment Yellow 128 | C.I. Pigment Orange 36 |
| Dispersion accelerator (1) | Acetylenol EH | DEGmBE | Surfynol 61 | Acetylenol EO |
| Dispersion accelerator (2) | Surfynol 465 | 1,6-hexanediol | 2-propanol | DEGmBE |
| Addition ratio of (1) | 0.5 parts | 5.5 parts | 2 parts | 0.5 parts |
| Addition ratio of (2) | 1.5 parts | 2.5 parts | 2 parts | 3 parts |
| Neutralizer | sodium hydroxide | triethanolamine | tripropanolamine | sodium hydroxide |
| Addition ratio | 0.5 parts | 1.5 parts | 2 parts | 1 part |
| Dispersion solvent | ion exchanged water | ion exchanged water | ion exchanged water | ion exchanged water |
| Addition ratio | (balance) | (balance) | (balance) | (balance) |
| Surface tension | 30 mN/m | 33 mN/m | 29 mN/m | 30 mN/m |
| Average particle size | 95 nm | 105 nm | 100 nm | 95 nm |

DEGmBE: diethylene glycol monobutyl ether (Preparation Example of Inkjet Ink)

In the following, examples of the composition suitable as the ink for aqueous inkjet recording according to the present invention are specifically described. The amount of each dispersion added is shown by the solid content concentration (total amount of pigment and dispersing polymer surrounding the pigment) in terms of weight. In < >, the particle size of the pigment is shown by the unit of nm. In Examples, the water as balance was ion exchanged water where 0.05% of Proxel XL-2 for preventing septic activity of the aqueous ink and 0.01% of EDTA (ethylenediaminetetraacetic acid) for reducing the effect of metal ion in the aqueous ink system were added.

Example K-1

The ink composition of Example K-1 is shown below.

| | Amount Added (%) |
|---|---|
| Dispersion K1 | 40.0 |
| Olfine E1010 | 0.5 |
| TEGmBE | 5.0 |
| 1,5-Pentanediol | 5.0 |
| Glycerin | 9.0 |
| Triethanolamine | 1.0 |
| Ion exchanged water | balance |

Olfine E1010 (acetylene glycol-base surfactant, produced by Nissin Chemical Industry Co., Ltd.)

TEGmBE: triethylene glycol monobutyl ether

Example K-2

The ink composition of Example K-2 is shown below.

| | Amount Added (%) |
|---|---|
| Dispersion K2 | 30.0 |
| Surfynol TG | 0.3 |
| DEGmBE | 10.0 |
| Dipropylene glycol | 5.0 |
| Triethanolamine | 0.9 |
| Ion exchanged water | balance |

Surfynol TG (acetylene glycol-base surfactant, produced by Air Products (USA))

DEGmBE: diethylene glycol monobutyl ether

Example K-3

The ink composition of Example K-3 is shown below.

| | Amount Added (%) |
|---|---|
| Dispersion K3 | 50.0 |
| 1,2-Hexanediol | 4.0 |
| 1,6-Hexanediol | 4.0 |
| Olfine STG | 0.3 |
| Diethylene glycol | 7.0 |
| Thiodiglycol | 1.5 |
| Triethanolamine | 1.0 |
| Potassium hydroxide | 0.1 |
| Ion exchanged water | balance |

Olfine STG (acetylene glycols, produced by Nissin Chemical Industry Co., Ltd.)

Example K-4

The ink composition of Example K-4 is shown below.

|  | Amount Added (%) |
| --- | --- |
| Dispersion K4 | 60.0 |
| Surfynol 104 | 0.5 |
| TEGmBE | 3.0 |
| 1,2-Pentanediol | 5.0 |
| 1,5-Pentanediol | 2.0 |
| Tetraethylene glycol | 9.0 |
| Dimethyl-2-imidazolidinone | 2.0 |
| Sodium benzoate | 0.1 |
| Triethanolamine | 0.7 |
| Ion exchanged water | balance |

Surfynol 104 (acetylene glycols, produced by Air Products (USA))

Example K-5

The ink composition of Example K-5 is shown below.

|  | Amount Added (%) |
| --- | --- |
| Dispersion K5 | 50.0 |
| DPGmBE | 2.0 |
| DEGmBE | 7.0 |
| Glycerin | 14.0 |
| Triethanolamine | 0.9 |
| Ion exchanged water | balance |

DPGmBE: dipropylene glycol monobutyl ether

Example K-6

The ink composition of Example K-6 is shown below.

|  | Amount Added (%) |
| --- | --- |
| Dispersion K6 | 40.0 |
| Acetylenol EO | 0.1 |
| TEGmBE | 6.0 |
| 1,5-Pentanediol | 1.0 |
| Glycerin | 15.0 |
| Thiodiglycol | 2.0 |
| Triethanolamine | 0.9 |
| Ion exchanged water | balance |

Example K-7

The ink composition of Example K-7 is shown below.

|  | Amount Added (%) |
| --- | --- |
| Dispersion K7 | 60.0 |
| Surfynol 465 | 0.5 |
| Surfynol 61 | 0.5 |
| DEGmBE | 8.0 |
| Glycerin | 15.0 |
| Trimethylolpropane | 1.0 |
| Trimethylolethane | 1.0 |
| Triethanolamine | 0.5 |
| KOH | 0.05 |
| Ion exchanged water | balance |

Example K-8

The ink composition of Example K-8 is shown below.

|  | Amount Added (%) |
| --- | --- |
| Dispersion K8 | 40.0 |
| Surfynol STG | 0.5 |
| PGmBE | 2.0 |
| DEGmBE | 10.0 |
| Tetrapropylene glycol | 5.0 |
| Glycerin | 7.0 |
| Diethylene glycol | 5.0 |
| Triethanolamine | 0.9 |
| KOH | 0.1 |
| Ion exchanged water | balance |

PGmBE: propylene glycol monobutyl ether

Comparative Example K-1

In Comparative Example K-1, Raven C (produced by Columbian Carbon Co., Ltd.) which is a carbon black pigment was used similarly to Example K-1 and dispersed by using Solsperse 27000 (produced by Avecia Limited) as a dispersant.

15 Parts of Raven C, 4 parts of Solsperse 27000 (produced by Avecia Limited), 4 parts of diethanolamine, 0.5 parts of 2-propanol and 76.5 parts of ion exchanged water were dispersed in a bead mill MINIZETOR (manufactured by Ajisawa) for 2 hours to obtain Dispersion K9 for use in Comparative Example K-1.

The ink composition of Comparative Example K-1 is shown below.

|  | Amount Added (%) |
| --- | --- |
| Dispersion K9 <120> | 7.0 |
| Glycerin | 10.0 |
| Dispersant | 3.0 |
| Nonionic surfactant | 1.0 |
| Ion exchanged water | balance |

Nonionic surfactant: Noigen EA160 (produced by Dai-ichi Kogyo Seiyaku Co., Ltd.)

Comparative Example K-2

In Comparative Example K-2, Acid Blue 9 which is an acid dye was used as the colorant.

The ink composition of Comparative Example K-2 is shown below.

|  | Amount Added (%) |
| --- | --- |
| Acid Blue 9 | 6.5 |
| DEGmME | 7.0 |
| Diethylene glycol | 10.0 |
| 2-Pyrrolidone | 5.0 |
| Ion exchanged water | balance |

DEGmME: diethylene glycol monomethyl ether

Comparative Example K-3

In Comparative Example K-3, Direct Black 154 which is a direct dye was used as the colorant.

The ink composition of Comparative Example K-3 is shown below.

|  | Amount Added (%) |
|---|---|
| Direct Black 154 | 2.5 |
| Diethylene glycol | 10.0 |
| Nonionic surfactant | 1.0 |
| Ion exchanged water | balance |

Nonionic surfactant: Epan 450 (produced by Dai-ichi Kogyo Seiyaku Co., Ltd.)

In Table 49, the evaluation results of blurring when a letter was printed are shown as the printing evaluation results. In Table 49, A denotes "very good", B denotes "good", C denotes "bad" and D denotes "very bad".

TABLE 49

Evaluation Results of Printing Quality

|  | Example K |  |  |  |  |  |  |  | Comparative Example K |  |  |
|---|---|---|---|---|---|---|---|---|---|---|---|
|  | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | D | D | D |
| Rapid Copy | A | A | A | A | A | A | A | A | D | D | D |
| EPSON EPP | A | A | A | A | A | A | A | A | C | C | C |
| Xerox P | A | A | A | A | A | A | A | A | C | C | D |
| Xerox 4024 | A | A | A | A | A | A | A | A | D | D | D |
| Xerox 10 | A | A | A | A | A | A | A | A | C | D | D |
| Neenha Bond | A | A | A | A | A | A | A | A | C | D | D |
| Ricopy 6200 | A | A | A | A | A | A | A | A | D | C | D |
| Yamayuri | A | A | A | A | A | A | A | A | D | D | D |
| Xerox R | A | A | A | A | A | A | A | A | D | D | D |

As apparent from the results in Table 49, the printing quality is bad when the ink of Comparative Example is used, and the printing quality is good when the ink for inkjet recording of the present invention is used.

Incidentally, this printing evaluation was performed by using an inkjet printer PM-900C manufactured by Seiko Epson Corporation. The papers used in this evaluation were Conqueror, Favorit, Modo Copy, Rapid Copy, EPSON EPP, Xerox 4024, Xerox 10, Neenha Bond, Ricopy 6200, Yamayuri and Xerox R which are plain papers commercially available in Europe, USA and Japan.

As verified above, the present invention can provide an ink for inkjet recording, which is reduced in blurring for a material on which a printed image is recorded, such as paper, and ensures high quality and high practicability.

The inks of Examples K-1 to K-8 each was charged into a sampling vial and after tightly plugging the vial, left standing at 60° C. for one week. The foreign matters generated and physical values (viscosity, surface tension) of the ink were examined before and after the aqueous ink was left standing.

As a result, all inks exhibited good storage stability with almost no generation of foreign matters and no change of physical values.

The same test was performed by changing the colorant in the composition of Example K-1 to the pigment of Comparative Example K-1, as a result, the surface tension was less changed but foreign matters were generated to decrease the filterability and increase the viscosity and ejection stability could not be obtained.

Furthermore, inks prepared by using another additive preferred in the present invention (a substance comprising one or more member selected from acetylene glycols, acetylene alcohols, polysiloxanes, di(tri)ethylene glycol monobutyl ethers, (di)propylene glycol monobutyl ethers and 1,2-alkylene glycols) in place of TEGmBE and E1010 in the composition of Example K-1, and inks prepared by adding the additive preferred in the present invention (a substance comprising one or more member selected from acetylene glycols, acetylene alcohols, polysiloxanes, di(tri)ethylene glycol monobutyl ethers, (di)propylene glycol monobutyl ethers and 1,2-alkylene glycols) to the ink of Comparative Example K-1 (Examples K-9 to K-18 in Table 50) each was similarly left standing at 60° C. for one week and each ink after standing was examined on foreign matters generated, physical values (viscosity, surface tension) and ejection stability. The results obtained are shown in Table 50. The amount of foreign matters generated shows a value of amount of foreign matters after standing at 60° C./initial amount of foreign matters, the viscosity shows a value of viscosity after standing at 60° C./initial viscosity, and the surface tension shows a value of surface tension after standing at 60° C./initial surface tension. The ejection stability was evaluated by using an inkjet printer PM-900C manufactured by Seiko Epson Corporation and rated A when printing disorder was not generated at all even in continuous printing of 100 pages on A4-size Xerox P, rated B when printing disorder was generated at less than 10 portions, rated C when printing disorder was generated at 10 to less than 100 portions, and rated D when printing disorder was generated at 100 or more portions.

TABLE 50

Evaluation Results of Storage Stability and Ejection Stability when Additives were Changed in Compositions of Example K-1 and Comparative Example K1

| Additive | Example | 9 | 10 | 11 | 12 | 13 | 14 | 15 | 16 | 17 | 18 |
|---|---|---|---|---|---|---|---|---|---|---|---|
| DEGmBE |  | 4 |  | 4 |  |  | 3 | 9 |  |  |  |
| TEGmBE |  |  | 7 |  | 6 |  |  |  | 7 |  |  |
| PGmBE |  |  |  | 2 |  |  |  |  |  |  |  |
| DPGmBE |  |  |  |  | 2 |  |  | 3 |  |  |  |
| 1, 2-HD |  |  |  |  |  | 3 |  |  | 2 |  | 2 |
| 1, 2-PD |  |  |  |  |  |  | 5 |  |  |  | 6 |
| Olfine E1010 |  |  | 1 | 1 |  | 0.9 |  |  |  | 1 |  |
| Olfine STG |  | 0.5 |  |  | 0.5 |  |  | 1 | 0.3 |  |  |
| Surfynol 61 |  |  |  |  |  |  | 0.5 |  | 0.5 |  |  |
| Example K-1 | Foreign matters generated | 1 | 1 | 1 | 1 | 1 | 1 | 1 | 1 | 1 | 1 |

TABLE 50-continued

Evaluation Results of Storage Stability and Ejection
Stability when Additives were Changed in Compositions
of Example K-1 and Comparative Example K1

| Additive | Example | 9 | 10 | 11 | 12 | 13 | 14 | 15 | 16 | 17 | 18 |
|---|---|---|---|---|---|---|---|---|---|---|---|
| | Viscosity | 1 | 1 | 1 | 1 | 1 | 1 | 1 | 1 | 1 | 1 |
| | Surface tension | 1 | 1 | 1 | 1 | 1 | 1 | 1 | 1 | 1 | 1 |
| | Ejection stability | A | A | A | A | A | A | A | A | A | A |
| Comparative Example K-1 | Foreign matters generated | 10 | 5 | 14 | 10 | 5 | 19 | 20 | 18 | 2.0 | 3.3 |
| | Viscosity | 5 | 4.5 | 5 | 3.8 | 1.9 | 9 | 19 | 25 | 2.9 | 3.3 |
| | Surface tension | 1.0 | 1.0 | 1 | 1.1 | 1 | 1 | 1.3 | 1.2 | 1 | 1 |
| | Ejection stability | D | D | D | D | C | D | D | D | C | C |

As seen from the results in Tables 49 and 50, the inkjet recording ink prepared by using the dispersing element of the present invention exhibits good printing quality and ensures excellent ejection stability and high storage stability. Examples K-2 to K-8 were also tested by similarly changing the additives, as a result, almost the same results were obtained.

Furthermore, the dispersing polymers used in Examples K-1 and K-5 each was polymerized by varying the amount of aromatic ring to determine the relationship between the aromatic ring amount and the storage stability. The results are shown in Table 51. In the evaluation of the storage stability, each ink of Examples K-1 to K-8 was charged in a sampling vial and after tightly plugging the vial, left standing at 60° C. or 70° C. for one week and the foreign matters generated and physical value (viscosity) of the ink was examined before and after the aqueous ink was left standing. The amount of foreign matters generated shows a value of amount of foreign matters after standing at 60° C. or 70° C./initial amount of foreign matters, and the viscosity shows a value of viscosity after standing at 60° C. or 70° C./initial viscosity.

TABLE 51

Amount of Benzene Ring in Dispersing Polymer and Storage Stability

| | | Amount of Benzene Ring (%) | | | | | | | | | |
|---|---|---|---|---|---|---|---|---|---|---|---|
| | | 0 | 10 | 20 | 25 | 30 | 40 | 50 | 60 | 70 | 72 |
| Example K-1 | | | | | | | | | | | |
| Foreign matters | 60° C. | 5.2 | 4.0 | 1.1 | 1.0 | 1.0 | 1.1 | 1.0 | 1.1 | 1.2 | 10 |
| | 70° C. | 14 | 12 | 1.3 | 1.1 | 1.0 | 1.0 | 1.0 | 1.6 | 2.5 | 34 |
| Viscosity | 60° C. | 5.5 | 3.3 | 1.0 | 1.0 | 1.0 | 1.0 | 1.0 | 1.0 | 1.1 | 16 |
| | 70° C. | 25 | 12 | 1.0 | 1.0 | 1.0 | 1.0 | 1.1 | 1.2 | 1.5 | 55 |
| Example A-5 | | | | | | | | | | | |
| Foreign matters | 60° C. | 3.8 | 3.2 | 1.4 | 1.1 | 1.0 | 1.0 | 1.0 | 1.0 | 1.3 | 16 |
| | 70° C. | 12 | 8.8 | 1.8 | 1.2 | 1.0 | 1.0 | 1.0 | 1.4 | 2.9 | 23 |
| Viscosity | 60° C. | 4.3 | 2.4 | 1.1 | 1.0 | 1.0 | 1.0 | 1.0 | 1.0 | 1.2 | 9 |
| | 70° C. | 18 | 11 | 1.3 | 1.1 | 1.0 | 1.0 | 1.0 | 1.1 | 1.3 | 24 |

As seen from the results in Table 51, the amount of benzene ring in the dispersing polymer of the present invention is from 20 to 70%, preferably from 25 to 50%.

From these, it is understood that when the colorant is dispersed by using a general dispersant as in conventional techniques, the additive preferred in the present invention (a substance comprising one or more member selected from acetylene glycols, acetylene alcohols, polysiloxanes, di(tri)ethylene glycol monobutyl ethers, (di)propylene glycol monobutyl ethers and 1,2-alkylene glycols) is difficult to use and therefore, a sufficiently high printing quality cannot be obtained. However, according to the present invention, a microcapsule is formed by encapsulating the pigment with a polymer to render it dispersible in water and the amount of benzene ring in the polymer is controlled to 20 to 70 wt % based on the polymer, so that an inkjet recording ink ensured with storage stability and ejection stability while keeping a sufficiently high color forming property can be obtained. Furthermore, a pigment is used and this provides an effect of giving a printed matter more excellent in the water resistance than those obtained by using a normal dye (for example, Comparative Examples K-2 and K-3). In addition, the function of the polymer encapsulating the colorant can be freely changed by the polymerizing monomer or other reactive agents and this provides an effect that a variety of functions (e.g., light fastness, gas resistance, color-ability, glossiness, fixing property) can be imparted. In the case of using a normal dispersant as in conventional techniques, the adsorptive strength of the dispersant adsorbing to the pigment is fundamentally weak and the dispersant is partially desorbed. Due to the resultant desorbed material or the dispersant not adsorbed, the viscosity increases and therefore, the amount of colorant added is limited, as a result, a sufficiently high color formation can be hardly obtained.

Example L

The present invention is described below by referring to Examples, however, the scope of the present invention is not limited thereto.

(Measuring Methods of Amount of Aromatic Ring, Pigment/Polymer Ratio, Average Particle Size, Amount of Polyvalent Cation in Dispersing Element and Surface Tension)

The measured values (amount of aromatic ring, pigment/polymer ratio, average particle size, amount of polyvalent cation in dispersing element and surface tension) obtained in these Examples each was measured by the following method.

"Measurement of Amount of Aromatic Ring"

A part of each dispersing polymer solution obtained in Examples and Comparative Examples was taken out, then only the polymer component was taken out by distilling off the solvent components and dissolved in DMSO-$d_6$, and the amount of aromatic ring in the polymer was measured by using $^{13}$C-NMR and $^1$H-NMR (AMX400, manufactured by Bruker (Germany)).

"Measurement of Pigment/Polymer Ratio"

A part of each dispersion obtained in Examples and Comparative Examples was taken out and after precipitating only the dispersing element with an acid by adding HCl in a concentration of 0.1 mol/liter, measured on the dry weight. Then, only the dispersing polymer was taken out by a Soxhlet extraction method using acetone and measured on the dry weight. From the obtained values, the weight ratio of pigment/polymer was calculated.

"Measurement of Average Particle Size"

The aqueous inks obtained in Examples and Comparative Examples each was diluted with ion exchanged water to have a dispersing element concentration of 0.001 to 0.01 wt % (because the optimal concentration at the measurement slightly differs depending on the ink) and the average particle size of dispersed particles at 20° C. was measured by a particle size distribution meter (DLS-800, manufactured by Otsuka Electronics Co., Ltd.).

"Measurement of Amount of Polyvalent Cation in Dispersing Element"

A necessary amount of each aqueous ink obtained in Examples and Comparative Examples was taken out and by a centrifugal separation treatment, separated into the solvent components of ink and the dispersing element which is the solid content. The centrifugation conditions were 2500 G and 60 minutes.

The obtained dispersing element was sampled in a quartz dish, incinerated by adding a trapping agent, melted with potassium hydrogensulfate and dissolved in dilute nitric acid and the amount of polyvalent cation in the dispersing element was measured by the ICP emission analysis (ICPS-8000, manufactured by Shimadzu Corporation).

"Measurement of Surface Tension"

The aqueous inks obtained in Examples and Comparative Examples each was measured on the surface tension at 20° C. by a surface tension balance (CBVP-A3, manufactured by Kyowa Interface Science Co., Ltd.).

Example L-1

(1) Production of Dispersion

Dispersion L1

For the production of Dispersion L1 used in Example L-1, Color Black FW18 (produced by Degussa), which is an inorganic pigment and a carbon black pigment, was used.

A reaction vessel equipped with a stirrer, a thermometer, a reflux tube and a dropping funnel was purged with nitrogen and thereinto, 15 parts of methyl ethyl ketone, 22 parts of styrene, 5 parts of α-methylstyrene, 16 parts of butyl methacrylate, 10 parts of lauryl methacrylate, 2 parts of acrylic acid and 0.3 parts of tert-dodecylmercaptan were charged and heated at 70° C. Thereafter, separately prepared 100 parts of styrene, 16 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 57%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 mm to obtain Dispersion L1 containing 20% of Dispersing Element L1 (dispersing element where the carbon black pigment is encapsulated with the polymer having an aromatic ring amount of 57%).

In Table 52, the pigment used in Dispersion L1, the amount of aromatic ring in the dispersing polymer and the pigment/polymer ratio are shown. The pigment/polymer ratio was measured by the method described in "Measurement of Pigment/Polymer Ratio" above.

(2) Preparation of Ink

In Example L-1, Dispersion L1 obtained in Example L-1 (1) above, Olfine E1010 (produced by Nissin Chemical Industry Co., Ltd.) as an acetylene glycol-base surfactant, diethylene glycol monobutyl ether as an alkylene glycol monoalkyl ether, and 1,2-pentanediol as a 1,2-alkylene glycol were used. The specific composition is shown below.

Incidentally, in the preparation of ink, Dispersion L1 was added to have a Dispersing Element L1 content of 8.0%. The value in < > shows an average particle size (unit: nm) of Dispersing Element L1 measured by the method described in "Measurement of Average Particle Size" above.

Also, the ion exchanged water added as "balance" in the ink composition of Example L-1 shown below was ion exchanged water where Proxel XL-2 for preventing septic activity of the ink, benzotriazole for preventing corrosion of an inkjet head member and EDTA 2Na salt for reducing the effect of metal ion in the ink system were added to a concentration of 0.01%, 0.01% and 0.02%, respectively, based on the entire weight of the ink.

| Dispersing Element L1 <120> | 8.0% |
|---|---|
| Olfine E1010 | 0.5% |
| Diethylene glycol monobutyl ether | 3.0% |
| 1,2-Pentanediol | 2.5% |
| Diethylene glycol | 3.0% |
| Glycerin | 11.5% |
| Trimethylolpropane | 6.0% |
| Tripropanolamine | 0.3% |
| Ion exchanged water | balance |

(3) Measurement of Amount of Polyvalent Cation in Dispersing Element

The ink prepared in Example L-1(2) was measured by the method described in "Measurement of Amount of Polyvalent Cation in Dispersing Element" above, as a result, the total amount of polyvalent cations in the dispersing element was 387 ppm. The details of the measurement results are shown in Table 54.

(4) Printing Evaluation

In the printing evaluation, the ink prepared in Example L-1(2) was evaluated on the printing quality by using an inkjet printer PM-950C (manufactured by Seiko Epson Corporation) which ejects an ink by an inkjet head using a piezoelectric element.

As for the paper used for evaluation, (a) Conqueror, (b) Reymat, (c) Mode Copy, (d) Rapid Copy, (e) Xerox P, (f) Xerox 4024, (g) Xerox 10, (h) Neenha Bond, (i) Ricopy 6200 and (j) Hammer mill Copy Plus which are plain papers commercially available in Europe, USA and Japan were used.

The evaluation was performed with an eye according to the following criteria.

A: No blurring was observed in letters of all points.
B: Blurring was slightly observed in letters of 5 point or less (practicable level).
C: Letters of 5 point or less were seen thickened due to blurring.
D: Blurring was serious and letters of 5 point or less could not be made out.

The printing evaluation results are shown in Table 53.

(5) Evaluation of Ejection Stability

A continuous printing of 200 pages was performed on A4-size Xerox P by using the same printer and ink as in Example L-1(4) above and the ejection stability was evaluated by observing the printing disorder.

The evaluation was performed with an eye according to the following criteria.

A: Printing disorder was not generated at all.
B: Printing disorder was generated but at less than 10 portions (practicable level).
C: Printing disorder was generated at 10 to less than 100 portions.
D: Printing disorder was generated at 100 or more portions.

The evaluation results of ejection stability are shown in Table 54.

(6) Evaluation of Storage Stability

The ink prepared in Example L-1(2) above was charged into a vial and after tightly plugging the vial, left standing at 60° C. for one week or at −20° C. for one week. The foreign matters generated and the change in physical values (viscosity, surface tension) of ink before and after standing were evaluated.

The evaluation was performed according to the following criteria.

A: The ratio of the amount of foreign matters generated and physical values after standing at 60° C. or −20° C. to those before standing was in the range from 0.99 to 1.01.
B: The ratio was from 0.95 to 0.99 or from 1.01 to 1.05 (practicable level).
C: The ratio was from 0.90 to 0.95 or from 1.05 to 1.10.
D: The ratio was less than 0.90 or more than 1.10.

The evaluation results of storage stability are shown in Table 54.

Example L-2

(1) Production of Dispersion

Dispersion L2

For the production of Dispersion L2 used in Example L-2, an insoluble monoazo yellow pigment (C.I. Pigment Yellow 74) which is an organic pigment was used.

A reaction vessel equipped with a stirrer, a thermometer, a reflux tube and a dropping funnel was purged with nitrogen and thereinto, 12 parts of styrene, 9 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 3 parts of methacrylic acid, 5 parts of methyl ethyl ketone and 0.3 parts of mercaptoethanol were charged and heated at 70° C. Thereafter, separately prepared 25 parts of styrene, 30 parts of lauryl methacrylate, 15 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 10 parts of methacrylic acid, 20 parts of methyl ethyl ketone and 1.0 part of mercaptoethanol were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 40%.

40 Parts of the dispersing polymer solution obtained above, 30 parts of an insoluble monoazo yellow pigment (C.I. Pigment Yellow 74) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion L2 containing 20% of Dispersing Element L2 (dispersing element where the insoluble monoazo yellow pigment is encapsulated with the polymer having an aromatic ring amount of 40%).

In Table 52, the pigment used in Dispersion L2, the amount of aromatic ring in the dispersing polymer and the pigment/polymer ratio are shown. The amount of aromatic ring in the polymer and the pigment/polymer ratio were measured, similarly to Example L-1(1), by the methods described in "Measurement of Amount of Aromatic Ring" and "Measurement of Pigment/Polymer Ratio" above.

(2) Preparation of Ink

In Example L-2, Dispersion L2 obtained in Example L-2 (1) above, Surfynol 440 (produced by Air Products) and Olfine STG (produced by Nissin Chemical Industry Co., Ltd.) as acetylene glycol-base surfactants, triethylene glycol monobutyl ether as an alkylene glycol monoalkyl ether, and 1,2-pentanediol as a 1,2-alkylene glycol were used. The specific composition is shown below.

Incidentally, in the preparation of ink, Dispersion L2 was added to have a Dispersing Element L2 content of 7.0%. The value in < > shows an average particle size (unit: nm) of Dispersing Element L2 measured by the method described in "Measurement of Average Particle Size" above.

Also, the ion exchanged water added as "balance" in the ink composition of Example L-2 shown below was, similarly to Example L-1(2), ion exchanged water where 0.01% of Proxel XL-2, 0.01% of benzotriazole and 0.02% of EDTA 2Na salt were added based on the entire weight of the ink.

| | |
|---|---|
| Dispersing Element L2 <120> | 7.0% |
| Surfynol 440 | 0.2% |
| Olfine STG | 0.2% |
| Triethylene glycol monobutyl ether | 3.0% |
| 1,2-Pentanediol | 2.0% |
| 2-Pyrrolidone | 3.0% |
| Glycerin | 13.5% |
| Trimethylolethane | 5.0% |
| Triethanolamine | 0.1% |
| Ion exchanged water | balance |

(3) Measurement of Amount of Polyvalent Cation in Dispersing Element

The ink prepared in Example L-2(2) above was measured by the method described in "Measurement of Amount of Polyvalent Cation in Dispersing Element" above, as a result, the total amount of polyvalent cations in the dispersing element was 272 ppm. The details of the measurement results are shown in Table 54.

(4) Printing Evaluation

The ink prepared in Example L-2(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Example L-2(4) according to the same evaluation criteria as in Example L-1(5). The evaluation results of ejection stability are shown in Table 54.

(6) Evaluation of Storage Stability

The ink prepared in Example L-2(2) above was evaluated on the storage stability by the same evaluation method as in Example L-1(6) according to the same evaluation criteria as in Example L-1(6). The evaluation results of storage stability are shown in Table 54.

Example L-3

(1) Production of Dispersion

Dispersion L3

For the production of Dispersion L3 used in Example L-3, a quinacridone red pigment (C.I. Pigment Red 122) which is an organic pigment was used.

A reaction vessel equipped with a stirrer, a thermometer, a reflux tube and a dropping funnel was purged with nitrogen and thereinto, 10 parts of styrene, 5 parts of styrene macromer (AS-6, produced by Toagosei Chemical Industry Co., Ltd.), 3.5 parts of n-dodecyl methacrylate, 10 parts of N,N-dimethylaminoethyl methacrylate, 25 parts of methoxypolyethylene glycol methacrylate (NK Ester M40G, produced by Shin-Nakamura Chemical Co., Ltd.), 5 parts of methyl ethyl ketone and 0.3 parts of mercaptoethanol were charged and heated at 70° C. Thereafter, separately prepared 15 parts of styrene, 10 parts of styrene macromer (AS-6, produced by Toagosei Chemical Industry Co., Ltd.), 5 parts of n-dodecyl methacrylate, 20 parts of N,N-dimethylaminoethyl methacrylate, 30 parts of methoxypolyethylene glycol methacrylate (NK Ester M40G, produced by Shin-Nakamura Chemical Co., Ltd.), 50 parts of methyl ethyl ketone and 1.5 parts of azobisisobutyronitrile were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 28%.

40 Parts of the dispersing polymer solution obtained above, 25 parts of a quinacridone red pigment (C.I. Pigment Red 122) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion L3 containing 20% of Dispersing Element L3 (dispersing element where the quinacridone red pigment is encapsulated with the polymer having an aromatic ring amount of 28%).

In Table 52, the pigment used in Dispersion L3, the amount of aromatic ring in the dispersing polymer and the pigment/polymer ratio are shown. The amount of aromatic ring in the polymer and the pigment/polymer ratio were measured, similarly to Example L-1(1), by the methods described in "Measurement of Amount of Aromatic Ring" and "Measurement of Pigment/Polymer Ratio" above.

(2) Preparation of Ink

In Example L-3, Dispersion L3 obtained in Example L-3 (1) above, Olfine E1010 (produced by Nissin Chemical Industry Co., Ltd.) and Surfynol 104PG50 (produced by Air Products) as acetylene glycol-base surfactants, triethylene glycol monobutyl ether as an alkylene glycol monoalkyl ether, and 1,2-hexanediol as a 1,2-alkylene glycol were used. The specific composition is shown below.

Incidentally, in the preparation of ink, Dispersion L3 was added to have a Dispersing Element L3 content of 7.5%. The value in < > shows an average particle size (unit: nm) of Dispersing Element L3 measured by the method described in "Measurement of Average Particle Size" above.

Also, the ion exchanged water added as "balance" in the ink composition of Example L-3 shown below was, similarly to Example L-1(2), ion exchanged water where 0.01% of Proxel XL-2, 0.01% of benzotriazole and 0.02% of EDTA 2Na salt were added based on the entire weight of the ink.

| | |
|---|---|
| Dispersing Element L3 <140> | 7.5% |
| Olfine E1010 | 0.1% |
| Surfynol 104PG50 | 0.4% |
| Triethylene glycol monobutyl ether | 1.0% |
| 1,2-Hexanediol | 2.5% |
| Triethylene glycol | 2.0% |
| 2-Pyrrolidone | 4.0% |
| Glycerin | 13.8% |
| Trimethylolpropane | 6.0% |
| Ion exchanged water | balance |

(3) Measurement of Amount of Polyvalent Cation in Dispersing Element

The ink prepared in Example L-3(2) above was measured by the method described in "Measurement of Amount of Polyvalent Cation in Dispersing Element" above, as a result, the total amount of polyvalent cations in the dispersing element was 527 ppm. The details of the measurement results are shown in Table 54.

(4) Printing Evaluation

The ink prepared in Example L-3(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Example L-3(4) according to the same evaluation criteria as in Example L-1(5). The evaluation results of ejection stability are shown in Table 54.

(6) Evaluation of Storage Stability

The ink prepared in Example L-3(2) above was evaluated on the storage stability by the same evaluation method as in Example L-1(6) according to the same evaluation criteria as in Example L-1(6). The evaluation results of storage stability are shown in Table 54.

Example L-4

(1) Production of Dispersion

Dispersion L4

For the production of Dispersion L4 used in Example L-4, a phthalocyanine blue pigment (C.I. Pigment Blue 15:4) which is an organic pigment was used.

A reaction vessel equipped with a stirrer, a thermometer, a reflux tube and a dropping funnel was purged with nitrogen and thereinto, 20 parts of styrene, 10 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 10 parts of styrene macromer (AS-6, produced by Toagosei Chemical Industry Co., Ltd.), 5 parts of methacrylic acid, 5 parts of methyl ethyl ketone and 0.3 parts of n-dodecylmercaptan were charged and heated at 70° C. Thereafter, separately prepared 25 parts of styrene, 30 parts of lauryl methacrylate, 20 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 15 parts of styrene macromer (AS-6, produced by Toagosei Chemical Industry Co., Ltd.), 5 parts of methacrylic acid, 20 parts of methyl ethyl ketone and 1.5 parts of n-dodecylmercaptan were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 45%.

40 Parts of the dispersing polymer solution obtained above, 40 parts of a phthalocyanine blue pigment (C.I. Pigment Blue 15:4) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 µm to obtain Dispersion L4 containing 20% of Dispersing Element L4 (dispersing element where the phthalocyanine blue pigment is encapsulated with the polymer having an aromatic ring amount of 45%).

In Table 52, the pigment used in Dispersion L4, the amount of aromatic ring in the dispersing polymer and the pigment/polymer ratio are shown. The amount of aromatic ring in the polymer and the pigment/polymer ratio were measured, similarly to Example L-1(1), by the methods described in "Measurement of Amount of Aromatic Ring" and "Measurement of Pigment/Polymer Ratio" above.

(2) Preparation of Ink

In Example L-4, Dispersion L4 obtained in Example L-4 (1) above, Acetylenol E100 (produced by Kawaken Fine Chemicals) as an acetylene glycol-base surfactant, propylene glycol monobutyl ether as an alkylene glycol monoalkyl ether, and 1,2-hexanediol as a 1,2-alkylene glycol were used. The specific composition is shown below.

Incidentally, in the preparation of ink, Dispersion L4 was added to have a Dispersing Element L4 content of 8.0%. The value in < > shows an average particle size (unit: nm) of Dispersing Element L4 measured by the method described in "Measurement of Average Particle Size" above.

Also, the ion exchanged water added as "balance" in the ink composition of Example L-4 shown below was, similarly to Example L-1(2), ion exchanged water where 0.01% of Proxel XL-2, 0.01% of benzotriazole and 0.02% of EDTA 2Na salt were added based on the entire weight of the ink.

| Dispersing Element L4 <100> | 8.0% |
|---|---|
| Acetylenol E100 | 0.5% |
| Propylene glycol monobutyl ether | 3.0% |
| 1,2-Hexanediol | 1.0% |
| Triethylene glycol | 3.0% |
| Glycerin | 13.8% |
| Trimethylolpropane | 5.2% |
| Tripropanolamine | 0.2% |
| Ion exchanged water | balance |

(3) Measurement of Amount of Polyvalent Cation in Dispersing Element

The ink prepared in Example L-4(2) above was measured by the method described in "Measurement of Amount of Polyvalent Cation in Dispersing Element" above, as a result, the total amount of polyvalent cations in the dispersing element was 172 ppm. In this Example, 9,300 ppm of copper ion was detected but the copper ion constitutes the pigment molecular skeleton and doses not dissolve out in the ink, therefore, this ion does not come under the polyvalent cation contained in the dispersing element as referred to in the present invention and is not included in the above-described total amount of polyvalent cations. The details of the measurement results are shown in Table 54.

(4) Printing Evaluation

The ink prepared in Example L-4(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Example L-4(4) according to the same evaluation criteria as in Example L-1(5). The evaluation results of ejection stability are shown in Table 54.

(6) Evaluation of Storage Stability

The ink prepared in Example L-4(2) above was evaluated on the storage stability by the same evaluation method as in Example L-1(6) according to the same evaluation criteria as in Example L-1(6). The evaluation results of storage stability are shown in Table 54.

Example L-5

(1) Production of Dispersion

Dispersion L5

For the production of Dispersion L5 used in Example L-5, a perynone orange pigment (C.I. Pigment Orange 43) was used. Except for this, Dispersion L5 containing 20% of Dispersing Element L5 (dispersing element where the perynone orange pigment is encapsulated with a polymer having an aromatic ring amount of 56%) was obtained in the same manner as in Example L-1(1).

In Table 52, the pigment used in Dispersion L5, the amount of aromatic ring in the dispersing polymer and the pigment/polymer ratio are shown. The amount of aromatic ring in the polymer and the pigment/polymer ratio were measured, similarly to Example L-1(1), by the methods described in "Measurement of Amount of Aromatic Ring" and "Measurement of Pigment/Polymer Ratio" above.

(2) Preparation of Ink

In Example L-5, Dispersion L5 obtained in Example L-5 (1) above, Surfynol 485 and Surfynol TG (both produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of ink, Dispersion L5 was added to have a Dispersing Element L5 content of 10.0%. The value in < > shows an average particle size (unit: nm) of Dispersing Element L5 measured by the method described in "Measurement of Average Particle Size" above.

Also, the ion exchanged water added as "balance" in the ink composition of Example L-5 shown below was, similarly to Example L-1(2), ion exchanged water where 0.01% of Proxel XL-2, 0.01% of benzotriazole and 0.02% of EDTA 2Na salt were added based on the entire weight of the ink.

| Dispersing Element L5 <150> | 10.0% |
|---|---|
| Surfynol 485 | 0.5% |
| Surfynol TG | 0.2% |
| Dipropylene glycol monobutyl ether | 2.0% |
| 1,2-Pentanediol | 2.0% |
| N-Methyl-2-pyrrolidone | 5.0% |
| Glycerin | 11.2% |
| Trehalose | 5.8% |
| Ion exchanged water | balance |

(3) Measurement of Amount of Polyvalent Cation in Dispersing Element

The ink prepared in Example L-5(2) above was measured by the method described in "Measurement of Amount of Polyvalent Cation in Dispersing Element" above, as a result, the total amount of polyvalent cations in the dispersing element was 610 ppm. The details of the measurement results are shown in Table 54.

(4) Printing Evaluation

The ink prepared in Example L-5(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Example L-5(4) according to the same evaluation criteria as in Example L-1(5). The evaluation results of ejection stability are shown in Table 54.

(6) Evaluation of Storage Stability

The ink prepared in Example L-5(2) above was evaluated on the storage stability by the same evaluation method as in Example L-1(6) according to the same evaluation criteria as in Example L-1(6). The evaluation results of storage stability are shown in Table 54.

Example L-6

(1) Production of Dispersion

Dispersion L6

For the production of Dispersion L6 used in Example L-6, a benzimidazolone brown pigment (C.I. Pigment Brown 32) was used. Except for this, Dispersion L6 containing 20% of Dispersing Element L6 (dispersing element where the benzimidazolone brown pigment is encapsulated with a polymer having an aromatic ring amount of 69%) was obtained in the same manner as in Example L-1(1).

In Table 52, the pigment used in Dispersion L6, the amount of aromatic ring in the dispersing polymer and the pigment/polymer ratio are shown. The amount of aromatic ring in the polymer and the pigment/polymer ratio were measured, similarly to Example L-1(1), by the methods described in "Measurement of Amount of Aromatic Ring" and "Measurement of Pigment/Polymer Ratio" above.

(2) Preparation of Ink

In Example L-6, Dispersion L6 obtained in Example L-6 (1) above, Surfynol 420 as an acetylene glycol-base surfactant, and diethylene glycol monobutyl ether as an alkylene glycol monoalkyl ether were used. The specific composition is shown below.

Incidentally, in the preparation of ink, Dispersion L6 was added to have a Dispersing Element L6 content of 5.0%. The value in < > shows an average particle size (unit: nm) of Dispersing Element L6 measured by the method described in "Measurement of Average Particle Size" above.

Also, the ion exchanged water added as "balance" in the ink composition of Example L-6 shown below was, similarly to Example L-1(2), ion exchanged water where 0.01% of Proxel XL-2, 0.01% of benzotriazole and 0.02% of EDTA 2Na salt were added based on the entire weight of the ink.

| | |
|---|---|
| Dispersing Element L6 <140> | 5.0% |
| Surfynol 420 | 0.1% |
| Diethylene glycol monobutyl ether | 3.0% |
| 1,6-Hexanediol | 2.0% |
| Tetraethylene glycol | 5.5% |
| Glycerin | 13.5% |
| Triethanolamine | 0.5% |
| Ion exchanged water | balance |

(3) Measurement of Amount of Polyvalent Cation in Dispersing Element

The ink prepared in Example L-6(2) above was measured by the method described in "Measurement of Amount of Polyvalent Cation in Dispersing Element" above, as a result, the total amount of polyvalent cations in the dispersing element was 797 ppm. The details of the measurement results are shown in Table 54.

(4) Printing Evaluation

The ink prepared in Example L-6(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Example L-6(4) according to the same evaluation criteria as in Example L-1(5). The evaluation results of ejection stability are shown in Table 54.

(6) Evaluation of Storage Stability

The ink prepared in Example L-6(2) above was evaluated on the storage stability by the same evaluation method as in Example L-1(6) according to the same evaluation criteria as in Example L-1(6). The evaluation results of storage stability are shown in Table 54.

Example L-7

(1) Production of Dispersion

Dispersion L7

For the production of Dispersion L7 used in Example L-7, a quinacridone violet pigment (C.I. Pigment Violet 19) which is an organic pigment was used. Except for this, Dispersion L7 containing 20% of Dispersing Element L7 (dispersing element where the quinacridone violet pigment is encapsulated with a polymer having an aromatic ring amount of 21%) was obtained in the same manner as in Example L-1(1).

In Table 52, the pigment used in Dispersion L7, the amount of aromatic ring in the dispersing polymer and the pigment/polymer ratio are shown. The amount of aromatic ring in the polymer and the pigment/polymer ratio were measured, similarly to Example L-1(1), by the methods described in "Measurement of Amount of Aromatic Ring" and "Measurement of Pigment/Polymer Ratio" above.

(2) Preparation of Ink

In Example L-7, Dispersion L7 obtained in Example L-7 (1) above, Surfynol 61 as acetylene alcohol-base surfactant and Surfynol TG (both produced by Air Products), triethylene glycol monobutyl ether as an alkylene glycol monoalkyl ether, and 1,2-pentanediol as a 1,2-alkylene glycol were used. The specific composition is shown below.

Incidentally, in the preparation of ink, Dispersion L7 was added to have a Dispersing Element L7 content of 6.0%. The value in < > shows an average particle size (unit: nm) of Dispersing Element L7 measured by the method described in "Measurement of Average Particle Size" above.

Also, the ion exchanged water added as "balance" in the ink composition of Example L-7 shown below was, similarly to Example L-1(2), ion exchanged water where 0.01% of Proxel XL-2, 0.01% of benzotriazole and 0.02% of EDTA 2Na salt were added based on the entire weight of the ink.

| | |
|---|---|
| Dispersing Element L7 <120> | 6.0% |
| Surfynol 61 | 0.3% |
| Surfynol TG | 0.1% |
| Triethylene glycol monobutyl ether | 1.5% |
| 1,2-Pentanediol | 2.0% |
| Diethylene glycol | 2.0% |
| Thiodiglycol | 4.0% |
| Glycerin | 12.6% |
| Trimethylolethane | 7.0% |
| Ion exchanged water | balance |

(3) Measurement of Amount of Polyvalent Cation in Dispersing Element

The ink prepared in Example L-7(2) above was measured by the method described in "Measurement of Amount of Polyvalent Cation in Dispersing Element" above, as a result, the total amount of polyvalent cations in the dispersing element was 742 ppm. The details of the measurement results are shown in Table 54.

(4) Printing Evaluation

The ink prepared in Example L-7(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Example L-7(4) according to the same evaluation criteria as in Example L-1(5). The evaluation results of ejection stability are shown in Table 54.

(6) Evaluation of Storage Stability

The ink prepared in Example L-7(2) above was evaluated on the storage stability by the same evaluation method as in Example L-1(6) according to the same evaluation criteria as in Example L-1(6). The evaluation results of storage stability are shown in Table 54.

Example L-8

(1) Production of Dispersion

Dispersion L8

For the production of Dispersion L8 used in Example L-8, a phthalocyanine green pigment (C.I. Pigment Green 7) which is an organic pigment was used. Except for this, Dispersion L8 containing 20% of Dispersing Element L8 (dispersing element where the phthalocyanine green pigment is encapsulated with a polymer having an aromatic ring amount of 30%) was obtained in the same manner as in Example L-1(1).

In Table 52, the pigment used in Dispersion L8, the amount of aromatic ring in the dispersing polymer and the pigment/polymer ratio are shown. The amount of aromatic ring in the polymer and the pigment/polymer ratio were measured, similarly to Example L-1(1), by the methods described in "Measurement of Amount of Aromatic Ring" and "Measurement of Pigment/Polymer Ratio" above.

(2) Preparation of Ink

In Example L-8, Dispersion L8 obtained in Example L-8 (1) above, Olfine E1010 (produced by Nissin Chemical Industry Co., Ltd.) and Surfynol 104 (produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of ink, Dispersion L8 was added to have a Dispersing Element L8 content of 8.0%. The value in < > shows an average particle size (unit: nm) of Dispersing Element L8 measured by the method described in "Measurement of Average Particle Size" above.

Also, the ion exchanged water added as "balance" in the ink composition of Example L-8 shown below was, similarly to Example L-1(2), ion exchanged water where 0.01% of Proxel XL-2, 0.01% of benzotriazole and 0.02% of EDTA 2Na salt were added based on the entire weight of the ink.

| | |
|---|---|
| Dispersing Element L8 <110> | 8.0% |
| Olfine E1010 | 0.3% |
| Surfynol 104 | 0.1% |
| Dipropylene glycol monobutyl ether | 1.0% |
| 1,2-Pentanediol | 3.0% |
| Triethylene glycol | 2.0% |
| Thiodiglycol | 4.0% |
| Glycerin | 13.8% |
| Trimethylolpropane | 6.0% |
| Triethanolamine | 0.1% |
| Ion exchanged water | balance |

(3) Measurement of Amount of Polyvalent Cation in Dispersing Element

The ink prepared in Example L-8(2) above was measured by the method described in "Measurement of Amount of Polyvalent Cation in Dispersing Element" above, as a result, the total amount of polyvalent cations in the dispersing element was 588 ppm. In this Example, 8,600 ppm of copper ion was detected but the copper ion constitutes the pigment molecular skeleton and does not dissolve out in the ink, therefore, this ion does not come under the polyvalent cation contained in the dispersing element as referred to in the present invention and is not included in the above-described total amount of polyvalent cations. The details of the measurement results are shown in Table 54.

(4) Printing Evaluation

The ink prepared in Example L-8(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Example L-8(4) according to the same evaluation criteria as in Example L-1(5). The evaluation results of ejection stability are shown in Table 54.

(6) Evaluation of Storage Stability

The ink prepared in Example L-8(2) above was evaluated on the storage stability by the same evaluation method as in Example L-1(6) according to the same evaluation criteria as in Example L-1(6). The evaluation results of storage stability are shown in Table 54.

Comparative Example L-1

(1) Production of Dispersion

Dispersion L9

In Comparative Example L-1, a quinacridone red pigment (C.I. Pigment Red 122) which is an organic pigment was used similarly to Example L-3(1). Dispersion L9 containing 20% of Dispersing Element L9 (dispersing element where the quinacridone red pigment is encapsulated with a polymer having an aromatic ring amount of 20%) was obtained in the same manner as in Example L-3(1) except that in the grinding treatment of pigment, the pigment used in this Comparative Example was ground by intentionally spending as long as two times or more the normal grinding time.

In Table 52, the pigment used in Dispersion L9, the amount of aromatic ring in the dispersing polymer and the pigment/polymer ratio are shown. The pigment/polymer ratio was measured by the method described in "Measurement of Pigment/Polymer Ratio" above.

(2) Preparation of Ink

In Comparative Example L-1, an ink was prepared by using Dispersion L9 obtained in Comparative Example L-1(1) above. The specific composition is shown below.

Incidentally, in the preparation of ink, Dispersion L9 was added to have a Dispersing Element L9 content of 8.0%. The value in < > shows an average particle size (unit: nm) of Dispersing Element L9 measured by the method described in "Measurement of Average Particle Size" above.

Also, the ion exchanged water added as "balance" in the ink composition of Comparative Example L-1 shown below was, similarly to Example L-1(2), ion exchanged water where 0.01% of Proxel XL-2, 0.01% of benzotriazole and 0.02% of EDTA 2Na salt were added based on the entire weight of the ink.

| | |
|---|---|
| Dispersing Element L9 <140> | 8.0% |
| Nonionic surfactant | 1.0% |
| Ethylene glycol | 5.0% |
| Glycerin | 15.0% |
| Ion exchanged water | balance |

In the composition above, Epan 450 (trade name, produced by Dai-ichi Kogyo Seiyaku Co., Ltd.) was used as the nonionic surfactant.

(3) Measurement of Amount of Polyvalent Cation in Dispersing Element

The ink prepared in Comparative Example L-1(2) was measured by the method described in "Measurement of Amount of Polyvalent Cation in Dispersing Element" above, as a result, the total amount of polyvalent cations in the dispersing element was 1,055 ppm. The details of the measurement results are shown in Table 54.

(4) Printing Evaluation

The ink prepared in Comparative Example L-1(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Comparative Example L-1(4) according to the same evaluation criteria as in Example L-1(5). The evaluation results of ejection stability are shown in Table 54.

(6) Evaluation of Storage Stability

The ink prepared in Comparative Example L-1(2) above was evaluated on the storage stability by the same evaluation method as in Example L-1(6) according to the same evaluation criteria as in Example. L-1(6). The evaluation results of storage stability are shown in Table 54.

Comparative Example L-2

(1) Production of Dispersion

Dispersion L10

In this Comparative Example, a quinacridone violet pigment (C.I. Pigment Violet 19) which is an organic pigment was dispersed by using Solsperse 12000 (produced by Avecia Limited).

15 Parts of the quinacridone violet pigment, 5 parts of Solsperse 12000, 5 parts of diethanolamine, 0.5 parts of 2-propanol and 74.5 parts of ion exchanged water were dispersed by a bead mill MINIZETOR (manufactured by Ajisawa) for 2 hours to obtain Dispersion L10 for use in Comparative Example L-2, containing 20% (pigment: 15%, dispersing resin: 5%) of Dispersing Element L10.

(2) Preparation of Ink

In Comparative Example L-2, an ink was prepared by using Dispersion L10 obtained in Comparative Example L-2(1) above. The specific composition of this Comparative Example is shown below.

Incidentally, in the preparation of ink, Dispersion L10 was added to have a Dispersing Element L10 content of 8.0%. The value in < > shows an average particle size (unit: nm) of Dispersing Element L10 measured by the method described in "Measurement of Average Particle Size" above.

Also, the ion exchanged water added as "balance" in the ink composition of Comparative Example L-2 shown below was, similarly to Example L-1(2), ion exchanged water where 0.01% of Proxel XL-2, 0.01% of benzotriazole and 0.02% of EDTA 2Na salt were added based on the entire weight of the ink.

| | |
|---|---|
| Dispersing Element L10 <150> | 8.0% |
| Nonionic surfactant | 1.0% |
| Ethylene glycol | 5.0% |
| Glycerin | 15.0% |
| Ion exchanged water | balance |

In the composition above, Noigen EA160 (trade name, produced by Dai-ichi Kogyo Seiyaku Co., Ltd.) was used as the nonionic surfactant.

(3) Measurement of Amount of Polyvalent Cation in Dispersing Element

The ink prepared in Comparative Example L-2(2) was measured by the method described in "Measurement of Amount of Polyvalent Cation in Dispersing Element" above, as a result, the total amount of polyvalent cations in the dispersing element was 1,393 ppm. The details of the measurement results are shown in Table 54.

(4) Printing Evaluation

The ink prepared in Comparative Example L-2(2) was subjected to printing evaluation according to the same evaluation criteria as in Example L-1(4) by using the same inkjet printer PM-950C (manufactured by Seiko Epson Corporation) as in Example L-1(4) and using the same evaluation paper as in Example L-1(4). The printing evaluation results are shown in Table 53.

(5) Evaluation of Ejection Stability

The ejection stability was evaluated by the same evaluation method as in Example L-1(5) using the same printer and ink as in Comparative Example L-2(4) according to the same evaluation criteria as in Example L-1(5). The evaluation results of ejection stability are shown in Table 54.

(6) Evaluation of Storage Stability

The ink prepared in Comparative Example L-2(2) above was evaluated on the storage stability by the same evaluation method as in Example L-1(6) according to the same evaluation criteria as in Example L-1(6). The evaluation results of storage stability are shown in Table 54.

TABLE 52

List of Dispersions L1 to L9

| | Name of Dispersion | | | | | | | | |
|---|---|---|---|---|---|---|---|---|---|
| | Dispersion L1 | Dispersion L2 | Dispersion L3 | Dispersion L4 | Dispersion L5 | Dispersion L6 | Dispersion L7 | Dispersion L8 | Dispersion L9 |
| Pigment used | Color Black FW-18 | C.I. Pigment Yellow 74 | C.I. Pigment Red 122 | C.I. Pigment Blue 15:4 | C.I. Pigment Orange 43 | C.I. Pigment Brown 32 | C.I. Pigment Violet 19 | C.I. Pigment Green 7 | C.I. Pigment Red 122 |
| Amount of aromatic ring | 57% | 40% | 28% | 45% | 56% | 69% | 21% | 30% | 20% |
| Pigment:polymer ratio | 7.0:3.0 | 6.5:3.5 | 8.0:2.0 | 6.0:4.0 | 3.5:6.5 | 3.0:7.0 | 9.0:1.0 | 5.5:4.5 | 4.5:5.5 |

TABLE 53

Printing Evaluation Results of Ink of Examples and Comparative Examples

| Paper Evaluated | Example L | | | | | | | | Comparative Example L | |
|---|---|---|---|---|---|---|---|---|---|---|
| | 1 | 2 | 3 | 4 | 5 | 6 | 7 | 8 | 1 | 2 |
| (a) Conqueror | A | A | A | A | A | A | A | A | D | D |
| (b) Reymat | A | A | A | A | A | A | A | A | C | C |
| (c) Mode Copy | A | A | A | A | A | A | A | A | D | D |
| (d) Rapid Copy | A | A | A | A | A | A | A | B | D | D |
| (e) Xerox P | A | A | A | A | A | A | A | A | C | C |
| (f) Xerox 4024 | A | A | A | A | A | A | A | A | C | D |
| (g) Xerox 10 | A | A | A | A | B | A | A | A | D | D |
| (h) Neenha Bond | A | A | A | A | A | A | A | A | C | D |
| (i) Ricopy 6200 | A | A | A | A | B | A | B | A | D | D |
| (j) Hammer mill Copy Plus | A | A | A | A | B | B | A | D | D | D |

As apparent from the results in Tables 52 and 53, the printing quality is bad when the ink of Comparative Example is used, and the printing quality is good when the ink of the present invention is used.

This reveals that by using the aqueous ink of the present invention, high-quality print recording can be obtained with reduced blurring on any species of paper.

As apparent from the results in Table 54, the aqueous ink of the present invention where the amount of polyvalent cation in the dispersing element of the ink is reduced to 800 ppm or less ensures excellent ejection stability and high storage stability and, from Table 53, also ensures excellent printing quality. Furthermore, it is seen that when the amount of polyvalent cation is 550 ppm or less, very excellent ejection stability and storage stability can be obtained. On the other hand, when the amount of polyvalent cation exceeds 1,000 ppm as in Comparative Examples, the printing quality, ejection stability and storage stability all fail in reaching the practicable level.

These results reveal that good printing quality and ejection stability can be obtained by using the aqueous ink of the present invention and moreover, the storage stability of the ink is excellent.

Example M

The present invention is described below by referring to Examples, however, the scope of the present invention is not limited thereto.
(Measuring Methods of Amount of Aromatic Ring, Pigment/Polymer Ratio, Average Particle Size, Amount of Polyvalent Anion in Dispersing Element and Surface Tension)

The measured values (amount of aromatic ring, pigment/polymer ratio, average particle size, amount of polyvalent

TABLE 54

Amount of Polyvalent Cation in Dispersing Element of Examples and Comparative Examples and Evaluation Results of Storage Stability and Ejection Stability

| | Example L | | | | | | | | Comparative Example L | |
|---|---|---|---|---|---|---|---|---|---|---|
| | 1 | 2 | 3 | 4 | 5 | 6 | 7 | 8 | 1 | 2 |
| Amount of polyvalent cation (ppm) | | | | | | | | | | |
| Aluminum ion | 38 | — | 214 | — | 114 | 114 | 186 | 33 | 314 | 134 |
| Calcium ion | 205 | 199 | 71 | 88 | 184 | 171 | 164 | 293 | 271 | 363 |
| Copper ion | — | — | — | (9300) | — | 5 | — | (8600) | 5 | — |
| Iron ion | 34 | 10 | 41 | 21 | 61 | 167 | 132 | 61 | 141 | 182 |
| Magnesium ion | 54 | 46 | 143 | 38 | 193 | 116 | 189 | 96 | 243 | 257 |
| Silicon ion | 21 | 12 | 24 | 11 | — | 224 | 57 | 24 | 44 | 433 |
| Zinc ion | 16 | 5 | 34 | — | 34 | — | 14 | 34 | 34 | 24 |
| Chromium ion | 4 | — | — | 9 | 10 | — | — | 31 | 9 | — |
| Nickel ion | 12 | — | — | 5 | 14 | — | — | 16 | 14 | — |
| Total | 387 | 272 | 527 | 172 | 610 | 797 | 742 | 588 | 1055 | 1393 |
| Foreign matters | A | A | A | A | B | B | B | B | C | D |
| Viscosity | A | A | A | A | A | B | B | A | C | D |
| Surface tension | A | A | A | A | A | B | A | A | C | D |
| Ejection stability | A | A | A | A | B | B | B | A | D | D |

* In the Table, "—" shows that the amount is lower than the measurement limit value. The copper ion in Examples L-4 and L-8 is present in the pigment skeleton and therefore, excluded from the amount.

anion in dispersing element and surface tension) obtained in these Examples each was measured by the following method.
"Measurement of Amount of Aromatic Ring"

A part of each dispersing polymer solution obtained in Examples and Comparative Examples was taken out, then only the polymer component was taken out by distilling off the solvent components and dissolved in DMSO-$d_6$, and the amount of aromatic ring in the polymer was measured by using $^{13}$C-NMR and $^1$H-NMR (AMX400, manufactured by Bruker (Germany)).
"Measurement of Pigment/Polymer Ratio"

A part of each dispersion obtained in Examples and Comparative Examples was taken out and after precipitating only the dispersing element with an acid by adding HCl in a concentration of 0.1 mol/liter, measured on the dry weight. Then, only the dispersing polymer was taken out by a Soxhlet extraction method using acetone and measured on the dry weight. From the obtained values, the weight ratio of pigment/polymer was calculated.
"Measurement of Average Particle Size"

The aqueous inks obtained in Examples and Comparative Examples each was diluted with ion exchanged water to have a dispersing element concentration of 0.001 to 0.01 wt % (because the optimal concentration at the measurement slightly differs depending on the aqueous ink) and the average particle size of dispersed particles at 20° C. was measured by a particle size distribution meter (DLS-800, manufactured by Otsuka Electronics Co., Ltd.).
"Measurement of Amount of Polyvalent Anion in Dispersing Element"

A necessary amount of each aqueous ink obtained in Examples and Comparative Examples was taken out and by a centrifugal separation treatment, separated into the solvent components of aqueous ink and the dispersing element which is the solid content. The centrifugation conditions were 2500 G and 60 minutes.

The obtained dispersing element was sampled in a quartz dish, incinerated by adding a trapping agent, melted with potassium hydrogensulfate and dissolved in dilute nitric acid and the amount of polyvalent anion in the dispersing element was measured by the ICP emission analysis (ICPS-8000, manufactured by Shimadzu Corporation).
"Measurement of Surface Tension"

The aqueous inks obtained in Examples and Comparative Examples each was measured on the surface tension at 20° C. by a surface tension balance (CBVP-A3, manufactured by Kyowa Interface Science Co., Ltd.).

Example M-1

(1) Production of Dispersion

Dispersion M1

For the production of Dispersion M1 used in Example M-1, Color Black FW18 (produced by Degussa), which is an inorganic pigment and a carbon black pigment, was used.

A reaction vessel equipped with a stirrer, a thermometer, a reflux tube and a dropping funnel was purged with nitrogen and thereinto, 15 parts of methyl ethyl ketone, 22 parts of styrene, 5 parts of (x-methylstyrene, 16 parts of butyl methacrylate, 10 parts of lauryl methacrylate, 2 parts of acrylic acid and 0.3 parts of tert-dodecylmercaptan were charged and heated at 70° C. Thereafter, separately prepared 100 parts of styrene, 16 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 57%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion M1 containing 20% of Dispersing Element M1 (dispersing element where the carbon black pigment is encapsulated with the polymer having an aromatic ring amount of 57%).

In Table 55, the pigment used in Dispersion M1, the amount of aromatic ring in the dispersing polymer and the pigment/polymer ratio are shown. The pigment/polymer ratio was measured by the method described in "Measurement of Pigment/Polymer Ratio" above.

(2) Preparation of Aqueous Ink

In Example M-1, Dispersion M1 obtained in Example M-1(1) above, Olfine E1010 (produced by Nissin Chemical Industry Co., Ltd.) as an acetylene glycol-base surfactant, diethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion M1 was added to have a Dispersing Element M1 content of 8.0%. The value in < > shows an average particle size (unit: nm) of Dispersing Element M1 measured by the method described in "Measurement of Average Particle Size" above.

Also, the ion exchanged water added as "balance" in the aqueous ink composition of Example M-1 shown below was ion exchanged water where Proxel XL-2 for preventing septic activity of the aqueous ink, benzotriazole for preventing corrosion of an aqueous inkjet head member and EDTA 2Na salt for reducing the effect of metal ion in the aqueous ink system were added to a concentration of 0.01%, 0.01% and 0.02%, respectively, based on the entire weight of the aqueous ink.

| | |
|---|---|
| Dispersing Element M1 <120> | 8.0% |
| Olfine E1010 | 0.5% |
| Diethylene glycol monobutyl ether | 3.0% |
| 1,2-Pentanediol | 2.5% |
| Diethylene glycol | 3.0% |
| Glycerin | 11.5% |
| Trimethylolpropane | 6.0% |
| Tripropanolamine | 0.3% |
| Ion exchanged water | balance |

(3) Measurement of Amount of Polyvalent Anion in Dispersing Element

The aqueous ink prepared in Example M-1(2) was measured by the method described in "Measurement of Amount of Polyvalent Anion in Dispersing Element" above, as a result, the total amount of polyvalent anions in the dispersing element was 402 ppm. The details of the measurement results are shown in Table 57.

(4) Printing Evaluation

In the printing evaluation, the aqueous ink prepared in Example M-1(2) was evaluated on the printing quality by using an aqueous inkjet printer PM-950C (manufactured by Seiko Epson Corporation) which ejects an aqueous ink by an aqueous inkjet head using a piezoelectric element.

As for the paper used for evaluation, (a) Conqueror, (b) Reymat, (c) Mode Copy, (d) Rapid Copy, (e) Xerox P, (f) Xerox 4024, (g) Xerox 10, (h) Neenha Bond, (i) Ricopy 6200 and (j) Hammer mill Copy Plus which are plain papers commercially available in Europe, USA and Japan were used.

The evaluation was performed with an eye according to the following criteria.
A: No blurring was observed in letters of all points.
B: Blurring was slightly observed in letters of 5 point or less (practicable level).
C: Letters of 5 point or less were seen thickened due to blurring.
D: Blurring was serious and letters of 5 point or less could not be made out.

The printing evaluation results are shown in Table 56.

(5) Evaluation of Ejection Stability

A continuous printing of 200 pages was performed on A4-size Xerox P by using the same printer and aqueous ink as in Example M-1(4) above and the ejection stability was evaluated by observing the printing disorder.

The evaluation was performed with an eye according to the following criteria.
A: Printing disorder was not generated at all.
B: Printing disorder was generated but at less than 10 portions (practicable level).
C: Printing disorder was generated at 10 to less than 100 portions.
D: Printing disorder was generated at 100 or more portions.

The evaluation results of ejection stability are shown in Table 57.

(6) Evaluation of Storage Stability

The aqueous ink prepared in Example M-1(2) above was charged into a vial and after tightly plugging the vial, left standing at 60° C. for one week or at −20° C. for one week. The foreign matters generated and the change in physical values (viscosity, surface tension) of the aqueous ink before and after standing were evaluated.

The evaluation was performed according to the following criteria.
A: The ratio of the amount of foreign matters generated and physical values after standing at 60° C. or −20° C. to those before standing was in the range from 0.99 to 1.01.
B: The ratio was from 0.95 to 0.99 or from 1.01 to 1.05 (practicable level).
C: The ratio was from 0.90 to 0.95 or from 1.05 to 1.10.
D: The ratio was less than 0.90 or more than 1.10.

The evaluation results of storage stability are shown in Table 57.

Example M-2

(1) Production of Dispersion

Dispersion M2

For the production of Dispersion M2 used in Example M-2, an insoluble monoazo yellow pigment (C.I. Pigment Yellow 74) which is an organic pigment was used.

A reaction vessel equipped with a stirrer, a thermometer, a reflux tube and a dropping funnel was purged with nitrogen and thereinto, 12 parts of styrene, 9 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 3 parts of methacrylic acid, 5 parts of methyl ethyl ketone and 0.3 parts of mercaptoethanol were charged and heated at 70° C. Thereafter, separately prepared 25 parts of styrene, 30 parts of lauryl methacrylate, 15 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 10 parts of methacrylic acid, 20 parts of methyl ethyl ketone and 1.0 part of mercaptoethanol were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 40%.

40 Parts of the dispersing polymer solution obtained above, 30 parts of an insoluble monoazo yellow pigment (C.I. Pigment Yellow 74) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion M2 containing 20% of Dispersing Element M2 (dispersing element where the insoluble monoazo yellow pigment is encapsulated with the polymer having an aromatic ring amount of 40%).

In Table 55, the pigment used in Dispersion M2, the amount of aromatic ring in the dispersing polymer and the pigment/polymer ratio are shown. The amount of aromatic ring in the polymer and the pigment/polymer ratio were measured, similarly to Example M-1(1), by the methods described in "Measurement of Amount of Aromatic Ring" and "Measurement of Pigment/Polymer Ratio" above.

(2) Preparation of Aqueous Ink

In Example M-2, Dispersion M2 obtained in Example M-2(1) above, Surfynol 440 (produced by Air Products) and Olfine STG (produced by Nissin Chemical Industry Co., Ltd.) as acetylene glycol-base surfactants, triethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion M2 was added to have a Dispersing Element M2 content of 7.0%. The value in < > shows an average particle size (unit: nm) of Dispersing Element M2 measured by the method described in "Measurement of Average Particle Size" above.

Also, the ion exchanged water added as "balance" in the aqueous ink composition of Example M-2 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M2 <120> | 7.0% |
| Surfynol 440 | 0.2% |
| Olfine STG | 0.2% |
| Triethylene glycol monobutyl ether | 3.0% |
| 1,2-Pentanediol | 2.0% |
| 2-Pyrrolidone | 3.0% |
| Glycerin | 13.5% |
| Trimethylolethane | 5.0% |
| Triethanolamine | 0.1% |
| Ion exchanged water | balance |

(3) Measurement of Amount of Polyvalent Anion in Dispersing Element

The aqueous ink prepared in Example M-2(2) above was measured by the method described in "Measurement of Amount of Polyvalent Anion in Dispersing Element" above, as a result, the total amount of polyvalent anions in the dispersing element was 225 ppm. The details of the measurement results are shown in Table 57.

(4) Printing Evaluation

The aqueous ink prepared in Example M-2(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Example M-2(4) according to the same evaluation criteria as in Example M-1(5). The evaluation results of ejection stability are shown in Table 57.

(6) Evaluation of Storage Stability

The aqueous ink prepared in Example M-2(2) above was evaluated on the storage stability by the same evaluation method as in Example M-1(6) according to the same evaluation criteria as in Example M-1(6). The evaluation results of storage stability are shown in Table 57.

Example M-3

(1) Production of Dispersion

Dispersion M3

For the production of Dispersion M3 used in Example M-3, a quinacridone red pigment (C.I. Pigment Red 122) which is an organic pigment was used.

A reaction vessel equipped with a stirrer, a thermometer, a reflux tube and a dropping funnel was purged with nitrogen and thereinto, 10 parts of styrene, 5 parts of styrene macromer (AS-6, produced by Toagosei Chemical Industry Co., Ltd.), 3.5 parts of n-dodecyl methacrylate, 10 parts of N,N-dimethylaminoethyl methacrylate, 25 parts of methoxypolyethylene glycol methacrylate (NK Ester M40G, produced by Shin-Nakamura Chemical Co., Ltd.), 5 parts of methyl ethyl ketone and 0.3 parts of mercaptoethanol were charged and heated at 70° C. Thereafter, separately prepared 15 parts of styrene, 10 parts of styrene macromer (AS-6, produced by Toagosei Chemical Industry Co., Ltd.), 5 parts of n-dodecyl methacrylate, 20 parts of N,N-dimethylaminoethyl methacrylate, 30 parts of methoxypolyethylene glycol methacrylate (NK Ester M40G, produced by Shin-Nakamura Chemical Co., Ltd.), 50 parts of methyl ethyl ketone and 1.5 parts of azobisisobutyronitrile were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 28%.

40 Parts of the dispersing polymer solution obtained above, 25 parts of a quinacridone red pigment (C.I. Pigment Red 122) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion M3 containing 20% of Dispersing Element M3 (dispersing element where the quinacridone red pigment is encapsulated with the polymer having an aromatic ring amount of 28%).

In Table 55, the pigment used in Dispersion M3, the amount of aromatic ring in the dispersing polymer and the pigment/polymer ratio are shown. The amount of aromatic ring in the polymer and the pigment/polymer ratio were measured, similarly to Example M-1(1), by the methods described in "Measurement of Amount of Aromatic Ring" and "Measurement of Pigment/Polymer Ratio" above.

(2) Preparation of Aqueous Ink

In Example M-3, Dispersion M3 obtained in Example M-3(1) above, Olfine E1010 (produced by Nissin Chemical Industry Co., Ltd.) and Surfynol 104PG50 (produced by Air Products) as acetylene glycol-base surfactants, triethylene glycol monobutyl ether as an alkylene glycol monoalkyl ether, and 1,2-hexanediol as a 1,2-alkylene glycol were used. The specific composition is shown below.

Incidentally, in the preparation of aqueous ink, Dispersion M3 was added to have a Dispersing Element M3 content of 7.5%. The value in < > shows an average particle size (unit: nm) of Dispersing Element M3 measured by the method described in "Measurement of Average Particle Size" above.

Also, the ion exchanged water added as "balance" in the aqueous ink composition of Example M-3 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M3 <140> | 7.5% |
| Olfine E1010 | 0.1% |

-continued

| | |
|---|---|
| Surfynol 104PG50 | 0.4% |
| Triethylene glycol monobutyl ether | 1.0% |
| 1,2-Hexanediol | 2.5% |
| Triethylene glycol | 2.0% |
| 2-Pyrrolidone | 4.0% |
| Glycerin | 13.8% |
| Trimethylolpropane | 6.0% |
| Ion exchanged water | balance |

(3) Measurement of Amount of Polyvalent Anion in Dispersing Element

The aqueous ink prepared in Example M-3(2) above was measured by the method described in "Measurement of Amount of Polyvalent Anion in Dispersing Element" above, as a result, the total amount of polyvalent anions in the dispersing element was 287 ppm. The details of the measurement results are shown in Table 57.

(4) Printing Evaluation

The aqueous ink prepared in Example M-3(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Example M-3(4) according to the same evaluation criteria as in Example M-1(5). The evaluation results of ejection stability are shown in Table 57.

(6) Evaluation of Storage Stability

The aqueous ink prepared in Example M-3(2) above was evaluated on the storage stability by the same evaluation method as in Example M-1(6) according to the same evaluation criteria as in Example M-1(6). The evaluation results of storage stability are shown in Table 57.

Example M-4

(1) Production of Dispersion

Dispersion M4

For the production of Dispersion M4 used in Example M-4, a phthalocyanine blue pigment (C.I. Pigment Blue 15:4) which is an organic pigment was used.

A reaction vessel equipped with a stirrer, a thermometer, a reflux tube and a dropping funnel was purged with nitrogen and thereinto, 20 parts of styrene, 10 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 10 parts of styrene macromer (AS-6, produced by Toagosei Chemical Industry Co., Ltd.), 5 parts of methacrylic acid, 5 parts of methyl ethyl ketone and 0.3 parts of n-dodecylmercaptan were charged and heated at 70° C. Thereafter, separately prepared 25 parts of styrene, 30 parts of lauryl methacrylate, 20 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 15 parts of styrene macromer (AS-6, produced by Toagosei Chemical Industry Co., Ltd.), 5 parts of methacrylic acid, 20 parts of methyl ethyl ketone and 1.5 parts of n-dodecylmercaptan were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 45%.

40 Parts of the dispersing polymer solution obtained above, 40 parts of a phthalocyanine blue pigment (C.I. Pigment Blue 15:4) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion M4 containing 20% of Dispersing Element M4 (dispersing element where the phthalocyanine blue pigment is encapsulated with the polymer having an aromatic ring amount of 45%).

In Table 55, the pigment used in Dispersion M4, the amount of aromatic ring in the dispersing polymer and the pigment/polymer ratio are shown. The amount of aromatic ring in the polymer and the pigment/polymer ratio were measured, similarly to Example M-1(1), by the methods described in "Measurement of Amount of Aromatic Ring" and "Measurement of Pigment/Polymer Ratio" above.

(2) Preparation of Aqueous Ink

In Example M-4, Dispersion M4 obtained in Example M-4(1) above, Acetylenol E100 (produced by Kawaken Fine Chemicals) as an acetylene glycol-base surfactant, propylene glycol monobutyl ether as an alkylene glycol monoalkyl ether, and 1,2-hexanediol as a 1,2-alkylene glycol were used. The specific composition is shown below.

Incidentally, in the preparation of aqueous ink, Dispersion M4 was added to have a Dispersing Element M4 content of 8.0%. The value in < > shows an average particle size (unit: nm) of Dispersing Element M4 measured by the method described in "Measurement of Average Particle Size" above.

Also, the ion exchanged water added as "balance" in the aqueous ink composition of Example M-4 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M4 <100> | 8.0% |
| Acetylenol E100 | 0.5% |
| Propylene glycol monobutyl ether | 3.0% |
| 1,2-Hexanediol | 1.0% |
| Triethylene glycol | 3.0% |
| Glycerin | 13.8% |
| Trimethylolpropane | 5.2% |

-continued

| | |
|---|---|
| Tripropanolamine | 0.2% |
| Ion exchanged water | balance |

(3) Measurement of Amount of Polyvalent Anion in Dispersing Element

The aqueous ink prepared in Example M-4(2) above was measured by the method described in "Measurement of Amount of Polyvalent Anion in Dispersing Element" above, as a result, the total amount of polyvalent anions in the dispersing element was 375 ppm. The details of the measurement results are shown in Table 57.

(4) Printing Evaluation

The aqueous ink prepared in Example M-4(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Example M-4(4) according to the same evaluation criteria as in Example M-1(5). The evaluation results of ejection stability are shown in Table 57.

(6) Evaluation of Storage Stability

The aqueous ink prepared in Example M-4(2) above was evaluated on the storage stability by the same evaluation method as in Example M-1(6) according to the same evaluation criteria as in Example M-1(6). The evaluation results of storage stability are shown in Table 57.

Example M-5

(1) Production of Dispersion

Dispersion M5

For the production of Dispersion M5 used in Example M-5, a perynone orange pigment (C.I. Pigment Orange 43) was used. Except for this, Dispersion M5 containing 20% of Dispersing Element M5 (dispersing element where the perynone orange pigment is encapsulated with a polymer having an aromatic ring amount of 56%) was obtained in the same manner as in Example M-1(1).

In Table 55, the pigment used in Dispersion M5, the amount of aromatic ring in the dispersing polymer and the pigment/polymer ratio are shown. The amount of aromatic ring in the polymer and the pigment/polymer ratio were measured, similarly to Example M-1(1), by the methods described in "Measurement of Amount of Aromatic Ring" and "Measurement of Pigment/Polymer Ratio" above.

(2) Preparation of Aqueous Ink

In Example M-5, Dispersion M5 obtained in Example M-5(1) above, Surfynol 485 and Surfynol TG (both produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion M5 was added to have a Dispersing Element M5 content of 10.0%. The value in < > shows an average particle size (unit: nm) of Dispersing Element M5 measured by the method described in "Measurement of Average Particle Size" above.

Also, the ion exchanged water added as "balance" in the aqueous ink composition of Example M-5 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M5 <150> | 10.0% |
| Surfynol 485 | 0.5% |
| Surfynol TG | 0.2% |
| Dipropylene glycol monobutyl ether | 2.0% |
| 1,2-Pentanediol | 2.0% |
| N-Methyl-2-pyrrolidone | 5.0% |
| Glycerin | 11.2% |
| Trehalose | 5.8% |
| Ion exchanged water | balance |

(3) Measurement of Amount of Polyvalent Anion in Dispersing Element

The aqueous ink prepared in Example M-5(2) above was measured by the method described in "Measurement of Amount of Polyvalent Anion in Dispersing Element" above, as a result, the total amount of polyvalent anions in the dispersing element was 248 ppm. The details of the measurement results are shown in Table 57.

(4) Printing Evaluation

The aqueous ink prepared in Example M-5(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Example M-5(4) according to the same evaluation criteria as in Example M-1(5). The evaluation results of ejection stability are shown in Table 57.

(6) Evaluation of Storage Stability

The aqueous ink prepared in Example M-5(2) above was evaluated on the storage stability by the same evaluation method as in Example M-1(6) according to the same evaluation criteria as in Example M-1(6). The evaluation results of storage stability are shown in Table 57.

Example M-6

(1) Production of Dispersion

Dispersion M6

For the production of Dispersion M6 used in Example M-6, a benzimidazolone brown pigment (C.I. Pigment Brown 32) was used. Except for this, Dispersion M6 containing 20% of Dispersing Element M6 (dispersing element where the benzimidazolone brown pigment is encapsulated with a polymer having an aromatic ring amount of 69%) was obtained in the same manner as in Example M-1(1).

In Table 55, the pigment used in Dispersion M6, the amount of aromatic ring in the dispersing polymer and the pigment/polymer ratio are shown. The amount of aromatic ring in the polymer and the pigment/polymer ratio were measured, similarly to Example M-1(1), by the methods described in "Measurement of Amount of Aromatic Ring" and "Measurement of Pigment/Polymer Ratio" above.

(2) Preparation of Aqueous Ink

In Example M-6, Dispersion M6 obtained in Example M-6(1) above, Surfynol 420 as an acetylene glycol-base surfactant, and diethylene glycol monobutyl ether as an alkylene glycol monoalkyl ether were used. The specific composition is shown below.

Incidentally, in the preparation of aqueous ink, Dispersion M6 was added to have a Dispersing Element M6 content of 5.0%. The value in < > shows an average particle size (unit: nm) of Dispersing Element M6 measured by the method described in "Measurement of Average Particle Size" above.

Also, the ion exchanged water added as "balance" in the aqueous ink composition of Example M-6 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M6 <140> | 5.0% |
| Surfynol 420 | 0.1% |
| Diethylene glycol monobutyl ether | 3.0% |
| 1,6-Hexanediol | 2.0% |
| Tetraethylene glycol | 5.5% |
| Glycerin | 13.5% |
| Triethanolamine | 0.5% |
| Ion exchanged water | balance |

(3) Measurement of Amount of Polyvalent Anion in Dispersing Element

The aqueous ink prepared in Example M-6(2) above was measured by the method described in "Measurement of Amount of Polyvalent Anion in Dispersing Element" above, as a result, the total amount of polyvalent anions in the dispersing element was 515 ppm. The details of the measurement results are shown in Table 57.

(4) Printing Evaluation

The aqueous ink prepared in Example M-6(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Example M-6(4) according to the same evaluation criteria as in Example M-1(5). The evaluation results of ejection stability are shown in Table 57.

(6) Evaluation of Storage Stability

The aqueous ink prepared in Example M-6(2) above was evaluated on the storage stability by the same evaluation method as in Example M-1(6) according to the same evaluation criteria as in Example M-1(6). The evaluation results of storage stability are shown in Table 57.

Example M-7

(1) Production of Dispersion

Dispersion M7

For the production of Dispersion M7 used in Example M-7, a quinacridone violet pigment (C.I. Pigment Violet 19) which is an organic pigment was used. Except for this, Dispersion M7 containing 20% of Dispersing Element M7 (dispersing element where the quinacridone violet pigment is encapsulated with a polymer having an aromatic ring amount of 21%) was obtained in the same manner as in Example M-1(1).

In Table 55, the pigment used in Dispersion M7, the amount of aromatic ring in the dispersing polymer and the pigment/polymer ratio are shown. The amount of aromatic ring in the polymer and the pigment/polymer ratio were measured, similarly to Example M-1(1), by the methods described in "Measurement of Amount of Aromatic Ring" and "Measurement of Pigment/Polymer Ratio" above.

(2) Preparation of Aqueous Ink

In Example M-7, Dispersion M7 obtained in Example M-7(1) above, Surfynol 61 as acetylene alcohol-base surfactant and Surfynol TG (both produced by Air Products), triethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion M7 was added to have a Dispersing Element M7 content of 6.0%. The value in < > shows an average particle size (unit: nm) of Dispersing Element M7 measured by the method described in "Measurement of Average Particle Size" above.

Also, the ion exchanged water added as "balance" in the aqueous ink composition of Example M-7 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M7 <120> | 6.0% |
| Surfynol 61 | 0.3% |
| Surfynol TG | 0.1% |
| Triethylene glycol monobutyl ether | 1.5% |
| 1,2-Pentanediol | 2.0% |
| Diethylene glycol | 2.0% |
| Thiodiglycol | 4.0% |
| Glycerin | 12.6% |
| Trimethylolethane | 7.0% |
| Ion exchanged water | balance |

(3) Measurement of Amount of Polyvalent Anion in Dispersing Element

The aqueous ink prepared in Example M-7(2) above was measured by the method described in "Measurement of Amount of Polyvalent Anion in Dispersing Element" above, as a result, the total amount of polyvalent anions in the dispersing element was 351 ppm. The details of the measurement results are shown in Table 57.

(4) Printing Evaluation

The aqueous ink prepared in Example M-7(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Example M-7(4) according to the same evaluation criteria as in Example M-1(5). The evaluation results of ejection stability are shown in Table 57.

(6) Evaluation of Storage Stability

The aqueous ink prepared in Example M-7(2) above was evaluated on the storage stability by the same evaluation method as in Example M-1(6) according to the same evaluation criteria as in Example M-1(6). The evaluation results of storage stability are shown in Table 57.

Example M-8

(1) Production of Dispersion

Dispersion M8

For the production of Dispersion M8 used in Example M-8, a phthalocyanine green pigment (C.I. Pigment Green 7) which is an organic pigment was used. Except for this, Dispersion M8 containing 20% of Dispersing Element M8 (dispersing element where the phthalocyanine green pigment is encapsulated with a polymer having an aromatic ring amount of 30%) was obtained in the same manner as in Example M-1(1).

In Table 55, the pigment used in Dispersion M8, the amount of aromatic ring in the dispersing polymer and the pigment/polymer ratio are shown. The amount of aromatic ring in the polymer and the pigment/polymer ratio were measured, similarly to Example M-1(1), by the methods described in "Measurement of Amount of Aromatic Ring" and "Measurement of Pigment/Polymer Ratio" above.

(2) Preparation of Aqueous Ink

In Example M-8, Dispersion M8 obtained in Example M-8(1) above, Olfine E1010 (produced by Nissin Chemical Industry Co., Ltd.) and Surfynol 104 (produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion M8 was added to have a Dispersing Element M8 content of 8.0%. The value in < > shows an average particle size (unit: nm) of Dispersing Element M8 measured by the method described in "Measurement of Average Particle Size" above.

Also, the ion exchanged water added as "balance" in the aqueous ink composition of Example M-8 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M8 <110> | 8.0% |
| Olfine E1010 | 0.3% |
| Surfynol 104 | 0.1% |
| Dipropylene glycol monobutyl ether | 1.0% |
| 1,2-Pentanediol | 3.0% |
| Triethylene glycol | 2.0% |
| Thiodiglycol | 4.0% |
| Glycerin | 13.8% |
| Trimethylolpropane | 6.0% |
| Triethanolamine | 0.1% |
| Ion exchanged water | balance |

(3) Measurement of Amount of Polyvalent Anion in Dispersing Element

The aqueous ink prepared in Example M-8(2) above was measured by the method described in "Measurement of Amount of Polyvalent Anion in Dispersing Element" above, as a result, the total amount of polyvalent anions in the dispersing element was 568 ppm. The details of the measurement results are shown in Table 57.

(4) Printing Evaluation

The aqueous ink prepared in Example M-8(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Example M-8(4) according to the same evaluation criteria as in Example M-1(5). The evaluation results of ejection stability are shown in Table 57.

(6) Evaluation of Storage Stability

The aqueous ink prepared in Example M-8(2) above was evaluated on the storage stability by the same evaluation method as in Example M-1(6) according to the same evaluation criteria as in Example M-1(6). The evaluation results of storage stability are shown in Table 57.

Comparative Example M-1

(1) Production of Dispersion

Dispersion M9

In Comparative Example M-1, a quinacridone red pigment (C.I. Pigment Red 122) which is an organic pigment was used similarly to Example M-3(1). Dispersion M9 containing 20% of Dispersing Element M9 (dispersing element where the quinacridone red pigment is encapsulated with a polymer having an aromatic ring amount of 20%) was obtained in the same manner as in Example M-3(1) except that in the grinding treatment of pigment, the pigment used in this Comparative Example was ground by intentionally spending as long as two times or more the normal grinding time.

In Table 55, the pigment used in Dispersion M9, the amount of aromatic ring in the dispersing polymer and the pigment/polymer ratio are shown. The pigment/polymer ratio was measured by the method described in "Measurement of Pigment/Polymer Ratio" above.

(2) Preparation of Aqueous Ink

In Comparative Example M-1, an aqueous ink was prepared by using Dispersion M9 obtained in Comparative Example M-1(1) above. The specific composition is shown below.

Incidentally, in the preparation of aqueous ink, Dispersion M9 was added to have a Dispersing Element M9 content of 8.0%. The value in < > shows an average particle size (unit: nm) of Dispersing Element M9 measured by the method described in "Measurement of Average Particle Size" above.

Also, the ion exchanged water added as "balance" in the aqueous ink composition of Comparative Example M-1 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M9 <140> | 8.0% |
| Nonionic surfactant | 1.0% |
| Ethylene glycol | 5.0% |
| Glycerin | 15.0% |
| Ion exchanged water | balance |

In the composition above, Epan 450 (trade name, produced by Dai-ichi Kogyo Seiyaku Co., Ltd.) was used as the nonionic surfactant.

(3) Measurement of Amount of Polyvalent Anion in Dispersing Element

The aqueous ink prepared in Comparative Example M-1(2) was measured by the method described in "Measurement of Amount of Polyvalent Anion in Dispersing Element" above, as a result, the total amount of polyvalent anions in the dispersing element was 848 ppm. The details of the measurement results are shown in Table 57.

(4) Printing Evaluation

The aqueous ink prepared in Comparative Example M-1(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Comparative Example M-1(4) according to the same evaluation criteria as in Example M-1(5). The evaluation results of ejection stability are shown in Table 57.

(6) Evaluation of Storage Stability

The aqueous ink prepared in Comparative Example M-1(2) above was evaluated on the storage stability by the same evaluation method as in Example M-1(6) according to the same evaluation criteria as in Example M-1(6). The evaluation results of storage stability are shown in Table 57.

Comparative Example M-2

(1) Production of Dispersion

Dispersion M10

In Comparative Example M-2, a quinacridone violet pigment (C.I. Pigment Violet 19) which is an organic pigment was dispersed by using Solsperse 12000 (produced by Avecia Limited).

15 Parts of the quinacridone violet pigment (C.I. Pigment Violet 19), 5 parts of Solsperse 12000, 5 parts of diethanolamine, 0.5 parts of 2-propanol and 74.5 parts of ion exchanged water were dispersed by a bead mill MINIZETOR (manufactured by Ajisawa) for 2 hours to obtain Dispersion M10 for use in Comparative Example M-2, containing 20% (pigment: 15%, dispersing resin: 5%) of Dispersing Element M9.

(2) Preparation of Aqueous Ink

In Comparative Example M-2, an aqueous ink was prepared by using Dispersion M10 obtained in Comparative Example M-2(1) above. The specific composition of this Comparative Example is shown below.

Incidentally, in the preparation of aqueous ink, Dispersion M10 was added to have a Dispersing Element M9 content of 8.0%. The value in < > shows an average particle size (unit: nm) of Dispersing Element M9 measured by the method described in "Measurement of Average Particle Size" above.

Also, the ion exchanged water added as "balance" in the aqueous ink composition of Comparative Example M-2 shown below was, similarly to Example M-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element M9 <150> | 8.0% |
| Nonionic surfactant | 1.0% |
| Ethylene glycol | 5.0% |
| Glycerin | 15.0% |
| Ion exchanged water | balance |

In the composition above, Noigen EA160 (trade name, produced by Dai-ichi Kogyo Seiyaku Co., Ltd.) was used as the nonionic surfactant.

(3) Measurement of Amount of Polyvalent Anion in Dispersing Element

The aqueous ink prepared in Comparative Example M-2(2) was measured by the method described in "Measurement of Amount of Polyvalent Anion in Dispersing Element" above, as a result, the total amount of polyvalent anions in the dispersing element was 1,386 ppm. The details of the measurement results are shown in Table 57.

(4) Printing Evaluation

The aqueous ink prepared in Comparative Example M-2(2) was subjected to printing evaluation according to the same evaluation criteria as in Example M-1(4) by using the same aqueous inkjet printer PM-950C (manufactured by Seiko Epson Corporation) as in Example M-1(4) and using the same evaluation paper as in Example M-1(4). The printing evaluation results are shown in Table 56.

(5) Evaluation of Ejection Stability

The ejection stability was evaluated by the same evaluation method as in Example M-1(5) using the same printer and aqueous ink as in Comparative Example M-2(4) according to the same evaluation criteria as in Example M-1(5). The evaluation results of ejection stability are shown in Table 57.

(6) Evaluation of Storage Stability

The aqueous ink prepared in Comparative Example M-2(2) above was evaluated on the storage stability by the same evaluation method as in Example M-1(6) according to the same evaluation criteria as in Example M-1(6). The evaluation results of storage stability are shown in Table 57.

TABLE 55

List of Dispersions M1 to M9

| | Name of Dispersion | | | | | | | | |
|---|---|---|---|---|---|---|---|---|---|
| | Example M | | | | | | | | Comparative Example M |
| | Dispersion M1 | Dispersion M2 | Dispersion M3 | Dispersion M4 | Dispersion M5 | Dispersion M6 | Dispersion M7 | Dispersion M8 | Dispersion M9 |
| Pigment used | Color Black FW-18 | C.I. Pigment Yellow 74 | C.I. Pigment Red 122 | C.I. Pigment Blue 15:4 | C.I. Pigment Orange 43 | C.I. Pigment Brown 32 | C.I. Pigment Violet 19 | C.I. Pigment Green 7 | C.I. Pigment Red 122 |
| Amount of aromatic ring | 57% | 40% | 28% | 45% | 56% | 69% | 21% | 30% | 20% |
| Pigment:polymer ratio | 70:30 | 65:35 | 80:20 | 60:40 | 35:65 | 30:70 | 90:10 | 55:45 | 45:55 |

TABLE 56

Printing Evaluation Results of Ink of Examples and Comparative Examples

| Paper Evaluated | Example M | | | | | | | | Comparative Example M | |
|---|---|---|---|---|---|---|---|---|---|---|
| | 1 | 2 | 3 | 4 | 5 | 6 | 7 | 8 | 1 | 2 |
| (a) Conqueror | A | A | A | A | A | A | A | A | D | D |
| (b) Reymat | A | A | A | A | A | A | A | A | C | C |
| (c) Mode Copy | A | A | A | A | A | A | A | A | D | D |
| (d) Rapid Copy | A | A | A | A | A | A | A | A | D | D |
| (e) Xerox P | A | A | A | A | A | A | A | A | C | C |
| (f) Xerox 4024 | A | A | A | A | A | A | A | A | C | D |
| (g) Xerox 10 | A | A | A | A | A | B | A | A | D | D |
| (h) Neenha Bond | A | A | A | A | A | A | A | A | C | D |
| (i) Ricopy 6200 | A | A | A | A | A | B | A | A | D | D |
| (j) Hammer mill Copy Plus | A | A | A | A | A | B | B | A | D | D |

As apparent from the results in Tables 55 and 56, the printing quality is bad when the aqueous ink of Comparative Example is used, and the printing quality is good when the aqueous ink of the present invention is used.

This reveals that by using the aqueous ink of the present invention, high-quality print recording can be obtained with reduced blurring on any species of paper.

TABLE 57

Amount of Polyvalent Anion in Dispersing Element of Examples and Comparative Examples and Evaluation Results of Storage Stability and Ejection Stability

| | Example M | | | | | | | | Comparative Example M | |
|---|---|---|---|---|---|---|---|---|---|---|
| | 1 | 2 | 3 | 4 | 5 | 6 | 7 | 8 | 1 | 2 |
| Amount of polyvalent anion (ppm) | | | | | | | | | | |
| Sulfate ion | 21 | 20 | 55 | 38 | 27 | 29 | 62 | 41 | 98 | 213 |
| Phosphate ion | 331 | 205 | 232 | 327 | 198 | 450 | 289 | 479 | 677 | 1085 |
| Low molecular polycarboxylic acid | 50 | — | — | 10 | 23 | 36 | — | 48 | 73 | 88 |
| Total | 402 | 225 | 287 | 375 | 248 | 515 | 351 | 568 | 848 | 1386 |
| Foreign matters | A | A | A | A | A | A | A | B | C | D |
| Viscosity | A | A | A | A | A | B | A | B | C | D |
| Surface tension | A | A | A | A | A | A | A | A | C | D |
| Ejection stability | B | A | A | A | A | B | A | B | D | D |

* In the Table, "—" shows that the amount is lower than the measurement limit value.

As apparent from the results in Table 57, the aqueous ink of the present invention where the amount of polyvalent anion in the dispersing element of the aqueous ink is reduced to 600 ppm or less ensures excellent ejection stability and high storage stability and, from Table 56, also ensures excellent printing quality. Furthermore, it is seen that when the amount of polyvalent anion is 400 ppm or less, very excellent ejection stability and storage stability can be obtained. On the other hand, when the amount of polyvalent anion exceeds 800 ppm as in Comparative Examples, the printing quality, ejection stability and storage stability all fail in reaching the practicable level.

These results reveal that good printing quality and ejection stability can be obtained by using the aqueous ink of the present invention and moreover, the storage stability of the ink is excellent.

Example N

The present invention is described below by referring to Examples, however, the scope of the present invention is not limited thereto.

(Measuring Methods of Amount of Aromatic Ring, Pigment/Polymer Ratio, Average Particle Size, Amount of Monovalent Cation in Dispersing Element and Surface Tension)

The measured values (amount of aromatic ring, pigment/polymer ratio, average particle size, amount of monovalent cation in dispersing element and surface tension) obtained in these Examples each was measured by the following method.

"Measurement of Amount of Aromatic Ring"

A part of each dispersing polymer solution obtained in Examples and Comparative Examples was taken out, then only the polymer component was taken out by distilling off the solvent components and dissolved in DMSO-d$_6$, and the amount of aromatic ring in the polymer was measured by using $^{13}$C-NMR and $^1$H-NMR (AMX400, manufactured by Bruker (Germany)).

"Measurement of Pigment/Polymer Ratio"

A part of each dispersion obtained in Examples and Comparative Examples was taken out and after precipitating only the dispersing element with an acid by adding HCl in a concentration of 0.1 mol/liter, measured on the dry weight. Then, only the dispersing polymer was taken out by a Soxhlet extraction method using acetone and measured on the dry weight. From the obtained values, the weight ratio of pigment/polymer was calculated.

"Measurement of Average Particle Size"

The aqueous inks obtained in Examples and Comparative Examples each was diluted with ion exchanged water to have a dispersing element concentration of 0.001 to 0.01 wt % (because the optimal concentration at the measurement slightly differs depending on the aqueous ink) and the average particle size of dispersed particles at 20° C. was measured by a particle size distribution meter (DLS-800, manufactured by Otsuka Electronics Co., Ltd.).

"Measurement of Amount of Monovalent Cation in Dispersing Element"

A necessary amount of each aqueous ink obtained in Examples and Comparative Examples was taken out and by a centrifugal separation treatment, separated into the solvent components of aqueous ink and the dispersing element which is the solid content. The centrifugation conditions were 2500 G and 60 minutes.

After the centrifugation treatment, the obtained dispersing element was diluted with pure water and the amount of monovalent cation in the dispersing element was measured by the ICP emission analysis (ICPS-8000, manufactured by Shimadzu Corporation).

"Measurement of Surface Tension"

The aqueous inks obtained in Examples and Comparative Examples each was measured on the surface tension at 20° C. by a surface tension balance (CBVP-A3, manufactured by Kyowa Interface Science Co., Ltd.).

Example N-1

(1) Production of Dispersion

Dispersion N1

For the production of Dispersion N1 used in Example N-1, Color Black FW18 (produced by Degussa), which is an inorganic pigment and a carbon black pigment, was used.

A reaction vessel equipped with a stirrer, a thermometer, a reflux tube and a dropping funnel was purged with nitrogen and thereinto, 15 parts of methyl ethyl ketone, 21 parts of styrene, 5 parts of α-methylstyrene, 16 parts of butyl methacrylate, 10 parts of lauryl methacrylate, 2 parts of acrylic acid and 0.3 parts of tert-dodecylmercaptan were charged and heated at 70° C. Thereafter, separately prepared 100 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 59%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 mm to obtain Dispersion N1 containing 20% of Dispersing Element N1 (dispersing element where the carbon black pigment is encapsulated with the polymer having an aromatic ring amount of 59%).

In Table 58, the pigment used in Dispersion N1, the amount of aromatic ring in the dispersing polymer and the pigment/polymer ratio are shown. The pigment/polymer ratio was measured by the method described in "Measurement of Pigment/Polymer Ratio" above.

(2) Preparation of Aqueous Ink

In Example N-1, Dispersion N1 obtained in Example N-1 (1) above, Olfine E1010 (produced by Nissin Chemical Industry Co., Ltd.) as an acetylene glycol-base surfactant, diethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion N1 was added to have a Dispersing Element N1 content of 8.0%. The value in < > shows an average particle size (unit: nm) of Dispersing Element N1 measured by the method described in "Measurement of Average Particle Size" above.

Also, the ion exchanged water added as "balance" in the aqueous ink composition of Example N-1 shown below was ion exchanged water where Proxel XL-2 for preventing septic activity of the aqueous ink, benzotriazole for preventing corrosion of an aqueous inkjet head member and EDTA 2Na salt for reducing the effect of metal ion in the aqueous ink system were added to a concentration of 0.01%, 0.01% and 0.02%, respectively, based on the entire weight of the aqueous ink.

| | |
|---|---|
| Dispersing Element N1 <120> | 8.0% |
| Olfine E1010 | 0.5% |
| Diethylene glycol monobutyl ether | 3.0% |
| 1,2-Pentanediol | 2.5% |
| Diethylene glycol | 3.0% |
| Glycerin | 11.5% |
| Trimethylolpropane | 6.0% |
| Tripropanolamine | 0.3% |
| Ion exchanged water | balance |

(3) Measurement of Amount of Monovalent Cation in Dispersing Element

The aqueous ink prepared in Example N-1(2) was measured by the method described in "Measurement of Amount of Monovalent Cation in Dispersing Element" above, as a result, the total amount of monovalent cations was 1,788 ppm. The details of the measurement results are shown in Table 60.

(4) Printing Evaluation

In the printing evaluation, the aqueous ink prepared in Example N-1(2) was evaluated on the printing quality by using an aqueous inkjet printer PM-950C (manufactured by Seiko Epson Corporation) which ejects an aqueous ink by an aqueous inkjet head using a piezoelectric element.

As for the paper used for evaluation, (a) Conqueror, (b) Reymat, (c) Mode Copy, (d) Rapid Copy, (e) Xerox P, (f) Xerox 4024, (g) Xerox 10, (h) Neenha Bond, (i) Ricopy 6200 and (j) Hammer mill Copy Plus which are plain papers commercially available in Europe, USA and Japan were used.

The evaluation was performed with an eye according to the following criteria.

A: No blurring was observed in letters of all points.
B: Blurring was slightly observed in letters of 5 point or less (practicable level).
C: Letters of 5 point or less were seen thickened due to blurring.
D: Blurring was serious and letters of 5 point or less could not be made out.

The printing evaluation results are shown in Table 59.

(5) Evaluation of Ejection Stability

A continuous printing of 200 pages was performed on A4-size Xerox P by using the same printer and aqueous ink as in Example N-1(4) above and the ejection stability was evaluated by observing the printing disorder.

The evaluation was performed with an eye according to the following criteria.

A: Printing disorder was not generated at all.
B: Printing disorder was generated but at less than 10 portions (practicable level).
C: Printing disorder was generated at 10 to less than 100 portions.
D: Printing disorder was generated at 100 or more portions.

The evaluation results of ejection stability are shown in Table 60.

(6) Evaluation of Storage Stability

The aqueous ink prepared in Example N-1(2) above was charged into a vial and after tightly plugging the vial, left standing at 60° C. for one week or at −20° C. for one week. The foreign matters generated and the change in physical values (viscosity, surface tension) of the aqueous ink before and after standing were evaluated.

The evaluation was performed according to the following criteria.

A: The ratio of the amount of foreign matters generated and physical values after standing at 60° C. or −20° C. to those before standing was in the range from 0.99 to 1.01.
B: The ratio was from 0.95 to 0.99 or from 1.01 to 1.05 (practicable level).
C: The ratio was from 0.90 to 0.95 or from 1.05 to 1.10.
D: The ratio was less than 0.90 or more than 1.10.

The evaluation results of storage stability are shown in Table 60.

Example N-2

(1) Production of Dispersion

Dispersion N2

For the production of Dispersion N2 used in Example N-2, an insoluble monoazo yellow pigment (C.I. Pigment Yellow 74) which is an organic pigment was used.

A reaction vessel equipped with a stirrer, a thermometer, a reflux tube and a dropping funnel was purged with nitrogen and thereinto, 12 parts of styrene, 9 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 3 parts of methacrylic acid, 5 parts of methyl ethyl ketone and 0.3 parts of mercaptoethanol were charged and heated at 70° C. Thereafter, separately prepared 25 parts of styrene, 30 parts of lauryl methacrylate, 15 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 10 parts of methacrylic acid, 20 parts of methyl ethyl ketone and 1.0 part of mercaptoethanol were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 35%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 25%.

40 Parts of the dispersing polymer solution obtained above, 30 parts of an insoluble monoazo yellow pigment (C.I. Pigment Yellow 74) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion N2 containing 20% of Dispersing Element N2 (dispersing element where the insoluble monoazo yellow pigment is encapsulated with the polymer having an aromatic ring amount of 25%).

In Table 58, the pigment used in Dispersion N2, the amount of aromatic ring in the dispersing polymer and the pigment/polymer ratio are shown. The amount of aromatic ring in the polymer and the pigment/polymer ratio were measured, similarly to Example N-1(1), by the methods described in "Measurement of Amount of Aromatic Ring" and "Measurement of Pigment/Polymer Ratio" above.

(2) Preparation of Aqueous Ink

In Example N-2, Dispersion N2 obtained in Example N-2 (1) above, Surfynol 440 (produced by Air Products) and Olfine STG (produced by Nissin Chemical Industry Co., Ltd.) as acetylene glycol-base surfactants, triethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion N2 was added to have a Dispersing Element N2 content of 7.0%. The value in < > shows an average particle size (unit: nm) of Dispersing Element N2 measured by the method described in "Measurement of Average Particle Size" above.

Also, the ion exchanged water added as "balance" in the aqueous ink composition of Example N-2 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element N2 <120> | 7.0% |
| Surfynol 440 | 0.2% |
| Olfine STG | 0.2% |
| Triethylene glycol monobutyl ether | 3.0% |
| 1,2-Pentanediol | 2.0% |
| 2-Pyrrolidone | 3.0% |
| Glycerin | 13.5% |
| Trimethylolethane | 5.0% |
| Triethanolamine | 0.1% |
| Ion exchanged water | balance |

(3) Measurement of Amount of Monovalent Cation in Dispersing Element

The aqueous ink prepared in Example N-2(2) above was measured by the method described in "Measurement of Amount of Monovalent Cation in Dispersing Element" above, as a result, the total amount of monovalent cations was 1,085 ppm. The details of the measurement results are shown in Table 60.

(4) Printing Evaluation

The aqueous ink prepared in Example N-2(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Example N-2(4) according to the same evaluation criteria as in Example N-1(5). The evaluation results of ejection stability are shown in Table 60.

(6) Evaluation of Storage Stability

The aqueous ink prepared in Example N-2(2) above was evaluated on the storage stability by the same evaluation method as in Example N-1(6) according to the same evaluation criteria as in Example N-1(6). The evaluation results of storage stability are shown in Table 60.

Example N-3

(1) Production of Dispersion

Dispersion N3

For the production of Dispersion N3 used in Example N-3, a quinacridone red pigment (C.I. Pigment Red 122) which is an organic pigment was used.

A reaction vessel equipped with a stirrer, a thermometer, a reflux tube and a dropping funnel was purged with nitrogen and thereinto, 12 parts of styrene, 6 parts of styrene macromer (AS-6, produced by Toagosei Chemical Industry Co., Ltd.), 3.5 parts of n-dodecyl methacrylate, 12 parts of N,N-dimethylaminoethyl methacrylate, 25 parts of methoxypolyethylene glycol methacrylate (NK Ester M40G, produced by Shin-Nakamura Chemical Co., Ltd.), 5 parts of methyl ethyl ketone and 0.3 parts of azobisisobutyronitrile were charged and heated at 70° C. Thereafter, separately prepared 15 parts of styrene, 8 parts of styrene macromer (AS-6, produced by Toagosei Chemical Industry Co., Ltd.), 7 parts of n-dodecyl methacrylate, 20 parts of N,N-dimethylaminoethyl methacrylate, 30 parts of methoxypolyethylene glycol methacrylate (NK Ester M40G, produced by Shin-Nakamura Chemical Co., Ltd.), 50 parts of methyl ethyl ketone and 1.5 parts of azobisisobutyronitrile were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 38%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 40%.

40 Parts of the dispersing polymer solution obtained above, 25 parts of a quinacridone red pigment (C.I. Pigment Red 122) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion N3 containing 20% of Dispersing Element N3 (dispersing element where the quinacridone red pigment is encapsulated with the polymer having an aromatic ring amount of 40%).

In Table 58, the pigment used in Dispersion N3, the amount of aromatic ring in the dispersing polymer and the pigment/polymer ratio are shown. The amount of aromatic ring in the polymer and the pigment/polymer ratio were measured, similarly to Example N-1(1), by the methods described in "Measurement of Amount of Aromatic Ring" and "Measurement of Pigment/Polymer Ratio" above.

(2) Preparation of Aqueous Ink

In Example N-3, Dispersion N3 obtained in Example N-3 (1) above, Olfine E1010 (produced by Nissin Chemical Industry Co., Ltd.) and Surfynol 104PG50 (produced by Air Products) as acetylene glycol-base surfactants, triethylene glycol monobutyl ether as an alkylene glycol monoalkyl ether, and 1,2-hexanediol as a 1,2-alkylene glycol were used. The specific composition is shown below.

Incidentally, in the preparation of aqueous ink, Dispersion N3 was added to have a Dispersing Element N3 content of 7.5%. The value in < > shows an average particle size (unit: nm) of Dispersing Element N3 measured by the method described in "Measurement of Average Particle Size" above.

Also, the ion exchanged water added as "balance" in the aqueous ink composition of Example N-3 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element N3 <140> | 7.5% |
| Olfine E1010 | 0.1% |
| Surfynol 104PG50 | 0.4% |
| Triethylene glycol monobutyl ether | 1.0% |
| 1,2-Hexanediol | 2.5% |
| Triethylene glycol | 2.0% |
| 2-Pyrrolidone | 4.0% |
| Glycerin | 13.8% |

-continued

| | |
|---|---|
| Trimethylolpropane | 6.0% |
| Ion exchanged water | balance |

(3) Measurement of Amount of Monovalent Cation in Dispersing Element

The aqueous ink prepared in Example N-3(2) above was measured by the method described in "Measurement of Amount of Monovalent Cation in Dispersing Element" above, as a result, the total amount of monovalent cations was 1,484 ppm. The details of the measurement results are shown in Table 60.

(4) Printing Evaluation

The aqueous ink prepared in Example N-3(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Example N-3(4) according to the same evaluation criteria as in Example N-1(5). The evaluation results of ejection stability are shown in Table 60.

(6) Evaluation of Storage Stability

The aqueous ink prepared in Example N-3(2) above was evaluated on the storage stability by the same evaluation method as in Example N-1(6) according to the same evaluation criteria as in Example N-1(6). The evaluation results of storage stability are shown in Table 60.

Example N-4

(1) Production of Dispersion

Dispersion N4

For the production of Dispersion N4 used in Example N-4, a phthalocyanine blue pigment (C.I. Pigment Blue 15:4) which is an organic pigment was used.

A reaction vessel equipped with a stirrer, a thermometer, a reflux tube and a dropping funnel was purged with nitrogen and thereinto, 20 parts of styrene, 10 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 10 parts of styrene macromer (AS-6, produced by Toagosei Chemical Industry Co., Ltd.), 5 parts of methacrylic acid, 5 parts of methyl ethyl ketone and 0.3 parts of n-dodecylmercaptan were charged and heated at 70° C. Thereafter, separately prepared 25 parts of styrene, 30 parts of lauryl methacrylate, 20 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 15 parts of styrene macromer (AS-6, produced by Toagosei Chemical Industry Co., Ltd.), 5 parts of methacrylic acid, 20 parts of methyl ethyl ketone and 1.5 parts of n-dodecylmercaptan were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 46%.

40 Parts of the dispersing polymer solution obtained above, 40 parts of a phthalocyanine blue pigment (C.I. Pigment Blue 15:4) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion N4 containing 20% of Dispersing Element N4 (dispersing element where the phthalocyanine blue pigment is encapsulated with the polymer having an aromatic ring amount of 46%).

In Table 58, the pigment used in Dispersion N4, the amount of aromatic ring in the dispersing polymer and the pigment/polymer ratio are shown. The amount of aromatic ring in the polymer and the pigment/polymer ratio were measured, similarly to Example N-1(1), by the methods described in "Measurement of Amount of Aromatic Ring" and "Measurement of Pigment/Polymer Ratio" above.

(2) Preparation of Aqueous Ink

In Example N-4, Dispersion N4 obtained in Example N-4 (1) above, Acetylenol E100 (produced by Kawaken Fine Chemicals) as an acetylene glycol-base surfactant, propylene glycol monobutyl ether as an alkylene glycol monoalkyl ether, and 1,2-hexanediol as a 1,2-alkylene glycol were used. The specific composition is shown below.

Incidentally, in the preparation of aqueous ink, Dispersion N4 was added to have a Dispersing Element N4 content of 8.0%. The value in < > shows an average particle size (unit: nm) of Dispersing Element N4 measured by the method described in "Measurement of Average Particle Size" above.

Also, the ion exchanged water added as "balance" in the aqueous ink composition of Example N-4 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element N4 <100> | 8.0% |
| Acetylenol E100 | 0.5% |
| Propylene glycol monobutyl ether | 3.0% |
| 1,2-Hexanediol | 1.0% |
| Triethylene glycol | 3.0% |
| Glycerin | 13.8% |
| Trimethylolpropane | 5.2% |
| Tripropanolamine | 0.2% |
| Ion exchanged water | balance |

(3) Measurement of Amount of Monovalent Cation in Dispersing Element

The aqueous ink prepared in Example N-4(2) above was measured by the method described in "Measurement of Amount of Monovalent Cation in Dispersing Element" above, as a result, the total amount of monovalent cations was 1,208 ppm. The details of the measurement results are shown in Table 60.

(4) Printing Evaluation

The aqueous ink prepared in Example N-4(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Example N-4(4) according to the same evaluation criteria as in Example N-1(5). The evaluation results of ejection stability are shown in Table 60.

(6) Evaluation of Storage Stability

The aqueous ink prepared in Example N-4(2) above was evaluated on the storage stability by the same evaluation method as in Example N-1(6) according to the same evaluation criteria as in Example N-1(6). The evaluation results of storage stability are shown in Table 60.

Example N-5

(1) Production of Dispersion

Dispersion N5

For the production of Dispersion N5 used in Example N-5, a perynone orange pigment (C.I. Pigment Orange 43) was used. Except for this, Dispersion N5 containing 20% of Dispersing Element N5 (dispersing element where the perynone orange pigment is encapsulated with a polymer having an aromatic ring amount of 56%) was obtained in the same manner as in Example N-1(1).

In Table 58, the pigment used in Dispersion N5, the amount of aromatic ring in the dispersing polymer and the pigment/polymer ratio are shown. The amount of aromatic ring in the polymer and the pigment/polymer ratio were measured, similarly to Example N-1(1), by the methods described in "Measurement of Amount of Aromatic Ring" and "Measurement of Pigment/Polymer Ratio" above.

(2) Preparation of Aqueous Ink

In Example N-5, Dispersion N5 obtained in Example N-5 (1) above, Surfynol 485 and Surfynol TG (both produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below. Incidentally, in the preparation of aqueous ink, Dispersion N5 was added to have a Dispersing Element N5 content of 10.0%. The value in < > shows an average particle size (unit: nm) of Dispersing Element N5 measured by the method described in "Measurement of Average Particle Size" above.

Also, the ion exchanged water added as "balance" in the aqueous ink composition of Example N-5 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element N5 <150> | 10.0% |
| Surfynol 485 | 0.5% |
| Surfynol TG | 0.2% |
| Dipropylene glycol monobutyl ether | 2.0% |
| 1,2-Pentanediol | 2.0% |
| N-Methyl-2-pyrrolidone | 5.0% |
| Glycerin | 11.2% |
| Trehalose | 5.8% |
| Ion exchanged water | balance |

(3) Measurement of Amount of Monovalent Cation in Dispersing Element

The aqueous ink prepared in Example N-5(2) above was measured by the method described in "Measurement of Amount of Monovalent Cation in Dispersing Element" above, as a result, the total amount of monovalent cations was 1,040 ppm. The details of the measurement results are shown in Table 60.

(4) Printing Evaluation

The aqueous ink prepared in Example N-5(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Example N-5(4) according to the same evaluation criteria as in Example N-1(5). The evaluation results of ejection stability are shown in Table 60.

(6) Evaluation of Storage Stability

The aqueous ink prepared in Example N-5(2) above was evaluated on the storage stability by the same evaluation method as in Example N-1(6) according to the same evaluation criteria as in Example N-1(6). The evaluation results of storage stability are shown in Table 60.

Example N-6

(1) Production of Dispersion

Dispersion N6

For the production of Dispersion N6 used in Example N-6, a benzimidazolone brown pigment (C.I. Pigment Brown 32) was used. Except for this, Dispersion N6 containing 20% of Dispersing Element N6 (dispersing element where the benzimidazolone brown pigment is encapsulated with a polymer having an aromatic ring amount of 67%) was obtained in the same manner as in Example N-1(1).

In Table 58, the pigment used in Dispersion N6, the amount of aromatic ring in the dispersing polymer and the pigment/polymer ratio are shown. The amount of aromatic ring in the polymer and the pigment/polymer ratio were measured, similarly to Example N-1(1), by the methods described in "Measurement of Amount of Aromatic Ring" and "Measurement of Pigment/Polymer Ratio" above.

(2) Preparation of Aqueous Ink

In Example N-6, Dispersion N6 obtained in Example N-6 (1) above, Surfynol 420 as an acetylene glycol-base surfactant, and diethylene glycol monobutyl ether as an alkylene glycol monoalkyl ether were used. The specific composition is shown below.

Incidentally, in the preparation of aqueous ink, Dispersion N6 was added to have a Dispersing Element N6 content of 5.0%. The value in < > shows an average particle size (unit: nm) of Dispersing Element N6 measured by the method described in "Measurement of Average Particle Size" above.

Also, the ion exchanged water added as "balance" in the aqueous ink composition of Example N-6 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element N6 <140> | 5.0% |
| Surfynol 420 | 0.1% |
| Diethylene glycol monobutyl ether | 3.0% |
| 1,6-Hexanediol | 2.0% |
| Tetraethylene glycol | 5.5% |
| Glycerin | 13.5% |
| Triethanolamine | 0.5% |
| Ion exchanged water | balance |

(3) Measurement of Amount of Monovalent Cation in Dispersing Element

The aqueous ink prepared in Example N-6(2) above was measured by the method described in "Measurement of Amount of Monovalent Cation in Dispersing Element" above, as a result, the total amount of monovalent cations was 1,780 ppm. The details of the measurement results are shown in Table 60.

(4) Printing Evaluation

The aqueous ink prepared in Example N-6(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Example N-6(4) according to the same evaluation criteria as in Example N-1(5). The evaluation results of ejection stability are shown in Table 60.

(6) Evaluation of Storage Stability

The aqueous ink prepared in Example N-6(2) above was evaluated on the storage stability by the same evaluation method as in Example N-1(6) according to the same evaluation criteria as in Example N-1(6). The evaluation results of storage stability are shown in Table 60.

Example N-7

(1) Production of Dispersion

Dispersion N7

For the production of Dispersion N7 used in Example N-7, a quinacridone violet pigment (C.I. Pigment Violet 19) which is an organic pigment was used. Except for this, Dispersion N7 containing 20% of Dispersing Element N7 (dispersing element where the quinacridone violet pigment is encapsulated with a polymer having an aromatic ring amount of 21%) was obtained in the same manner as in Example N-1(1).

In Table 58, the pigment used in Dispersion N7, the amount of aromatic ring in the dispersing polymer and the pigment/polymer ratio are shown. The amount of aromatic ring in the polymer and the pigment/polymer ratio were measured, similarly to Example N-1(1), by the methods described in "Measurement of Amount of Aromatic Ring" and "Measurement of Pigment/Polymer Ratio" above.

(2) Preparation of Aqueous Ink

In Example N-7, Dispersion N7 obtained in Example N-7 (1) above, Surfynol 61 as acetylene alcohol-base surfactant and Surfynol TG (both produced by Air Products), triethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion N7 was added to have a Dispersing Element N7 content of 6.0%. The value in < > shows an average particle size (unit: nm) of Dispersing Element N7 measured by the method described in "Measurement of Average Particle Size" above.

Also, the ion exchanged water added as "balance" in the aqueous ink composition of Example N-7 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element N7 <120> | 6.0% |
| Surfynol 61 | 0.3% |
| Surfynol TG | 0.1% |
| Triethylene glycol monobutyl ether | 1.5% |
| 1,2-Pentanediol | 2.0% |
| Diethylene glycol | 2.0% |
| Thiodiglycol | 4.0% |
| Glycerin | 12.6% |
| Trimethylolethane | 7.0% |
| Ion exchanged water | balance |

(3) Measurement of Amount of Monovalent Cation in Dispersing Element

The aqueous ink prepared in Example N-7(2) above was measured by the method described in "Measurement of Amount of Monovalent Cation in Dispersing Element" above, as a result, the total amount of monovalent cations was 1,123 ppm. The details of the measurement results are shown in Table 60.

(4) Printing Evaluation

The aqueous ink prepared in Example N-7(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Example N-7(4) according to the same evaluation criteria as in Example N-1(5). The evaluation results of ejection stability are shown in Table 60.

(6) Evaluation of Storage Stability

The aqueous ink prepared in Example N-7(2) above was evaluated on the storage stability by the same evaluation method as in Example N-1(6) according to the same evaluation criteria as in Example N-1(6). The evaluation results of storage stability are shown in Table 60.

Example N-8

(1) Production of Dispersion

Dispersion N8

For the production of Dispersion N8 used in Example N-8, a phthalocyanine green pigment (C.I. Pigment Green 7) which is an organic pigment was used. Except for this, Dispersion N8 containing 20% of Dispersing Element N8 (dispersing element where the phthalocyanine green pigment is encapsulated with a polymer having an aromatic ring amount of 30%) was obtained in the same manner as in Example N-1(1).

In Table 58, the pigment used in Dispersion N8, the amount of aromatic ring in the dispersing polymer and the pigment/polymer ratio are shown. The amount of aromatic ring in the polymer and the pigment/polymer ratio were measured, similarly to Example N-1(1), by the methods described in "Measurement of Amount of Aromatic Ring" and "Measurement of Pigment/Polymer Ratio" above.

(2) Preparation of Aqueous Ink

In Example N-8, Dispersion N8 obtained in Example N-8(1) above, Olfine E1010 (produced by Nissin Chemical Industry Co., Ltd.) and Surfynol 104 (produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion N8 was added to have a Dispersing Element N8 content of 8.0%. The value in < > shows an average particle size (unit: nm) of Dispersing Element N8 measured by the method described in "Measurement of Average Particle Size" above.

Also, the ion exchanged water added as "balance" in the aqueous ink composition of Example N-8 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element N8 <110> | 8.0% |
| Olfine E1010 | 0.3% |
| Surfynol 104 | 0.1% |
| Dipropylene glycol monobutyl ether | 1.0% |
| 1,2-Pentanediol | 3.0% |
| Triethylene glycol | 2.0% |
| Thiodiglycol | 4.0% |
| Glycerin | 13.8% |
| Trimethylolpropane | 6.0% |
| Triethanolamine | 0.1% |
| Ion exchanged water | balance |

(3) Measurement of Amount of Monovalent Cation in Dispersing Element

The aqueous ink prepared in Example N-8(2) above was measured by the method described in "Measurement of Amount of Monovalent Cation in Dispersing Element" above, as a result, the total amount of monovalent cations was 2,387 ppm. The details of the measurement results are shown in Table 60.

(4) Printing Evaluation

The aqueous ink prepared in Example N-8(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Example N-8(4) according to the same evaluation criteria as in Example N-1(5). The evaluation results of ejection stability are shown in Table 60.

(6) Evaluation of Storage Stability

The aqueous ink prepared in Example N-8(2) above was evaluated on the storage stability by the same evaluation method as in Example N-1(6) according to the same evaluation criteria as in Example N-1(6). The evaluation results of storage stability are shown in Table 60.

Comparative Example N-1

(1) Production of Dispersion

Dispersion N9

In Comparative Example N-1, Color Black FW18 (produced by Degussa) which is an inorganic pigment was used similarly to Example N-1(1).

However, in Comparative Example N-1, the ultra-filtration which was performed in Example N-1(1) was not performed.

A reaction vessel equipped with a stirrer, a thermometer, a reflux tube and a dropping funnel was purged with nitrogen and thereinto, 25 parts of styrene, 5 parts of α-methylstyrene, 15 parts of butyl methacrylate, 10 parts of lauryl methacrylate, 2 parts of acrylic acid and 0.5 parts of tert-dodecylmercaptan were charged and, in this Comparative Example, heated at 60° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel, in this Comparative Example, over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 40%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and, in this Comparative Example, without performing ultrafiltration, ion exchanged water and an aqueous sodium hydroxide solution as a neutralizer were appropriately added with stirring to adjust the pH to 7.5. Then, the resulting solution was filtered through a membrane filter having an average pore size of 5 μm to obtain Dispersion N9 containing 20% of Dispersing Element N9 (dispersing element where the carbon black pigment is encapsulated with the polymer having an aromatic ring amount of 40%).

In Table 58, the pigment used in Dispersion N9, the amount of aromatic ring in the dispersing polymer and the pigment/polymer ratio are shown. The pigment/polymer ratio was measured by the method described in "Measurement of Pigment/Polymer Ratio" above.

(2) Preparation of Aqueous Ink

In Comparative Example N-1, an aqueous ink was prepared by using Dispersion N9 obtained in Comparative Example N-1(1) above. The specific composition is shown below.

Incidentally, in the preparation of aqueous ink, Dispersion N9 was added to have a Dispersing Element N9 content of 8.0%. The value in < > shows an average particle size (unit: nm) of Dispersing Element N9 measured by the method described in "Measurement of Average Particle Size" above.

Also, the ion exchanged water added as "balance" in the aqueous ink composition of Comparative Example N-1 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element N9 <140> | 8.0% |
| Nonionic surfactant | 1.0% |
| Ethylene glycol | 5.0% |
| Glycerin | 15.0% |
| Ion exchanged water | balance |

In the composition above, Epan 450 (trade name, produced by Dai-ichi Kogyo Seiyaku Co., Ltd.) was used as the nonionic surfactant.

(3) Measurement of Amount of Monovalent Cation in Dispersing Element

The aqueous ink prepared in Comparative Example N-1(2) was measured by the method described in "Measurement of Amount of Monovalent Cation in Dispersing Element" above, as a result, the total amount of monovalent cations was 3,678 ppm. The details of the measurement results are shown in Table 60.

(4) Printing Evaluation

The aqueous ink prepared in Comparative Example N-1(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Comparative Example N-1(4) according to the same evaluation criteria as in Example N-1(5). The evaluation results of ejection stability are shown in Table 60.

(6) Evaluation of Storage Stability

The aqueous ink prepared in Comparative Example N-1(2) above was evaluated on the storage stability by the same evaluation method as in Example N-1(6) according to the same evaluation criteria as in Example N-1(6). The evaluation results of storage stability are shown in Table 60.

Comparative Example N-2

(1) Production of Dispersion

Dispersion N10

For the production of Dispersion N10 used in Comparative Example N-2, a phthalocyanine green pigment (C.I. Pigment Green 7) which is an organic pigment was dispersed by using Solsperse 27000 (produced by Avecia Limited).

15 Parts of the phthalocyanine green pigment, 5 parts of Solsperse 27000, 5 parts of diethanolamine, 0.5 parts of 2-propanol and 74.5 parts of ion exchanged water were dispersed by a bead mill MINIZETOR (manufactured by Ajisawa) for 2 hours to obtain Dispersion N10 for use in Comparative Example N-2, containing 20% (pigment: 15%, dispersing resin: 5%) of Dispersing Element N10.

(2) Preparation of Aqueous Ink

In Comparative Example N-2, an aqueous ink was prepared by using Dispersion N10 obtained in Comparative Example N-2(1) above. The specific composition of this Comparative Example is shown below.

Incidentally, in the preparation of aqueous ink, Dispersion N10 was added to have a Dispersing Element N10 content of 8.0%. The value in < > shows an average particle size (unit: nm) of Dispersing Element N10 measured by the method described in "Measurement of Average Particle Size" above.

Also, the ion exchanged water added as "balance" in the aqueous ink composition of Comparative Example N-2 shown below was, similarly to Example N-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersion N10 <150> | 8.0% |
| Nonionic surfactant | 1.0% |
| Ethylene glycol | 5.0% |
| Glycerin | 15.0% |
| Ion exchanged water | balance |

In the composition above, Noigen EA160 (trade name, produced by Dai-ichi Kogyo Seiyaku Co., Ltd.) was used as the nonionic surfactant.

(3) Measurement of Amount of Monovalent Cation in Dispersing Element

The aqueous ink prepared in Comparative Example N-2(2) was measured by the method described in "Measurement of Amount of Monovalent Cation in Dispersing Element" above, as a result, the total amount of monovalent cations was 4,304 ppm. The details of the measurement results are shown in Table 60.

(4) Printing Evaluation

The aqueous ink prepared in Comparative Example N-2(2) was subjected to printing evaluation according to the same evaluation criteria as in Example N-1(4) by using the same aqueous inkjet printer PM-950C (manufactured by Seiko Epson Corporation) as in Example N-1(4) and using the same evaluation paper as in Example N-1(4). The printing evaluation results are shown in Table 59.

(5) Evaluation of Ejection Stability

The ejection stability was evaluated by the same evaluation method as in Example N-1(5) using the same printer and aqueous ink as in Comparative Example N-2(4) according to the same evaluation criteria as in Example N-1(5). The evaluation results of ejection stability are shown in Table 60.

(6) Evaluation of Storage Stability

The aqueous ink prepared in Comparative Example N-2(2) above was evaluated on the storage stability by the same evaluation method as in Example N-1(6) according to the same evaluation criteria as in Example N-1(6). The evaluation results of storage stability are shown in Table 60.

TABLE 58

List of Dispersions N1 to N10

|  | Example N | | | | | | | | Comparative Example N |
|---|---|---|---|---|---|---|---|---|---|
| Name of Dispersion | Dispersion N1 | Dispersion N2 | Dispersion N3 | Dispersion N4 | Dispersion N5 | Dispersion N6 | Dispersion N7 | Dispersion N8 | Dispersion N9 |
| Pigment used | Color Black FW-18 | C.I. Pigment Yellow 74 | C.I. Pigment Red 122 | C.I. Pigment Blue 15:4 | C.I. Pigment Orange 43 | C.I. Pigment Brown 32 | C.I. Pigment Violet 19 | C.I. Pigment Green 7 | Color Black FW-18 |
| Amount of aromatic ring | 59% | 25% | 40% | 46% | 56% | 67% | 21% | 30% | 20% |
| Pigment:polymer ratio | 75:25 | 65:35 | 80:20 | 60:40 | 35:65 | 30:70 | 90:10 | 55:45 | 45:55 |

TABLE 59

Printing Evaluation Results of Ink of Examples and Comparative Examples

|  | Example N | | | | | | | | Comparative Example N | |
|---|---|---|---|---|---|---|---|---|---|---|
| Paper Evaluated | 1 | 2 | 3 | 4 | 5 | 6 | 7 | 8 | 1 | 2 |
| (a) Conqueror | A | A | A | A | A | A | A | A | D | D |
| (b) Reymat | A | A | A | A | A | A | A | A | C | C |
| (c) Mode Copy | A | A | A | A | A | A | A | A | D | D |
| (d) Rapid Copy | A | A | A | A | A | A | A | A | D | D |
| (e) Xerox P | A | A | A | A | A | A | A | A | C | C |
| (f) Xerox 4024 | A | A | A | A | A | A | A | A | C | D |
| (g) Xerox 10 | A | A | A | A | A | A | A | A | D | D |
| (h) Neenha Bond | A | A | A | A | A | A | A | B | C | D |
| (i) Ricopy 6200 | A | A | A | A | A | B | A | A | D | D |
| (j) Hammer mill Copy Plus | A | A | A | A | A | A | A | B | D | D |

As apparent from the results in Tables 58 and 59, the printing quality is bad when the aqueous ink of Comparative Example is used, and the printing quality is good when the aqueous ink of the present invention is used.

This reveals that by using the aqueous ink of the present invention, high-quality print recording can be obtained with reduced blurring on any species of paper.

TABLE 60

Amount of Monovalent Cation in Dispersing Element of Examples and Comparative Examples and Evaluation Results of Storage Stability and Ejection Stability

|  | Example N | | | | | | | | Comparative Example N | |
|---|---|---|---|---|---|---|---|---|---|---|
|  | 1 | 2 | 3 | 4 | 5 | 6 | 7 | 8 | 1 | 2 |
| Amount of monovalent cation (ppm) | | | | | | | | | | |
| Lithium ion | 143 | 36 | 61 | 57 | 46 | 163 | 28 | 338 | 497 | 666 |
| Sodium ion | 1220 | 985 | 1260 | 753 | 840 | 448 | 1040 | 1670 | 1850 | 2283 |
| Potassium ion | 303 | 20 | 72 | 180 | 48 | 601 | 36 | 151 | 722 | 509 |
| Ammonium ion | 122 | 44 | 91 | 218 | 106 | 568 | 19 | 228 | 609 | 846 |
| Total | 1788 | 1085 | 1484 | 1208 | 1040 | 1780 | 1123 | 2387 | 3678 | 4304 |
| Ejection stability | B | A | A | A | A | B | A | B | D | D |
| Foreign matters | A | A | A | A | A | A | A | B | C | D |
| Viscosity | B | A | A | A | A | B | A | B | C | D |
| Surface tension | A | A | A | A | A | A | A | A | C | D |

As apparent from the results in Table 60, the aqueous ink of the present invention where the amount of monovalent cation in the dispersing element is reduced to 2,500 ppm or less ensures excellent ejection stability and high storage stability and, from Table 59, also ensures excellent printing quality. Furthermore, it is seen that when the amount of monovalent cation is 1,500 ppm or less, very excellent ejection stability and storage stability can be obtained. On the other hand, when the amount of monovalent cation exceeds 3,500 ppm as in Comparative Examples, the printing quality, ejection stability and storage stability all fail in reaching the practicable level.

These results reveal that good printing quality and ejection stability can be obtained by using the aqueous ink of the present invention and moreover, the storage stability of the ink is excellent.

Example P

The present invention is described below by referring to Examples, however, the scope of the present invention is not limited thereto.
(Measuring Methods of Amount of Aromatic Ring, Pigment/Polymer Ratio, Average Particle Size, Amount of Monovalent Anion in Dispersing Element and Surface Tension)

The measured values (amount of aromatic ring, pigment/polymer ratio, average particle size, amount of monovalent anion in dispersing element and surface tension) obtained in these Examples each was measured by the following method.
"Measurement of Amount of Aromatic Ring"

A part of each dispersing polymer solution obtained in Examples and Comparative Examples was taken out, then only the polymer component was taken out by distilling off the solvent components and dissolved in DMSO-$d_6$, and the amount of aromatic ring in the polymer was measured by using $^{13}$C-NMR and $^1$H-NMR (AMX400, manufactured by Bruker (Germany)).

"Measurement of Pigment/Polymer Ratio"

A part of each dispersion obtained in Examples and Comparative Examples was taken out and after precipitating only the dispersing element with an acid by adding HCl in a concentration of 0.1 mol/liter, measured on the dry weight. Then, only the dispersing polymer was taken out by a Soxhlet extraction method using acetone and measured on the dry weight. From the obtained values, the weight ratio of pigment/polymer was calculated.

"Measurement of Average Particle Size"

The aqueous inks obtained in Examples and Comparative Examples each was diluted with ion exchanged water to have a dispersing element concentration of 0.001 to 0.01 wt % (because the optimal concentration at the measurement slightly differs depending on the aqueous ink) and the average particle size of dispersed particles at 20° C. was measured by a particle size distribution meter (DLS-800, manufactured by Otsuka Electronics Co., Ltd.).

"Measurement of Amount of Monovalent Anion in Dispersing Element"

A necessary amount of each aqueous ink obtained in Examples and Comparative Examples was taken out and by a centrifugal separation treatment, separated into the solvent components of aqueous ink and the dispersing element which is the solid content. The centrifugation conditions were 2500 G and 60 minutes.

The obtained dispersing element was sampled in a quartz dish, incinerated by adding a trapping agent, melted with potassium hydrogensulfate and dissolved in dilute nitric acid and the amount of monovalent anion in the dispersing element was measured by the ICP emission analysis (ICPS-8000, manufactured by Shimadzu Corporation).

"Measurement of Surface Tension"

The aqueous inks obtained in Examples and Comparative Examples each was measured on the surface tension at 20° C. by a surface tension balance (CBVP-A3, manufactured by Kyowa Interface Science Co., Ltd.).

Example P-1

(1) Production of Dispersion

Dispersion P1

For the production of Dispersion P1 used in Example P-1, Color Black FW18 (produced by Degussa), which is an inorganic pigment and a carbon black pigment, was used.

A reaction vessel equipped with a stirrer, a thermometer, a reflux tube and a dropping funnel was purged with nitrogen and thereinto, 15 parts of methyl ethyl ketone, 22 parts of styrene, 5 parts of α-methylstyrene, 16 parts of butyl methacrylate, 10 parts of lauryl methacrylate, 2 parts of acrylic acid and 0.3 parts of tert-dodecylmercaptan were charged and heated at 70° C. Thereafter, separately prepared 100 parts of styrene, 16 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 56%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 mm to obtain Dispersion P1 containing 20% of Dispersing Element P1 (dispersing element where the carbon black pigment is encapsulated with the polymer having an aromatic ring amount of 56%).

In Table 61, the pigment used in Dispersion P1, the amount of aromatic ring in the dispersing polymer and the pigment/polymer ratio are shown. The pigment/polymer ratio was measured by the method described in "Measurement of Pigment/Polymer Ratio" above.

(2) Preparation of Aqueous Ink

In Example P-1, Dispersion P1 obtained in Example P-1(1) above, Olfine E1010 (produced by Nissin Chemical Industry Co., Ltd.) as an acetylene glycol-base surfactant, diethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion P1 was added to have a Dispersing Element P1 content of 8.0%. The value in < > shows an average particle size (unit: nm) of Dispersing Element P1 measured by the method described in "Measurement of Average Particle Size" above.

Also, the ion exchanged water added as "balance" in the aqueous ink composition of Example P-1 shown below was ion exchanged water where Proxel XL-2 for preventing septic activity of the aqueous ink, benzotriazole for preventing corrosion of an aqueous inkjet head member and EDTA 2Na salt for reducing the effect of metal ion in the aqueous ink system were added to a concentration of 0.01%, 0.01% and 0.02%, respectively, based on the entire weight of the aqueous ink.

| | |
|---|---|
| Dispersing Element P1 <120> | 8.0% |
| Olfine E1010 | 0.5% |
| Diethylene glycol monobutyl ether | 3.0% |
| 1,2-Pentanediol | 2.5% |
| Diethylene glycol | 3.0% |
| Glycerin | 11.5% |
| Trimethylolpropane | 6.0% |
| Tripropanolamine | 0.3% |
| Ion exchanged water | balance |

(3) Measurement of Amount of Monovalent Anion in Dispersing Element

The aqueous ink prepared in Example P-1(2) was measured by the method described in "Measurement of Amount of Monovalent Anion in Dispersing Element" above, as a result, the total amount of monovalent anions was 2,570 ppm. The details of the measurement results are shown in Table 63.

(4) Printing Evaluation

In the printing evaluation, the aqueous ink prepared in Example P-1(2) was evaluated on the printing quality by using an aqueous inkjet printer PM-950C (manufactured by Seiko Epson Corporation) which ejects an aqueous ink by an aqueous inkjet head using a piezoelectric element.

As for the paper used for evaluation, (a) Conqueror, (b) Reymat, (c) Mode Copy, (d) Rapid Copy, (e) Xerox P, (f) Xerox 4024, (g) Xerox 10, (h) Neenha Bond, (i) Ricopy 6200 and (j) Hammer mill Copy Plus which are plain papers commercially available in Europe, USA and Japan were used.

The evaluation was performed with an eye according to the following criteria.

A: No blurring was observed in letters of all points.

B: Blurring was slightly observed in letters of 5 point or less (practicable level).

C: Letters of 5 point or less were seen thickened due to blurring.

D: Blurring was serious and letters of 5 point or less could not be made out.

The printing evaluation results are shown in Table 62.

(5) Evaluation of Ejection Stability

A continuous printing of 200 pages was performed on A4-size Xerox P by using the same printer and aqueous ink as in Example P-1(4) above and the ejection stability was evaluated by observing the printing disorder.

The evaluation was performed with an eye according to the following criteria.

A: Printing disorder was not generated at all.

B: Printing disorder was generated but at less than 10 portions (practicable level).

C: Printing disorder was generated at 10 to less than 100 portions.

D: Printing disorder was generated at 100 or more portions.

The evaluation results of ejection stability are shown in Table 63.

(6) Evaluation of Storage Stability

The aqueous ink prepared in Example P-1(2) above was charged into a vial and after tightly plugging the vial, left standing at 60° C. for one week or at −20° C. for one week. The foreign matters generated and the change in physical values (viscosity, surface tension) of the aqueous ink before and after standing were evaluated.

The evaluation was performed according to the following criteria.

A: The ratio of the amount of foreign matters generated and physical values after standing at 60° C. or −20° C. to those before standing was in the range from 0.99 to 1.01.

B: The ratio was from 0.95 to 0.99 or from 1.01 to 1.05 (practicable level).

C: The ratio was from 0.90 to 0.95 or from 1.05 to 1.10.

D: The ratio was less than 0.90 or more than 1.10.

The evaluation results of storage stability are shown in Table 63.

Example P-2

(1) Production of Dispersion

Dispersion P2

For the production of Dispersion P2 used in Example P-2, an insoluble monoazo yellow pigment (C.I. Pigment Yellow 74) which is an organic pigment was used.

A reaction vessel equipped with a stirrer, a thermometer, a reflux tube and a dropping funnel was purged with nitrogen and thereinto, 12 parts of styrene, 9 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 3 parts of methacrylic acid, 5 parts of methyl ethyl ketone and 0.3 parts of mercaptoethanol were charged and heated at 70° C. Thereafter, separately prepared 25 parts of styrene, 30 parts of lauryl methacrylate, 15 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 10 parts of methacrylic acid, 20 parts of methyl ethyl ketone and 1.0 part of mercaptoethanol were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 26%.

40 Parts of the dispersing polymer solution obtained above, 30 parts of an insoluble monoazo yellow pigment (C.I. Pigment Yellow 74) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion P2 containing 20% of Dispersing Element P2 (dispersing element where the insoluble monoazo yellow pigment is encapsulated with the polymer having an aromatic ring amount of 26%).

In Table 61, the pigment used in Dispersion P2, the amount of aromatic ring in the dispersing polymer and the pigment/polymer ratio are shown. The amount of aromatic ring in the polymer and the pigment/polymer ratio were measured, similarly to Example P-1(1), by the methods described in "Measurement of Amount of Aromatic Ring" and "Measurement of Pigment/Polymer Ratio" above.

(2) Preparation of Aqueous Ink

In Example P-2, Dispersion P2 obtained in Example P-2(1) above, Surfynol 440 (produced by Air Products) and Olfine STG (produced by Nissin Chemical Industry Co., Ltd.) as acetylene glycol-base surfactants, triethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion P2 was added to have a Dispersing Element P2 content of 7.0%. The value in < > shows an average particle size (unit: nm) of Dispersing Element P2 measured by the method described in "Measurement of Average Particle Size" above.

Also, the ion exchanged water added as "balance" in the aqueous ink composition of Example P-2 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element P2 <120> | 7.0% |
| Surfynol 440 | 0.2% |
| Olfine STG | 0.2% |
| Triethylene glycol monobutyl ether | 3.0% |
| 1,2-Pentanediol | 2.0% |
| 2-Pyrrolidone | 3.0% |
| Glycerin | 13.5% |
| Trimethylolethane | 5.0% |
| Triethanolamine | 0.1% |
| Ion exchanged water | balance |

(3) Measurement of Amount of Monovalent Anion in Dispersing Element

The aqueous ink prepared in Example P-2(2) above was measured by the method described in "Measurement of Amount of Monovalent Anion in Dispersing Element" above, as a result, the total amount of monovalent anions was 1,179 ppm. The details of the measurement results are shown in Table 63.

(4) Printing Evaluation

The aqueous ink prepared in Example P-2(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Example P-2(4) according to the same evaluation criteria as in Example P-1(5). The evaluation results of ejection stability are shown in Table 63.

(6) Evaluation of Storage Stability

The aqueous ink prepared in Example P-2(2) above was evaluated on the storage stability by the same evaluation method as in Example P-1(6) according to the same evaluation criteria as in Example P-1(6). The evaluation results of storage stability are shown in Table 63.

Example P-3

(1) Production of Dispersion

Dispersion P3

For the production of Dispersion P3 used in Example P-3, a quinacridone red pigment (C.I. Pigment Red 122) which is an organic pigment was used.

A reaction vessel equipped with a stirrer, a thermometer, a reflux tube and a dropping funnel was purged with nitrogen and thereinto, 10 parts of styrene, 5 parts of styrene macromer (AS-6, produced by Toagosei Chemical Industry Co., Ltd.), 3.5 parts of n-dodecyl methacrylate, 10 parts of N,N-dimethylaminoethyl methacrylate, 25 parts of methoxypolyethylene glycol methacrylate (NK Ester M40G, produced by Shin-Nakamura Chemical Co., Ltd.), 5 parts of methyl ethyl ketone and 0.3 parts of azobisisobutyronitrile were charged and heated at 70° C. Thereafter, separately prepared 15 parts of styrene, 10 parts of styrene macromer (AS-6, produced by Toagosei Chemical Industry Co., Ltd.), 5 parts of n-dodecyl methacrylate, 20 parts of N,N-dimethylaminoethyl methacrylate, 30 parts of methoxypolyethylene glycol methacrylate (NK Ester M40G, produced by Shin-Nakamura Chemical Co., Ltd.), 50 parts of methyl ethyl ketone and 1.5 parts of azobisisobutyronitrile were charged into the dropping funnel and added dropwise to the reaction vessel over 4 hours, thereby polymerizing a dispersing polymer. Then, methyl ethyl ketone was appropriately added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 38%.

40 Parts of the dispersing polymer solution obtained above, 25 parts of a quinacridone red pigment (C.I. Pigment Red 122) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 380 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion P3 containing 20% of Dispersing Element P3 (dispersing element where the quinacridone red pigment is encapsulated with the polymer having an aromatic ring amount of 38%).

In Table 61, the pigment used in Dispersion P3, the amount of aromatic ring in the dispersing polymer and the pigment/polymer ratio are shown. The amount of aromatic ring in the polymer and the pigment/polymer ratio were measured, similarly to Example P-1(1), by the methods described in "Measurement of Amount of Aromatic Ring" and "Measurement of Pigment/Polymer Ratio" above.

(2) Preparation of Aqueous Ink

In Example P-3, Dispersion P3 obtained in Example P-3(1) above, Olfine E1010 (produced by Nissin Chemical Industry Co., Ltd.) and Surfynol 104PG50 (produced by Air Products) as acetylene glycol-base surfactants, triethylene glycol monobutyl ether as an alkylene glycol monoalkyl ether, and 1,2-hexanediol as a 1,2-alkylene glycol were used. The specific composition is shown below.

Incidentally, in the preparation of aqueous ink, Dispersion P3 was added to have a Dispersing Element P3 content of 7.5%. The value in < > shows an average particle size (unit: nm) of Dispersing Element P3 measured by the method described in "Measurement of Average Particle Size" above.

Also, the ion exchanged water added as "balance" in the aqueous ink composition of Example P-3 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element P3 <140> | 7.5% |
| Olfine E1010 | 0.1% |
| Surfynol 104PG50 | 0.4% |
| Triethylene glycol monobutyl ether | 1.0% |
| 1,2-Hexanediol | 2.5% |
| Triethylene glycol | 2.0% |
| 2-Pyrrolidone | 4.0% |
| Glycerin | 13.8% |

-continued

| | |
|---|---|
| Trimethylolpropane | 6.0% |
| Ion exchanged water | balance |

(3) Measurement of Amount of Monovalent Anion in Dispersing Element

The aqueous ink prepared in Example P-3(2) above was measured by the method described in "Measurement of Amount of Monovalent Anion in Dispersing Element" above, as a result, the total amount of monovalent anions was 1,008 ppm. The details of the measurement results are shown in Table 63.

(4) Printing Evaluation

The aqueous ink prepared in Example P-3(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Example P-3(4) according to the same evaluation criteria as in Example P-1(5). The evaluation results of ejection stability are shown in Table 63.

(6) Evaluation of Storage Stability

The aqueous ink prepared in Example P-3(2) above was evaluated on the storage stability by the same evaluation method as in Example P-1(6) according to the same evaluation criteria as in Example P-1(6). The evaluation results of storage stability are shown in Table 63.

Example P-4

(1) Production of Dispersion

Dispersion P4

For the production of Dispersion P4 used in Example P-4, a phthalocyanine blue pigment (C.I. Pigment Blue 15:4) which is an organic pigment was used.

A reaction vessel equipped with a stirrer, a thermometer, a reflux tube and a dropping funnel was purged with nitrogen and thereinto, 20 parts of styrene, 10 parts of lauryl methacrylate, 15 parts of methoxypolyethylene glycol methacrylate (NK Ester M90G, produced by Shin-Nakamura Chemical Co., Ltd.), 5 parts of isobutyl methacrylate macromer (AW-6S, produced by Toagosei Chemical Industry Co., Ltd.), 10 parts of styrene macromer (AS-6, produced by Toagosei Chemical Industry Co., Ltd.), 5 parts of methacrylic acid, 5 parts of methyl ethyl ketone and 0.3 parts of n-dodecylmercaptan were charged and heated at 70° C. Thereafter, separately prepared 25 parts of styrene, 30 parts of lauryl methacrylate, 20 parts of methoxypolyethylene glycol methacrylate (NK Ester M90G, produced by Shin-Nakamura Chemical Co., Ltd.), 15 parts of isobutyl methacrylate macromer (AW-6S, produced by Toagosei Chemical Industry Co., Ltd.), 15 parts of styrene macromer (AS-6, produced by Toagosei Chemical Industry Co., Ltd.), 5 parts of methacrylic acid, 20 parts of methyl ethyl ketone and 1.5 parts of n-dodecylmercaptan were charged into the dropping funnel and added dropwise to the reaction vessel over 4 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 45%.

40 Parts of the dispersing polymer solution obtained above, 40 parts of a phthalocyanine blue pigment (C.I. Pigment Blue 15:4) which is an organic pigment, 100 parts of an aqueous solution containing 0.1 mol/liter of sodium hydroxide, and 40 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and then the residue was ultrafiltered by an ultrafiltration system Millitan (produced by Millipore) with a fractional molecular weight of 100,000 while appropriately adding water. Thereto, ion exchanged water and an aqueous sodium hydroxide solution as a neutralizer were appropriately added with stirring to adjust the pH to 7.5 and then the resulting solution was filtered through a membrane filter having an average pore size of 5 μm to obtain Dispersion P4 containing 20% of Dispersing Element P4 (dispersing element where the phthalocyanine blue pigment is encapsulated with the polymer having an aromatic ring amount of 45%).

In Table 61, the pigment used in Dispersion P4, the amount of aromatic ring in the dispersing polymer and the pigment/polymer ratio are shown. The amount of aromatic ring in the polymer and the pigment/polymer ratio were measured, similarly to Example P-1(1), by the methods described in "Measurement of Amount of Aromatic Ring" and "Measurement of Pigment/Polymer Ratio" above.

(2) Preparation of Aqueous Ink

In Example P-4, Dispersion P4 obtained in Example P-4(1) above, Acetylenol E100 (produced by Kawaken Fine Chemicals) as an acetylene glycol-base surfactant, propylene glycol monobutyl ether as an alkylene glycol monoalkyl ether, and 1,2-hexanediol as a 1,2-alkylene glycol were used. The specific composition is shown below.

Incidentally, in the preparation of aqueous ink, Dispersion P4 was added to have a Dispersing Element P4 content of 8.0%. The value in < > shows an average particle size (unit: nm) of Dispersing Element P4 measured by the method described in "Measurement of Average Particle Size" above.

Also, the ion exchanged water added as "balance" in the aqueous ink composition of Example P-4 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element P4 <100> | 8.0% |
| Acetylenol E100 | 0.5% |
| Propylene glycol monobutyl ether | 3.0% |
| 1,2-Hexanediol | 1.0% |
| Triethylene glycol | 3.0% |
| Glycerin | 13.8% |
| Trimethylolpropane | 5.2% |
| Tripropanolamine | 0.2% |
| Ion exchanged water | balance |

(3) Measurement of Amount of Monovalent Anion in Dispersing Element

The aqueous ink prepared in Example P-4(2) above was measured by the method described in "Measurement of Amount of Monovalent Anion in Dispersing Element" above, as a result, the total amount of monovalent anions was 1,982 ppm. The details of the measurement results are shown in Table 63.

(4) Printing Evaluation

The aqueous ink prepared in Example P-4(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Example P-4(4) according to the same evaluation criteria as in Example P-1(5). The evaluation results of ejection stability are shown in Table 63.

(6) Evaluation of Storage Stability

The aqueous ink prepared in Example P-4(2) above was evaluated on the storage stability by the same evaluation method as in Example P-1(6) according to the same evaluation criteria as in Example P-1(6). The evaluation results of storage stability are shown in Table 63.

Example P-5

(1) Production of Dispersion

Dispersion P5

For the production of Dispersion P5 used in Example P-5, a perynone orange pigment (C.I. Pigment Orange 43) was used. Except for this, Dispersion 5 containing 20% of Dispersing Element P5 (dispersing element where the perynone orange pigment is encapsulated with a polymer having an aromatic ring amount of 56%) was obtained in the same manner as in Example P-1(1).

In Table 61, the pigment used in Dispersion P5, the amount of aromatic ring in the dispersing polymer and the pigment/polymer ratio are shown. The amount of aromatic ring in the polymer and the pigment/polymer ratio were measured, similarly to Example P-1(1), by the methods described in "Measurement of Amount of Aromatic Ring" and "Measurement of Pigment/Polymer Ratio" above.

(2) Preparation of Aqueous Ink

In Example P-5, Dispersion P5 obtained in Example P-5(1) above, Surfynol 485 and Surfynol TG (both produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below. Incidentally, in the preparation of aqueous ink, Dispersion P5 was added to have a Dispersing Element P5 content of 10.0%. The value in < > shows an average particle size (unit: nm) of Dispersing Element P5 measured by the method described in "Measurement of Average Particle Size" above.

Also, the ion exchanged water added as "balance" in the aqueous ink composition of Example P-5 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element P5 <150> | 10.0% |
| Surfynol 485 | 0.5% |
| Surfynol TG | 0.2% |
| Dipropylene glycol monobutyl ether | 2.0% |
| 1,2-Pentanediol | 2.0% |
| N-Methyl-2-pyrrolidone | 5.0% |
| Glycerin | 11.2% |
| Trehalose | 5.8% |
| Ion exchanged water | balance |

(3) Measurement of Amount of Monovalent Anion in Dispersing Element

The aqueous ink prepared in Example P-5(2) above was measured by the method described in "Measurement of Amount of Monovalent Anion in Dispersing Element" above, as a result, the total amount of monovalent anions was 2,406 ppm. The details of the measurement results are shown in Table 63.

(4) Printing Evaluation

The aqueous ink prepared in Example P-5(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Example P-5(4) according to the same evaluation criteria as in Example P-1(5). The evaluation results of ejection stability are shown in Table 63.

(6) Evaluation of Storage Stability

The aqueous ink prepared in Example P-5(2) above was evaluated on the storage stability by the same evaluation method as in Example P-1(6) according to the same evaluation criteria as in Example P-1(6). The evaluation results of storage stability are shown in Table 63.

Example P-6

(1) Production of Dispersion

Dispersion P6

For the production of Dispersion P6 used in Example P-6, a perylene brown pigment (C.I. Pigment Brown 26) was used. Except for this, Dispersion P6 containing 20% of Dispersing Element P6 (dispersing element where the perylene brown pigment is encapsulated with a polymer having an aromatic ring amount of 67%) was obtained in the same manner as in Example P-1(1).

In Table 61, the pigment used in Dispersion P6, the amount of aromatic ring in the dispersing polymer and the pigment/polymer ratio are shown. The amount of aromatic ring in the polymer and the pigment/polymer ratio were measured, similarly to Example P-1(1), by the methods described in "Measurement of Amount of Aromatic Ring" and "Measurement of Pigment/Polymer Ratio" above.

(2) Preparation of Aqueous Ink

In Example P-6, Dispersion P6 obtained in Example P-6(1) above, Surfynol 420 as an acetylene glycol-base surfactant, and diethylene glycol monobutyl ether as an alkylene glycol monoalkyl ether were used. The specific composition is shown below.

Incidentally, in the preparation of aqueous ink, Dispersion P6 was added to have a Dispersing Element P6 content of 5.0%. The value in < > shows an average particle size (unit: nm) of Dispersing Element P6 measured by the method described in "Measurement of Average Particle Size" above.

Also, the ion exchanged water added as "balance" in the aqueous ink composition of Example P-6 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element P6 <140> | 5.0% |
| Surfynol 420 | 0.1% |
| Diethylene glycol monobutyl ether | 3.0% |
| 1,6-Hexanediol | 2.0% |
| Tetraethylene glycol | 5.5% |
| Glycerin | 13.5% |
| Triethanolamine | 0.5% |
| Ion exchanged water | balance |

(3) Measurement of Amount of Monovalent Anion in Dispersing Element

The aqueous ink prepared in Example P-6(2) above was measured by the method described in "Measurement of Amount of Monovalent Anion in Dispersing Element" above, as a result, the total amount of monovalent anions was 2,563 ppm. The details of the measurement results are shown in Table 63.

(4) Printing Evaluation

The aqueous ink prepared in Example P-6(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Example P-6(4) according to the same evaluation criteria as in Example P-1(5). The evaluation results of ejection stability are shown in Table 63.

(6) Evaluation of Storage Stability

The aqueous ink prepared in Example P-6(2) above was evaluated on the storage stability by the same evaluation method as in Example P-1(6) according to the same evaluation criteria as in Example P-1(6). The evaluation results of storage stability are shown in Table 63.

Example P-7

(1) Production of Dispersion

Dispersion P7

For the production of Dispersion P7 used in Example P-7, a quinacridone violet pigment (C.I. Pigment Violet 19) which is an organic pigment was used. Except for this, Dispersion P7 containing 20% of Dispersing Element P7 (dispersing element where the quinacridone violet pigment is encapsulated with a polymer having an aromatic ring amount of 21%) was obtained in the same manner as in Example P-1(1).

In Table 61, the pigment used in Dispersion P7, the amount of aromatic ring in the dispersing polymer and the pigment/polymer ratio are shown. The amount of aromatic ring in the polymer and the pigment/polymer ratio were measured, similarly to Example P-1(1), by the methods described in "Measurement of Amount of Aromatic Ring" and "Measurement of Pigment/Polymer Ratio" above.

(2) Preparation of Aqueous Ink

In Example P-7, Dispersion P7 obtained in Example P-7(1) above, Surfynol 61 as acetylene alcohol-base surfactant and Surfynol TG (both produced by Air Products), triethylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion P7 was added to have a Dispersing Element P7 content of 6.0%. The value in < > shows an average particle size (unit: nm) of Dispersing Element P7 measured by the method described in "Measurement of Average Particle Size" above.

Also, the ion exchanged water added as "balance" in the aqueous ink composition of Example P-7 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element P7 <120> | 6.0% |
| Surfynol 61 | 0.3% |
| Surfynol TG | 0.1% |
| Triethylene glycol monobutyl ether | 1.5% |
| 1,2-Pentanediol | 2.0% |
| Diethylene glycol | 2.0% |
| Thiodiglycol | 4.0% |
| Glycerin | 12.6% |
| Trimethylolethane | 7.0% |
| Ion exchanged water | balance |

(3) Measurement of Amount of Monovalent Anion in Dispersing Element

The aqueous ink prepared in Example P-7(2) above was measured by the method described in "Measurement of Amount of Monovalent Anion in Dispersing Element" above, as a result, the total amount of monovalent anions was 2,927 ppm. The details of the measurement results are shown in Table 63.

(4) Printing Evaluation

The aqueous ink prepared in Example P-7(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Example P-7(4) according to the same evaluation criteria as in Example P-1(5). The evaluation results of ejection stability are shown in Table 63.

(6) Evaluation of Storage Stability

The aqueous ink prepared in Example P-7(2) above was evaluated on the storage stability by the same evaluation method as in Example P-1(6) according to the same evaluation criteria as in Example P-1(6). The evaluation results of storage stability are shown in Table 63.

Example P-8

(1) Production of Dispersion

Dispersion P8

For the production of Dispersion P8 used in Example P-8, a violanthrone green pigment (C.I. Pigment Green 47) which is an organic pigment was used. Except for this, Dispersion P8 containing 20% of Dispersing Element P8 (dispersing element where the violanthrone green pigment is encapsulated with a polymer having an aromatic ring amount of 30%) was obtained in the same manner as in Example P-1(1).

In Table 61, the pigment used in Dispersion P8, the amount of aromatic ring in the dispersing polymer and the pigment/polymer ratio are shown. The amount of aromatic ring in the polymer and the pigment/polymer ratio were measured, similarly to Example P-1(1), by the methods described in "Measurement of Amount of Aromatic Ring" and "Measurement of Pigment/Polymer Ratio" above.

(2) Preparation of Aqueous Ink

In Example P-8, Dispersion P8 obtained in Example P-8(1) above, Olfine E1010 (produced by Nissin Chemical Industry Co., Ltd.) and Surfynol 104 (produced by Air Products) as acetylene glycol-base surfactants, dipropylene glycol monobutyl ether as an alkylene glycol monoalkyl ether, and 1,2-pentanediol as a 1,2-alkylene glycol were used. The specific composition is shown below.

Incidentally, in the preparation of aqueous ink, Dispersion P8 was added to have a Dispersing Element P8 content of 8.0%. The value in < > shows an average particle size (unit: nm) of Dispersing Element P8 measured by the method described in "Measurement of Average Particle Size" above.

Also, the ion exchanged water added as "balance" in the aqueous ink composition of Example P-8 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element P8 <110> | 8.0% |
| Olfine E1010 | 0.3% |
| Surfynol 104 | 0.1% |
| Dipropylene glycol monobutyl ether | 1.0% |
| 1,2-Pentanediol | 3.0% |
| Triethylene glycol | 2.0% |
| Thiodiglycol | 4.0% |
| Glycerin | 13.8% |
| Trimethylolpropane | 6.0% |
| Triethanolamine | 0.1% |
| Ion exchanged water | balance |

(3) Measurement of Amount of Monovalent Anion in Dispersing Element

The aqueous ink prepared in Example P-8(2) above was measured by the method described in "Measurement of Amount of Monovalent Anion in Dispersing Element" above, as a result, the total amount of monovalent anions was 3,429 ppm. The details of the measurement results are shown in Table 63.

(4) Printing Evaluation

The aqueous ink prepared in Example P-8(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Example P-8(4) according to the same evaluation criteria as in Example P-1(5). The evaluation results of ejection stability are shown in Table 63.

(6) Evaluation of Storage Stability

The aqueous ink prepared in Example P-8(2) above was evaluated on the storage stability by the same evaluation method as in Example P-1(6) according to the same evaluation criteria as in Example P-1(6). The evaluation results of storage stability are shown in Table 63.

Comparative Example P-1

(1) Production of Dispersion

Dispersion P9

In Comparative Example P-1, Color Black FW18 (produced by Degussa), which is an inorganic pigment and a carbon black pigment, was used similarly to Example P-1(1).

In Comparative Example P-1, the dispersing polymer was polymerized by intentionally employing the polymerization conditions different from those in Example P-1(1).

A reaction vessel equipped with a stirrer, a thermometer, a reflux tube and a dropping funnel was purged with nitrogen and thereinto, 25 parts of styrene, 5 parts of α-methylstyrene, 15 parts of butyl methacrylate, 10 parts of lauryl methacrylate, 2 parts of acrylic acid and 0.5 parts of tert-dodecylmercaptan were charged and, in this Comparative Example, heated at 65° C. Thereafter, separately prepared 150 parts of styrene, 15 parts of acrylic acid, 50 parts of butyl methacrylate, 1 part of tert-dodecylmercaptan, 20 parts of methyl ethyl ketone and 3 parts of azobisisobutyronitrile were charged into the dropping funnel and added dropwise to the reaction vessel, in this Comparative Example, over 2 hours, thereby polymerizing a dispersing polymer. Then, methyl ethyl ketone was added to the reaction vessel to prepare a dispersing polymer solution having a concentration of 40%.

A part of this dispersing polymer solution was taken out and after distilling off the solvent components, the ratio of the aromatic ring to the entire weight was measured by the method described in "Measurement of Amount of Aromatic Ring" above, as a result, the amount of aromatic ring to the entire weight of dispersing polymer was 20%.

40 Parts of the dispersing polymer solution obtained above, 30 parts of Color Black FW18 (produced by Degussa) which is a carbon black pigment, 100 parts of an aqueous solution containing 0.1 mol/liter of sodium hydroxide, and 35 parts of methyl ethyl ketone were mixed and dispersed by a homogenizer for 30 minutes or more. Thereto, 350 parts of ion exchanged water was added and the resulting solution was further dispersed for one hour. The entire amount of methyl ethyl ketone and a part of water were distilled off by a rotary evaporator and, in this Comparative Example, without performing ultrafiltration, ion exchanged water and an aqueous sodium hydroxide solution as a neutralizer were appropriately added with stirring to adjust the pH to 7.5. Then, the resulting solution was filtered through a membrane filter having an average pore size of 5 mm to obtain Dispersion P9 containing 20% of Dispersing Element P9 (dispersing element where the carbon black pigment is encapsulated with the polymer having an aromatic ring amount of 20%).

In Table 61, the pigment used in Dispersion P9, the amount of aromatic ring in the dispersing polymer and the pigment/polymer ratio are shown. The pigment/polymer ratio was measured by the method described in "Measurement of Pigment/Polymer Ratio" above.

(2) Preparation of Aqueous Ink

In Comparative Example P-1, an aqueous ink was prepared by using Dispersion P9 obtained in Comparative Example P-1(1) above. The specific composition is shown below.

Incidentally, in the preparation of aqueous ink, Dispersion P9 was added to have a Dispersing Element P9 content of 8.0%. The value in < > shows an average particle size (unit: nm) of Dispersing Element P9 measured by the method described in "Measurement of Average Particle Size" above.

Also, the ion exchanged water added as "balance" in the aqueous ink composition of Comparative Example P-1 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersing Element P9 <140> | 8.0% |
| Nonionic surfactant | 1.0% |
| Ethylene glycol | 5.0% |
| Glycerin | 15.0% |
| Ion exchanged water | balance |

In the composition above, Epan 450 (trade name, produced by Dai-ichi Kogyo Seiyaku Co., Ltd.) was used as the nonionic surfactant.

(3) Measurement of Amount of Monovalent Anion in Dispersing Element

The aqueous ink prepared in Comparative Example P-1(2) was measured by the method described in "Measurement of Amount of Monovalent Anion in Dispersing Element" above, as a result, the total amount of monovalent anions was 5,059 ppm. The details of the measurement results are shown in Table 63.

(4) Printing Evaluation

The aqueous ink prepared in Comparative Example P-1(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Comparative Example P-1(4) according to the same evaluation criteria as in Example P-1(5). The evaluation results of ejection stability are shown in Table 63.

(6) Evaluation of Storage Stability

The aqueous ink prepared in Comparative Example P-1(2) above was evaluated on the storage stability by the same evaluation method as in Example P-1(6) according to the same evaluation criteria as in Example P-1(6). The evaluation results of storage stability are shown in Table 63.

Comparative Example P-2

(1) Production of Dispersion

Dispersion P10

For the production of Dispersion P10 used in Comparative Example P-2, a violanthrone green pigment (C.I. Pigment Green 47) which is an organic pigment was dispersed by using Solsperse 12000 (produced by Avecia Limited).

15 Parts of the violanthrone green pigment, 5 parts of Solsperse 12000, 5 parts of diethanolamine, 0.5 parts of 2-propanol and 74.5 parts of ion exchanged water were dispersed by a bead mill MINIZETOR (manufactured by Ajisawa) for 2 hours to obtain Dispersion P10 for use in Comparative Example P-2, containing 20% (pigment: 15%, dispersing resin: 5%) of Dispersing Element P9.

(2) Preparation of Aqueous Ink

In Comparative Example P-2, an aqueous ink was prepared by using Dispersion P10 obtained in Comparative Example P-2(1) above. The specific composition of this Comparative Example is shown below.

Incidentally, in the preparation of aqueous ink, Dispersion P10 was added to have a Dispersing Element P9 content of 8.0%. The value in < > shows an average particle size (unit: nm) of Dispersing Element P9 measured by the method described in "Measurement of Average Particle Size" above.

Also, the ion exchanged water added as "balance" in the aqueous ink composition of Comparative Example P-2 shown below was, similarly to Example P-1(2), ion exchanged water where 0.01% of Proxel XL-2, 0.01% of benzotriazole and 0.02% of EDTA 2Na salt were added based on the entire weight of the aqueous ink.

| | |
|---|---|
| Dispersion P10 <150> | 20.0% |
| Nonionic surfactant | 1.0% |
| Ethylene glycol | 5.0% |
| Glycerin | 15.0% |
| Ion exchanged water | balance |

In the composition above, Noigen EA160 (trade name, produced by Dai-ichi Kogyo Seiyaku Co., Ltd.) was used as the nonionic surfactant.

(3) Measurement of Amount of Monovalent Anion in Dispersing Element

The aqueous ink prepared in Comparative Example P-2(2) was measured by the method described in "Measurement of Amount of Monovalent Anion in Dispersing Element" above, as a result, the total amount of monovalent anions was 5,393 ppm. The details of the measurement results are shown in Table 63.

(4) Printing Evaluation

The aqueous ink prepared in Comparative Example P-2(2) was subjected to printing evaluation according to the same evaluation criteria as in Example P-1(4) by using the same aqueous inkjet printer PM-950C (manufactured by Seiko Epson Corporation) as in Example P-1(4) and using the same evaluation paper as in Example P-1(4). The printing evaluation results are shown in Table 62.

(5) Evaluation of Ejection Stability

The ejection stability was evaluated by the same evaluation method as in Example P-1(5) using the same printer and aqueous ink as in Comparative Example P-2(4) according to the same evaluation criteria as in Example P-1(5). The evaluation results of ejection stability are shown in Table 63.

(6) Evaluation of Storage Stability

The aqueous ink prepared in Comparative Example P-2(2) above was evaluated on the storage stability by the same evaluation method as in Example P-1(6) according to the same evaluation criteria as in Example P-1(6). The evaluation results of storage stability are shown in Table 63.

TABLE 61

List of Dispersions P1 to P9

| | Name of Dispersion | | | | | | | | |
|---|---|---|---|---|---|---|---|---|---|
| | Dispersion P1 | Dispersion P2 | Dispersion P3 | Dispersion P4 | Dispersion P5 | Dispersion P6 | Dispersion P7 | Dispersion P8 | Dispersion P9 |
| Pigment used | Color Black FW-18 | C.I. Pigment Yellow 74 | C.I. Pigment Red 122 | C.I. Pigment Blue 15:4 | C.I. Pigment Orange 43 | C.I. Pigment Brown 26 | C.I. Pigment Violet 19 | C.I. Pigment Green 47 | Color Black FW-18 |
| Amount of aromatic ring | 56% | 26% | 38% | 45% | 56% | 67% | 21% | 30% | 20% |
| Pigment:polymer ratio | 8.0:2.0 | 6.5:3.5 | 8.0:2.0 | 6.0:4.0 | 3.5:6.5 | 3.0:7.0 | 9.0:1.0 | 5.5:4.5 | 4.5:5.5 |

TABLE 62

Printing Evaluation Results of Ink of Examples and Comparative Examples

| Paper Evaluated | Example P | | | | | | | | Comparative Example P | |
|---|---|---|---|---|---|---|---|---|---|---|
| | 1 | 2 | 3 | 4 | 5 | 6 | 7 | 8 | 1 | 2 |
| (a) Conqueror | A | A | A | A | A | A | A | A | D | D |
| (b) Reymat | A | A | A | A | A | A | A | A | C | C |
| (c) Mode Copy | A | A | A | A | A | A | A | A | D | D |
| (d) Rapid Copy | A | A | A | A | A | A | A | B | D | D |
| (e) Xerox P | A | A | A | A | A | A | A | A | C | C |
| (f) Xerox 4024 | A | A | A | A | A | A | A | A | C | D |
| (g) Xerox 10 | A | A | A | A | A | B | B | B | D | D |
| (h) Neenha Bond | A | A | A | A | A | A | A | A | C | D |
| (i) Ricopy 6200 | A | A | A | A | A | B | A | B | D | D |
| (j) Hammer mill Copy Plus | B | A | A | A | A | B | B | B | D | D |

As apparent from the results in Tables 61 and 62, the printing quality is bad when the aqueous ink cartridge of Comparative Example is used, and the printing quality is good when the aqueous ink cartridge of the present invention is used.

This reveals that by using the aqueous ink cartridge of the present invention, high-quality print recording can be obtained with reduced blurring on any species of paper.

As apparent from the results in Table 63, the aqueous ink of the present invention where the amount of monovalent anion in the dispersing element is reduced to 3,500 ppm or less ensures excellent ejection stability and high storage stability and, from Table 62, also ensures excellent printing quality. Furthermore, it is seen that when the amount of monovalent anion is 2,500 ppm or less, very excellent ejection stability and storage stability can be obtained. On the other hand, when the amount of monovalent anion exceeds 5,000 ppm as in Comparative Examples, the printing quality, ejection stability and storage stability all fail in reaching the practicable level.

These results reveal that good printing quality and ejection stability can be obtained by using the aqueous ink of the present invention and moreover, the storage stability of the ink is excellent.

INDUSTRIAL APPLICABILITY

An aqueous ink ensuring less blurring and high color formation on plain paper and satisfactory color formation and fixing property on special paper and furthermore, ensuring excellent ejection stability can be provided.

The invention claimed is:
1. An aqueous ink comprising a dispersing element of a pigment encapsulated with a polymer and rendered dispersible in water, and two or more members selected from an acetylene glycol-base surfactant, an acetylene alcohol-base surfactant, a silicon-base surfactant, a glycol ether and an 1,2-alkylene glycol having a carbon number of 4 to 10, wherein the amount of an aromatic ring in said polymer is from 25 to 50 wt % of said polymer, and wherein the aqueous

TABLE 63

Amount of Monovalent Anion in Dispersing Element of Examples and Comparative Examples and Evaluation Results of Storage Stability and Ejection Stability

| | Example P | | | | | | | | Comparative Example P | |
|---|---|---|---|---|---|---|---|---|---|---|
| | 1 | 2 | 3 | 4 | 5 | 6 | 7 | 8 | 1 | 2 |
| Amount of monovalent anion (ppm) | | | | | | | | | | |
| Chlorine ion | 1892 | 1023 | 932 | 1884 | 1734 | 2187 | 1945 | 2630 | 3324 | 3416 |
| Bromine ion | 593 | 156 | 59 | 98 | 360 | 325 | 982 | 689 | 1086 | 1137 |
| Iodine ion | 85 | — | 17 | — | 312 | 51 | — | 110 | 520 | 606 |
| Total | 2570 | 1179 | 1008 | 1982 | 2406 | 2563 | 2927 | 3429 | 5059 | 5393 |
| Foreign matters | A | A | A | A | A | A | B | B | C | D |
| Viscosity | A | A | A | A | A | A | A | B | C | D |
| Surface tension | A | A | A | A | A | A | A | B | C | D |
| Ejection stability | B | A | A | A | A | B | B | B | D | D |

* In the Table, "—" shows that the amount is lower than the measurement limit value.

ink comprises a liquid component in which the dispersing element is dispersed, wherein the liquid component contains a total amount of polyvalent metal ions of 200 ppm or less, and does not contain any one of Si, Ca, Mg, Fe, Cr, Ni or Zr ions in an amount of more than 50 ppm.

2. The aqueous ink as claimed in claim 1, wherein the weight ratio of said pigment to said polymer is from 10:90 to 90:10.

3. The aqueous ink as claimed in claim 1, wherein the weight ratio of said pigment to said polymer is from 40:60 to 90:10 for a black pigment, from 50:50 to 90:10 for a yellow pigment, from 50:50 to 90:10 for a red pigment and from 20:80 to 70:30 for a blue pigment.

4. The aqueous ink as claimed in claim 1, wherein the liquid component contains polyvalent anions in an amount of 1,000 ppm or less.

5. The aqueous ink as claimed in claim 4, wherein said polyvalent anions contained in the liquid component are selected from the group consisting of sulfate ions, and phosphate ions.

6. The aqueous ink as claimed in claim 1, wherein the liquid component contains monovalent cations in an amount of 5,000 ppm or less.

7. The aqueous ink as claimed in claim 6, wherein said monovalent cations are alkali metal ions.

8. The aqueous ink as claimed in claim 7, wherein said alkali metal ions are selected from the group consisting of lithium ions, sodium ions and potassium ions.

9. The aqueous ink as claimed in claim 6, wherein said monovalent cations are ammonium ions.

10. The aqueous ink as claimed in claim 1, wherein the liquid component contains monovalent anions in an amount of 3,000 ppm or less.

11. The aqueous ink as claimed in claim 10, wherein said monovalent anions are halogen ions.

12. The aqueous ink as claimed in claim 11, wherein said halogen ions are selected from the group consisting of chlorine ions, bromine ions and iodine ions.

13. The aqueous ink as claimed in claim 1, wherein the liquid component contains polyvalent metal ions in an amount of 200 ppm or less, polyvalent anions in an amount of 1,000 ppm or less, monovalent cations in an amount of 5,000 ppm or less, monovalent anions in an amount of 3,000 ppm or less and free polymer in an amount of 2 wt % or less.

14. The aqueous ink as claimed in claim 1, wherein the polymer encapsulating the colorant in said dispersing element is one or more member selected from the group consisting of a polyacrylic acid ester, a styrene-acrylic acid copolymer, a polystyrene, a polyester, a polyamide, a polyimide, a silicon-containing polymer and a sulfur-containing polymer.

15. The aqueous ink as claimed in claim 1, wherein the polymer that encapsulates the pigment is produced by an emulsification polymerization method or a phase inversion emulsification reaction method.

16. The aqueous ink as claimed in claim 1, wherein the members comprise the acetylene glycol-base surfactant, and the glycol ether or the 1,2-alkylene glycol having a carbon number of 4 to 10.

17. The aqueous ink as claimed in claim 16, wherein the acetylene glycol-base surfactant is present in an amount of 0.01 to 10 wt % and the 1,2-alkylene glycol having a carbon number of 4 to 10 is present in an amount of 1 wt % or more, the aqueous ink further comprising at least one of (di)ethylene glycol monobutyl ether and (di)propylene glycol monobutyl ether.

18. The aqueous ink as claimed in claim 16, further comprising (di)propylene glycol monobutyl ether in an amount of 10 wt % or less.

19. The aqueous ink as claimed in claim 16, further comprising (di)ethylene glycol monobutyl ether in an amount of 20 wt % or less.

20. The aqueous ink as claimed in claim 16, wherein the 1,2-alkylene glycol having a carbon number of 4 to 10 is 1,2-hexanediol, and the 1,2-hexanediol is present in an amount of 0.5 to 10 wt %.

* * * * *